(12) United States Patent
Xiao et al.

(10) Patent No.: US 8,526,020 B2
(45) Date of Patent: Sep. 3, 2013

(54) PAPER SIZE SUPPORT FOR A PRINT SYSTEM

(75) Inventors: Zhenning Xiao, Renton, WA (US); Senthil K. Selvaraj, Snoqualmie, WA (US)

(73) Assignee: Ricoh Company, Ltd., Tokyo (JP)

( * ) Notice: Subject to any disclaimer, the term of this patent is extended or adjusted under 35 U.S.C. 154(b) by 997 days.

(21) Appl. No.: 12/399,891

(22) Filed: Mar. 6, 2009

(65) Prior Publication Data

US 2010/0225933 A1    Sep. 9, 2010

(51) Int. Cl.
    *G06F 3/12*      (2006.01)

(52) U.S. Cl.
     USPC .......... 358/1.13; 358/1.15; 358/501; 358/1.2; 358/401; 719/321; 719/327; 719/329

(58) Field of Classification Search
     USPC ......... 358/1.13, 1.15, 501, 1.2, 401; 715/243
     See application file for complete search history.

(56) References Cited

U.S. PATENT DOCUMENTS

| | | |
|---|---|---|
| 5,467,434 A | 11/1995 | Hower et al. |
| 5,487,168 A | 1/1996 | Geiner et al. |
| 5,513,126 A | 4/1996 | Harkins et al. |
| 5,692,111 A | 11/1997 | Marbry et al. |
| 5,768,483 A | 6/1998 | Maniwa et al. |
| 5,845,076 A | 12/1998 | Arakawa |
| 5,875,350 A | 2/1999 | Comp et al. |
| 5,996,029 A | 11/1999 | Sugiyama et al. |
| 5,999,945 A | 12/1999 | Lahey et al. |
| 6,148,346 A | 11/2000 | Hanson |
| 6,351,320 B1 | 2/2002 | Shin |
| 6,421,135 B1 * | 7/2002 | Fresk et al. ................ 358/1.15 |
| 6,453,127 B2 | 9/2002 | Wood et al. |
| 6,501,472 B1 | 12/2002 | Hunt et al. |
| 6,631,010 B1 | 10/2003 | Foster et al. |
| 6,789,111 B1 | 9/2004 | Brockway et al. |
| 6,825,941 B1 | 11/2004 | Nguyen et al. |

(Continued)

FOREIGN PATENT DOCUMENTS

| | | |
|---|---|---|
| GB | 2347766 | 9/2000 |
| JP | 2002-014786 | 1/2002 |

(Continued)

OTHER PUBLICATIONS

Xerox, Xerox 4595 Copier/Printer System Administration Guide, Jan. 2008, Xerox, pp. 1-402.

(Continued)

*Primary Examiner* — King Poon
*Assistant Examiner* — Beniyam Menberu
(74) *Attorney, Agent, or Firm* — Hickman Palermo Truong Becker Bingham Wong LLP; Daniel D. Ledesma

(57) ABSTRACT

Techniques are provided for allowing a print driver to recognize a paper size that is not supported by the print driver. A printing device informs the print driver (executing on a client device) that an input tray of the printing device supports a particular paper size. Alternatively, the printing device informs the print driver that a feature and/or option supported by the printing device has changed. The print driver requests the new paper size (or the set of features and options) from the printing device. The print driver receives the new paper size data from the printing device and updates its user interface to allow a user to select the new paper size as a supportable option.

19 Claims, 7 Drawing Sheets

(56) References Cited

U.S. PATENT DOCUMENTS

| | | |
|---|---|---|
| 6,898,624 B2 | 5/2005 | Young et al. |
| 6,952,831 B1 | 10/2005 | Moore |
| 6,967,728 B1 | 11/2005 | Vidyanand |
| 7,002,703 B2 | 2/2006 | Parry |
| 7,082,574 B2 | 7/2006 | Ogino et al. |
| 7,120,910 B2 | 10/2006 | Matsuda et al. |
| 7,136,941 B2 | 11/2006 | Nguyen et al. |
| 7,162,518 B2 | 1/2007 | Takahashi |
| 7,174,534 B2 | 2/2007 | Chong et al. |
| 7,180,616 B2 | 2/2007 | Miyoshi et al. |
| 7,312,887 B2 | 12/2007 | Wu |
| 7,522,299 B2 | 4/2009 | Nguyen et al. |
| 7,605,936 B2 | 10/2009 | Uchida et al. |
| 7,633,403 B2 | 12/2009 | Abe et al. |
| 7,728,999 B2 | 6/2010 | White et al. |
| 7,809,807 B2 | 10/2010 | Tominaga |
| 7,849,094 B2 | 12/2010 | Arai |
| 8,099,486 B2 | 1/2012 | Nakamura et al. |
| 8,149,431 B2 | 4/2012 | Barton et al. |
| 8,243,294 B2 * | 8/2012 | Herrmann et al. ........... 358/1.13 |
| 2001/0050684 A1 | 12/2001 | Smith |
| 2002/0030840 A1 | 3/2002 | Itaki et al. |
| 2002/0054339 A1 | 5/2002 | Arakawa |
| 2002/0078160 A1 | 6/2002 | Kemp et al. |
| 2002/0171857 A1 | 11/2002 | Hisatomi et al. |
| 2002/0174444 A1 | 11/2002 | Gatto et al. |
| 2002/0184294 A1 | 12/2002 | Volkoff et al. |
| 2003/0030664 A1 | 2/2003 | Parry |
| 2003/0033368 A1 | 2/2003 | Tominaga |
| 2003/0160989 A1 | 8/2003 | Chapin et al. |
| 2003/0174357 A1 * | 9/2003 | Lester et al. ................. 358/1.15 |
| 2003/0184782 A1 | 10/2003 | Perkins et al. |
| 2004/0019628 A1 | 1/2004 | Puri et al. |
| 2004/0130744 A1 | 7/2004 | Wu et al. |
| 2004/0179231 A1 | 9/2004 | Savino et al. |
| 2004/0215665 A1 | 10/2004 | Edgar et al. |
| 2004/0246505 A1 | 12/2004 | Oh |
| 2004/0263900 A1 * | 12/2004 | Nguyen et al. ............... 358/1.15 |
| 2005/0046886 A1 | 3/2005 | Ferlitsch |
| 2005/0099650 A1 | 5/2005 | Brown et al. |
| 2005/0111029 A1 | 5/2005 | Dehart |
| 2005/0162688 A1 | 7/2005 | Nakaoka et al. |
| 2005/0213136 A1 | 9/2005 | Noyama et al. |
| 2005/0223390 A1 | 10/2005 | Moore |
| 2005/0225795 A1 * | 10/2005 | Nuggehalli et al. ......... 358/1.15 |
| 2006/0023244 A1 | 2/2006 | Mitsui |
| 2006/0087682 A1 | 4/2006 | Lee |
| 2006/0221372 A1 | 10/2006 | Onishi et al. |
| 2006/0221391 A1 | 10/2006 | Okazawa et al. |
| 2006/0268328 A1 * | 11/2006 | Park et al. ................... 358/1.15 |
| 2007/0002355 A1 | 1/2007 | Kai |
| 2007/0002368 A1 | 1/2007 | Corona |
| 2007/0013935 A1 * | 1/2007 | Uchida ........................ 358/1.13 |
| 2007/0086023 A1 | 4/2007 | Kadota |
| 2007/0097399 A1 * | 5/2007 | Boyd et al. .................. 358/1.13 |
| 2007/0136485 A1 | 6/2007 | Mitsui |
| 2007/0174521 A1 | 7/2007 | Aritomi |
| 2007/0214409 A1 | 9/2007 | Miyata |
| 2007/0263242 A1 | 11/2007 | Takahashi |
| 2008/0007742 A1 * | 1/2008 | Abe et al. ....................... 358/1.1 |
| 2008/0037062 A1 | 2/2008 | Omino et al. |
| 2008/0059978 A1 * | 3/2008 | Nishio .......................... 719/318 |
| 2008/0068635 A1 | 3/2008 | Asano |
| 2008/0192121 A1 | 8/2008 | Hashimoto |
| 2008/0231886 A1 | 9/2008 | Wehner et al. |
| 2008/0239373 A1 * | 10/2008 | Suzuki ......................... 358/1.15 |
| 2008/0297838 A1 * | 12/2008 | Matsui et al. ................ 358/1.15 |
| 2008/0301277 A1 | 12/2008 | Tsujiguchi |
| 2009/0040549 A1 * | 2/2009 | Miyamoto ................... 358/1.15 |
| 2009/0063718 A1 * | 3/2009 | Sekine et al. ..................... 710/8 |
| 2009/0190150 A1 | 7/2009 | Selvaraj et al. |
| 2010/0027040 A1 | 2/2010 | Kuroda |
| 2010/0082782 A1 | 4/2010 | Ding |
| 2010/0100832 A1 | 4/2010 | Wang et al. |
| 2010/0188688 A1 | 7/2010 | Selvaraj et al. |
| 2010/0225957 A1 | 9/2010 | Liu |
| 2010/0225958 A1 | 9/2010 | Selvaraj et al. |
| 2010/0225959 A1 | 9/2010 | Selvaraj et al. |

FOREIGN PATENT DOCUMENTS

| | | |
|---|---|---|
| JP | 2002024495 A | 1/2002 |
| JP | 2005031956 A | 2/2005 |
| JP | 2005148953 A | 6/2005 |
| JP | 2006/024199 A | 1/2006 |
| JP | 2006155289 A | 6/2006 |
| JP | 2007-034899 | 2/2007 |
| WO | WO 2004/070607 A1 | 8/2004 |

OTHER PUBLICATIONS

U.S. Appl. No. 12/253,823, filed Oct. 17, 2008, Final Office Action, mailed Feb. 17, 2012.

U.S. Appl. No. 12/253,823, filed Oct. 17, 2008, Final Office Action, Feb. 8, 2011.

European Patent Office, "European Search Report", application No. EP 07250298, dated Feb. 23, 2010, 8 pages.

Systems Inc., "PostScript Printer Description File Format Specification 4.3—Chapters 1 & 2", Internet Citation, XP002158174, retrieved from http://partners.adobe.com/asn/developer/pdfs/tn/5003.PPD_Spec_v4.3.pdf, 18 pages.

European Patent Office, "European Search Report", application No. EP 09151185, 8 pages.

U.S. Appl. No. 11/846,926, filed Aug. 29, 2007, Final Office Action, Aug. 15, 2011.

U.S. Appl. No. 12/253,823, Oct. 17, 2008, Final Office Action, Aug. 31, 2011.

U.S. Appl. No. 11/846,926, filed Aug. 29, 2007, Interview Summary, Sep. 21, 2011.

U.S. Appl. No. 11/846,869, filed Aug. 29, 2007, Final Office Action, Oct. 27, 2011.

U.S. Appl. No. 12/399,884, filed Mar. 6, 2009, Final Office Action, Nov. 26, 2012.

U.S. Appl. No. 12/399,895, Mar. 6, 2009, Notice of Allowance, Jan. 2, 2013.

U.S. Appl. No. 12/360,794, Jan. 27, 2009, Notice of Allowance, Jan. 25, 2013.

U.S. Appl. No. 12/399,799, filed Mar. 6, 2009, Office Action, mailed Apr. 23, 2013.

* cited by examiner

PAPER SIZE SUPPORT FOR A PRINT SYSTEM

RELATED APPLICATION DATA

This application is related to U.S. patent application Ser. No. 12/399,799 entitled "Driverless Architecture For Printing Systems", filed Mar. 6, 2009, U.S. patent application Ser. No. 12/399,884 entitled "Approach For Printing to Web Services-Enabled Printing Devices", filed Mar. 6, 2009, and U.S. patent application Ser. No. 12/399,895 entitled "Print Driver Localization Support From Printing Device To Support Multiple User Profiles", filed Mar. 6, 2009, U.S. patent application Ser. No. 11/846,884 entitled "Capability-Based Control Of A Computer Peripheral Device", filed Aug. 29, 2007, U.S. patent application Ser. No. 11/846,926 entitled "Automatically Generating Capability-Based Computer Peripheral Device Drivers", filed Aug. 29, 2007, U.S. patent application Ser. No. 12/019,610 entitled "On-Demand Print Driver", filed Jan. 24, 2008, U.S. patent application Ser. No. 12/253,823 entitled "Providing Device Defined User Interface Modifiers To A Computer System", filed Oct. 17, 2008, and U.S. patent application Ser. No. 12/360,794 entitled "Automatically Updating A Printer Driver With New Printing Device Features", filed Jan. 27, 2009, the contents all of which are incorporated by reference in their entirety for all purposes as if fully set forth herein.

FIELD OF THE INVENTION

The present invention generally relates to printing and, more particularly, to supporting seemingly unlimited paper sizes in a printing system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Part of the utility of a printing device includes the number of features and options on the printing device that are available to users of the printing device. One of those features is paper size. The more paper size options that are available, the more varying types of print jobs a user can submit. However, the number of different paper size options tends to be limited by the number of paper size options defined in the corresponding print driver. Thus, even if a printing device is capable of 100 different paper size options, the corresponding print driver may be configured to only recognize a relatively small number of paper sizes.

A print driver is software that executes on a client device (e.g., a PC) and converts data to be printed to the form specific to a printing device of a particular model. The purpose of printer drivers is to allow software application programs to cause printing without being aware of the technical details of the corresponding printing device.

Some printing devices include a configurable input paper tray, which is adjustable to take print media of an almost unlimited number of paper sizes. However, because print drivers are defined to only support a certain number of paper sizes, if a user wants to print with a paper size that the print driver does not support, then the user must take one of two approaches. According to a first approach, the user determines the new paper size and creates a new form for the new paper size using an application program's graphical user interface (GUI). According to a second approach, the user uninstalls the old print driver, locates a new print driver that supports the new paper size (assuming one exists), and installs the new print driver.

One example is envelope printing where a printing device includes an adjustable envelope input tray. If a user adjusts the envelope input tray and wants to print to the envelope input tray, then the user is required to (1) know the exact dimensions of the envelope that the user is inserting and then (2) select the size of the envelope from a pre-defined list of envelope sizes that the current print driver supports. If the user does not know the exact size, then the user may either select a wrong paper size or not be able to print. This results in a significant inconvenience to the user.

According to the first approach, if the user is inserting an envelope whose paper size is not supported by the corresponding print driver, then the user must perform (according to the first approach described above) a number of steps in order to be able print with that envelope. FIG. 1 is a flow diagram 100 that depicts these manual steps. At step 110, the user adjusts the input paper tray (or simply "input tray") to fit the envelope. At step 120, the user measures the dimensions of the envelope. At step 130, using a GUI of an application program, the user creates a new form based on the dimensions of the envelope. The print application provides user interface controls that allow the user to input a new paper size and save the new paper size for subsequent selection when submitting a print job. At step 140, the user opens the application program (if not already open) and prints with the new form. Even though the user is able to print using a paper size that is not supported by the corresponding print driver, the user must perform a number of manual steps that may significantly inconvenience the user.

One of the problems with the second approach is that a new print driver must be generated and distributed to a large number of users. Printing device manufacturers attempt to provide current print drivers available on their Website for download, but many users do not know to check a manufacturer's Website for current drivers. Furthermore, many print drivers must be certified by the company that makes the operating system or by printing device manufactures, which can be time consuming and expensive. Any changes to a print driver typically trigger a re-certification requirement.

SUMMARY

Techniques are provided for printing electronic data. According to one technique, a print driver, executing on a client device, retrieves, from a Web Service-enabled printing device, paper size data that indicates a particular paper size that the Web Service-enabled printing device is currently configured to support. The particular paper size is not supported by the print driver. In response to retrieving the paper size data, the print driver updates, based at least upon the paper size data, printer description data, associated with the print driver, to indicate the particular paper size. Printer description data specifies display data for one or more features and options from the plurality of features and options currently supported by the Web Service-enabled printing device. The print drive then generates, based at least upon the display data contained in the printer description data, graphical user interface data which, when processed at the client device, causes at least the particular paper size to be displayed on a graphical user interface. The print driver then receives, from an application program, application data generated by the application program. The application data indicates the particular paper size. The print driver generates print data and a print job ticket based upon the application data. The print driver causes the print data and the print job ticket to be transmitted to the Web services-enabled printing device.

According to another technique, a print driver, executing on a client device, retrieves, from a Web Service-enabled printing device, paper size data that indicates a particular paper size that the Web Services-enabled printing device is currently configured to support. Again, the particular paper size is not supported by the print driver. In response to retrieving the paper size data, the print driver creates, based at least upon the paper size data, a form that corresponds to the particular paper size and indicates the particular paper size. An application program then generates, based at least upon the form, graphical user interface data which, when processed at the client device, causes at least the particular paper size to be displayed on a graphical user interface. The print driver receives, from the application program, application data generated by the application program. The application data indicates the particular paper size. The print driver generates, based upon the application data, print data and a print job ticket. The print driver causes the print data and the print job ticket to be transmitted to the Web services-enabled printing device.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided to allow a user to print with a paper size that is not supported by a print driver. Thus, the print driver is configurable in being able to process print jobs that specify a seemingly unlimited number of paper sizes.

Although the following description references "paper size," embodiments of the invention are not limited to paper as the sole print media. Embodiments of the invention include any other type of print media. Thus, "paper size" is merely shorthand for "print media size."

Figure 1:
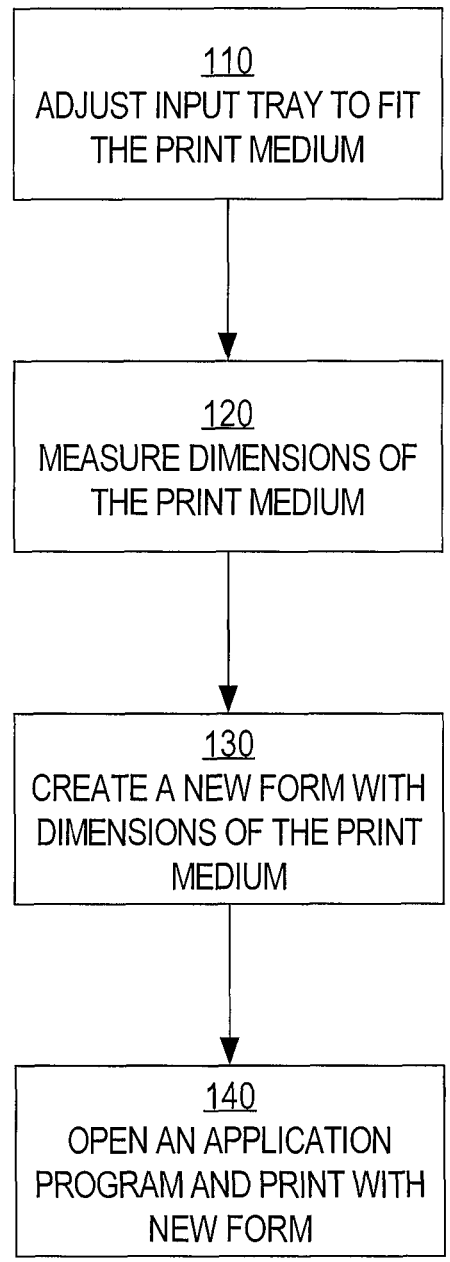
FIG. 1 is a flow diagram that depicts manual steps that, according to one approach, a user performs to be able to print with a paper size that is not defined by a print driver.
Figure 2:
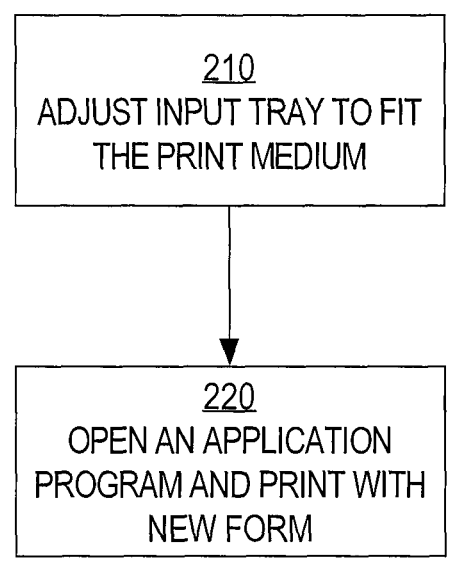
FIG. 2 is a flow diagram that depicts manual steps that a user performs to be able to print with a paper size that is not defined by a print driver, according to an embodiment of the invention.

FIG. 2 is a flow diagram 200 that depicts manual steps that a user performs to be able to print with a paper size that is not supported by a print driver, according to an embodiment of the invention. At step 210, the user adjusts an input tray on a printing device to fit a print medium on which print data will be printed. At step 220, the user opens an application program and causes the application program to issue a print job with (a) a new form that the print driver automatically created (i.e., without user assistance) based on the adjusted input tray or (b) a selection, in a GUI generated by the print driver, of a paper size that corresponds to the adjusted input tray.

Printing System Architecture

Figure 3:
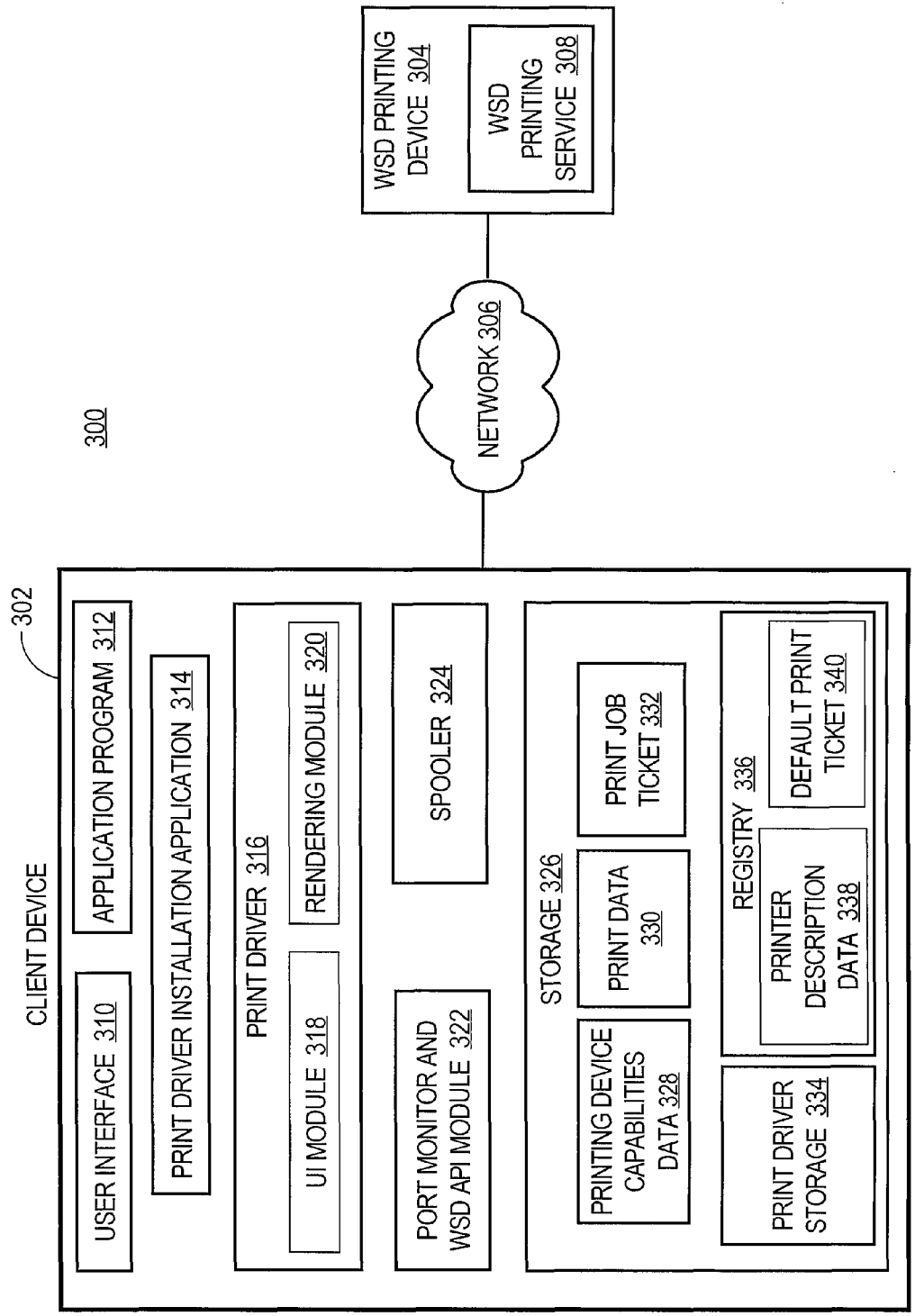
FIG. 3 is a block diagram that depicts an example printing arrangement, according to an embodiment of the invention.

FIG. 3 is a block diagram that depicts an example printing arrangement 300 that includes a client device 302 and a Web Services-enabled (WSD) printing device 304 communicatively coupled via a network 306. Network 306 may be implemented by any medium or mechanism that provides for the exchange of data between client device 302 and WSD printing device 304. Examples of network 306 include, without limitation, a network such as a Local Area Network (LAN), Wide Area Network (WAN), Ethernet or the Internet, or one or more terrestrial, satellite or wireless links.

WSD printing device 304 includes a WSD printing service 308. Client device 302 includes a user interface 310, an application program 312, a print driver installation application 314, a print driver 316, with a User Interface (UI) module and a rendering module 320, a port monitor and Web Services Device (WSD) Application Program Interface (API) module 322, a spooler 324, and a storage 326. Storage 326 stores printing capabilities data 328, print data 330, and a print job ticket 332. Storage also includes a print driver storage 334 and a registry 336 that stores printer description data 338 and a default print ticket 340. Each of these elements is briefly described below and in more detail hereinafter.

User interface 310 is a mechanism and/or medium for presenting information to a user and allowing user input. Application program 312 may be any type of program that prints data. Examples of application program 312 include, without limitation, a word processing program, a spreadsheet program, an email client, etc. A single application program 312 is depicted in FIG. 3 for purposes of explanation, but client device 302 may have any number of application programs.

Printer driver installation application 314 performs installation of print driver 316 which may include installing any data or files required by print driver 316. Installation of print driver 316 may also include obtaining data and/or files from other sources and locations, depending upon an implementation, as well as performing any configuration required by an operating system.

Print driver 316 interacts with application program 312 to generate print data for printing on WSD printing device 304. UI module 318 generates graphical user interface data which, when processed by application program 312, provides a graphical user interface on user interface 310 for a user to select the features and options to be used when printing a particular electronic document. Rendering module 320 processes application data generated by application program 312 and generates print data which, when processed by WSD printing device 304, cause a printed version of an electronic document reflected in the print data to be printed at WSD printing device 304. Print driver 316 performs various other functions that are described in more detail hereinafter.

Port monitor and WSD API module 322 allow communications between print driver 316 and WSD printing device 304. For example, the WSD API module 322 may be installed on a custom port and print driver 316 communicates with the WSD API module 322 via the custom port. The port monitor and WSD API module 322 communicate with WSD printing device 304. Thus, port monitor and WSD API module 322 is capable of converting client side commands, e.g., BiDi function calls, to SOAP requests, in the form of SOAP envelopes, and is also capable of extracting XML information from SOAP responses, in the form of SOAP envelopes, received from WSD printing device 304 and generating BiDi function call responses. Port monitor and WSD API module 322 sends SOAP requests to the port associated with WSD printing service 308.

Printing device capabilities data 328 is data that specifies the current features and options, i.e., allowed values for each feature, of WSD printing device 304. Examples of printing device features include, without limitation, a paper tray, duplex printing, stapling, hole punching, ultraviolet (UV) coating, etc. Each feature has one or more options, i.e., values. Some features may only have two options. For example, UV coating typically has two options, such as "enabled" or "disabled". Other features, for example, paper size, may have many options, e.g., "A4", "legal", "8½×11", etc. Printing device capabilities data 328 stored on client device 302 may include printing device capability data for any number of WSD printing devices.

Print data 330 is data generated by print driver 316, based at least upon application data generated by application program 312, which when processed by WSD printing device 304, causes a printed version of an electronic document represented in the print data 330 to be printed. Print job ticket 332 specifies one or more parameters that indicate how print data 330 is to be processed at WSD printing device 304. Print data 330 may include data for multiple print jobs and print job ticket 332 may include multiple print job tickets.

Printer driver storage 334 contains one or more print drivers that are used by client device 302 to print on printing devices. Registry 336 is an area of storage 326 for storing printer description data 338 and the default print ticket 340. Registry 336 may be a protected area of storage 326 that is under the control of an operating system on client device 302. Default print ticket 340 includes data that indicates default options for the features supported by WSD printing device 304. Default print ticket 340 may include default print tickets for any number of printing devices.

Print driver 316 generates printer description data 338 based at least upon printing device capabilities data 328. Printer description data specifies display data for one or more feature and options currently supported by WSD printing device 304. Print driver 316 uses printer description data 338 to generate graphical user interface data and also for generating print data 330 and/or print job ticket 332.

Reporting a New Paper Size

Figure 4:
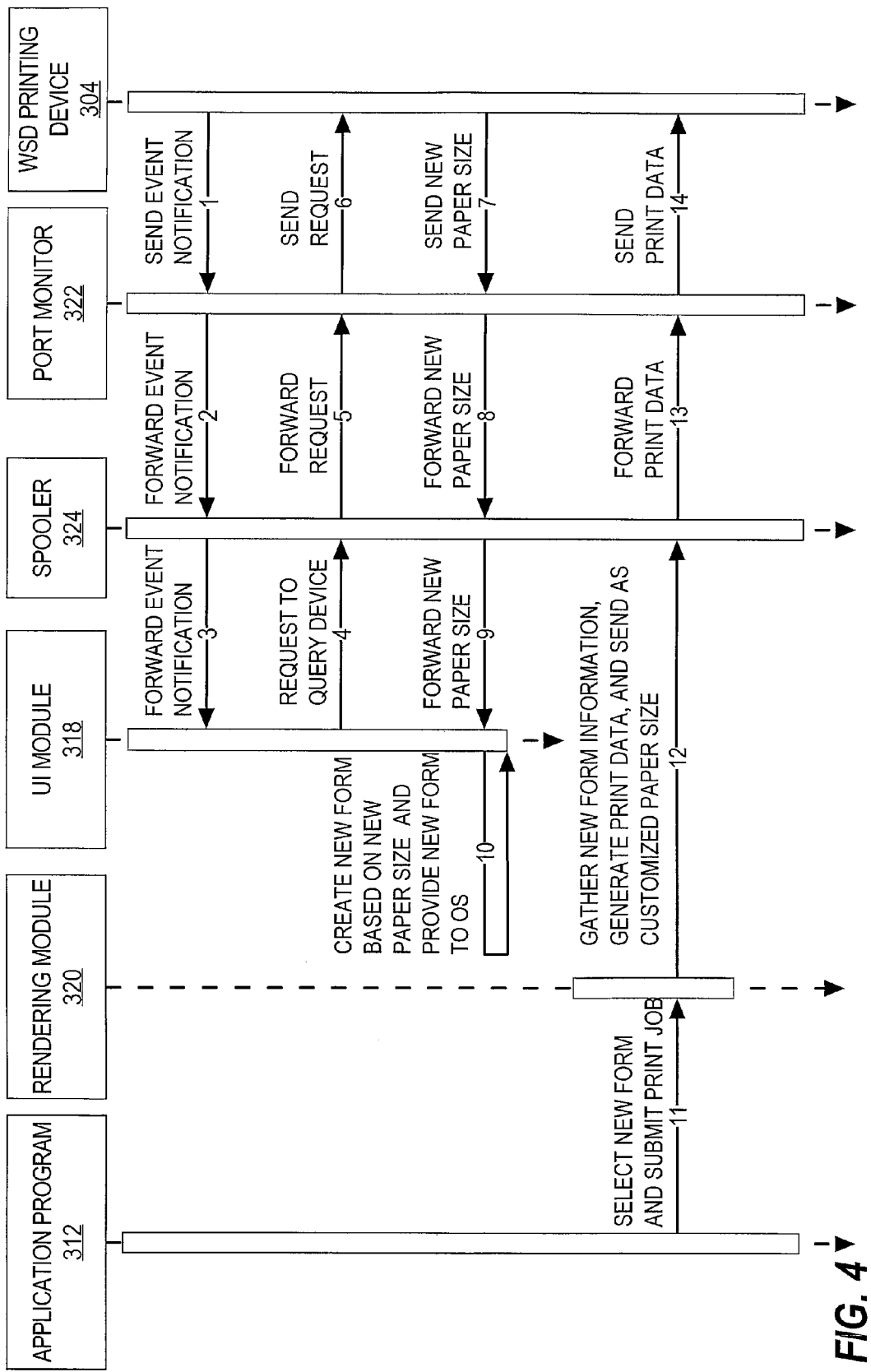
FIG. 4 is a sequence diagram that depicts an example set of communications between elements of a client device and a printing device when a new paper size is detected, according to an embodiment of the invention.

FIG. 4 is a sequence diagram that depicts an example set of communications between elements of client device 302 and WSD printing service 308 when a new paper size is detected, according to an embodiment of the invention.

At step 1, WSD printing service 308 sends an event notification that indicates that there is a change to a feature and/or option provided by WSD printing service 308. The event notification is a SOAP message that includes a portion that conforms to a WS-Eventing specification. The event notification may be sent in response to WSD printing device 304 detecting that the configuration of an input tray of WSD printing device 304 has changed or that a new input tray has been inserted into WSD printing device 304.

At step 2, in response to receiving the event notification, port monitor 322 creates, from the event notification, a modified notification that indicates that there is a change to a feature and/or option provided by WSD printing service 308. The modified notification is in a format that UI module 318 is configured to process. Thus, port monitor 322 effectively removes the SOAP and WS-Eventing-related format portions from the event notification. Port monitor 322 then sends the modified notification to spooler 324.

At step 3, spooler 324 forwards the modified notification to UI module 318.

At step 4, in response to receiving the modified notification, UI module 318 generates a request message and sends the request message to spooler 324. The request message indicates a request to query WSD printing device 304 for the features and options provided by WSD printing device 304.

At step 5, spooler 324 forwards the request message to port monitor 322.

At step 6, in response to receiving the request message, port monitor 322 creates, based on the request message, a SOAP request. The SOAP request includes a request to query WSD printing device 304 for the features and options provided by WSD printing device 304. Port monitor 322 then sends the SOAP request message to WSD printing device 304. If WSD printing device 304 implements a print device/service standard that defines an API to query a printing device/service, then the SOAP request includes a call to that API. An example of such a print service standard is Print Service Definition V1.0 for Web Services on Devices.

At step 7, in response to receiving the SOAP request, WSD printing device 304 generates a SOAP response. The SOAP response includes new paper size data in addition to the other features and options provided by WSD printing device 304. WSD printing device 304 then sends the SOAP response to port monitor 322.

At step 8, in response to receiving the SOAP response, port monitor 322 creates, from the SOAP response, a modified response that also includes the features and options currently supported by WSD printing service 308 and the new paper size data. The modified response is in a format that UI module 318 is configured to process. Thus, port monitor 322 effectively removes the SOAP-related format portions from the SOAP response. Port monitor 322 then sends the modified response to spooler 324.

At step 9, spooler 324 forwards the modified response to UI module 318.

At step 10, in response to receiving the modified response, UI module 318 creates, based at least in part on the new paper size data, a new form for the new paper size. A form is a set of data that indicates a paper size and other information related to the paper size, such as margins. UI module 318 then provides the new form to the operating system of client device 302. In this way, one or more application programs (including application program 312) may use the new form as a native form of WSD printing device 304. Also, UI module 318 updates its user interface to display the new paper size as a selectable option.

According to an embodiment, step 10 includes UI module 318 updating printer description data 338 in response to receiving the modified response that includes the new paper size data. The process of generating and updating printer description data 338 is described in detail below.

At step 11, application program 312 generates a GUI, based at least in part on the new form, in response to user input that indicates a user's desire to print electronic data onto one or more print media. Then, in response to a user selection of the new paper size via the new form and the submission of a print job, application program 312 generates application data and sends the application data, including an indication that the new paper size was selected, to rendering module 320.

At step 12, rendering module 320 gathers information from the new form, generates print data (e.g., in the form of a PDL stream) from the application data, and sends the print data and a print ticket to spooler 324. In addition to other print specifications, the print ticket includes paper size data that indicates that the new paper size is a customized paper size rather than a new paper size.

At step 13, spooler 324 forwards the print data and the print ticket to port monitor 322.

At step 14, port monitor 322 generates a SOAP print request and includes the print data and the print ticket in the SOAP message. Port monitor 222 then sends the SOAP print request to WSD printing service 308. In response to receiving the SOAP print request message, WSD printing service 308 prints to the input tray that includes one or more print media on which the print data is to be printed. The dimensions of the one or more print media correspond to the new paper size.

According to an embodiment, the event notification, from WSD printing device 304 in step 1, specifically indicates what change has occurred, i.e., that a new paper size is supported. In this embodiment, the event notification may itself include the new paper size data. If the event notification does not include the new paper size, then, at step 4, UI module 318 may be configured to request only the new paper size, instead of requesting features and/or other options provided by WSD printing device 304.

As indicated above, in some situations, application program 312 may not provide its own print GUI to allow a user to (1) view certain features of WSD printing device 304 and (2) select options associated with those features. In such a scenario, steps 10-12 may be different. For example, at step 10, UI module 318 does not create a new form and, thus, does not provide the new form to the operating system. Instead, UI module 318 updates printer description data 338, which updating is described in detail below. Then, at step 11, UI module 318 generates, in response to user input indicating the user's desire to print, a GUI that displays the new paper size as a selectable option. The user selects the new paper size option on the GUI and submits a print job. This scenario is described in more detail below.

Generating Printer Description Data

As previously described herein, UI module 318 is configured to generate and store in registry 336 printer description data 338 and is also configured to store default print tickets received from WSD printing device 304. Printer description data 338 is used by UI module 318 to generate GUI data which, when processed by application program 312, causes a GUI to be displayed on user interface 310 that displays the features and options supported by WSD printing device 304 and allows a user to select one or more features and options to be used when printing a particular electronic document.

The process for generating printer description data 338 generally involves combining information from the printing device capabilities data 328 for WSD printing device 304 and data from Core Mapping Data that is provided as part of the basic installed print driver. Appendix A includes example printing device capabilities data, Appendix B includes example core mapping data and Appendix C includes example printer description data.

According to an embodiment of the invention, UI module 318 examines the printing device capabilities data 328 and identifies the printing device features specified therein. For each feature in printing device capabilities data 328, UI module 318 determines whether the feature is defined in the core mapping data. Core mapping data includes PDLKeywords and rcNameIDs for a standard set of printing device features and options. If a particular feature in printing device capabilities data 328 is defined in the core mapping data, then UI module 318 retrieves a PDLkeyWord value and rcNameID Value for the particular feature and each of the corresponding options from the core mapping file and stores the PDLkeyWord values and the rcNameID Values in printer description data. The PDLkeyWord value provides a mapping between a feature or option terminology understood by print driver 316 and the terminology understood by WSD printing service 308 for the same feature or option. The rcNameID Value indicates the name of a string variable (resource ID) that contains the string for the feature or option. The string is included in the GUI data that is generated by UI module 318 and provided to application program 312. Consider the following example. Suppose that printing device capabilities data 328 includes a feature named "InputTray4". Suppose further that this feature is defined in the core mapping data as indicated below in Table I.

TABLE I

```
<DeviceFeature Value="InputTray4">
    <PDLKeyword Value="InputTray4"/>
    <rcNameID Value="RC_STR_TRAY4" />
    <FeatureOption Value="NotInstalled">
        <PDLKeyword Value="NotInstalled" />
        <rcNameID Value="RC_STR_NOTINSTALLED" />
    </FeatureOption >
    <FeatureOption Value="Installed">
        <PDLKeyword Value="Installed" />
        <rcNameID Value="RC_STR_INSTALLED" />
    </FeatureOption >
</DeviceFeature >
```

As indicated in Table I, the feature InputTray4 has two options that include "NotInstalled" and "Installed". Note that the feature and each option has both a specified PDLKeyword value and a specified rcNameID value, which UI module 318 retrieves and stores in printer description data.

If the particular feature in printing device capabilities data 328 is not defined in the core mapping file, then the particular feature is typically a new feature. In this situation, UI module 318 uses the feature name for the particular feature from the printing device capabilities data 328 to generate the PDLkeyWord value for printer description data 338. In addition, UI module 318 includes the DisplayName values for the particular feature in printer description data 338. Multiple DisplayName values may be included in printer description data 338 for each feature and/or option to provide support for multiple languages. The display name values are included in the GUI data that is generated by UI module 318 and provided to application program 312. Referring to the prior example, suppose that the feature named "InputTray4" is not defined in the core mapping data. Suppose further that this feature is defined in printing device capabilities data 328 as indicated below in Table II.

TABLE II

```
<rodp:InputTray4>
    <rodp:DisplayName xml:lang="en-US">Tray 4</rodp:DisplayName>
    <rodp:DefaultOption>NotInstalled</rodp:DefaultOption>
    <rodp:InputTray4Entry Name="NotInstalled">
      <rodp:DisplayName
      xml:lang="en-US">Not Installed</rodp:DisplayName>
    </rodp:InputTray4Entry>
    <rodp:InputTray4Entry Name="Installed">
      <rodp:DisplayName
      xml:lang="en-US">Installed</rodp:DisplayName>
    </rodp:InputTray4Entry>
</rodp:InputTray4>
```

As indicated in TABLE II, there are no PDLKeyword values or rcNameID values contained in the definition of the InputTray4 feature in printing device capabilities data 328. In this example, the feature name "InputTray4" is stored in printer description data 338 as the PDLKeyword value. Also, UI module 318 retrieves the DisplayName values for the feature and each option and stores the DisplayName values in printer description data 338.

Figure 5:
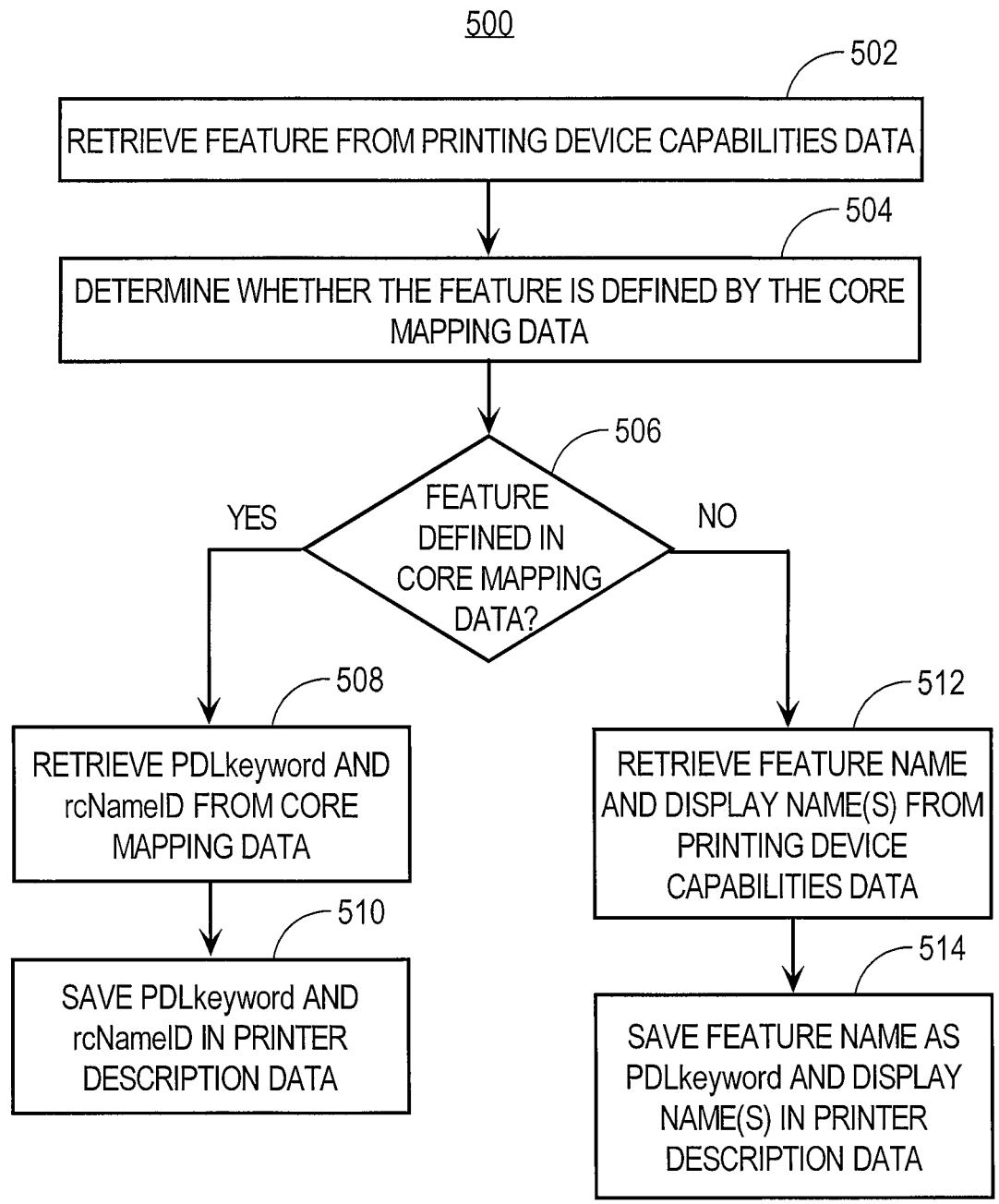
FIG. 5 is a flow diagram depicting an approach for generating printer description data for a particular feature from printing device capabilities data, according to an embodiment of the invention.

FIG. 5 is a flow diagram 500 depicting an approach for generating printer description data 338 for a particular feature from printing device capabilities data 328, according to one embodiment of the invention. This approach may be used for any number of features and also for any number of options for each feature. In step 502, a feature is retrieved from printing device capabilities data 328. In step 504, a determination is made whether the feature is defined in the core mapping data. In step 506, if the feature is defined in the core mapping data, then in step 508, the PDLkeyword and rcNameID are retrieved from the core mapping data. In step 510, the PDLkeyword and rcNameID are stored in printer description data 338. As previously mention herein, printer description data 338 may include printer description data for any number of WSD printing devices.

If, in step 506, a determination is made that the feature is not defined in the core mapping data, then in step 512, the feature name and display name(s) are retrieved from printing device capabilities data 328. As previously described herein, multiple display names may be used to provide support for multiple languages. In step 514, the feature name is stored in printer description data 338 as the PDLkeyword for the feature. Also, the display name(s) are stored in printer description data 338 in association with the feature.

Dynamic Updating of Printer Description Data

Figure 6:
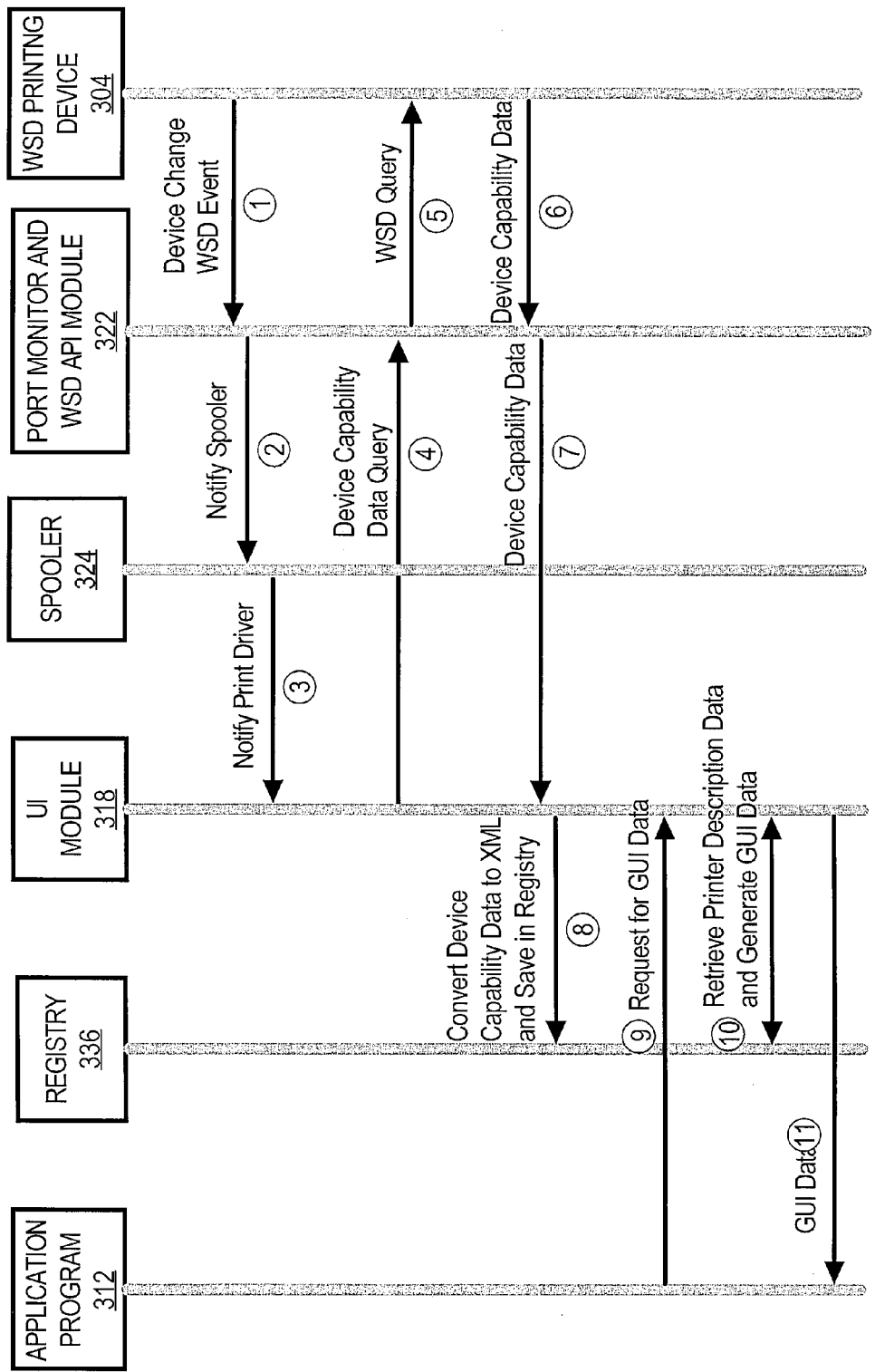
FIG. 6 is a sequence diagram that depicts an approach for updating printer description data, according to an embodiment of the invention.

FIG. 6 is a sequence diagram that depicts an approach for updating printer description data, according to one embodiment of the invention. In Step 1, WSD printing device 304 generates an event indicating a change in printing features or options. This may include the deletion, addition or change of a printing feature or option. Port monitor and WSD API module 322 has subscribed to receive this event and receives the event. For example, port monitor and WSD API module 322 may receive an event notification in the form of a SOAP message specifying the event.

In Step 3, port monitor and WSD API module 322 receives the event notification and notifies spooler 324. In Step 3, spooler 324 notifies UI module 318. In Step 4, UI module sends to the port monitor and WSD API module 322 a request for the device capabilities of WSD printing device 304. The request may be implemented, for example, by a call to a SendRecvBiDiData function that contains a request for the device capabilities data of WSD printing device 304. In this situation, the SendRecvBiDiData function makes a call to port monitor and WSD API module 322.

In Step 5, the port monitor and WSD API module 322 receives, from UI module 318, the request for the device capabilities data of WSD printing device 304. Port monitor and WSD API module 322 generates a SOAP request message, in the form of a SOAP envelope, based at least upon the request received from UI module 318 and forwards the SOAP request to WSD printing device 304.

In Step 6, WSD printing device 304 generates and sends to port monitor and WSD API module 322 a SOAP response message, in the form of a SOAP envelope, that includes the device capabilities data for WSD printing device 304. The device capabilities data for WSD printing device 304 specifies the features and options currently supported by WSD printing device 304. The device capabilities data in the SOAP response may include any portion or all of the device capabilities data available on WSD printing device 204, depending upon a particular implementation. For example, the device capabilities data retrieved in response to the event notification may include all of the device capabilities data available on WSD printing device 204. Alternatively, only the device capabilities data that corresponds to the change in features or options may be retrieved from WSD printing device 204. In addition, the device capability data may be retrieved using any number of SOAP requests and responses. The SOAP response message may also include a default print ticket that specifies default options for WSD printing device 304.

In Step 7, port monitor and WSD API module 322 sends to UI module 318 a response that contains the device capabilities data of WSD printing device 304. This may include port monitor and WSD API module 322 extracting XML information from the SOAP response and generating a response that includes the extracted information. In the situation where the request was implemented using a call to SendRecvBiDiData function, the response to the function call contains the device capabilities data from WSD printing device 304.

In Step 8, UI module 318 generates printer description data 338 for WSD printing device 304 and stores printer description data 338 in registry 336 as previously described herein. Alternatively, UI module 318 may update the existing printer description data for WSD printing device 304 to reflect the change in the features and/or options made to WSD printing device 304.

In Step 9, application program 312 makes a request to UI module 318 for GUI data. In Step 10, UI module 318 retrieves printer description data 338 from registry 336 and generates the requested GUI data. The GUI data includes data which, when processed by application program 312, allows a user to view and change the features and settings supported by WSD printing device 304. The GUI data may include, for example, display data that includes display strings that correspond to features and options currently supported by WSD printing device 304. In Step 11, UI module 318 provides the GUI data to application program 312. The process for processing a print job then continues as previously described in FIG. 4.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
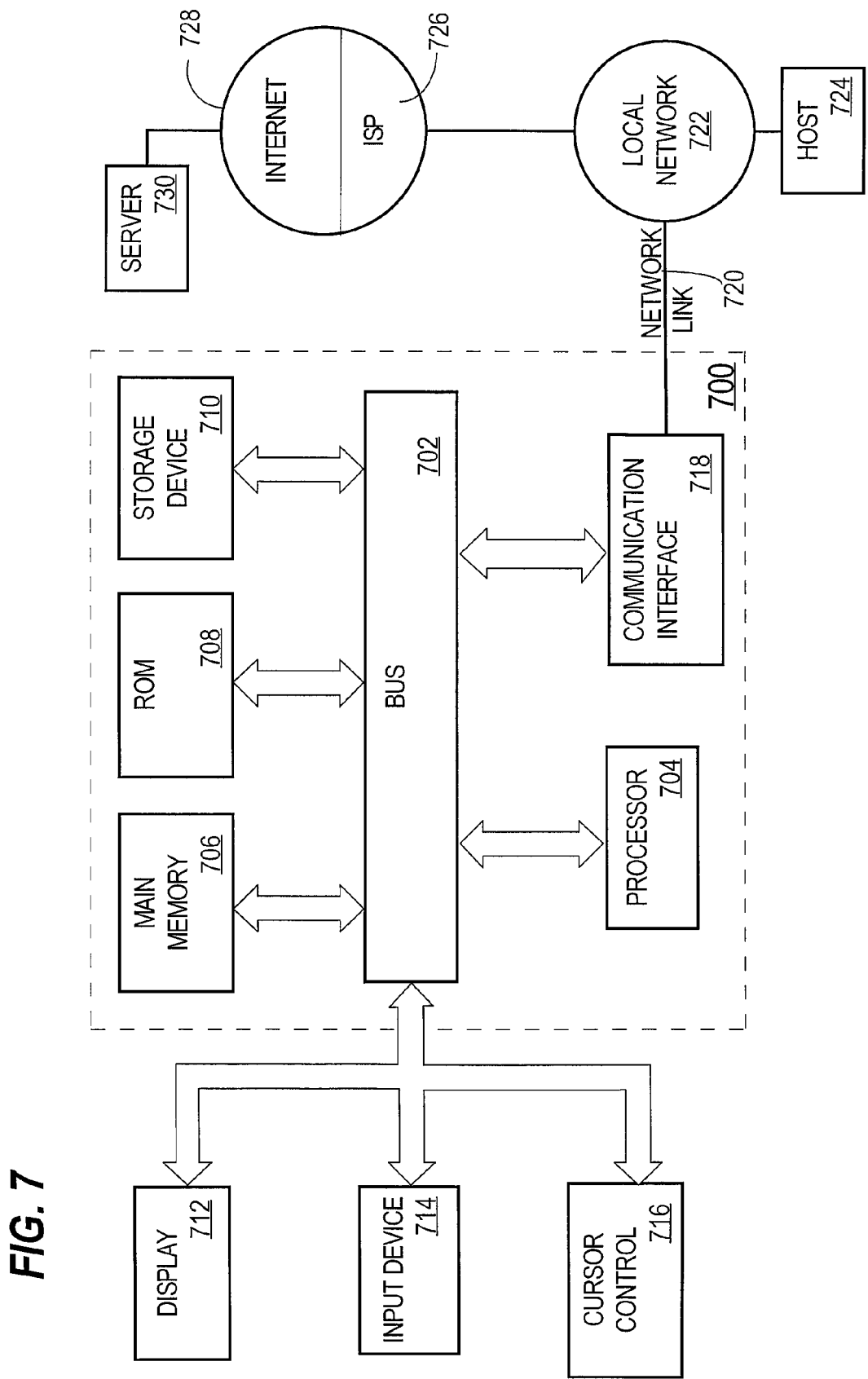
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

APPENDIX A -- EXAMPLE DEVICE CAPABILITIES DATA

```xml
<?xml version="1.0"?>
<RequestedPrinterElements
xmlns:wprt="http://schemas.microsoft.com/windows/2006/08/wdp/print"
xmlns:rodp="http://schemas.Ricoh-Usa.com/wsd/print">
 <wprt:PrinterDescription>
   <wprt:ColorSupported>true</wprt:ColorSupported>
   <wprt:DeviceId>MFG:RICOH;CMD:PJL,RCS,PCL,PCLXL;MDL:Future Printer 2010;STS:12301/13300/13000/10004,0;CLS:PRINTER;DES:RICOH Future Printer 2010;</wprt:DeviceId>
   <wprt:MultipleDocumentJobsSupported>false</wprt:MultipleDocumentJobsSupported>
   <wprt:PagesPerMinute>0</wprt:PagesPerMinute>
   <wprt:PagesPerMinuteColor>0</wprt:PagesPerMinuteColor>
   <wprt:PrinterName>RICOH Future Printer 2010</wprt:PrinterName>
   <wprt:PrinterInfo>No Setting</wprt:PrinterInfo>
   <wprt:PrinterLocation>No Setting</wprt:PrinterLocation>
 </wprt:PrinterDescription>
 <wprt:PrinterConfiguration>
   <wprt:PrinterEventRate>1</wprt:PrinterEventRate>
   <wprt:Storage>
     <wprt:StorageEntry Removed="false" Name="">
       <wprt:Type>HardDisk</wprt:Type>
       <wprt:Size>1024</wprt:Size>
       <wprt:Free>-1</wprt:Free>
     </wprt:StorageEntry>
   </wprt:Storage>
   <wprt:Consumables>
     <wprt:ComsumableEntry Removed="false" Name="Black Toner">
       <wprt:Type>Toner</wprt:Type>
       <wprt:Color>Black</wprt:Color>
       <wprt:Level>70</wprt:Level>
       <wprt:Model>Black Toner</wprt:Model>
     </wprt:ComsumableEntry>
     <wprt:ComsumableEntry Removed="false" Name="Cyan Toner">
       <wprt:Type>Toner</wprt:Type>
       <wprt:Color>Cyan</wprt:Color>
       <wprt:Level>50</wprt:Level>
       <wprt:Model>Cyan Toner</wprt:Model>
     </wprt:ComsumableEntry>
     <wprt:ComsumableEntry Removed="false" Name="Magenta Toner">
       <wprt:Type>Toner</wprt:Type>
       <wprt:Color>Magenta</wprt:Color>
       <wprt:Level>80</wprt:Level>
       <wprt:Model>Magenta Toner</wprt:Model>
     </wprt:ComsumableEntry>
     <wprt:ComsumableEntry Removed="false" Name="Yellow Toner">
       <wprt:Type>Toner</wprt:Type>
```

```xml
      <wprt:Color>Yellow</wprt:Color>
      <wprt:Level>70</wprt:Level>
      <wprt:Model>Yellow Toner</wprt:Model>
    </wprt:ComsumableEntry>
</wprt:Consumables>
<wprt:InputBins>
  <wprt:InputBinEntry Name="Tray1">
    <wprt:FeedDirection>ShortEdgeFirst</wprt:FeedDirection>
    <wprt:MediaSize>Letter</wprt:MediaSize>
    <wprt:MediaType>unknown</wprt:MediaType>
    <wprt:MediaColor>unknown</wprt:MediaColor>
    <wprt:Capacity>550</wprt:Capacity>
    <wprt:Level>275</wprt:Level>
  </wprt:InputBinEntry>
  <wprt:InputBinEntry Name="Tray2">
    <wprt:FeedDirection>LongEdgeFirst</wprt:FeedDirection>
    <wprt:MediaSize>unknown</wprt:MediaSize>
    <wprt:MediaType>unknown</wprt:MediaType>
    <wprt:MediaColor>unknown</wprt:MediaColor>
    <wprt:Capacity>550</wprt:Capacity>
    <wprt:Level>275</wprt:Level>
  </wprt:InputBinEntry>
  <wprt:InputBinEntry Name="unknown">
    <wprt:FeedDirection>ShortEdgeFirst</wprt:FeedDirection>
    <wprt:MediaSize>Letter</wprt:MediaSize>
    <wprt:MediaType>unknown</wprt:MediaType>
    <wprt:MediaColor>unknown</wprt:MediaColor>
    <wprt:Capacity>2000</wprt:Capacity>
    <wprt:Level>0</wprt:Level>
  </wprt:InputBinEntry>
  <wprt:InputBinEntry Name="Bypass">
    <wprt:FeedDirection>ShortEdgeFirst</wprt:FeedDirection>
    <wprt:MediaSize>Letter</wprt:MediaSize>
    <wprt:MediaType>unknown</wprt:MediaType>
    <wprt:MediaColor>unknown</wprt:MediaColor>
    <wprt:Capacity>100</wprt:Capacity>
    <wprt:Level>-3</wprt:Level>
  </wprt:InputBinEntry>
</wprt:InputBins>
<wprt:Finishings>
  <wprt:CollationSupported>true</wprt:CollationSupported>
  <wprt:JogOffsetSupported>true</wprt:JogOffsetSupported>
  <wprt:DuplexerInstalled>true</wprt:DuplexerInstalled>
  <wprt:StaplerInstalled>true</wprt:StaplerInstalled>
  <wprt:HolePunchInstalled>true</wprt:HolePunchInstalled>
</wprt:Finishings>
<wprt:OutputBins>
  <wprt:OutputBinEntry Name="InternalTray1">
```

```xml
<wprt:Capacity>500</wprt:Capacity>
  <wprt:Level>-1</wprt:Level>
 </wprt:OutputBinEntry>
 <wprt:OutputBinEntry Name="ExternalTray">
  <wprt:Capacity>100</wprt:Capacity>
  <wprt:Level>-1</wprt:Level>
 </wprt:OutputBinEntry>
 <wprt:OutputBinEntry Name="FinisherShiftTray1">
  <wprt:Capacity>500</wprt:Capacity>
  <wprt:Level>-1</wprt:Level>
 </wprt:OutputBinEntry>
 <wprt:OutputBinEntry Name="FinisherShiftTray2">
  <wprt:Capacity>1500</wprt:Capacity>
  <wprt:Level>-1</wprt:Level>
 </wprt:OutputBinEntry>
</wprt:OutputBins>
<rodp:RicohPrinterConfiguration>
 <rodp:Storage>
  <rodp:StorageEntry StorageName="RAM">
   <rodp:DisplayName xml:lang="en-US">Printer Memory</rodp:DisplayName>
   <rodp:DefaultOption>65536KB</rodp:DefaultOption>
   <rodp:ConcealFromUI ValueType="BOOL">
    <rodp:ConcealFromUIValue Value="TRUE"/>
   </rodp:ConcealFromUI>
   <rodp:MemoryEntry Name="65536KB">
    <rodp:DisplayName xml:lang="en-US">64MB</rodp:DisplayName>
    <rodp:MemoryConfigKB ValueType="PAIR">
     <rodp:MemoryConfigKBValue Value="65536"/>
     <rodp:MemoryConfigKBValue Value="56700"/>
    </rodp:MemoryConfigKB>
   </rodp:MemoryEntry>
  </rodp:StorageEntry>
  <rodp:StorageEntry StorageName="HardDisk">
   <rodp:DisplayName xml:lang="en-US">HardDisk</rodp:DisplayName>
   <rodp:DefaultOption>Installed</rodp:DefaultOption>
   <rodp:ConcealFromUI ValueType="BOOL">
    <rodp:ConcealFromUIValue Value="TRUE"/>
   </rodp:ConcealFromUI>
   <rodp:MemoryEntry Name="Installed">
    <rodp:DisplayName xml:lang="en-US">Installed</rodp:DisplayName>
   </rodp:MemoryEntry>
  </rodp:StorageEntry>
 </rodp:Storage>
 <rodp:HolePunchUnit>
  <rodp:DisplayName xml:lang="en-US">Punch Unit</rodp:DisplayName>
  <rodp:DefaultOption>NotInstalled</rodp:DefaultOption>
  <rodp:HolePunchUnitEntry Name="NotInstalled">
   <rodp:DisplayName xml:lang="en-US">Not Installed</rodp:DisplayName>
```

```xml
</rodp:HolePunchUnitEntry>
<rodp:HolePunchUnitEntry Name="2and3holes">
  <rodp:DisplayName xml:lang="en-US">2 and 3 holes</rodp:DisplayName>
</rodp:HolePunchUnitEntry>
<rodp:HolePunchUnitEntry Name="2and4holes">
  <rodp:DisplayName xml:lang="en-US">2 and 4 holes</rodp:DisplayName>
</rodp:HolePunchUnitEntry>
<rodp:HolePunchUnitEntry Name="2holesJP">
  <rodp:DisplayName xml:lang="en-US">2 holes type JP</rodp:DisplayName>
</rodp:HolePunchUnitEntry>
<rodp:HolePunchUnitEntry Name="4holesEU">
  <rodp:DisplayName xml:lang="en-US">4 holes type EU</rodp:DisplayName>
</rodp:HolePunchUnitEntry>
<rodp:HolePunchUnitEntry Name="4holesNE">
  <rodp:DisplayName xml:lang="en-US">4 holes type NE</rodp:DisplayName>
</rodp:HolePunchUnitEntry>
</rodp:HolePunchUnit>
<rodp:Finisher>
  <rodp:DisplayName xml:lang="en-US">Finisher</rodp:DisplayName>
  <rodp:DefaultOption>NotInstalled</rodp:DefaultOption>
  <rodp:FinisherEntry Name="NotInstalled">
    <rodp:DisplayName xml:lang="en-US">Not Installed</rodp:DisplayName>
  </rodp:FinisherEntry>
  <rodp:FinisherEntry Name="Finisher2000">
    <rodp:DisplayName xml:lang="en-US">2 Tray Finisher</rodp:DisplayName>
  </rodp:FinisherEntry>
  <rodp:FinisherEntry Name="BookletFinisher">
    <rodp:DisplayName xml:lang="en-US">Booklet Finisher</rodp:DisplayName>
  </rodp:FinisherEntry>
</rodp:Finisher>
<rodp:UVCoating>
  <DisplayName xml:lang="en-US">UVCoatingDisplayName_ENG</DisplayName>
  <DisplayName xml:lang="ja-JP">UVCoatingDisplayName_JP_特徴</DisplayName>
  <DisplayName xml:lang="zh-CN">UVCoatingDisplayName_CN_渡膜</DisplayName>
  <rodp:DefaultOption>UVCoatingOption1</rodp:DefaultOption>
  <rodp:UVCoatingEntry Name="UVCoatingOption1">
    <DisplayName xml:lang="en-US">UVCoatingOption1DisplayName_ENG</DisplayName>
    <DisplayName xml:lang="ja-JP">UVCoatingOption1DisplayName_JP_コーティング_オプション_1</DisplayName>
    <DisplayName xml:lang="zh-CN">UVCoatingOption1DisplayName_CN_渡膜_选项1</DisplayName>
  </rodp:UVCoatingEntry>
  <rodp:UVCoatingEntry Name="UVCoatingOption2">
    <DisplayName xml:lang="en-US">UVCoatingOption2DisplayName_ENG</DisplayName>
```

```xml
    <DisplayName xml:lang="ja-JP">UVCoatingOption2DisplayName_JP_コーティング_オプション_2</DisplayName>
    <DisplayName xml:lang="zh-CN">UVCoatingOption2DisplayName_CN_渡膜_选项2</DisplayName>
  </rodp:UVCoatingEntry>
  <rodp:UVCoatingEntry Name="UVCoatingOption3">
    <DisplayName xml:lang="en-US">UVCoatingOption3DisplayName_ENG</DisplayName>
    <DisplayName xml:lang="ja-JP">UVCoatingOption3DisplayName_JP_コーティング_オプション_3</DisplayName>
    <DisplayName xml:lang="zh-CN">UVCoatingOption3DisplayName_CN_渡膜_选项3</DisplayName>
  </rodp:UVCoatingEntry>
</rodp:UVCoating>
<rodp:LeftTray1and2>
  <rodp:DisplayName xml:lang="en-US">Left Tray 1 and 2</rodp:DisplayName>
  <rodp:DefaultOption>NotInstalled</rodp:DefaultOption>
  <rodp:LeftTray1and2Entry Name="NotInstalled">
    <rodp:DisplayName xml:lang="en-US">Not Installed</rodp:DisplayName>
  </rodp:LeftTray1and2Entry>
  <rodp:LeftTray1and2Entry Name="Installed">
    <rodp:DisplayName xml:lang="en-US">Installed</rodp:DisplayName>
  </rodp:LeftTray1and2Entry>
</rodp:LeftTray1and2>
<rodp:InputTray3>
  <rodp:DisplayName xml:lang="en-US">Tray 3</rodp:DisplayName>
  <rodp:DefaultOption>NotInstalled</rodp:DefaultOption>
  <rodp:InputTray3Entry Name="NotInstalled">
    <rodp:DisplayName xml:lang="en-US">Not Installed</rodp:DisplayName>
  </rodp:InputTray3Entry>
  <rodp:InputTray3Entry Name="Installed">
    <rodp:DisplayName xml:lang="en-US">Installed</rodp:DisplayName>
  </rodp:InputTray3Entry>
</rodp:InputTray3>
<rodp:InputTray4>
  <rodp:DisplayName xml:lang="en-US">Tray 4</rodp:DisplayName>
  <rodp:DefaultOption>NotInstalled</rodp:DefaultOption>
  <rodp:InputTray4Entry Name="NotInstalled">
    <rodp:DisplayName xml:lang="en-US">Not Installed</rodp:DisplayName>
  </rodp:InputTray4Entry>
  <rodp:InputTray4Entry Name="Installed">
    <rodp:DisplayName xml:lang="en-US">Installed</rodp:DisplayName>
  </rodp:InputTray4Entry>
</rodp:InputTray4>
<rodp:LargeCapacityTray>
  <rodp:DisplayName xml:lang="en-US">Large Capacity Tray</rodp:DisplayName>
  <rodp:DefaultOption>NotInstalled</rodp:DefaultOption>
```

```xml
    <rodp:LargeCapacityTrayEntry Name="NotInstalled">
      <rodp:DisplayName xml:lang="en-US">Not Installed</rodp:DisplayName>
    </rodp:LargeCapacityTrayEntry>
    <rodp:LargeCapacityTrayEntry Name="Installed">
      <rodp:DisplayName xml:lang="en-US">Installed</rodp:DisplayName>
    </rodp:LargeCapacityTrayEntry>
   </rodp:LargeCapacityTray>
  </rodp:RicohPrinterConfiguration>
 </wprt:PrinterConfiguration>
 <wprt:PrinterCapabilities>
  <wprt:JobValues>
   <wprt:JobProcessing>
    <wprt:Copies>
     <wprt:MinValue>1</wprt:MinValue>
     <wprt:MaxValue>999999</wprt:MaxValue>
    </wprt:Copies>
    <wprt:JobFinishings>
     <wprt:Staple>
      <wprt:Localtion>
       <wprt:AllowedValue>unknown</wprt:AllowedValue>
      </wprt:Localtion>
      <wprt:Angle>
       <wprt:AllowedValue>unknown</wprt:AllowedValue>
      </wprt:Angle>
     </wprt:Staple>
     <wprt:HolePunch>
      <wprt:Edge>
       <wprt:AllowedValue>unknown</wprt:AllowedValue>
      </wprt:Edge>
      <wprt:Pattern>
       <wprt:AllowedValue>unknown</wprt:AllowedValue>
      </wprt:Pattern>
     </wprt:HolePunch>
    </wprt:JobFinishings>
    <wprt:Priority>
     <wprt:MinValue>50</wprt:MinValue>
     <wprt:MaxValue>50</wprt:MaxValue>
    </wprt:Priority>
   </wprt:JobProcessing>
   <wprt:DocumentProcessing>
    <wprt:MediaSizeName>
     <wprt:AllowedValue>Letter</wprt:AllowedValue>
     <wprt:AllowedValue>unknown</wprt:AllowedValue>
    </wprt:MediaSizeName>
    <wprt:MediaType>
     <wprt:AllowedValue>unknown</wprt:AllowedValue>
    </wprt:MediaType>
    <wprt:MediaColor>
```

```xml
      <wprt:AllowedValue>unknown</wprt:AllowedValue>
     </wprt:MediaColor>
     <wprt:NumberUp>
      <wprt:PagesPerSheet>
       <wprt:AllowedValue>1</wprt:AllowedValue>
       <wprt:AllowedValue>2</wprt:AllowedValue>
       <wprt:AllowedValue>4</wprt:AllowedValue>
       <wprt:AllowedValue>9</wprt:AllowedValue>
       <wprt:AllowedValue>16</wprt:AllowedValue>
      </wprt:PagesPerSheet>
      <wprt:Direction>
       <wprt:AllowedValue>RightDown</wprt:AllowedValue>
       <wprt:AllowedValue>DownRight</wprt:AllowedValue>
       <wprt:AllowedValue>LeftDown</wprt:AllowedValue>
       <wprt:AllowedValue>DownLeft</wprt:AllowedValue>
      </wprt:Direction>
     </wprt:NumberUp>
     <wprt:Orientation>
      <wprt:AllowedValue>Landscape</wprt:AllowedValue>
      <wprt:AllowedValue>Portrait</wprt:AllowedValue>
      <wprt:AllowedValue>ReverseLandscape</wprt:AllowedValue>
      <wprt:AllowedValue>ReversePortrait</wprt:AllowedValue>
     </wprt:Orientation>
     <wprt:Resolution>
      <wprt:AllowedValue>
       <wprt:Width>1200</wprt:Width>
       <wprt:Height>1200</wprt:Height>
      </wprt:AllowedValue>
     </wprt:Resolution>
     <wprt:PrintQuality>
      <wprt:AllowedValue>Normal</wprt:AllowedValue>
     </wprt:PrintQuality>
     <wprt:Sides>
      <wprt:AllowedValue>OneSided</wprt:AllowedValue>
      <wprt:AllowedValue>TwoSidedLongEdge</wprt:AllowedValue>
      <wprt:AllowedValue>TwoSidedShortEdge</wprt:AllowedValue>
     </wprt:Sides>
    </wprt:DocumentProcessing>
  </wprt:JobValues>
  <wprt:DocumentValues>
   <wprt:DocumentDescription>
    <wprt:Compression>
     <wprt:AllowedValue>None</wprt:AllowedValue>
    </wprt:Compression>
    <wprt:Format>
     <wprt:AllowedValue>application/octet-stream</wprt:AllowedValue>
     <wprt:AllowedValue>unknown</wprt:AllowedValue>
    </wprt:Format>
```

```xml
</wprt:DocumentDescription>
</wprt:DocumentValues>
<rodp:RicohPrinterCapabilities>
 <rodp:JobValues>
  <rodp:JobProcessing>
   <rodp:JobFinishings>
    <rodp:Collate>
     <rodp:DisplayName xml:lang="en-US">Collate</rodp:DisplayName>
     <rodp:AllowedValue>
      <rodp:Option>false</rodp:Option>
      <rodp:DisplayName xml:lang="en-US">OFF</rodp:DisplayName>
     </rodp:AllowedValue>
     <rodp:AllowedValue>
      <rodp:Option>true</rodp:Option>
      <rodp:DisplayName xml:lang="en-US">ON</rodp:DisplayName>
     </rodp:AllowedValue>
    </rodp:Collate>
    <rodp:Staple>
     <rodp:DisplayName xml:lang="en-US">Staple</rodp:DisplayName>
     <rodp:AllowedValue>
      <rodp:Option>OFF</rodp:Option>
      <rodp:DisplayName xml:lang="en-US">OFF</rodp:DisplayName>
     </rodp:AllowedValue>
     <rodp:AllowedValue>
      <rodp:Option>TopLeft</rodp:Option>
      <rodp:DisplayName xml:lang="en-US">Top Left</rodp:DisplayName>
     </rodp:AllowedValue>
     <rodp:AllowedValue>
      <rodp:Option>TopRight</rodp:Option>
      <rodp:DisplayName xml:lang="en-US">Top Right</rodp:DisplayName>
     </rodp:AllowedValue>
     <rodp:AllowedValue>
      <rodp:Option>Left2</rodp:Option>
      <rodp:DisplayName xml:lang="en-US">Left 2</rodp:DisplayName>
     </rodp:AllowedValue>
     <rodp:AllowedValue>
      <rodp:Option>Top2</rodp:Option>
      <rodp:DisplayName xml:lang="en-US">Top 2</rodp:DisplayName>
     </rodp:AllowedValue>
     <rodp:AllowedValue>
      <rodp:Option>Right2</rodp:Option>
      <rodp:DisplayName xml:lang="en-US">Right 2</rodp:DisplayName>
     </rodp:AllowedValue>
     <rodp:AllowedValue>
      <rodp:Option>TopLeftSlant</rodp:Option>
      <rodp:DisplayName xml:lang="en-US">Top Left Slant</rodp:DisplayName>
     </rodp:AllowedValue>
     <rodp:AllowedValue>
```

```xml
    <rodp:Option>TopRightSlant</rodp:Option>
    <rodp:DisplayName xml:lang="en-US">Top Right Slant</rodp:DisplayName>
  </rodp:AllowedValue>
  <rodp:AllowedValue>
    <rodp:Option>Booklet</rodp:Option>
    <rodp:DisplayName xml:lang="en-US">Booklet</rodp:DisplayName>
  </rodp:AllowedValue>
</rodp:Staple>
<rodp:HolePunch>
  <rodp:DisplayName xml:lang="en-US">Punch</rodp:DisplayName>
  <rodp:AllowedValue>
    <rodp:Option>OFF</rodp:Option>
    <rodp:DisplayName xml:lang="en-US">OFF</rodp:DisplayName>
  </rodp:AllowedValue>
  <rodp:AllowedValue>
    <rodp:Option>Left2</rodp:Option>
    <rodp:DisplayName xml:lang="en-US">Left 2</rodp:DisplayName>
  </rodp:AllowedValue>
  <rodp:AllowedValue>
    <rodp:Option>Top2</rodp:Option>
    <rodp:DisplayName xml:lang="en-US">Top 2</rodp:DisplayName>
  </rodp:AllowedValue>
  <rodp:AllowedValue>
    <rodp:Option>Right2</rodp:Option>
    <rodp:DisplayName xml:lang="en-US">Right 2</rodp:DisplayName>
  </rodp:AllowedValue>
  <rodp:AllowedValue>
    <rodp:Option>Left3</rodp:Option>
    <rodp:DisplayName xml:lang="en-US">Left 3</rodp:DisplayName>
  </rodp:AllowedValue>
  <rodp:AllowedValue>
    <rodp:Option>Top3</rodp:Option>
    <rodp:DisplayName xml:lang="en-US">Top 3</rodp:DisplayName>
  </rodp:AllowedValue>
  <rodp:AllowedValue>
    <rodp:Option>Right3</rodp:Option>
    <rodp:DisplayName xml:lang="en-US">Right 3</rodp:DisplayName>
  </rodp:AllowedValue>
  <rodp:AllowedValue>
    <rodp:Option>Left4</rodp:Option>
    <rodp:DisplayName xml:lang="en-US">Left 4</rodp:DisplayName>
  </rodp:AllowedValue>
  <rodp:AllowedValue>
    <rodp:Option>Top4</rodp:Option>
    <rodp:DisplayName xml:lang="en-US">Top 4</rodp:DisplayName>
  </rodp:AllowedValue>
  <rodp:AllowedValue>
    <rodp:Option>Right4</rodp:Option>
```

```xml
        <rodp:DisplayName xml:lang="en-US">Right 4</rodp:DisplayName>
       </rodp:AllowedValue>
      </rodp:HolePunch>
     </rodp:JobFinishings>
    </rodp:JobProcessing>
    <rodp:DocumentProcessing>
     <rodp:Orientation>
      <rodp:DisplayName xml:lang="en-US">Orientation</rodp:DisplayName>
      <rodp:AllowedValue>
       <rodp:Option>Landscape</rodp:Option>
       <rodp:DisplayName xml:lang="en-US">Landscape</rodp:DisplayName>
      </rodp:AllowedValue>
      <rodp:AllowedValue>
       <rodp:Option>Portrait</rodp:Option>
       <rodp:DisplayName xml:lang="en-US">Portrait</rodp:DisplayName>
      </rodp:AllowedValue>
     </rodp:Orientation>
     <rodp:Sides>
      <rodp:DisplayName xml:lang="en-US">Print on Both Sides</rodp:DisplayName>
      <rodp:AllowedValue>
       <rodp:Option>OneSided</rodp:Option>
       <rodp:DisplayName xml:lang="en-US">None</rodp:DisplayName>
      </rodp:AllowedValue>
      <rodp:AllowedValue>
       <rodp:Option>TwoSidedLongEdge</rodp:Option>
       <rodp:DisplayName xml:lang="en-US">Flip on long edge</rodp:DisplayName>
      </rodp:AllowedValue>
      <rodp:AllowedValue>
       <rodp:Option>TwoSidedShortEdge</rodp:Option>
       <rodp:DisplayName xml:lang="en-US">Flip on short edge</rodp:DisplayName>
      </rodp:AllowedValue>
     </rodp:Sides>
     <rodp:Resolution>
      <rodp:DisplayName xml:lang="en-US">Resolution</rodp:DisplayName>
      <rodp:AllowedValue>
       <rodp:Option>600</rodp:Option>
       <rodp:DisplayName xml:lang="en-US">600dpi</rodp:DisplayName>
      </rodp:AllowedValue>
      <rodp:AllowedValue>
       <rodp:Option>1200</rodp:Option>
       <rodp:DisplayName xml:lang="en-US">1200dpi</rodp:DisplayName>
      </rodp:AllowedValue>
     </rodp:Resolution>
     <rodp:MediaType>
      <rodp:DisplayName xml:lang="en-US">Media</rodp:DisplayName>
      <rodp:ConflictPriority ValueType="INT">
       <rodp:ConflictPriorityValue Value="30"/>
      </rodp:ConflictPriority>
```

```xml
<rodp:AllowedValue>
  <rodp:Option>Auto</rodp:Option>
  <rodp:DisplayName xml:lang="en-US">Auto Select</rodp:DisplayName>
</rodp:AllowedValue>
<rodp:AllowedValue>
  <rodp:Option>STANDARD</rodp:Option>
  <rodp:DisplayName xml:lang="en-US">Plain Paper</rodp:DisplayName>
</rodp:AllowedValue>
<rodp:AllowedValue>
  <rodp:Option>Recycled</rodp:Option>
  <rodp:DisplayName xml:lang="en-US">Recycled</rodp:DisplayName>
</rodp:AllowedValue>
<rodp:AllowedValue>
  <rodp:Option>Special</rodp:Option>
  <rodp:DisplayName xml:lang="en-US">Special</rodp:DisplayName>
</rodp:AllowedValue>
<rodp:AllowedValue>
  <rodp:Option>Thick</rodp:Option>
  <rodp:DisplayName xml:lang="en-US">Thick</rodp:DisplayName>
</rodp:AllowedValue>
<rodp:AllowedValue>
  <rodp:Option>TRANSPARENCY</rodp:Option>
  <rodp:DisplayName xml:lang="en-US">Transparency</rodp:DisplayName>
</rodp:AllowedValue>
<rodp:AllowedValue>
  <rodp:Option>Color</rodp:Option>
  <rodp:DisplayName xml:lang="en-US">Color</rodp:DisplayName>
</rodp:AllowedValue>
<rodp:AllowedValue>
  <rodp:Option>Letterhead</rodp:Option>
  <rodp:DisplayName xml:lang="en-US">Letterhead</rodp:DisplayName>
</rodp:AllowedValue>
<rodp:AllowedValue>
  <rodp:Option>Preprinted</rodp:Option>
  <rodp:DisplayName xml:lang="en-US">Preprinted</rodp:DisplayName>
</rodp:AllowedValue>
<rodp:AllowedValue>
  <rodp:Option>Labels</rodp:Option>
  <rodp:DisplayName xml:lang="en-US">Labels</rodp:DisplayName>
</rodp:AllowedValue>
<rodp:AllowedValue>
  <rodp:Option>Plain_Duplex_Backside</rodp:Option>
  <rodp:DisplayName xml:lang="en-US">Plain (Duplex Backside)</rodp:DisplayName>
</rodp:AllowedValue>
<rodp:AllowedValue>
  <rodp:Option>Thick_Duplex_Backside</rodp:Option>
```

```xml
        <rodp:DisplayName xml:lang="en-US">Thick (Duplex
Backside)</rodp:DisplayName>
      </rodp:AllowedValue>
    </rodp:MediaType>
    <rodp:MediaSizeName>
      <rodp:DisplayName xml:lang="en-US">Paper Size</rodp:DisplayName>
      <rodp:AllowedValue>
        <rodp:Option>na_arch-b_12x18in</rodp:Option>
        <rodp:DisplayName xml:lang="en-US">12x18</rodp:DisplayName>
        <rodp:PageDimensions ValueType="PAIR">
          <rodp:PageDimensionsValue Value="14400"/>
          <rodp:PageDimensionsValue Value="21600"/>
        </rodp:PageDimensions>
        <rodp:PrintableArea ValueType="PAIR">
          <rodp:PrintableAreaValue Value="14000"/>
          <rodp:PrintableAreaValue Value="21200"/>
        </rodp:PrintableArea>
        <rodp:PrintableOrigin ValueType="PAIR">
          <rodp:PrintableOriginValue Value="200"/>
          <rodp:PrintableOriginValue Value="200"/>
        </rodp:PrintableOrigin>
      </rodp:AllowedValue>
      <rodp:AllowedValue>
        <rodp:Option>na_ledger_11x17in</rodp:Option>
        <rodp:DisplayName xml:lang="en-US">11X17</rodp:DisplayName>
        <rodp:PrintableArea ValueType="PAIR">
          <rodp:PrintableAreaValue Value="12800"/>
          <rodp:PrintableAreaValue Value="20000"/>
        </rodp:PrintableArea>
        <rodp:PrintableOrigin ValueType="PAIR">
          <rodp:PrintableOriginValue Value="200"/>
          <rodp:PrintableOriginValue Value="200"/>
        </rodp:PrintableOrigin>
      </rodp:AllowedValue>
      <rodp:AllowedValue>
        <rodp:Option>na_legal_8.5x14in</rodp:Option>
        <rodp:DisplayName xml:lang="en-US">LEGAL</rodp:DisplayName>
        <rodp:PrintableArea ValueType="PAIR">
          <rodp:PrintableAreaValue Value="9800"/>
          <rodp:PrintableAreaValue Value="16400"/>
        </rodp:PrintableArea>
        <rodp:PrintableOrigin ValueType="PAIR">
          <rodp:PrintableOriginValue Value="200"/>
          <rodp:PrintableOriginValue Value="200"/>
        </rodp:PrintableOrigin>
      </rodp:AllowedValue>
      <rodp:AllowedValue>
        <rodp:Option>na_letter_8.5x11in</rodp:Option>
```

```xml
<rodp:DisplayName xml:lang="en-US">LETTER</rodp:DisplayName>
<rodp:PrintableArea ValueType="PAIR">
  <rodp:PrintableAreaValue Value="9800"/>
  <rodp:PrintableAreaValue Value="12800"/>
</rodp:PrintableArea>
<rodp:PrintableOrigin ValueType="PAIR">
  <rodp:PrintableOriginValue Value="200"/>
  <rodp:PrintableOriginValue Value="200"/>
</rodp:PrintableOrigin>
</rodp:AllowedValue>
<rodp:AllowedValue>
 <rodp:Option>na_executive_7.25x10.5in</rodp:Option>
 <rodp:DisplayName xml:lang="en-US">EXECUTIVE</rodp:DisplayName>
 <rodp:PrintableArea ValueType="PAIR">
  <rodp:PrintableAreaValue Value="8300"/>
  <rodp:PrintableAreaValue Value="12200"/>
 </rodp:PrintableArea>
 <rodp:PrintableOrigin ValueType="PAIR">
  <rodp:PrintableOriginValue Value="200"/>
  <rodp:PrintableOriginValue Value="200"/>
 </rodp:PrintableOrigin>
</rodp:AllowedValue>
<rodp:AllowedValue>
 <rodp:Option>na_invoice_5.5x8.5in</rodp:Option>
 <rodp:DisplayName xml:lang="en-US">STATEMENT</rodp:DisplayName>
 <rodp:PrintableArea ValueType="PAIR">
  <rodp:PrintableAreaValue Value="6200"/>
  <rodp:PrintableAreaValue Value="9800"/>
 </rodp:PrintableArea>
 <rodp:PrintableOrigin ValueType="PAIR">
  <rodp:PrintableOriginValue Value="200"/>
  <rodp:PrintableOriginValue Value="200"/>
 </rodp:PrintableOrigin>
</rodp:AllowedValue>
<rodp:AllowedValue>
 <rodp:Option>iso_a3_297x420mm</rodp:Option>
 <rodp:DisplayName xml:lang="en-US">A3</rodp:DisplayName>
 <rodp:PrintableArea ValueType="PAIR">
  <rodp:PrintableAreaValue Value="13628"/>
  <rodp:PrintableAreaValue Value="19440"/>
 </rodp:PrintableArea>
 <rodp:PrintableOrigin ValueType="PAIR">
  <rodp:PrintableOriginValue Value="200"/>
  <rodp:PrintableOriginValue Value="200"/>
 </rodp:PrintableOrigin>
</rodp:AllowedValue>
<rodp:AllowedValue>
 <rodp:Option>iso_a4_210x297mm</rodp:Option>
```

```xml
<rodp:DisplayName xml:lang="en-US">A4</rodp:DisplayName>
<rodp:PrintableArea ValueType="PAIR">
  <rodp:PrintableAreaValue Value="9520"/>
  <rodp:PrintableAreaValue Value="13628"/>
</rodp:PrintableArea>
<rodp:PrintableOrigin ValueType="PAIR">
  <rodp:PrintableOriginValue Value="200"/>
  <rodp:PrintableOriginValue Value="200"/>
</rodp:PrintableOrigin>
</rodp:AllowedValue>
<rodp:AllowedValue>
 <rodp:Option>iso_a5_148x210mm</rodp:Option>
 <rodp:DisplayName xml:lang="en-US">A5</rodp:DisplayName>
 <rodp:PrintableArea ValueType="PAIR">
  <rodp:PrintableAreaValue Value="6592"/>
  <rodp:PrintableAreaValue Value="9520"/>
 </rodp:PrintableArea>
 <rodp:PrintableOrigin ValueType="PAIR">
  <rodp:PrintableOriginValue Value="200"/>
  <rodp:PrintableOriginValue Value="200"/>
 </rodp:PrintableOrigin>
</rodp:AllowedValue>
<rodp:AllowedValue>
 <rodp:Option>iso_a6_105x148mm</rodp:Option>
 <rodp:DisplayName xml:lang="en-US">A6</rodp:DisplayName>
 <rodp:PageDimensions ValueType="PAIR">
  <rodp:PageDimentsionValue Value="4956"/>
  <rodp:PageDimentsionValue Value="6996"/>
 </rodp:PageDimensions>
 <rodp:PrintableArea ValueType="PAIR">
  <rodp:PrintableAreaValue Value="4560"/>
  <rodp:PrintableAreaValue Value="6592"/>
 </rodp:PrintableArea>
 <rodp:PrintableOrigin ValueType="PAIR">
  <rodp:PrintableOriginValue Value="200"/>
  <rodp:PrintableOriginValue Value="200"/>
 </rodp:PrintableOrigin>
</rodp:AllowedValue>
<rodp:AllowedValue>
 <rodp:Option>jis_b4_257x364mm</rodp:Option>
 <rodp:DisplayName xml:lang="en-US">B4</rodp:DisplayName>
 <rodp:PrintableArea ValueType="PAIR">
  <rodp:PrintableAreaValue Value="11740"/>
  <rodp:PrintableAreaValue Value="16796"/>
 </rodp:PrintableArea>
 <rodp:PrintableOrigin ValueType="PAIR">
  <rodp:PrintableOriginValue Value="200"/>
  <rodp:PrintableOriginValue Value="200"/>
```

```xml
    </rodp:PrintableOrigin>
  </rodp:AllowedValue>
  <rodp:AllowedValue>
    <rodp:Option>jis_b5_182x257mm</rodp:Option>
    <rodp:DisplayName xml:lang="en-US">B5</rodp:DisplayName>
    <rodp:PrintableArea ValueType="PAIR">
      <rodp:PrintableAreaValue Value="8196"/>
      <rodp:PrintableAreaValue Value="11740"/>
    </rodp:PrintableArea>
    <rodp:PrintableOrigin ValueType="PAIR">
      <rodp:PrintableOriginValue Value="200"/>
      <rodp:PrintableOriginValue Value="200"/>
    </rodp:PrintableOrigin>
  </rodp:AllowedValue>
  <rodp:AllowedValue>
    <rodp:Option>na_number-10_4.125x9.5in</rodp:Option>
    <rodp:DisplayName xml:lang="en-US">ENV_10</rodp:DisplayName>
    <rodp:PrintableArea ValueType="PAIR">
      <rodp:PrintableAreaValue Value="4548"/>
      <rodp:PrintableAreaValue Value="11000"/>
    </rodp:PrintableArea>
    <rodp:PrintableOrigin ValueType="PAIR">
      <rodp:PrintableOriginValue Value="200"/>
      <rodp:PrintableOriginValue Value="200"/>
    </rodp:PrintableOrigin>
  </rodp:AllowedValue>
  <rodp:AllowedValue>
    <rodp:Option>iso_dl_110x220mm</rodp:Option>
    <rodp:DisplayName xml:lang="en-US">ENV_DL</rodp:DisplayName>
    <rodp:PrintableArea ValueType="PAIR">
      <rodp:PrintableAreaValue Value="4796"/>
      <rodp:PrintableAreaValue Value="9992"/>
    </rodp:PrintableArea>
    <rodp:PrintableOrigin ValueType="PAIR">
      <rodp:PrintableOriginValue Value="200"/>
      <rodp:PrintableOriginValue Value="200"/>
    </rodp:PrintableOrigin>
  </rodp:AllowedValue>
  <rodp:AllowedValue>
    <rodp:Option>na_monarch_3.875x7.5in</rodp:Option>
    <rodp:DisplayName xml:lang="en-US">ENV_MONARCH</rodp:DisplayName>
    <rodp:PrintableArea ValueType="PAIR">
      <rodp:PrintableAreaValue Value="4248"/>
      <rodp:PrintableAreaValue Value="8600"/>
    </rodp:PrintableArea>
    <rodp:PrintableOrigin ValueType="PAIR">
      <rodp:PrintableOriginValue Value="200"/>
      <rodp:PrintableOriginValue Value="200"/>
```

```xml
    </rodp:PrintableOrigin>
   </rodp:AllowedValue>
   <rodp:AllowedValue>
    <rodp:Option>iso_c5_162x229mm</rodp:Option>
    <rodp:DisplayName xml:lang="en-US">ENV_C5</rodp:DisplayName>
    <rodp:PrintableArea ValueType="PAIR">
     <rodp:PrintableAreaValue Value="7252"/>
     <rodp:PrintableAreaValue Value="10416"/>
    </rodp:PrintableArea>
    <rodp:PrintableOrigin ValueType="PAIR">
     <rodp:PrintableOriginValue Value="200"/>
     <rodp:PrintableOriginValue Value="200"/>
    </rodp:PrintableOrigin>
   </rodp:AllowedValue>
   <rodp:AllowedValue>
    <rodp:Option>iso_c6_114x162mm</rodp:Option>
    <rodp:DisplayName xml:lang="en-US">ENV_C6</rodp:DisplayName>
    <rodp:PrintableArea ValueType="PAIR">
     <rodp:PrintableAreaValue Value="4984"/>
     <rodp:PrintableAreaValue Value="7252"/>
    </rodp:PrintableArea>
    <rodp:PrintableOrigin ValueType="PAIR">
     <rodp:PrintableOriginValue Value="200"/>
     <rodp:PrintableOriginValue Value="200"/>
    </rodp:PrintableOrigin>
   </rodp:AllowedValue>
   <rodp:AllowedValue>
    <rodp:Option>na_foolscap_8.5x13in</rodp:Option>
    <rodp:DisplayName xml:lang="en-US">FOLIO</rodp:DisplayName>
    <rodp:PrintableArea ValueType="PAIR">
     <rodp:PrintableAreaValue Value="9800"/>
     <rodp:PrintableAreaValue Value="15200"/>
    </rodp:PrintableArea>
    <rodp:PrintableOrigin ValueType="PAIR">
     <rodp:PrintableOriginValue Value="200"/>
     <rodp:PrintableOriginValue Value="200"/>
    </rodp:PrintableOrigin>
   </rodp:AllowedValue>
   <rodp:AllowedValue>
    <rodp:Option>na_unknown_8.25x13in</rodp:Option>
    <rodp:DisplayName xml:lang="en-US">8_25x13</rodp:DisplayName>
    <rodp:PageDimensions ValueType="PAIR">
     <rodp:PageDimensionsValue Value="9900"/>
     <rodp:PageDimensionsValue Value="15600"/>
    </rodp:PageDimensions>
    <rodp:PrintableArea ValueType="PAIR">
     <rodp:PrintableAreaValue Value="9500"/>
     <rodp:PrintableAreaValue Value="15200"/>
```

```xml
    </rodp:PrintableArea>
    <rodp:PrintableOrigin ValueType="PAIR">
      <rodp:PrintableOriginValue Value="200"/>
      <rodp:PrintableOriginValue Value="200"/>
    </rodp:PrintableOrigin>
  </rodp:AllowedValue>
  <rodp:AllowedValue>
    <rodp:Option>na_govt-legal_8x13in</rodp:Option>
    <rodp:DisplayName xml:lang="en-US">8x13</rodp:DisplayName>
    <rodp:PageDimensions ValueType="PAIR">
      <rodp:PageDimensionsValue Value="9600"/>
      <rodp:PageDimensionsValue Value="15600"/>
    </rodp:PageDimensions>
    <rodp:PrintableArea ValueType="PAIR">
      <rodp:PrintableAreaValue Value="9200"/>
      <rodp:PrintableAreaValue Value="15200"/>
    </rodp:PrintableArea>
    <rodp:PrintableOrigin ValueType="PAIR">
      <rodp:PrintableOriginValue Value="200"/>
      <rodp:PrintableOriginValue Value="200"/>
    </rodp:PrintableOrigin>
  </rodp:AllowedValue>
  <rodp:AllowedValue>
    <rodp:Option>om_pa-kai_267x389mm</rodp:Option>
    <rodp:DisplayName xml:lang="en-US">8kai</rodp:DisplayName>
    <rodp:PageDimensions ValueType="PAIR">
      <rodp:PageDimensionsValue Value="12612"/>
      <rodp:PageDimensionsValue Value="18424"/>
    </rodp:PageDimensions>
    <rodp:PrintableArea ValueType="PAIR">
      <rodp:PrintableAreaValue Value="12212"/>
      <rodp:PrintableAreaValue Value="18024"/>
    </rodp:PrintableArea>
    <rodp:PrintableOrigin ValueType="PAIR">
      <rodp:PrintableOriginValue Value="200"/>
      <rodp:PrintableOriginValue Value="200"/>
    </rodp:PrintableOrigin>
  </rodp:AllowedValue>
  <rodp:AllowedValue>
    <rodp:Option>prc_16k_146x215mm</rodp:Option>
    <rodp:DisplayName xml:lang="en-US">16kai</rodp:DisplayName>
    <rodp:PageDimensions ValueType="PAIR">
      <rodp:PageDimensionsValue Value="9212"/>
      <rodp:PageDimensionsValue Value="12612"/>
    </rodp:PageDimensions>
    <rodp:PrintableArea ValueType="PAIR">
      <rodp:PrintableAreaValue Value="8812"/>
      <rodp:PrintableAreaValue Value="12212"/>
```

```
    </rodp:PrintableArea>
    <rodp:PrintableOrigin ValueType="PAIR">
      <rodp:PrintableOriginValue Value="200"/>
      <rodp:PrintableOriginValue Value="200"/>
    </rodp:PrintableOrigin>
   </rodp:AllowedValue>
   <rodp:AllowedValue>
    <rodp:Option>custom_papersize</rodp:Option>
    <rodp:DisplayName xml:lang="en-US">CUSTOMSIZE</rodp:DisplayName>
    <rodp:MinSize ValueType="PAIR">
      <rodp:MinSizeValue Value="4251"/>
      <rodp:MinSizeValue Value="6992"/>
    </rodp:MinSize>
    <rodp:MaxSize ValueType="PAIR">
      <rodp:MaxSizeValue Value="14412"/>
      <rodp:MaxSizeValue Value="28346"/>
    </rodp:MaxSize>
    <rodp:MaxPrintableWidth ValueType="INT">
      <rodp:MaxPrintableWidthValue Value="14412"/>
    </rodp:MaxPrintableWidth>
    <rodp:MinLeftMargin ValueType="INT">
      <rodp:MinLeftMarginValue Value="200"/>
    </rodp:MinLeftMargin>
    <rodp:TopMargin ValueType="INT">
      <rodp:TopMarginValue Value="200"/>
    </rodp:TopMargin>
    <rodp:BottomMargin ValueType="INT">
      <rodp:BottomMarginValue Value="200"/>
    </rodp:BottomMargin>
   </rodp:AllowedValue>
  </rodp:MediaSizeName>
 </rodp:DocumentProcessing>
 <rodp:RicohPrinterSettings>
  <rodp:ColorMode>
   <rodp:DisplayName xml:lang="en-US">Color Mode</rodp:DisplayName>
   <rodp:AllowedValue>
    <rodp:Option>24bpp</rodp:Option>
    <rodp:DisplayName xml:lang="en-US">True Color (24BPP)</rodp:DisplayName>
   </rodp:AllowedValue>
   <rodp:AllowedValue>
    <rodp:Option>Mono</rodp:Option>
    <rodp:DisplayName xml:lang="en-US">Monochrome</rodp:DisplayName>
   </rodp:AllowedValue>
  </rodp:ColorMode>
  <rodp:Dither>
   <rodp:DisplayName xml:lang="en-US">Dither</rodp:DisplayName>
   <rodp:AllowedValue>
    <rodp:Option>High</rodp:Option>
```

```xml
      <rodp:DisplayName xml:lang="en-US">High</rodp:DisplayName>
    </rodp:AllowedValue>
    <rodp:AllowedValue>
      <rodp:Option>Low</rodp:Option>
      <rodp:DisplayName xml:lang="en-US">Low</rodp:DisplayName>
    </rodp:AllowedValue>
  </rodp:Dither>
  <rodp:SlipSheet>
    <rodp:DisplayName xml:lang="en-US">Slip Sheet</rodp:DisplayName>
    <rodp:ConflictPriority ValueType="INT">
      <rodp:ConflictPriorityValue Value="10"/>
    </rodp:ConflictPriority>
    <rodp:AllowedValue>
      <rodp:Option>OFF</rodp:Option>
      <rodp:DisplayName xml:lang="en-US">Off</rodp:DisplayName>
    </rodp:AllowedValue>
    <rodp:AllowedValue>
      <rodp:Option>ON</rodp:Option>
      <rodp:DisplayName xml:lang="en-US">On</rodp:DisplayName>
    </rodp:AllowedValue>
  </rodp:SlipSheet>
  <rodp:SlipSheetInputBin>
    <rodp:DisplayName xml:lang="en-US">Slip Sheet Paper Source</rodp:DisplayName>
    <rodp:AllowedValue>
      <rodp:Option>Bypass</rodp:Option>
      <rodp:DisplayName xml:lang="en-US">Bypass Tray</rodp:DisplayName>
    </rodp:AllowedValue>
    <rodp:AllowedValue>
      <rodp:Option>Tray1</rodp:Option>
      <rodp:DisplayName xml:lang="en-US">Tray 1</rodp:DisplayName>
    </rodp:AllowedValue>
    <rodp:AllowedValue>
      <rodp:Option>Tray2</rodp:Option>
      <rodp:DisplayName xml:lang="en-US">Tray 2</rodp:DisplayName>
    </rodp:AllowedValue>
    <rodp:AllowedValue>
      <rodp:Option>Tray3</rodp:Option>
      <rodp:DisplayName xml:lang="en-US">Tray 3</rodp:DisplayName>
    </rodp:AllowedValue>
    <rodp:AllowedValue>
      <rodp:Option>Tray4</rodp:Option>
      <rodp:DisplayName xml:lang="en-US">Tray 4</rodp:DisplayName>
    </rodp:AllowedValue>
    <rodp:AllowedValue>
      <rodp:Option>LargeCapacity</rodp:Option>
      <rodp:DisplayName xml:lang="en-US">Large Capacity Tray</rodp:DisplayName>
    </rodp:AllowedValue>
```

```
    </rodp:SlipSheetInputBin>
    <rodp:InputBins>
     <rodp:DisplayName xml:lang="en-US">Paper Source</rodp:DisplayName>
     <rodp:ConflictPriority ValueType="INT">
      <rodp:ConflictPriorityValue Value="20"/>
     </rodp:ConflictPriority>
     <rodp:AllowedValue>
      <rodp:Option>AUTO</rodp:Option>
      <rodp:DisplayName xml:lang="en-US">Auto Select by Printer</rodp:DisplayName>
     </rodp:AllowedValue>
     <rodp:AllowedValue>
      <rodp:Option>Bypass</rodp:Option>
      <rodp:DisplayName xml:lang="en-US">Bypass Tray</rodp:DisplayName>
     </rodp:AllowedValue>
     <rodp:AllowedValue>
      <rodp:Option>Tray1</rodp:Option>
      <rodp:DisplayName xml:lang="en-US">Tray 1</rodp:DisplayName>
     </rodp:AllowedValue>
     <rodp:AllowedValue>
      <rodp:Option>Tray2</rodp:Option>
      <rodp:DisplayName xml:lang="en-US">Tray 2</rodp:DisplayName>
     </rodp:AllowedValue>
     <rodp:AllowedValue>
      <rodp:Option>Tray3</rodp:Option>
      <rodp:DisplayName xml:lang="en-US">Tray 3</rodp:DisplayName>
     </rodp:AllowedValue>
     <rodp:AllowedValue>
      <rodp:Option>Tray4</rodp:Option>
      <rodp:DisplayName xml:lang="en-US">Tray 4</rodp:DisplayName>
     </rodp:AllowedValue>
     <rodp:AllowedValue>
      <rodp:Option>LargeCapacity</rodp:Option>
      <rodp:DisplayName xml:lang="en-US">Large Capacity Tray</rodp:DisplayName>
     </rodp:AllowedValue>
    </rodp:InputBins>
    <rodp:OutputBins>
     <rodp:DisplayName xml:lang="en-US">Output Bin</rodp:DisplayName>
     <rodp:AllowedValue>
      <rodp:Option>PrinterDefault</rodp:Option>
      <rodp:DisplayName xml:lang="en-US">Printer Default</rodp:DisplayName>
     </rodp:AllowedValue>
     <rodp:AllowedValue>
      <rodp:Option>StandardTray</rodp:Option>
      <rodp:DisplayName xml:lang="en-US">Standard Tray</rodp:DisplayName>
     </rodp:AllowedValue>
     <rodp:AllowedValue>
      <rodp:Option>ExternalTray</rodp:Option>
```

```
      <rodp:DisplayName xml:lang="en-US">External Tray</rodp:DisplayName>
     </rodp:AllowedValue>
     <rodp:AllowedValue>
      <rodp:Option>FinisherShiftTray1</rodp:Option>
      <rodp:DisplayName xml:lang="en-US">Finisher Shift Tray 1</rodp:DisplayName>
     </rodp:AllowedValue>
     <rodp:AllowedValue>
      <rodp:Option>FinisherShiftTray2</rodp:Option>
      <rodp:DisplayName xml:lang="en-US">Finisher Shift Tray 2</rodp:DisplayName>
     </rodp:AllowedValue>
     <rodp:AllowedValue>
      <rodp:Option>FinisherShiftTray</rodp:Option>
      <rodp:DisplayName xml:lang="en-US">Finisher Shift Tray</rodp:DisplayName>
     </rodp:AllowedValue>
     <rodp:AllowedValue>
      <rodp:Option>FinisherBookletTray</rodp:Option>
      <rodp:DisplayName xml:lang="en-US">Booklet Finisher Tray</rodp:DisplayName>
     </rodp:AllowedValue>
     <rodp:AllowedValue>
      <rodp:Option>LeftTray1</rodp:Option>
      <rodp:DisplayName xml:lang="en-US">Left Tray 1</rodp:DisplayName>
     </rodp:AllowedValue>
     <rodp:AllowedValue>
      <rodp:Option>LeftTray2</rodp:Option>
      <rodp:DisplayName xml:lang="en-US">Left Tray 2</rodp:DisplayName>
     </rodp:AllowedValue>
    </rodp:OutputBins>
   </rodp:RicohPrinterSettings>
  </rodp:JobValues>
 </rodp:RicohPrinterCapabilities>
</wprt:PrinterCapabilities>
<wprt:DefaultPrintTicket>
 <wprt:JobDescription>
  <wprt:JobName>DefaultJob</wprt:JobName>
  <wprt:JobOriginatingUserName>DefaultUser</wprt:JobOriginatingUserName>
 </wprt:JobDescription>
 <wprt:JobProcessing>
  <wprt:Copies>1</wprt:Copies>
  <wprt:JobFinishings>
   <wprt:Collate>false</wprt:Collate>
   <wprt:JogOffset>false</wprt:JogOffset>
   <wprt:Staple>
    <wprt:Location>unknown</wprt:Location>
    <wprt:Angle>unknown</wprt:Angle>
   </wprt:Staple>
   <wprt:HolePunch>
    <wprt:Edge>unknown</wprt:Edge>
```

```xml
      <wprt:Pattern>unknown</wprt:Pattern>
    </wprt:HolePunch>
  </wprt:JobFinishings>
  <wprt:Priority>50</wprt:Priority>
</wprt:JobProcessing>
<wprt:DocumentProcessing>
  <wprt:MediaSizeName>na_letter_8.5x11in</wprt:MediaSizeName>
  <wprt:MediaType>Auto</wprt:MediaType>
  <wprt:MediaColor>unknown</wprt:MediaColor>
  <wprt:NumberUp>
    <wprt:PagesPerSheet>1</wprt:PagesPerSheet>
    <wprt:Direction>RightDown</wprt:Direction>
  </wprt:NumberUp>
  <wprt:Orientation>Portrait</wprt:Orientation>
  <wprt:Resolution>
    <wprt:Width>600</wprt:Width>
    <wprt:Height>600</wprt:Height>
  </wprt:Resolution>
  <wprt:PrintQuality>Normal</wprt:PrintQuality>
  <wprt:Sides>OneSided</wprt:Sides>
</wprt:DocumentProcessing>
<rodp:RicohDefaultPrintTicket>
  <rodp:JobProcessing>
    <rodp:JobType>Normal</rodp:JobType>
    <rodp:LogEnabled>Disabled</rodp:LogEnabled>
    <rodp:UserName>DefaultUser</rodp:UserName>
    <rodp:JobID>DefaultJobID</rodp:JobID>
    <rodp:Password>Password</rodp:Password>
    <rodp:UserCode>UserDode</rodp:UserCode>
    <rodp:JobName>DefaultJob</rodp:JobName>
    <rodp:JobFinishings>
      <rodp:Staple>OFF</rodp:Staple>
      <rodp:HolePunch>OFF</rodp:HolePunch>
    </rodp:JobFinishings>
  </rodp:JobProcessing>
  <rodp:DocumentProcessing/>
  <rodp:RicohPrinterSettings>
    <rodp:ColorMode>24bpp</rodp:ColorMode>
    <rodp:Dither>High</rodp:Dither>
    <rodp:InputBins>AUTO</rodp:InputBins>
    <rodp:OutputBins>PrinterDefault</rodp:OutputBins>
    <rodp:SlipSheet>OFF</rodp:SlipSheet>
    <rodp:SlipSheetInputBin>Bypass</rodp:SlipSheetInputBin>
  </rodp:RicohPrinterSettings>
</rodp:RicohDefaultPrintTicket>
</wprt:DefaultPrintTicket>
<wprt:RicohExtensionData>
  <rodp:RicohExtensionData>
```

```xml
<rodp:DeviceCategory Category="RicohWSDPrototype"/>
<rodp:PDLHeader>
 <rodp:PrintRateUnit ValueType="DEF">
  <rodp:PrintRateUnitValue Value="PPM"/>
 </rodp:PrintRateUnit>
 <rodp:MasterUnits ValueType="PAIR">
  <rodp:MasterUnitsValue Value="1200"/>
  <rodp:MasterUnitsValue Value="1200"/>
 </rodp:MasterUnits>
 <rodp:PrinterType ValueType="DEF">
  <rodp:PrinterTypeValue Value="PAGE"/>
 </rodp:PrinterType>
 <rodp:Define ValueType="DEF">
  <rodp:DefineValue Value="RI_COLOR"/>
 </rodp:Define>
</rodp:PDLHeader>
<rodp:PDLOptionalHeader>
 <rodp:Support8CharPassword>
  <rodp:DisplayName xml:lang="en-US">Support8CharPassword</rodp:DisplayName>
  <rodp:ConcealFromUI ValueType="BOOL">
   <rodp:ConcealFromUIValue Value="TRUE"/>
  </rodp:ConcealFromUI>
  <rodp:DefaultOption>ON</rodp:DefaultOption>
  <rodp:AllowedValue>
   <rodp:Option>ON</rodp:Option>
   <rodp:DisplayName xml:lang="en-US">ON</rodp:DisplayName>
  </rodp:AllowedValue>
 </rodp:Support8CharPassword>
 <rodp:SupportDocUiReplace>
  <rodp:DisplayName xml:lang="en-US">SupportDocUiReplace</rodp:DisplayName>
  <rodp:ConcealFromUI ValueType="BOOL">
   <rodp:ConcealFromUIValue Value="TRUE"/>
  </rodp:ConcealFromUI>
  <rodp:DefaultOption>ON</rodp:DefaultOption>
  <rodp:AllowedValue>
   <rodp:Option>ON</rodp:Option>
   <rodp:DisplayName xml:lang="en-US">ON</rodp:DisplayName>
  </rodp:AllowedValue>
 </rodp:SupportDocUiReplace>
 <rodp:AutoConfig>
  <rodp:DisplayName xml:lang="en-US">AutoConfig</rodp:DisplayName>
  <rodp:ConcealFromUI ValueType="BOOL">
   <rodp:ConcealFromUIValue Value="TRUE"/>
  </rodp:ConcealFromUI>
  <rodp:DefaultOption>ON</rodp:DefaultOption>
  <rodp:AllowedValue>
   <rodp:Option>ON</rodp:Option>
   <rodp:DisplayName xml:lang="en-US">ON</rodp:DisplayName>
```

```xml
  </rodp:AllowedValue>
</rodp:AutoConfig>
<rodp:SupportSamplePrint>
  <rodp:DisplayName xml:lang="en-US">SupportSamplePrint</rodp:DisplayName>
  <rodp:ConcealFromUI ValueType="BOOL">
    <rodp:ConcealFromUIValue Value="TRUE"/>
  </rodp:ConcealFromUI>
  <rodp:DefaultOption>ON</rodp:DefaultOption>
  <rodp:AllowedValue>
    <rodp:Option>ON</rodp:Option>
    <rodp:DisplayName xml:lang="en-US">ON</rodp:DisplayName>
  </rodp:AllowedValue>
</rodp:SupportSamplePrint>
<rodp:SupportSecurePrint>
  <rodp:DisplayName xml:lang="en-US">SupportSecurePrint</rodp:DisplayName>
  <rodp:ConcealFromUI ValueType="BOOL">
    <rodp:ConcealFromUIValue Value="TRUE"/>
  </rodp:ConcealFromUI>
  <rodp:DefaultOption>ON</rodp:DefaultOption>
  <rodp:AllowedValue>
    <rodp:Option>ON</rodp:Option>
    <rodp:DisplayName xml:lang="en-US">ON</rodp:DisplayName>
  </rodp:AllowedValue>
</rodp:SupportSecurePrint>
<rodp:SupportHoldPrint>
  <rodp:DisplayName xml:lang="en-US">SupportHoldPrint</rodp:DisplayName>
  <rodp:ConcealFromUI ValueType="BOOL">
    <rodp:ConcealFromUIValue Value="TRUE"/>
  </rodp:ConcealFromUI>
  <rodp:DefaultOption>ON</rodp:DefaultOption>
  <rodp:AllowedValue>
    <rodp:Option>ON</rodp:Option>
    <rodp:DisplayName xml:lang="en-US">ON</rodp:DisplayName>
  </rodp:AllowedValue>
</rodp:SupportHoldPrint>
<rodp:SupportStoredPrint>
  <rodp:DisplayName xml:lang="en-US">SupportStoredPrint</rodp:DisplayName>
  <rodp:ConcealFromUI ValueType="BOOL">
    <rodp:ConcealFromUIValue Value="TRUE"/>
  </rodp:ConcealFromUI>
  <rodp:DefaultOption>ON</rodp:DefaultOption>
  <rodp:AllowedValue>
    <rodp:Option>ON</rodp:Option>
    <rodp:DisplayName xml:lang="en-US">ON</rodp:DisplayName>
  </rodp:AllowedValue>
</rodp:SupportStoredPrint>
<rodp:SupportDocumentBox>
  <rodp:DisplayName xml:lang="en-US">SupportDocumentBox</rodp:DisplayName>
```

```xml
<rodp:ConcealFromUI ValueType="BOOL">
  <rodp:ConcealFromUIValue Value="TRUE"/>
</rodp:ConcealFromUI>
<rodp:DefaultOption>ON</rodp:DefaultOption>
<rodp:AllowedValue>
  <rodp:Option>ON</rodp:Option>
  <rodp:DisplayName xml:lang="en-US">ON</rodp:DisplayName>
</rodp:AllowedValue>
</rodp:SupportDocumentBox>
</rodp:PDLOptionalHeader>
<rodp:DisplayOrder>
 <rodp:DeviceFeature Value="InputTray3"/>
 <rodp:DeviceFeature Value="InputTray4"/>
 <rodp:DeviceFeature Value="LargeCapacityTray"/>
 <rodp:DeviceFeature Value="LeftTray1and2"/>
 <rodp:DeviceFeature Value="Finisher"/>
 <rodp:DeviceFeature Value="HolePunchUnit"/>
 <rodp:DeviceFeature Value="MediaSizeName"/>
 <rodp:DeviceFeature Value="MediaType"/>
 <rodp:DeviceFeature Value="InputBins"/>
 <rodp:DeviceFeature Value="SlipSheet"/>
 <rodp:DeviceFeature Value="SlipSheetInputBin"/>
 <rodp:DeviceFeature Value="OutputBins"/>
 <rodp:DeviceFeature Value="Staple"/>
 <rodp:DeviceFeature Value="HolePunch"/>
 <rodp:DeviceFeature Value="Orientation"/>
 <rodp:DeviceFeature Value="Sides"/>
 <rodp:DeviceFeature Value="Resolution"/>
 <rodp:DeviceFeature Value="TrueTypeFormat"/>
 <rodp:DeviceFeature Value="ColorMode"/>
</rodp:DisplayOrder>
<rodp:DeviceConstraints>
 <rodp:FeatureConstraint Feature="Finisher" Option="NotInstalled">
  <rodp:Constraints>
   <rodp:Constraint Feature="OutputBins" Option="FinisherShiftTray1"/>
   <rodp:Constraint Feature="OutputBins" Option="FinisherShiftTray2"/>
   <rodp:Constraint Feature="OutputBins" Option="FinisherShiftTray"/>
   <rodp:Constraint Feature="OutputBins" Option="FinisherBookletTray"/>
   <rodp:Constraint Feature="HolePunchUnit" Option="2and3holes"/>
   <rodp:Constraint Feature="HolePunchUnit" Option="2and4holes"/>
   <rodp:Constraint Feature="HolePunchUnit" Option="2holesJP"/>
   <rodp:Constraint Feature="HolePunchUnit" Option="4holesEU"/>
   <rodp:Constraint Feature="HolePunchUnit" Option="4holesNE"/>
  </rodp:Constraints>
 </rodp:FeatureConstraint>
 <rodp:FeatureConstraint Feature="Finisher" Option="Finisher2000">
  <rodp:Constraints>
   <rodp:Constraint Feature="LeftTray1and2" Option="Installed"/>
```

```xml
    <rodp:Constraint Feature="HolePunchUnit" Option="2holesJP"/>
    <rodp:Constraint Feature="HolePunchUnit" Option="4holesEU"/>
    <rodp:Constraint Feature="OutputBins" Option="FinisherShiftTray"/>
    <rodp:Constraint Feature="OutputBins" Option="FinisherBookletTray"/>
    <rodp:Constraint Feature="OutputBins" Option="LeftTray1"/>
    <rodp:Constraint Feature="OutputBins" Option="LeftTray2"/>
  </rodp:Constraints>
</rodp:FeatureConstraint>
<rodp:FeatureConstraint Feature="Finisher" Option="BookletFinisher">
  <rodp:Constraints>
    <rodp:Constraint Feature="LeftTray1and2" Option="Installed"/>
    <rodp:Constraint Feature="HolePunchUnit" Option="2and4holes"/>
    <rodp:Constraint Feature="OutputBins" Option="FinisherShiftTray1"/>
    <rodp:Constraint Feature="OutputBins" Option="FinisherShiftTray2"/>
    <rodp:Constraint Feature="OutputBins" Option="LeftTray1"/>
    <rodp:Constraint Feature="OutputBins" Option="LeftTray2"/>
  </rodp:Constraints>
</rodp:FeatureConstraint>
<rodp:FeatureConstraint Feature="LeftTray1and2" Option="NotInstalled">
  <rodp:Constraints>
    <rodp:Constraint Feature="OutputBins" Option="LeftTray1"/>
    <rodp:Constraint Feature="OutputBins" Option="LeftTray2"/>
  </rodp:Constraints>
</rodp:FeatureConstraint>
<rodp:FeatureConstraint Feature="LeftTray1and2" Option="Installed">
  <rodp:Constraints>
    <rodp:Constraint Feature="HolePunchUnit" Option="2holesJP"/>
    <rodp:Constraint Feature="HolePunchUnit" Option="4holesEU"/>
    <rodp:Constraint Feature="HolePunchUnit" Option="4holesNE"/>
    <rodp:Constraint Feature="HolePunchUnit" Option="2and3holes"/>
    <rodp:Constraint Feature="HolePunchUnit" Option="2and4holes"/>
    <rodp:Constraint Feature="OutputBins" Option="FinisherShiftTray1"/>
    <rodp:Constraint Feature="OutputBins" Option="FinisherShiftTray2"/>
    <rodp:Constraint Feature="OutputBins" Option="FinisherShiftTray"/>
    <rodp:Constraint Feature="OutputBins" Option="FinisherBookletTray"/>
  </rodp:Constraints>
</rodp:FeatureConstraint>
<rodp:FeatureConstraint Feature="InputTray4" Option="Installed">
  <rodp:Constraints>
    <rodp:Constraint Feature="InputTray3" Option="NotInstalled"/>
  </rodp:Constraints>
</rodp:FeatureConstraint>
<rodp:FeatureConstraint Feature="HolePunchUnit" Option="NotInstalled">
  <rodp:Constraints>
    <rodp:Constraint Feature="HolePunch" Option="Left2"/>
    <rodp:Constraint Feature="HolePunch" Option="Top2"/>
    <rodp:Constraint Feature="HolePunch" Option="Right2"/>
    <rodp:Constraint Feature="HolePunch" Option="Left3"/>
```

```xml
    <rodp:Constraint Feature="HolePunch" Option="Top3"/>
    <rodp:Constraint Feature="HolePunch" Option="Right3"/>
    <rodp:Constraint Feature="HolePunch" Option="Left4"/>
    <rodp:Constraint Feature="HolePunch" Option="Top4"/>
    <rodp:Constraint Feature="HolePunch" Option="Right4"/>
  </rodp:Constraints>
</rodp:FeatureConstraint>
<rodp:FeatureConstraint Feature="HolePunchUnit" Option="2and3holes">
  <rodp:Constraints>
    <rodp:Constraint Feature="HolePunch" Option="Left4"/>
    <rodp:Constraint Feature="HolePunch" Option="Top4"/>
    <rodp:Constraint Feature="HolePunch" Option="Right4"/>
  </rodp:Constraints>
</rodp:FeatureConstraint>
<rodp:FeatureConstraint Feature="HolePunchUnit" Option="2and4holes">
  <rodp:Constraints>
    <rodp:Constraint Feature="HolePunch" Option="Left3"/>
    <rodp:Constraint Feature="HolePunch" Option="Top3"/>
    <rodp:Constraint Feature="HolePunch" Option="Right3"/>
  </rodp:Constraints>
</rodp:FeatureConstraint>
<rodp:FeatureConstraint Feature="HolePunchUnit" Option="2holesJP">
  <rodp:Constraints>
    <rodp:Constraint Feature="HolePunch" Option="Left4"/>
    <rodp:Constraint Feature="HolePunch" Option="Top4"/>
    <rodp:Constraint Feature="HolePunch" Option="Right4"/>
    <rodp:Constraint Feature="HolePunch" Option="Left3"/>
    <rodp:Constraint Feature="HolePunch" Option="Top3"/>
    <rodp:Constraint Feature="HolePunch" Option="Right3"/>
  </rodp:Constraints>
</rodp:FeatureConstraint>
<rodp:FeatureConstraint Feature="HolePunchUnit" Option="4holesEU">
  <rodp:Constraints>
    <rodp:Constraint Feature="HolePunch" Option="Left2"/>
    <rodp:Constraint Feature="HolePunch" Option="Top2"/>
    <rodp:Constraint Feature="HolePunch" Option="Right2"/>
    <rodp:Constraint Feature="HolePunch" Option="Left3"/>
    <rodp:Constraint Feature="HolePunch" Option="Top3"/>
    <rodp:Constraint Feature="HolePunch" Option="Right3"/>
  </rodp:Constraints>
</rodp:FeatureConstraint>
<rodp:FeatureConstraint Feature="HolePunchUnit" Option="4holesNE">
  <rodp:Constraints>
    <rodp:Constraint Feature="HolePunch" Option="Left2"/>
    <rodp:Constraint Feature="HolePunch" Option="Top2"/>
    <rodp:Constraint Feature="HolePunch" Option="Right2"/>
    <rodp:Constraint Feature="HolePunch" Option="Left3"/>
    <rodp:Constraint Feature="HolePunch" Option="Top3"/>
```

```xml
    <rodp:Constraint Feature="HolePunch" Option="Right3"/>
  </rodp:Constraints>
</rodp:FeatureConstraint>
<rodp:FeatureConstraint Feature="OutputBins" Option="StandardTray">
  <rodp:DisabledFeatures ValueType="LIST">
    <rodp:DisabledFeature Value="Staple"/>
  </rodp:DisabledFeatures>
  <rodp:DisabledFeatures ValueType="LIST">
    <rodp:DisabledFeature Value="HolePunch"/>
  </rodp:DisabledFeatures>
  <rodp:Constraints>
    <rodp:Constraint Feature="Staple" Option="TopLeft"/>
    <rodp:Constraint Feature="Staple" Option="TopLeftSlant"/>
    <rodp:Constraint Feature="Staple" Option="TopRight"/>
    <rodp:Constraint Feature="Staple" Option="TopRightSlant"/>
    <rodp:Constraint Feature="Staple" Option="Top2"/>
    <rodp:Constraint Feature="Staple" Option="Left2"/>
    <rodp:Constraint Feature="Staple" Option="Right2"/>
    <rodp:Constraint Feature="Staple" Option="Booklet"/>
    <rodp:Constraint Feature="HolePunch" Option="Left2"/>
    <rodp:Constraint Feature="HolePunch" Option="Top2"/>
    <rodp:Constraint Feature="HolePunch" Option="Right2"/>
    <rodp:Constraint Feature="HolePunch" Option="Left3"/>
    <rodp:Constraint Feature="HolePunch" Option="Top3"/>
    <rodp:Constraint Feature="HolePunch" Option="Right3"/>
    <rodp:Constraint Feature="HolePunch" Option="Left4"/>
    <rodp:Constraint Feature="HolePunch" Option="Top4"/>
    <rodp:Constraint Feature="HolePunch" Option="Right4"/>
  </rodp:Constraints>
</rodp:FeatureConstraint>
<rodp:FeatureConstraint Feature="OutputBins" Option="ExternalTray">
  <rodp:DisabledFeatures ValueType="LIST">
    <rodp:DisabledFeature Value="Staple"/>
  </rodp:DisabledFeatures>
  <rodp:DisabledFeatures ValueType="LIST">
    <rodp:DisabledFeature Value="HolePunch"/>
  </rodp:DisabledFeatures>
  <rodp:Constraints>
    <rodp:Constraint Feature="Staple" Option="TopLeft"/>
    <rodp:Constraint Feature="Staple" Option="TopLeftSlant"/>
    <rodp:Constraint Feature="Staple" Option="TopRight"/>
    <rodp:Constraint Feature="Staple" Option="TopRightSlant"/>
    <rodp:Constraint Feature="Staple" Option="Top2"/>
    <rodp:Constraint Feature="Staple" Option="Left2"/>
    <rodp:Constraint Feature="Staple" Option="Right2"/>
    <rodp:Constraint Feature="Staple" Option="Booklet"/>
    <rodp:Constraint Feature="HolePunch" Option="Left2"/>
    <rodp:Constraint Feature="HolePunch" Option="Top2"/>
```

```xml
    <rodp:Constraint Feature="HolePunch" Option="Right2"/>
    <rodp:Constraint Feature="HolePunch" Option="Left3"/>
    <rodp:Constraint Feature="HolePunch" Option="Top3"/>
    <rodp:Constraint Feature="HolePunch" Option="Right3"/>
    <rodp:Constraint Feature="HolePunch" Option="Left4"/>
    <rodp:Constraint Feature="HolePunch" Option="Top4"/>
    <rodp:Constraint Feature="HolePunch" Option="Right4"/>
    <rodp:Constraint Feature="Sides" Option="TwoSidedLongEdge"/>
    <rodp:Constraint Feature="Sides" Option="TwoSidedShortEdge"/>
  </rodp:Constraints>
</rodp:FeatureConstraint>
<rodp:FeatureConstraint Feature="OutputBins" Option="FinisherShiftTray1">
  <rodp:Constraints>
    <rodp:Constraint Feature="Staple" Option="Booklet"/>
  </rodp:Constraints>
</rodp:FeatureConstraint>
<rodp:FeatureConstraint Feature="OutputBins" Option="FinisherShiftTray2">
  <rodp:Constraints>
    <rodp:Constraint Feature="Staple" Option="Booklet"/>
  </rodp:Constraints>
</rodp:FeatureConstraint>
<rodp:FeatureConstraint Feature="OutputBins" Option="FinisherShiftTray">
  <rodp:Constraints>
    <rodp:Constraint Feature="Staple" Option="Booklet"/>
  </rodp:Constraints>
</rodp:FeatureConstraint>
<rodp:FeatureConstraint Feature="OutputBins" Option="FinisherBookletTray">
  <rodp:DisabledFeatures ValueType="LIST">
    <rodp:DisabledFeature Value="HolePunch"/>
  </rodp:DisabledFeatures>
  <rodp:Constraints>
    <rodp:Constraint Feature="Staple" Option="TopLeft"/>
    <rodp:Constraint Feature="Staple" Option="TopLeftSlant"/>
    <rodp:Constraint Feature="Staple" Option="TopRight"/>
    <rodp:Constraint Feature="Staple" Option="TopRightSlant"/>
    <rodp:Constraint Feature="Staple" Option="Top2"/>
    <rodp:Constraint Feature="Staple" Option="Left2"/>
    <rodp:Constraint Feature="Staple" Option="Right2"/>
    <rodp:Constraint Feature="HolePunch" Option="Left2"/>
    <rodp:Constraint Feature="HolePunch" Option="Top2"/>
    <rodp:Constraint Feature="HolePunch" Option="Right2"/>
    <rodp:Constraint Feature="HolePunch" Option="Left3"/>
    <rodp:Constraint Feature="HolePunch" Option="Top3"/>
    <rodp:Constraint Feature="HolePunch" Option="Right3"/>
    <rodp:Constraint Feature="HolePunch" Option="Left4"/>
    <rodp:Constraint Feature="HolePunch" Option="Top4"/>
    <rodp:Constraint Feature="HolePunch" Option="Right4"/>
  </rodp:Constraints>
```

```xml
</rodp:FeatureConstraint>
<rodp:FeatureConstraint Feature="OutputBins" Option="LeftTray1">
 <rodp:DisabledFeatures ValueType="LIST">
  <rodp:DisabledFeature Value="Staple"/>
 </rodp:DisabledFeatures>
 <rodp:DisabledFeatures ValueType="LIST">
  <rodp:DisabledFeature Value="HolePunch"/>
 </rodp:DisabledFeatures>
 <rodp:Constraints>
  <rodp:Constraint Feature="Staple" Option="TopLeft"/>
  <rodp:Constraint Feature="Staple" Option="TopLeftSlant"/>
  <rodp:Constraint Feature="Staple" Option="TopRight"/>
  <rodp:Constraint Feature="Staple" Option="TopRightSlant"/>
  <rodp:Constraint Feature="Staple" Option="Top2"/>
  <rodp:Constraint Feature="Staple" Option="Left2"/>
  <rodp:Constraint Feature="Staple" Option="Right2"/>
  <rodp:Constraint Feature="Staple" Option="Booklet"/>
  <rodp:Constraint Feature="HolePunch" Option="Left2"/>
  <rodp:Constraint Feature="HolePunch" Option="Top2"/>
  <rodp:Constraint Feature="HolePunch" Option="Right2"/>
  <rodp:Constraint Feature="HolePunch" Option="Left3"/>
  <rodp:Constraint Feature="HolePunch" Option="Top3"/>
  <rodp:Constraint Feature="HolePunch" Option="Right3"/>
  <rodp:Constraint Feature="HolePunch" Option="Left4"/>
  <rodp:Constraint Feature="HolePunch" Option="Top4"/>
  <rodp:Constraint Feature="HolePunch" Option="Right4"/>
 </rodp:Constraints>
</rodp:FeatureConstraint>
<rodp:FeatureConstraint Feature="OutputBins" Option="LeftTray2">
 <rodp:DisabledFeatures ValueType="LIST">
  <rodp:DisabledFeature Value="Staple"/>
 </rodp:DisabledFeatures>
 <rodp:DisabledFeatures ValueType="LIST">
  <rodp:DisabledFeature Value="HolePunch"/>
 </rodp:DisabledFeatures>
 <rodp:Constraints>
  <rodp:Constraint Feature="Staple" Option="TopLeft"/>
  <rodp:Constraint Feature="Staple" Option="TopLeftSlant"/>
  <rodp:Constraint Feature="Staple" Option="TopRight"/>
  <rodp:Constraint Feature="Staple" Option="TopRightSlant"/>
  <rodp:Constraint Feature="Staple" Option="Top2"/>
  <rodp:Constraint Feature="Staple" Option="Left2"/>
  <rodp:Constraint Feature="Staple" Option="Right2"/>
  <rodp:Constraint Feature="Staple" Option="Booklet"/>
  <rodp:Constraint Feature="HolePunch" Option="Left2"/>
  <rodp:Constraint Feature="HolePunch" Option="Top2"/>
  <rodp:Constraint Feature="HolePunch" Option="Right2"/>
  <rodp:Constraint Feature="HolePunch" Option="Left3"/>
```

```
      <rodp:Constraint Feature="HolePunch" Option="Top3"/>
      <rodp:Constraint Feature="HolePunch" Option="Right3"/>
      <rodp:Constraint Feature="HolePunch" Option="Left4"/>
      <rodp:Constraint Feature="HolePunch" Option="Top4"/>
      <rodp:Constraint Feature="HolePunch" Option="Right4"/>
    </rodp:Constraints>
  </rodp:FeatureConstraint>
  <rodp:GlobalConstraints>
    <rodp:InvalidCombinations>
      <rodp:InvalidCombination Feature="InputBins" Option="Tray1"/>
      <rodp:InvalidCombination Feature="MediaType" Option="TRANSPARENCY"/>
    </rodp:InvalidCombinations>
    <rodp:InvalidCombinations>
      <rodp:InvalidCombination Feature="InputBins" Option="Tray1"/>
      <rodp:InvalidCombination Feature="MediaType" Option="Thick"/>
    </rodp:InvalidCombinations>
    <rodp:InvalidCombinations>
      <rodp:InvalidCombination Feature="InputBins" Option="Tray1"/>
      <rodp:InvalidCombination Feature="MediaType" Option="Labels"/>
    </rodp:InvalidCombinations>
    <rodp:InvalidCombinations>
      <rodp:InvalidCombination Feature="InputBins" Option="Tray1"/>
      <rodp:InvalidCombination Feature="MediaType" Option="Plain_Duplex_Backside"/>
    </rodp:InvalidCombinations>
    <rodp:InvalidCombinations>
      <rodp:InvalidCombination Feature="InputBins" Option="Tray1"/>
      <rodp:InvalidCombination Feature="MediaType" Option="Thick_Duplex_Backside"/>
    </rodp:InvalidCombinations>
    <rodp:InvalidCombinations>
      <rodp:InvalidCombination Feature="InputBins" Option="Tray2"/>
      <rodp:InvalidCombination Feature="MediaType" Option="TRANSPARENCY"/>
    </rodp:InvalidCombinations>
    <rodp:InvalidCombinations>
      <rodp:InvalidCombination Feature="InputBins" Option="Tray2"/>
      <rodp:InvalidCombination Feature="MediaType" Option="Thick"/>
    </rodp:InvalidCombinations>
    <rodp:InvalidCombinations>
      <rodp:InvalidCombination Feature="InputBins" Option="Tray2"/>
      <rodp:InvalidCombination Feature="MediaType" Option="Labels"/>
    </rodp:InvalidCombinations>
    <rodp:InvalidCombinations>
      <rodp:InvalidCombination Feature="InputBins" Option="Tray2"/>
      <rodp:InvalidCombination Feature="MediaType" Option="Plain_Duplex_Backside"/>
    </rodp:InvalidCombinations>
    <rodp:InvalidCombinations>
```

```xml
    <rodp:InvalidCombination Feature="InputBins" Option="Tray2"/>
    <rodp:InvalidCombination Feature="MediaType" Option="Thick_Duplex_Backside"/>
</rodp:InvalidCombinations>
<rodp:InvalidCombinations>
    <rodp:InvalidCombination Feature="InputBins" Option="Tray3"/>
    <rodp:InvalidCombination Feature="MediaType" Option="TRANSPARENCY"/>
</rodp:InvalidCombinations>
<rodp:InvalidCombinations>
    <rodp:InvalidCombination Feature="InputBins" Option="Tray3"/>
    <rodp:InvalidCombination Feature="MediaType" Option="Thick"/>
</rodp:InvalidCombinations>
<rodp:InvalidCombinations>
    <rodp:InvalidCombination Feature="InputBins" Option="Tray3"/>
    <rodp:InvalidCombination Feature="MediaType" Option="Labels"/>
</rodp:InvalidCombinations>
<rodp:InvalidCombinations>
    <rodp:InvalidCombination Feature="InputBins" Option="Tray3"/>
    <rodp:InvalidCombination Feature="MediaType" Option="Plain_Duplex_Backside"/>
</rodp:InvalidCombinations>
<rodp:InvalidCombinations>
    <rodp:InvalidCombination Feature="InputBins" Option="Tray3"/>
    <rodp:InvalidCombination Feature="MediaType" Option="Thick_Duplex_Backside"/>
</rodp:InvalidCombinations>
<rodp:InvalidCombinations>
    <rodp:InvalidCombination Feature="InputBins" Option="Tray4"/>
    <rodp:InvalidCombination Feature="MediaType" Option="TRANSPARENCY"/>
</rodp:InvalidCombinations>
<rodp:InvalidCombinations>
    <rodp:InvalidCombination Feature="InputBins" Option="Tray4"/>
    <rodp:InvalidCombination Feature="MediaType" Option="Thick"/>
</rodp:InvalidCombinations>
<rodp:InvalidCombinations>
    <rodp:InvalidCombination Feature="InputBins" Option="Tray4"/>
    <rodp:InvalidCombination Feature="MediaType" Option="Labels"/>
</rodp:InvalidCombinations>
<rodp:InvalidCombinations>
    <rodp:InvalidCombination Feature="InputBins" Option="Tray4"/>
    <rodp:InvalidCombination Feature="MediaType" Option="Plain_Duplex_Backside"/>
</rodp:InvalidCombinations>
<rodp:InvalidCombinations>
    <rodp:InvalidCombination Feature="InputBins" Option="Tray4"/>
    <rodp:InvalidCombination Feature="MediaType" Option="Thick_Duplex_Backside"/>
</rodp:InvalidCombinations>
```

```xml
<rodp:InvalidCombinations>
  <rodp:InvalidCombination Feature="InputBins" Option="LARGECAPACITY"/>
  <rodp:InvalidCombination Feature="MediaType" Option="TRANSPARENCY"/>
</rodp:InvalidCombinations>
<rodp:InvalidCombinations>
  <rodp:InvalidCombination Feature="InputBins" Option="LARGECAPACITY"/>
  <rodp:InvalidCombination Feature="MediaType" Option="Thick"/>
</rodp:InvalidCombinations>
<rodp:InvalidCombinations>
  <rodp:InvalidCombination Feature="InputBins" Option="LARGECAPACITY"/>
  <rodp:InvalidCombination Feature="MediaType" Option="Labels"/>
</rodp:InvalidCombinations>
<rodp:InvalidCombinations>
  <rodp:InvalidCombination Feature="InputBins" Option="LARGECAPACITY"/>
  <rodp:InvalidCombination Feature="MediaType" Option="Plain_Duplex_Backside"/>
</rodp:InvalidCombinations>
<rodp:InvalidCombinations>
  <rodp:InvalidCombination Feature="InputBins" Option="LARGECAPACITY"/>
  <rodp:InvalidCombination Feature="MediaType" Option="Thick_Duplex_Backside"/>
</rodp:InvalidCombinations>
<rodp:InvalidCombinations>
  <rodp:InvalidCombination Feature="InputTray3" Option="NotInstalled"/>
  <rodp:InvalidCombination Feature="InputBins" Option="Tray3"/>
</rodp:InvalidCombinations>
<rodp:InvalidCombinations>
  <rodp:InvalidCombination Feature="InputTray4" Option="NotInstalled"/>
  <rodp:InvalidCombination Feature="InputBins" Option="Tray4"/>
</rodp:InvalidCombinations>
<rodp:InvalidCombinations>
  <rodp:InvalidCombination Feature="LargeCapacityTray" Option="NotInstalled"/>
  <rodp:InvalidCombination Feature="InputBins" Option="LARGECAPACITY"/>
</rodp:InvalidCombinations>
<rodp:InvalidCombinations>
  <rodp:InvalidCombination Feature="InputTray3" Option="NotInstalled"/>
  <rodp:InvalidCombination Feature="SlipSheetInputBin" Option="Tray3"/>
</rodp:InvalidCombinations>
<rodp:InvalidCombinations>
  <rodp:InvalidCombination Feature="InputTray4" Option="NotInstalled"/>
  <rodp:InvalidCombination Feature="SlipSheetInputBin" Option="Tray4"/>
</rodp:InvalidCombinations>
<rodp:InvalidCombinations>
  <rodp:InvalidCombination Feature="LargeCapacityTray" Option="NotInstalled"/>
  <rodp:InvalidCombination Feature="SlipSheetInputBin" Option="LARGECAPACITY"/>
</rodp:InvalidCombinations>
<rodp:InvalidCombinations>
```

```xml
  <rodp:InvalidCombination Feature="InputBins" Option="BypassTray"/>
  <rodp:InvalidCombination Feature="Sides" Option="TwoSidedLongEdge"/>
</rodp:InvalidCombinations>
<rodp:InvalidCombinations>
  <rodp:InvalidCombination Feature="InputBins" Option="BypassTray"/>
  <rodp:InvalidCombination Feature="Sides" Option="TwoSidedShortEdge"/>
</rodp:InvalidCombinations>
<rodp:InvalidCombinations>
  <rodp:InvalidCombination Feature="InputBins" Option="BypassTray"/>
  <rodp:InvalidCombination Feature="Staple" Option="TopLeft"/>
</rodp:InvalidCombinations>
<rodp:InvalidCombinations>
  <rodp:InvalidCombination Feature="InputBins" Option="BypassTray"/>
  <rodp:InvalidCombination Feature="Staple" Option="TopRight"/>
</rodp:InvalidCombinations>
<rodp:InvalidCombinations>
  <rodp:InvalidCombination Feature="InputBins" Option="BypassTray"/>
  <rodp:InvalidCombination Feature="Staple" Option="Top2"/>
</rodp:InvalidCombinations>
<rodp:InvalidCombinations>
  <rodp:InvalidCombination Feature="InputBins" Option="BypassTray"/>
  <rodp:InvalidCombination Feature="Staple" Option="Left2"/>
</rodp:InvalidCombinations>
<rodp:InvalidCombinations>
  <rodp:InvalidCombination Feature="InputBins" Option="BypassTray"/>
  <rodp:InvalidCombination Feature="Staple" Option="Right2"/>
</rodp:InvalidCombinations>
<rodp:InvalidCombinations>
  <rodp:InvalidCombination Feature="InputBins" Option="BypassTray"/>
  <rodp:InvalidCombination Feature="Staple" Option="TopLeftSlant"/>
</rodp:InvalidCombinations>
<rodp:InvalidCombinations>
  <rodp:InvalidCombination Feature="InputBins" Option="BypassTray"/>
  <rodp:InvalidCombination Feature="Staple" Option="TopRightSlant"/>
</rodp:InvalidCombinations>
<rodp:InvalidCombinations>
  <rodp:InvalidCombination Feature="InputBins" Option="BypassTray"/>
  <rodp:InvalidCombination Feature="Staple" Option="Booklet"/>
</rodp:InvalidCombinations>
<rodp:InvalidCombinations>
  <rodp:InvalidCombination Feature="InputBins" Option="BypassTray"/>
  <rodp:InvalidCombination Feature="HolePunch" Option="Left2"/>
</rodp:InvalidCombinations>
<rodp:InvalidCombinations>
  <rodp:InvalidCombination Feature="InputBins" Option="BypassTray"/>
  <rodp:InvalidCombination Feature="HolePunch" Option="Top2"/>
</rodp:InvalidCombinations>
<rodp:InvalidCombinations>
```

```xml
  <rodp:InvalidCombination Feature="InputBins" Option="BypassTray"/>
  <rodp:InvalidCombination Feature="HolePunch" Option="Right2"/>
</rodp:InvalidCombinations>
<rodp:InvalidCombinations>
  <rodp:InvalidCombination Feature="InputBins" Option="BypassTray"/>
  <rodp:InvalidCombination Feature="HolePunch" Option="Left3"/>
</rodp:InvalidCombinations>
<rodp:InvalidCombinations>
  <rodp:InvalidCombination Feature="InputBins" Option="BypassTray"/>
  <rodp:InvalidCombination Feature="HolePunch" Option="Top3"/>
</rodp:InvalidCombinations>
<rodp:InvalidCombinations>
  <rodp:InvalidCombination Feature="InputBins" Option="BypassTray"/>
  <rodp:InvalidCombination Feature="HolePunch" Option="Right3"/>
</rodp:InvalidCombinations>
<rodp:InvalidCombinations>
  <rodp:InvalidCombination Feature="InputBins" Option="BypassTray"/>
  <rodp:InvalidCombination Feature="HolePunch" Option="Left4"/>
</rodp:InvalidCombinations>
<rodp:InvalidCombinations>
  <rodp:InvalidCombination Feature="InputBins" Option="BypassTray"/>
  <rodp:InvalidCombination Feature="HolePunch" Option="Top4"/>
</rodp:InvalidCombinations>
<rodp:InvalidCombinations>
  <rodp:InvalidCombination Feature="InputBins" Option="BypassTray"/>
  <rodp:InvalidCombination Feature="HolePunch" Option="Right4"/>
</rodp:InvalidCombinations>
<rodp:InvalidCombinations>
  <rodp:InvalidCombination Feature="SlipSheet" Option="ON"/>
  <rodp:InvalidCombination Feature="InputBins" Option="AUTO"/>
</rodp:InvalidCombinations>
<rodp:InvalidCombinations>
  <rodp:InvalidCombination Feature="SlipSheet" Option="ON"/>
  <rodp:InvalidCombination Feature="InputBins" Option="Tray1"/>
</rodp:InvalidCombinations>
<rodp:InvalidCombinations>
  <rodp:InvalidCombination Feature="SlipSheet" Option="ON"/>
  <rodp:InvalidCombination Feature="InputBins" Option="Tray2"/>
</rodp:InvalidCombinations>
<rodp:InvalidCombinations>
  <rodp:InvalidCombination Feature="SlipSheet" Option="ON"/>
  <rodp:InvalidCombination Feature="InputBins" Option="Tray3"/>
</rodp:InvalidCombinations>
<rodp:InvalidCombinations>
  <rodp:InvalidCombination Feature="SlipSheet" Option="ON"/>
  <rodp:InvalidCombination Feature="InputBins" Option="Tray4"/>
</rodp:InvalidCombinations>
<rodp:InvalidCombinations>
```

```xml
  <rodp:InvalidCombination Feature="SlipSheet" Option="ON"/>
  <rodp:InvalidCombination Feature="InputBins" Option="LARGECAPACITY"/>
</rodp:InvalidCombinations>
<rodp:InvalidCombinations>
  <rodp:InvalidCombination Feature="SlipSheet" Option="ON"/>
  <rodp:InvalidCombination Feature="HolePunch" Option="Top2"/>
</rodp:InvalidCombinations>
<rodp:InvalidCombinations>
  <rodp:InvalidCombination Feature="SlipSheet" Option="ON"/>
  <rodp:InvalidCombination Feature="HolePunch" Option="Top3"/>
</rodp:InvalidCombinations>
<rodp:InvalidCombinations>
  <rodp:InvalidCombination Feature="SlipSheet" Option="ON"/>
  <rodp:InvalidCombination Feature="HolePunch" Option="Top4"/>
</rodp:InvalidCombinations>
<rodp:InvalidCombinations>
  <rodp:InvalidCombination Feature="SlipSheet" Option="ON"/>
  <rodp:InvalidCombination Feature="HolePunch" Option="Right2"/>
</rodp:InvalidCombinations>
<rodp:InvalidCombinations>
  <rodp:InvalidCombination Feature="SlipSheet" Option="ON"/>
  <rodp:InvalidCombination Feature="HolePunch" Option="Right3"/>
</rodp:InvalidCombinations>
<rodp:InvalidCombinations>
  <rodp:InvalidCombination Feature="SlipSheet" Option="ON"/>
  <rodp:InvalidCombination Feature="HolePunch" Option="Right4"/>
</rodp:InvalidCombinations>
<rodp:InvalidCombinations>
  <rodp:InvalidCombination Feature="SlipSheet" Option="ON"/>
  <rodp:InvalidCombination Feature="HolePunch" Option="Left2"/>
</rodp:InvalidCombinations>
<rodp:InvalidCombinations>
  <rodp:InvalidCombination Feature="SlipSheet" Option="ON"/>
  <rodp:InvalidCombination Feature="HolePunch" Option="Left3"/>
</rodp:InvalidCombinations>
<rodp:InvalidCombinations>
  <rodp:InvalidCombination Feature="SlipSheet" Option="ON"/>
  <rodp:InvalidCombination Feature="HolePunch" Option="Left4"/>
</rodp:InvalidCombinations>
<rodp:InvalidCombinations>
  <rodp:InvalidCombination Feature="SlipSheet" Option="ON"/>
  <rodp:InvalidCombination Feature="Staple" Option="TopLeft"/>
</rodp:InvalidCombinations>
<rodp:InvalidCombinations>
  <rodp:InvalidCombination Feature="SlipSheet" Option="ON"/>
  <rodp:InvalidCombination Feature="Staple" Option="TopLeftSlant"/>
</rodp:InvalidCombinations>
<rodp:InvalidCombinations>
```

```xml
<rodp:InvalidCombination Feature="SlipSheet" Option="ON"/>
<rodp:InvalidCombination Feature="Staple" Option="TopRight"/>
</rodp:InvalidCombinations>
<rodp:InvalidCombinations>
<rodp:InvalidCombination Feature="SlipSheet" Option="ON"/>
<rodp:InvalidCombination Feature="Staple" Option="TopRightSlant"/>
</rodp:InvalidCombinations>
<rodp:InvalidCombinations>
<rodp:InvalidCombination Feature="SlipSheet" Option="ON"/>
<rodp:InvalidCombination Feature="Staple" Option="Top2"/>
</rodp:InvalidCombinations>
<rodp:InvalidCombinations>
<rodp:InvalidCombination Feature="SlipSheet" Option="ON"/>
<rodp:InvalidCombination Feature="Staple" Option="Left2"/>
</rodp:InvalidCombinations>
<rodp:InvalidCombinations>
<rodp:InvalidCombination Feature="SlipSheet" Option="ON"/>
<rodp:InvalidCombination Feature="Staple" Option="Right2"/>
</rodp:InvalidCombinations>
<rodp:InvalidCombinations>
<rodp:InvalidCombination Feature="SlipSheet" Option="ON"/>
<rodp:InvalidCombination Feature="Staple" Option="Booklet"/>
</rodp:InvalidCombinations>
<rodp:InvalidCombinations>
<rodp:InvalidCombination Feature="SlipSheet" Option="ON"/>
<rodp:InvalidCombination Feature="MediaType" Option="STANDARD"/>
</rodp:InvalidCombinations>
<rodp:InvalidCombinations>
<rodp:InvalidCombination Feature="SlipSheet" Option="ON"/>
<rodp:InvalidCombination Feature="MediaType" Option="Thick"/>
</rodp:InvalidCombinations>
<rodp:InvalidCombinations>
<rodp:InvalidCombination Feature="SlipSheet" Option="ON"/>
<rodp:InvalidCombination Feature="MediaType" Option="Recycled"/>
</rodp:InvalidCombinations>
<rodp:InvalidCombinations>
<rodp:InvalidCombination Feature="SlipSheet" Option="ON"/>
<rodp:InvalidCombination Feature="MediaType" Option="Special"/>
</rodp:InvalidCombinations>
<rodp:InvalidCombinations>
<rodp:InvalidCombination Feature="SlipSheet" Option="ON"/>
<rodp:InvalidCombination Feature="MediaType" Option="Letterhead"/>
</rodp:InvalidCombinations>
<rodp:InvalidCombinations>
<rodp:InvalidCombination Feature="SlipSheet" Option="ON"/>
<rodp:InvalidCombination Feature="MediaType" Option="Preprinted"/>
</rodp:InvalidCombinations>
<rodp:InvalidCombinations>
```

```xml
  <rodp:InvalidCombination Feature="SlipSheet" Option="ON"/>
  <rodp:InvalidCombination Feature="MediaType" Option="Labels"/>
</rodp:InvalidCombinations>
<rodp:InvalidCombinations>
  <rodp:InvalidCombination Feature="SlipSheet" Option="ON"/>
  <rodp:InvalidCombination Feature="MediaType" Option="Color"/>
</rodp:InvalidCombinations>
<rodp:InvalidCombinations>
  <rodp:InvalidCombination Feature="SlipSheet" Option="ON"/>
  <rodp:InvalidCombination Feature="MediaType" Option="Plain_Duplex_Backside"/>
</rodp:InvalidCombinations>
<rodp:InvalidCombinations>
  <rodp:InvalidCombination Feature="SlipSheet" Option="ON"/>
  <rodp:InvalidCombination Feature="MediaType" Option="Thick_Duplex_Backside"/>
</rodp:InvalidCombinations>
<rodp:InvalidCombinations>
  <rodp:InvalidCombination Feature="SlipSheet" Option="ON"/>
  <rodp:InvalidCombination Feature="Sides" Option="TwoSidedLongEdge"/>
</rodp:InvalidCombinations>
<rodp:InvalidCombinations>
  <rodp:InvalidCombination Feature="SlipSheet" Option="ON"/>
  <rodp:InvalidCombination Feature="Sides" Option="TwoSidedShortEdge"/>
</rodp:InvalidCombinations>
<rodp:InvalidCombinations>
  <rodp:InvalidCombination Feature="Staple" Option="TopLeft"/>
  <rodp:InvalidCombination Feature="HolePunch" Option="Right2"/>
</rodp:InvalidCombinations>
<rodp:InvalidCombinations>
  <rodp:InvalidCombination Feature="Staple" Option="TopLeft"/>
  <rodp:InvalidCombination Feature="HolePunch" Option="Right3"/>
</rodp:InvalidCombinations>
<rodp:InvalidCombinations>
  <rodp:InvalidCombination Feature="Staple" Option="TopLeft"/>
  <rodp:InvalidCombination Feature="HolePunch" Option="Right4"/>
</rodp:InvalidCombinations>
<rodp:InvalidCombinations>
  <rodp:InvalidCombination Feature="Staple" Option="TopLeftSlant"/>
  <rodp:InvalidCombination Feature="HolePunch" Option="Right2"/>
</rodp:InvalidCombinations>
<rodp:InvalidCombinations>
  <rodp:InvalidCombination Feature="Staple" Option="TopLeftSlant"/>
  <rodp:InvalidCombination Feature="HolePunch" Option="Right3"/>
</rodp:InvalidCombinations>
<rodp:InvalidCombinations>
  <rodp:InvalidCombination Feature="Staple" Option="TopLeftSlant"/>
  <rodp:InvalidCombination Feature="HolePunch" Option="Right4"/>
```

```xml
</rodp:InvalidCombinations>
<rodp:InvalidCombinations>
  <rodp:InvalidCombination Feature="Staple" Option="TopRight"/>
  <rodp:InvalidCombination Feature="HolePunch" Option="Left2"/>
</rodp:InvalidCombinations>
<rodp:InvalidCombinations>
  <rodp:InvalidCombination Feature="Staple" Option="TopRight"/>
  <rodp:InvalidCombination Feature="HolePunch" Option="Left3"/>
</rodp:InvalidCombinations>
<rodp:InvalidCombinations>
  <rodp:InvalidCombination Feature="Staple" Option="TopRight"/>
  <rodp:InvalidCombination Feature="HolePunch" Option="Left4"/>
</rodp:InvalidCombinations>
<rodp:InvalidCombinations>
  <rodp:InvalidCombination Feature="Staple" Option="TopRightSlant"/>
  <rodp:InvalidCombination Feature="HolePunch" Option="Left2"/>
</rodp:InvalidCombinations>
<rodp:InvalidCombinations>
  <rodp:InvalidCombination Feature="Staple" Option="TopRightSlant"/>
  <rodp:InvalidCombination Feature="HolePunch" Option="Left3"/>
</rodp:InvalidCombinations>
<rodp:InvalidCombinations>
  <rodp:InvalidCombination Feature="Staple" Option="TopRightSlant"/>
  <rodp:InvalidCombination Feature="HolePunch" Option="Left4"/>
</rodp:InvalidCombinations>
<rodp:InvalidCombinations>
  <rodp:InvalidCombination Feature="Staple" Option="Top2"/>
  <rodp:InvalidCombination Feature="HolePunch" Option="Left2"/>
</rodp:InvalidCombinations>
<rodp:InvalidCombinations>
  <rodp:InvalidCombination Feature="Staple" Option="Top2"/>
  <rodp:InvalidCombination Feature="HolePunch" Option="Right2"/>
</rodp:InvalidCombinations>
<rodp:InvalidCombinations>
  <rodp:InvalidCombination Feature="Staple" Option="Top2"/>
  <rodp:InvalidCombination Feature="HolePunch" Option="Left3"/>
</rodp:InvalidCombinations>
<rodp:InvalidCombinations>
  <rodp:InvalidCombination Feature="Staple" Option="Top2"/>
  <rodp:InvalidCombination Feature="HolePunch" Option="Right3"/>
</rodp:InvalidCombinations>
<rodp:InvalidCombinations>
  <rodp:InvalidCombination Feature="Staple" Option="Top2"/>
  <rodp:InvalidCombination Feature="HolePunch" Option="Left4"/>
</rodp:InvalidCombinations>
<rodp:InvalidCombinations>
  <rodp:InvalidCombination Feature="Staple" Option="Top2"/>
  <rodp:InvalidCombination Feature="HolePunch" Option="Right4"/>
```

```xml
</rodp:InvalidCombinations>
<rodp:InvalidCombinations>
  <rodp:InvalidCombination Feature="Staple" Option="Left2"/>
  <rodp:InvalidCombination Feature="HolePunch" Option="Top2"/>
</rodp:InvalidCombinations>
<rodp:InvalidCombinations>
  <rodp:InvalidCombination Feature="Staple" Option="Left2"/>
  <rodp:InvalidCombination Feature="HolePunch" Option="Right2"/>
</rodp:InvalidCombinations>
<rodp:InvalidCombinations>
  <rodp:InvalidCombination Feature="Staple" Option="Left2"/>
  <rodp:InvalidCombination Feature="HolePunch" Option="Top3"/>
</rodp:InvalidCombinations>
<rodp:InvalidCombinations>
  <rodp:InvalidCombination Feature="Staple" Option="Left2"/>
  <rodp:InvalidCombination Feature="HolePunch" Option="Right3"/>
</rodp:InvalidCombinations>
<rodp:InvalidCombinations>
  <rodp:InvalidCombination Feature="Staple" Option="Left2"/>
  <rodp:InvalidCombination Feature="HolePunch" Option="Top4"/>
</rodp:InvalidCombinations>
<rodp:InvalidCombinations>
  <rodp:InvalidCombination Feature="Staple" Option="Left2"/>
  <rodp:InvalidCombination Feature="HolePunch" Option="Right4"/>
</rodp:InvalidCombinations>
<rodp:InvalidCombinations>
  <rodp:InvalidCombination Feature="Staple" Option="Right2"/>
  <rodp:InvalidCombination Feature="HolePunch" Option="Left2"/>
</rodp:InvalidCombinations>
<rodp:InvalidCombinations>
  <rodp:InvalidCombination Feature="Staple" Option="Right2"/>
  <rodp:InvalidCombination Feature="HolePunch" Option="Top2"/>
</rodp:InvalidCombinations>
<rodp:InvalidCombinations>
  <rodp:InvalidCombination Feature="Staple" Option="Right2"/>
  <rodp:InvalidCombination Feature="HolePunch" Option="Left3"/>
</rodp:InvalidCombinations>
<rodp:InvalidCombinations>
  <rodp:InvalidCombination Feature="Staple" Option="Right2"/>
  <rodp:InvalidCombination Feature="HolePunch" Option="Top3"/>
</rodp:InvalidCombinations>
<rodp:InvalidCombinations>
  <rodp:InvalidCombination Feature="Staple" Option="Right2"/>
  <rodp:InvalidCombination Feature="HolePunch" Option="Left4"/>
</rodp:InvalidCombinations>
<rodp:InvalidCombinations>
  <rodp:InvalidCombination Feature="Staple" Option="Right2"/>
  <rodp:InvalidCombination Feature="HolePunch" Option="Top4"/>
```

```
</rodp:InvalidCombinations>
<rodp:InvalidCombinations>
  <rodp:InvalidCombination Feature="Staple" Option="Booklet"/>
  <rodp:InvalidCombination Feature="HolePunch" Option="Left2"/>
</rodp:InvalidCombinations>
<rodp:InvalidCombinations>
  <rodp:InvalidCombination Feature="Staple" Option="Booklet"/>
  <rodp:InvalidCombination Feature="HolePunch" Option="Top2"/>
</rodp:InvalidCombinations>
<rodp:InvalidCombinations>
  <rodp:InvalidCombination Feature="Staple" Option="Booklet"/>
  <rodp:InvalidCombination Feature="HolePunch" Option="Right2"/>
</rodp:InvalidCombinations>
<rodp:InvalidCombinations>
  <rodp:InvalidCombination Feature="Staple" Option="Booklet"/>
  <rodp:InvalidCombination Feature="HolePunch" Option="Left3"/>
</rodp:InvalidCombinations>
<rodp:InvalidCombinations>
  <rodp:InvalidCombination Feature="Staple" Option="Booklet"/>
  <rodp:InvalidCombination Feature="HolePunch" Option="Top3"/>
</rodp:InvalidCombinations>
<rodp:InvalidCombinations>
  <rodp:InvalidCombination Feature="Staple" Option="Booklet"/>
  <rodp:InvalidCombination Feature="HolePunch" Option="Right3"/>
</rodp:InvalidCombinations>
<rodp:InvalidCombinations>
  <rodp:InvalidCombination Feature="Staple" Option="Booklet"/>
  <rodp:InvalidCombination Feature="HolePunch" Option="Left4"/>
</rodp:InvalidCombinations>
<rodp:InvalidCombinations>
  <rodp:InvalidCombination Feature="Staple" Option="Booklet"/>
  <rodp:InvalidCombination Feature="HolePunch" Option="Top4"/>
</rodp:InvalidCombinations>
<rodp:InvalidCombinations>
  <rodp:InvalidCombination Feature="Staple" Option="Booklet"/>
  <rodp:InvalidCombination Feature="HolePunch" Option="Right4"/>
</rodp:InvalidCombinations>
<rodp:InvalidCombinations>
  <rodp:InvalidCombination Feature="Staple" Option="TopLeft"/>
  <rodp:InvalidCombination Feature="MediaType" Option="TRANSPARENCY"/>
</rodp:InvalidCombinations>
<rodp:InvalidCombinations>
  <rodp:InvalidCombination Feature="Staple" Option="TopLeft"/>
  <rodp:InvalidCombination Feature="MediaType" Option="Thick"/>
</rodp:InvalidCombinations>
<rodp:InvalidCombinations>
  <rodp:InvalidCombination Feature="Staple" Option="TopLeft"/>
  <rodp:InvalidCombination Feature="MediaType" Option="Labels"/>
```

```xml
</rodp:InvalidCombinations>
<rodp:InvalidCombinations>
  <rodp:InvalidCombination Feature="Staple" Option="TopLeft"/>
  <rodp:InvalidCombination Feature="MediaType" Option="Plain_Duplex_Backside"/>
</rodp:InvalidCombinations>
<rodp:InvalidCombinations>
  <rodp:InvalidCombination Feature="Staple" Option="TopLeft"/>
  <rodp:InvalidCombination Feature="MediaType" Option="Thick_Duplex_Backside"/>
</rodp:InvalidCombinations>
<rodp:InvalidCombinations>
  <rodp:InvalidCombination Feature="Staple" Option="TopLeftSlant"/>
  <rodp:InvalidCombination Feature="MediaType" Option="TRANSPARENCY"/>
</rodp:InvalidCombinations>
<rodp:InvalidCombinations>
  <rodp:InvalidCombination Feature="Staple" Option="TopLeftSlant"/>
  <rodp:InvalidCombination Feature="MediaType" Option="Thick"/>
</rodp:InvalidCombinations>
<rodp:InvalidCombinations>
  <rodp:InvalidCombination Feature="Staple" Option="TopLeftSlant"/>
  <rodp:InvalidCombination Feature="MediaType" Option="Labels"/>
</rodp:InvalidCombinations>
<rodp:InvalidCombinations>
  <rodp:InvalidCombination Feature="Staple" Option="TopLeftSlant"/>
  <rodp:InvalidCombination Feature="MediaType" Option="Plain_Duplex_Backside"/>
</rodp:InvalidCombinations>
<rodp:InvalidCombinations>
  <rodp:InvalidCombination Feature="Staple" Option="TopLeftSlant"/>
  <rodp:InvalidCombination Feature="MediaType" Option="Thick_Duplex_Backside"/>
</rodp:InvalidCombinations>
<rodp:InvalidCombinations>
  <rodp:InvalidCombination Feature="Staple" Option="TopRight"/>
  <rodp:InvalidCombination Feature="MediaType" Option="TRANSPARENCY"/>
</rodp:InvalidCombinations>
<rodp:InvalidCombinations>
  <rodp:InvalidCombination Feature="Staple" Option="TopRight"/>
  <rodp:InvalidCombination Feature="MediaType" Option="Thick"/>
</rodp:InvalidCombinations>
<rodp:InvalidCombinations>
  <rodp:InvalidCombination Feature="Staple" Option="TopRight"/>
  <rodp:InvalidCombination Feature="MediaType" Option="Labels"/>
</rodp:InvalidCombinations>
<rodp:InvalidCombinations>
  <rodp:InvalidCombination Feature="Staple" Option="TopRight"/>
```

```xml
    <rodp:InvalidCombination Feature="MediaType" Option="Plain_Duplex_Backside"/>
  </rodp:InvalidCombinations>
  <rodp:InvalidCombinations>
    <rodp:InvalidCombination Feature="Staple" Option="TopRight"/>
    <rodp:InvalidCombination Feature="MediaType" Option="Thick_Duplex_Backside"/>
  </rodp:InvalidCombinations>
  <rodp:InvalidCombinations>
    <rodp:InvalidCombination Feature="Staple" Option="TopRightSlant"/>
    <rodp:InvalidCombination Feature="MediaType" Option="TRANSPARENCY"/>
  </rodp:InvalidCombinations>
  <rodp:InvalidCombinations>
    <rodp:InvalidCombination Feature="Staple" Option="TopRightSlant"/>
    <rodp:InvalidCombination Feature="MediaType" Option="Thick"/>
  </rodp:InvalidCombinations>
  <rodp:InvalidCombinations>
    <rodp:InvalidCombination Feature="Staple" Option="TopRightSlant"/>
    <rodp:InvalidCombination Feature="MediaType" Option="Labels"/>
  </rodp:InvalidCombinations>
  <rodp:InvalidCombinations>
    <rodp:InvalidCombination Feature="Staple" Option="TopRightSlant"/>
    <rodp:InvalidCombination Feature="MediaType" Option="Plain_Duplex_Backside"/>
  </rodp:InvalidCombinations>
  <rodp:InvalidCombinations>
    <rodp:InvalidCombination Feature="Staple" Option="TopRightSlant"/>
    <rodp:InvalidCombination Feature="MediaType" Option="Thick_Duplex_Backside"/>
  </rodp:InvalidCombinations>
  <rodp:InvalidCombinations>
    <rodp:InvalidCombination Feature="Staple" Option="Top2"/>
    <rodp:InvalidCombination Feature="MediaType" Option="TRANSPARENCY"/>
  </rodp:InvalidCombinations>
  <rodp:InvalidCombinations>
    <rodp:InvalidCombination Feature="Staple" Option="Top2"/>
    <rodp:InvalidCombination Feature="MediaType" Option="Thick"/>
  </rodp:InvalidCombinations>
  <rodp:InvalidCombinations>
    <rodp:InvalidCombination Feature="Staple" Option="Top2"/>
    <rodp:InvalidCombination Feature="MediaType" Option="Labels"/>
  </rodp:InvalidCombinations>
  <rodp:InvalidCombinations>
    <rodp:InvalidCombination Feature="Staple" Option="Top2"/>
    <rodp:InvalidCombination Feature="MediaType" Option="Plain_Duplex_Backside"/>
  </rodp:InvalidCombinations>
  <rodp:InvalidCombinations>
```

```xml
    <rodp:InvalidCombination Feature="Staple" Option="Top2"/>
    <rodp:InvalidCombination Feature="MediaType" Option="Thick_Duplex_Backside"/>
  </rodp:InvalidCombinations>
  <rodp:InvalidCombinations>
    <rodp:InvalidCombination Feature="Staple" Option="Left2"/>
    <rodp:InvalidCombination Feature="MediaType" Option="TRANSPARENCY"/>
  </rodp:InvalidCombinations>
  <rodp:InvalidCombinations>
    <rodp:InvalidCombination Feature="Staple" Option="Left2"/>
    <rodp:InvalidCombination Feature="MediaType" Option="Thick"/>
  </rodp:InvalidCombinations>
  <rodp:InvalidCombinations>
    <rodp:InvalidCombination Feature="Staple" Option="Left2"/>
    <rodp:InvalidCombination Feature="MediaType" Option="Labels"/>
  </rodp:InvalidCombinations>
  <rodp:InvalidCombinations>
    <rodp:InvalidCombination Feature="Staple" Option="Left2"/>
    <rodp:InvalidCombination Feature="MediaType" Option="Plain_Duplex_Backside"/>
  </rodp:InvalidCombinations>
  <rodp:InvalidCombinations>
    <rodp:InvalidCombination Feature="Staple" Option="Left2"/>
    <rodp:InvalidCombination Feature="MediaType" Option="Thick_Duplex_Backside"/>
  </rodp:InvalidCombinations>
  <rodp:InvalidCombinations>
    <rodp:InvalidCombination Feature="Staple" Option="Right2"/>
    <rodp:InvalidCombination Feature="MediaType" Option="TRANSPARENCY"/>
  </rodp:InvalidCombinations>
  <rodp:InvalidCombinations>
    <rodp:InvalidCombination Feature="Staple" Option="Right2"/>
    <rodp:InvalidCombination Feature="MediaType" Option="Thick"/>
  </rodp:InvalidCombinations>
  <rodp:InvalidCombinations>
    <rodp:InvalidCombination Feature="Staple" Option="Right2"/>
    <rodp:InvalidCombination Feature="MediaType" Option="Labels"/>
  </rodp:InvalidCombinations>
  <rodp:InvalidCombinations>
    <rodp:InvalidCombination Feature="Staple" Option="Right2"/>
    <rodp:InvalidCombination Feature="MediaType" Option="Plain_Duplex_Backside"/>
  </rodp:InvalidCombinations>
  <rodp:InvalidCombinations>
    <rodp:InvalidCombination Feature="Staple" Option="Right2"/>
    <rodp:InvalidCombination Feature="MediaType" Option="Thick_Duplex_Backside"/>
  </rodp:InvalidCombinations>
```

```
<rodp:InvalidCombinations>
    <rodp:InvalidCombination Feature="Staple" Option="Booklet"/>
    <rodp:InvalidCombination Feature="MediaType" Option="TRANSPARENCY"/>
</rodp:InvalidCombinations>
<rodp:InvalidCombinations>
    <rodp:InvalidCombination Feature="Staple" Option="Booklet"/>
    <rodp:InvalidCombination Feature="MediaType" Option="Thick"/>
</rodp:InvalidCombinations>
<rodp:InvalidCombinations>
    <rodp:InvalidCombination Feature="Staple" Option="Booklet"/>
    <rodp:InvalidCombination Feature="MediaType" Option="Labels"/>
</rodp:InvalidCombinations>
<rodp:InvalidCombinations>
    <rodp:InvalidCombination Feature="Staple" Option="Booklet"/>
    <rodp:InvalidCombination Feature="MediaType" Option="Plain_Duplex_Backside"/>
</rodp:InvalidCombinations>
<rodp:InvalidCombinations>
    <rodp:InvalidCombination Feature="Staple" Option="Booklet"/>
    <rodp:InvalidCombination Feature="MediaType" Option="Thick_Duplex_Backside"/>
</rodp:InvalidCombinations>
<rodp:InvalidCombinations>
    <rodp:InvalidCombination Feature="MediaSizeName" Option="na_invoice_5.5x8.5in"/>
    <rodp:InvalidCombination Feature="Staple" Option="TopLeft"/>
</rodp:InvalidCombinations>
<rodp:InvalidCombinations>
    <rodp:InvalidCombination Feature="MediaSizeName" Option="na_invoice_5.5x8.5in"/>
    <rodp:InvalidCombination Feature="Staple" Option="TopLeftSlant"/>
</rodp:InvalidCombinations>
<rodp:InvalidCombinations>
    <rodp:InvalidCombination Feature="MediaSizeName" Option="na_invoice_5.5x8.5in"/>
    <rodp:InvalidCombination Feature="Staple" Option="TopRight"/>
</rodp:InvalidCombinations>
<rodp:InvalidCombinations>
    <rodp:InvalidCombination Feature="MediaSizeName" Option="na_invoice_5.5x8.5in"/>
    <rodp:InvalidCombination Feature="Staple" Option="TopRightSlant"/>
</rodp:InvalidCombinations>
<rodp:InvalidCombinations>
    <rodp:InvalidCombination Feature="MediaSizeName" Option="na_invoice_5.5x8.5in"/>
    <rodp:InvalidCombination Feature="Staple" Option="Top2"/>
</rodp:InvalidCombinations>
<rodp:InvalidCombinations>
```

```xml
        <rodp:InvalidCombination Feature="MediaSizeName" Option="na_invoice_5.5x8.5in"/>
        <rodp:InvalidCombination Feature="Staple" Option="Left2"/>
      </rodp:InvalidCombinations>
      <rodp:InvalidCombinations>
        <rodp:InvalidCombination Feature="MediaSizeName" Option="na_invoice_5.5x8.5in"/>
        <rodp:InvalidCombination Feature="Staple" Option="Right2"/>
      </rodp:InvalidCombinations>
      <rodp:InvalidCombinations>
        <rodp:InvalidCombination Feature="MediaSizeName" Option="na_invoice_5.5x8.5in"/>
        <rodp:InvalidCombination Feature="Staple" Option="Booklet"/>
      </rodp:InvalidCombinations>
      <rodp:InvalidCombinations>
        <rodp:InvalidCombination Feature="MediaSizeName" Option="iso_a5_148x210mm"/>
        <rodp:InvalidCombination Feature="Staple" Option="TopLeft"/>
      </rodp:InvalidCombinations>
      <rodp:InvalidCombinations>
        <rodp:InvalidCombination Feature="MediaSizeName" Option="iso_a5_148x210mm"/>
        <rodp:InvalidCombination Feature="Staple" Option="TopLeftSlant"/>
      </rodp:InvalidCombinations>
      <rodp:InvalidCombinations>
        <rodp:InvalidCombination Feature="MediaSizeName" Option="iso_a5_148x210mm"/>
        <rodp:InvalidCombination Feature="Staple" Option="TopRight"/>
      </rodp:InvalidCombinations>
      <rodp:InvalidCombinations>
        <rodp:InvalidCombination Feature="MediaSizeName" Option="iso_a5_148x210mm"/>
        <rodp:InvalidCombination Feature="Staple" Option="TopRightSlant"/>
      </rodp:InvalidCombinations>
      <rodp:InvalidCombinations>
        <rodp:InvalidCombination Feature="MediaSizeName" Option="iso_a5_148x210mm"/>
        <rodp:InvalidCombination Feature="Staple" Option="Top2"/>
      </rodp:InvalidCombinations>
      <rodp:InvalidCombinations>
        <rodp:InvalidCombination Feature="MediaSizeName" Option="iso_a5_148x210mm"/>
        <rodp:InvalidCombination Feature="Staple" Option="Left2"/>
      </rodp:InvalidCombinations>
      <rodp:InvalidCombinations>
        <rodp:InvalidCombination Feature="MediaSizeName" Option="iso_a5_148x210mm"/>
        <rodp:InvalidCombination Feature="Staple" Option="Right2"/>
```

```xml
</rodp:InvalidCombinations>
<rodp:InvalidCombinations>
    <rodp:InvalidCombination Feature="MediaSizeName" Option="iso_a5_148x210mm"/>
    <rodp:InvalidCombination Feature="Staple" Option="Booklet"/>
</rodp:InvalidCombinations>
<rodp:InvalidCombinations>
    <rodp:InvalidCombination Feature="MediaSizeName" Option="iso_a6_105x148mm"/>
    <rodp:InvalidCombination Feature="Staple" Option="TopLeft"/>
</rodp:InvalidCombinations>
<rodp:InvalidCombinations>
    <rodp:InvalidCombination Feature="MediaSizeName" Option="iso_a6_105x148mm"/>
    <rodp:InvalidCombination Feature="Staple" Option="TopLeftSlant"/>
</rodp:InvalidCombinations>
<rodp:InvalidCombinations>
    <rodp:InvalidCombination Feature="MediaSizeName" Option="iso_a6_105x148mm"/>
    <rodp:InvalidCombination Feature="Staple" Option="TopRight"/>
</rodp:InvalidCombinations>
<rodp:InvalidCombinations>
    <rodp:InvalidCombination Feature="MediaSizeName" Option="iso_a6_105x148mm"/>
    <rodp:InvalidCombination Feature="Staple" Option="TopRightSlant"/>
</rodp:InvalidCombinations>
<rodp:InvalidCombinations>
    <rodp:InvalidCombination Feature="MediaSizeName" Option="iso_a6_105x148mm"/>
    <rodp:InvalidCombination Feature="Staple" Option="Top2"/>
</rodp:InvalidCombinations>
<rodp:InvalidCombinations>
    <rodp:InvalidCombination Feature="MediaSizeName" Option="iso_a6_105x148mm"/>
    <rodp:InvalidCombination Feature="Staple" Option="Left2"/>
</rodp:InvalidCombinations>
<rodp:InvalidCombinations>
    <rodp:InvalidCombination Feature="MediaSizeName" Option="iso_a6_105x148mm"/>
    <rodp:InvalidCombination Feature="Staple" Option="Right2"/>
</rodp:InvalidCombinations>
<rodp:InvalidCombinations>
    <rodp:InvalidCombination Feature="MediaSizeName" Option="iso_a6_105x148mm"/>
    <rodp:InvalidCombination Feature="Staple" Option="Booklet"/>
</rodp:InvalidCombinations>
<rodp:InvalidCombinations>
```

```xml
<rodp:InvalidCombination Feature="MediaSizeName" Option="na_number-10_4.125x9.5in"/>
    <rodp:InvalidCombination Feature="Staple" Option="TopLeft"/>
</rodp:InvalidCombinations>
<rodp:InvalidCombinations>
    <rodp:InvalidCombination Feature="MediaSizeName" Option="na_number-10_4.125x9.5in"/>
    <rodp:InvalidCombination Feature="Staple" Option="TopLeftSlant"/>
</rodp:InvalidCombinations>
<rodp:InvalidCombinations>
    <rodp:InvalidCombination Feature="MediaSizeName" Option="na_number-10_4.125x9.5in"/>
    <rodp:InvalidCombination Feature="Staple" Option="TopRight"/>
</rodp:InvalidCombinations>
<rodp:InvalidCombinations>
    <rodp:InvalidCombination Feature="MediaSizeName" Option="na_number-10_4.125x9.5in"/>
    <rodp:InvalidCombination Feature="Staple" Option="TopRightSlant"/>
</rodp:InvalidCombinations>
<rodp:InvalidCombinations>
    <rodp:InvalidCombination Feature="MediaSizeName" Option="na_number-10_4.125x9.5in"/>
    <rodp:InvalidCombination Feature="Staple" Option="Top2"/>
</rodp:InvalidCombinations>
<rodp:InvalidCombinations>
    <rodp:InvalidCombination Feature="MediaSizeName" Option="na_number-10_4.125x9.5in"/>
    <rodp:InvalidCombination Feature="Staple" Option="Left2"/>
</rodp:InvalidCombinations>
<rodp:InvalidCombinations>
    <rodp:InvalidCombination Feature="MediaSizeName" Option="na_number-10_4.125x9.5in"/>
    <rodp:InvalidCombination Feature="Staple" Option="Right2"/>
</rodp:InvalidCombinations>
<rodp:InvalidCombinations>
    <rodp:InvalidCombination Feature="MediaSizeName" Option="na_number-10_4.125x9.5in"/>
    <rodp:InvalidCombination Feature="Staple" Option="Booklet"/>
</rodp:InvalidCombinations>
<rodp:InvalidCombinations>
    <rodp:InvalidCombination Feature="MediaSizeName" Option="iso_dl_110x220mm"/>
    <rodp:InvalidCombination Feature="Staple" Option="TopLeft"/>
</rodp:InvalidCombinations>
<rodp:InvalidCombinations>
    <rodp:InvalidCombination Feature="MediaSizeName" Option="iso_dl_110x220mm"/>
    <rodp:InvalidCombination Feature="Staple" Option="TopLeftSlant"/>
```

```xml
</rodp:InvalidCombinations>
<rodp:InvalidCombinations>
    <rodp:InvalidCombination Feature="MediaSizeName" Option="iso_dl_110x220mm"/>
    <rodp:InvalidCombination Feature="Staple" Option="TopRight"/>
</rodp:InvalidCombinations>
<rodp:InvalidCombinations>
    <rodp:InvalidCombination Feature="MediaSizeName" Option="iso_dl_110x220mm"/>
    <rodp:InvalidCombination Feature="Staple" Option="TopRightSlant"/>
</rodp:InvalidCombinations>
<rodp:InvalidCombinations>
    <rodp:InvalidCombination Feature="MediaSizeName" Option="iso_dl_110x220mm"/>
    <rodp:InvalidCombination Feature="Staple" Option="Top2"/>
</rodp:InvalidCombinations>
<rodp:InvalidCombinations>
    <rodp:InvalidCombination Feature="MediaSizeName" Option="iso_dl_110x220mm"/>
    <rodp:InvalidCombination Feature="Staple" Option="Left2"/>
</rodp:InvalidCombinations>
<rodp:InvalidCombinations>
    <rodp:InvalidCombination Feature="MediaSizeName" Option="iso_dl_110x220mm"/>
    <rodp:InvalidCombination Feature="Staple" Option="Right2"/>
</rodp:InvalidCombinations>
<rodp:InvalidCombinations>
    <rodp:InvalidCombination Feature="MediaSizeName" Option="iso_dl_110x220mm"/>
    <rodp:InvalidCombination Feature="Staple" Option="Booklet"/>
</rodp:InvalidCombinations>
<rodp:InvalidCombinations>
    <rodp:InvalidCombination Feature="MediaSizeName" Option="na_monarch_3.875x7.5in"/>
    <rodp:InvalidCombination Feature="Staple" Option="TopLeft"/>
</rodp:InvalidCombinations>
<rodp:InvalidCombinations>
    <rodp:InvalidCombination Feature="MediaSizeName" Option="na_monarch_3.875x7.5in"/>
    <rodp:InvalidCombination Feature="Staple" Option="TopLeftSlant"/>
</rodp:InvalidCombinations>
<rodp:InvalidCombinations>
    <rodp:InvalidCombination Feature="MediaSizeName" Option="na_monarch_3.875x7.5in"/>
    <rodp:InvalidCombination Feature="Staple" Option="TopRight"/>
</rodp:InvalidCombinations>
<rodp:InvalidCombinations>
```

```xml
        <rodp:InvalidCombination Feature="MediaSizeName"
Option="na_monarch_3.875x7.5in"/>
            <rodp:InvalidCombination Feature="Staple" Option="TopRightSlant"/>
        </rodp:InvalidCombinations>
        <rodp:InvalidCombinations>
            <rodp:InvalidCombination Feature="MediaSizeName"
Option="na_monarch_3.875x7.5in"/>
            <rodp:InvalidCombination Feature="Staple" Option="Top2"/>
        </rodp:InvalidCombinations>
        <rodp:InvalidCombinations>
            <rodp:InvalidCombination Feature="MediaSizeName"
Option="na_monarch_3.875x7.5in"/>
            <rodp:InvalidCombination Feature="Staple" Option="Left2"/>
        </rodp:InvalidCombinations>
        <rodp:InvalidCombinations>
            <rodp:InvalidCombination Feature="MediaSizeName"
Option="na_monarch_3.875x7.5in"/>
            <rodp:InvalidCombination Feature="Staple" Option="Right2"/>
        </rodp:InvalidCombinations>
        <rodp:InvalidCombinations>
            <rodp:InvalidCombination Feature="MediaSizeName"
Option="na_monarch_3.875x7.5in"/>
            <rodp:InvalidCombination Feature="Staple" Option="Booklet"/>
        </rodp:InvalidCombinations>
        <rodp:InvalidCombinations>
            <rodp:InvalidCombination Feature="MediaSizeName"
Option="iso_c5_162x229mm"/>
            <rodp:InvalidCombination Feature="Staple" Option="TopLeft"/>
        </rodp:InvalidCombinations>
        <rodp:InvalidCombinations>
            <rodp:InvalidCombination Feature="MediaSizeName"
Option="iso_c5_162x229mm"/>
            <rodp:InvalidCombination Feature="Staple" Option="TopLeftSlant"/>
        </rodp:InvalidCombinations>
        <rodp:InvalidCombinations>
            <rodp:InvalidCombination Feature="MediaSizeName"
Option="iso_c5_162x229mm"/>
            <rodp:InvalidCombination Feature="Staple" Option="TopRight"/>
        </rodp:InvalidCombinations>
        <rodp:InvalidCombinations>
            <rodp:InvalidCombination Feature="MediaSizeName"
Option="iso_c5_162x229mm"/>
            <rodp:InvalidCombination Feature="Staple" Option="TopRightSlant"/>
        </rodp:InvalidCombinations>
        <rodp:InvalidCombinations>
            <rodp:InvalidCombination Feature="MediaSizeName"
Option="iso_c5_162x229mm"/>
            <rodp:InvalidCombination Feature="Staple" Option="Top2"/>
```

```
</rodp:InvalidCombinations>
<rodp:InvalidCombinations>
  <rodp:InvalidCombination Feature="MediaSizeName" Option="iso_c5_162x229mm"/>
  <rodp:InvalidCombination Feature="Staple" Option="Left2"/>
</rodp:InvalidCombinations>
<rodp:InvalidCombinations>
  <rodp:InvalidCombination Feature="MediaSizeName" Option="iso_c5_162x229mm"/>
  <rodp:InvalidCombination Feature="Staple" Option="Right2"/>
</rodp:InvalidCombinations>
<rodp:InvalidCombinations>
  <rodp:InvalidCombination Feature="MediaSizeName" Option="iso_c5_162x229mm"/>
  <rodp:InvalidCombination Feature="Staple" Option="Booklet"/>
</rodp:InvalidCombinations>
<rodp:InvalidCombinations>
  <rodp:InvalidCombination Feature="MediaSizeName" Option="iso_c6_114x162mm"/>
  <rodp:InvalidCombination Feature="Staple" Option="TopLeft"/>
</rodp:InvalidCombinations>
<rodp:InvalidCombinations>
  <rodp:InvalidCombination Feature="MediaSizeName" Option="iso_c6_114x162mm"/>
  <rodp:InvalidCombination Feature="Staple" Option="TopLeftSlant"/>
</rodp:InvalidCombinations>
<rodp:InvalidCombinations>
  <rodp:InvalidCombination Feature="MediaSizeName" Option="iso_c6_114x162mm"/>
  <rodp:InvalidCombination Feature="Staple" Option="TopRight"/>
</rodp:InvalidCombinations>
<rodp:InvalidCombinations>
  <rodp:InvalidCombination Feature="MediaSizeName" Option="iso_c6_114x162mm"/>
  <rodp:InvalidCombination Feature="Staple" Option="TopRightSlant"/>
</rodp:InvalidCombinations>
<rodp:InvalidCombinations>
  <rodp:InvalidCombination Feature="MediaSizeName" Option="iso_c6_114x162mm"/>
  <rodp:InvalidCombination Feature="Staple" Option="Top2"/>
</rodp:InvalidCombinations>
<rodp:InvalidCombinations>
  <rodp:InvalidCombination Feature="MediaSizeName" Option="iso_c6_114x162mm"/>
  <rodp:InvalidCombination Feature="Staple" Option="Left2"/>
</rodp:InvalidCombinations>
<rodp:InvalidCombinations>
```

```xml
        <rodp:InvalidCombination Feature="MediaSizeName" Option="iso_c6_114x162mm"/>
        <rodp:InvalidCombination Feature="Staple" Option="Right2"/>
    </rodp:InvalidCombinations>
    <rodp:InvalidCombinations>
        <rodp:InvalidCombination Feature="MediaSizeName" Option="iso_c6_114x162mm"/>
        <rodp:InvalidCombination Feature="Staple" Option="Booklet"/>
    </rodp:InvalidCombinations>
    <rodp:InvalidCombinations>
        <rodp:InvalidCombination Feature="MediaSizeName" Option="na_arch-b_12x18in"/>
        <rodp:InvalidCombination Feature="Staple" Option="TopLeft"/>
    </rodp:InvalidCombinations>
    <rodp:InvalidCombinations>
        <rodp:InvalidCombination Feature="MediaSizeName" Option="na_arch-b_12x18in"/>
        <rodp:InvalidCombination Feature="Staple" Option="TopLeftSlant"/>
    </rodp:InvalidCombinations>
    <rodp:InvalidCombinations>
        <rodp:InvalidCombination Feature="MediaSizeName" Option="na_arch-b_12x18in"/>
        <rodp:InvalidCombination Feature="Staple" Option="TopRight"/>
    </rodp:InvalidCombinations>
    <rodp:InvalidCombinations>
        <rodp:InvalidCombination Feature="MediaSizeName" Option="na_arch-b_12x18in"/>
        <rodp:InvalidCombination Feature="Staple" Option="TopRightSlant"/>
    </rodp:InvalidCombinations>
    <rodp:InvalidCombinations>
        <rodp:InvalidCombination Feature="MediaSizeName" Option="na_arch-b_12x18in"/>
        <rodp:InvalidCombination Feature="Staple" Option="Top2"/>
    </rodp:InvalidCombinations>
    <rodp:InvalidCombinations>
        <rodp:InvalidCombination Feature="MediaSizeName" Option="na_arch-b_12x18in"/>
        <rodp:InvalidCombination Feature="Staple" Option="Left2"/>
    </rodp:InvalidCombinations>
    <rodp:InvalidCombinations>
        <rodp:InvalidCombination Feature="MediaSizeName" Option="na_arch-b_12x18in"/>
        <rodp:InvalidCombination Feature="Staple" Option="Right2"/>
    </rodp:InvalidCombinations>
    <rodp:InvalidCombinations>
        <rodp:InvalidCombination Feature="MediaSizeName" Option="na_arch-b_12x18in"/>
        <rodp:InvalidCombination Feature="Staple" Option="Booklet"/>
```

```xml
</rodp:InvalidCombinations>
<rodp:InvalidCombinations>
  <rodp:InvalidCombination Feature="MediaSizeName" Option="custom_papersize"/>
  <rodp:InvalidCombination Feature="Staple" Option="TopLeft"/>
</rodp:InvalidCombinations>
<rodp:InvalidCombinations>
  <rodp:InvalidCombination Feature="MediaSizeName" Option="custom_papersize"/>
  <rodp:InvalidCombination Feature="Staple" Option="TopLeftSlant"/>
</rodp:InvalidCombinations>
<rodp:InvalidCombinations>
  <rodp:InvalidCombination Feature="MediaSizeName" Option="custom_papersize"/>
  <rodp:InvalidCombination Feature="Staple" Option="TopRight"/>
</rodp:InvalidCombinations>
<rodp:InvalidCombinations>
  <rodp:InvalidCombination Feature="MediaSizeName" Option="custom_papersize"/>
  <rodp:InvalidCombination Feature="Staple" Option="TopRightSlant"/>
</rodp:InvalidCombinations>
<rodp:InvalidCombinations>
  <rodp:InvalidCombination Feature="MediaSizeName" Option="custom_papersize"/>
  <rodp:InvalidCombination Feature="Staple" Option="Top2"/>
</rodp:InvalidCombinations>
<rodp:InvalidCombinations>
  <rodp:InvalidCombination Feature="MediaSizeName" Option="custom_papersize"/>
  <rodp:InvalidCombination Feature="Staple" Option="Left2"/>
</rodp:InvalidCombinations>
<rodp:InvalidCombinations>
  <rodp:InvalidCombination Feature="MediaSizeName" Option="custom_papersize"/>
  <rodp:InvalidCombination Feature="Staple" Option="Right2"/>
</rodp:InvalidCombinations>
<rodp:InvalidCombinations>
  <rodp:InvalidCombination Feature="MediaSizeName" Option="custom_papersize"/>
  <rodp:InvalidCombination Feature="Staple" Option="Booklet"/>
</rodp:InvalidCombinations>
<rodp:InvalidCombinations>
  <rodp:InvalidCombination Feature="HolePunch" Option="Top2"/>
  <rodp:InvalidCombination Feature="MediaType" Option="TRANSPARENCY"/>
</rodp:InvalidCombinations>
<rodp:InvalidCombinations>
  <rodp:InvalidCombination Feature="HolePunch" Option="Top2"/>
  <rodp:InvalidCombination Feature="MediaType" Option="Thick"/>
</rodp:InvalidCombinations>
<rodp:InvalidCombinations>
  <rodp:InvalidCombination Feature="HolePunch" Option="Top2"/>
  <rodp:InvalidCombination Feature="MediaType" Option="Labels"/>
</rodp:InvalidCombinations>
<rodp:InvalidCombinations>
  <rodp:InvalidCombination Feature="HolePunch" Option="Top2"/>
```

```xml
      <rodp:InvalidCombination Feature="MediaType" Option="Plain_Duplex_Backside"/>
    </rodp:InvalidCombinations>
    <rodp:InvalidCombinations>
      <rodp:InvalidCombination Feature="HolePunch" Option="Top2"/>
      <rodp:InvalidCombination Feature="MediaType" Option="Thick_Duplex_Backside"/>
    </rodp:InvalidCombinations>
    <rodp:InvalidCombinations>
      <rodp:InvalidCombination Feature="HolePunch" Option="Top3"/>
      <rodp:InvalidCombination Feature="MediaType" Option="TRANSPARENCY"/>
    </rodp:InvalidCombinations>
    <rodp:InvalidCombinations>
      <rodp:InvalidCombination Feature="HolePunch" Option="Top3"/>
      <rodp:InvalidCombination Feature="MediaType" Option="Thick"/>
    </rodp:InvalidCombinations>
    <rodp:InvalidCombinations>
      <rodp:InvalidCombination Feature="HolePunch" Option="Top3"/>
      <rodp:InvalidCombination Feature="MediaType" Option="Labels"/>
    </rodp:InvalidCombinations>
    <rodp:InvalidCombinations>
      <rodp:InvalidCombination Feature="HolePunch" Option="Top3"/>
      <rodp:InvalidCombination Feature="MediaType" Option="Plain_Duplex_Backside"/>
    </rodp:InvalidCombinations>
    <rodp:InvalidCombinations>
      <rodp:InvalidCombination Feature="HolePunch" Option="Top3"/>
      <rodp:InvalidCombination Feature="MediaType" Option="Thick_Duplex_Backside"/>
    </rodp:InvalidCombinations>
    <rodp:InvalidCombinations>
      <rodp:InvalidCombination Feature="HolePunch" Option="Top4"/>
      <rodp:InvalidCombination Feature="MediaType" Option="TRANSPARENCY"/>
    </rodp:InvalidCombinations>
    <rodp:InvalidCombinations>
      <rodp:InvalidCombination Feature="HolePunch" Option="Top4"/>
      <rodp:InvalidCombination Feature="MediaType" Option="Thick"/>
    </rodp:InvalidCombinations>
    <rodp:InvalidCombinations>
      <rodp:InvalidCombination Feature="HolePunch" Option="Top4"/>
      <rodp:InvalidCombination Feature="MediaType" Option="Labels"/>
    </rodp:InvalidCombinations>
    <rodp:InvalidCombinations>
      <rodp:InvalidCombination Feature="HolePunch" Option="Top4"/>
      <rodp:InvalidCombination Feature="MediaType" Option="Plain_Duplex_Backside"/>
    </rodp:InvalidCombinations>
    <rodp:InvalidCombinations>
```

```xml
      <rodp:InvalidCombination Feature="HolePunch" Option="Top4"/>
      <rodp:InvalidCombination Feature="MediaType" Option="Thick_Duplex_Backside"/>
    </rodp:InvalidCombinations>
    <rodp:InvalidCombinations>
      <rodp:InvalidCombination Feature="HolePunch" Option="Right2"/>
      <rodp:InvalidCombination Feature="MediaType" Option="TRANSPARENCY"/>
    </rodp:InvalidCombinations>
    <rodp:InvalidCombinations>
      <rodp:InvalidCombination Feature="HolePunch" Option="Right2"/>
      <rodp:InvalidCombination Feature="MediaType" Option="Thick"/>
    </rodp:InvalidCombinations>
    <rodp:InvalidCombinations>
      <rodp:InvalidCombination Feature="HolePunch" Option="Right2"/>
      <rodp:InvalidCombination Feature="MediaType" Option="Labels"/>
    </rodp:InvalidCombinations>
    <rodp:InvalidCombinations>
      <rodp:InvalidCombination Feature="HolePunch" Option="Right2"/>
      <rodp:InvalidCombination Feature="MediaType" Option="Plain_Duplex_Backside"/>
    </rodp:InvalidCombinations>
    <rodp:InvalidCombinations>
      <rodp:InvalidCombination Feature="HolePunch" Option="Right2"/>
      <rodp:InvalidCombination Feature="MediaType" Option="Thick_Duplex_Backside"/>
    </rodp:InvalidCombinations>
    <rodp:InvalidCombinations>
      <rodp:InvalidCombination Feature="HolePunch" Option="Right3"/>
      <rodp:InvalidCombination Feature="MediaType" Option="TRANSPARENCY"/>
    </rodp:InvalidCombinations>
    <rodp:InvalidCombinations>
      <rodp:InvalidCombination Feature="HolePunch" Option="Right3"/>
      <rodp:InvalidCombination Feature="MediaType" Option="Thick"/>
    </rodp:InvalidCombinations>
    <rodp:InvalidCombinations>
      <rodp:InvalidCombination Feature="HolePunch" Option="Right3"/>
      <rodp:InvalidCombination Feature="MediaType" Option="Labels"/>
    </rodp:InvalidCombinations>
    <rodp:InvalidCombinations>
      <rodp:InvalidCombination Feature="HolePunch" Option="Right3"/>
      <rodp:InvalidCombination Feature="MediaType" Option="Plain_Duplex_Backside"/>
    </rodp:InvalidCombinations>
    <rodp:InvalidCombinations>
      <rodp:InvalidCombination Feature="HolePunch" Option="Right3"/>
      <rodp:InvalidCombination Feature="MediaType" Option="Thick_Duplex_Backside"/>
    </rodp:InvalidCombinations>
```

```
<rodp:InvalidCombinations>
  <rodp:InvalidCombination Feature="HolePunch" Option="Right4"/>
  <rodp:InvalidCombination Feature="MediaType" Option="TRANSPARENCY"/>
</rodp:InvalidCombinations>
<rodp:InvalidCombinations>
  <rodp:InvalidCombination Feature="HolePunch" Option="Right4"/>
  <rodp:InvalidCombination Feature="MediaType" Option="Thick"/>
</rodp:InvalidCombinations>
<rodp:InvalidCombinations>
  <rodp:InvalidCombination Feature="HolePunch" Option="Right4"/>
  <rodp:InvalidCombination Feature="MediaType" Option="Labels"/>
</rodp:InvalidCombinations>
<rodp:InvalidCombinations>
  <rodp:InvalidCombination Feature="HolePunch" Option="Right4"/>
  <rodp:InvalidCombination Feature="MediaType" Option="Plain_Duplex_Backside"/>
</rodp:InvalidCombinations>
<rodp:InvalidCombinations>
  <rodp:InvalidCombination Feature="HolePunch" Option="Right4"/>
  <rodp:InvalidCombination Feature="MediaType" Option="Thick_Duplex_Backside"/>
</rodp:InvalidCombinations>
<rodp:InvalidCombinations>
  <rodp:InvalidCombination Feature="HolePunch" Option="Left2"/>
  <rodp:InvalidCombination Feature="MediaType" Option="TRANSPARENCY"/>
</rodp:InvalidCombinations>
<rodp:InvalidCombinations>
  <rodp:InvalidCombination Feature="HolePunch" Option="Left2"/>
  <rodp:InvalidCombination Feature="MediaType" Option="Thick"/>
</rodp:InvalidCombinations>
<rodp:InvalidCombinations>
  <rodp:InvalidCombination Feature="HolePunch" Option="Left2"/>
  <rodp:InvalidCombination Feature="MediaType" Option="Labels"/>
</rodp:InvalidCombinations>
<rodp:InvalidCombinations>
  <rodp:InvalidCombination Feature="HolePunch" Option="Left2"/>
  <rodp:InvalidCombination Feature="MediaType" Option="Plain_Duplex_Backside"/>
</rodp:InvalidCombinations>
<rodp:InvalidCombinations>
  <rodp:InvalidCombination Feature="HolePunch" Option="Left2"/>
  <rodp:InvalidCombination Feature="MediaType" Option="Thick_Duplex_Backside"/>
</rodp:InvalidCombinations>
<rodp:InvalidCombinations>
  <rodp:InvalidCombination Feature="HolePunch" Option="Left3"/>
  <rodp:InvalidCombination Feature="MediaType" Option="TRANSPARENCY"/>
</rodp:InvalidCombinations>
```

```xml
<rodp:InvalidCombinations>
  <rodp:InvalidCombination Feature="HolePunch" Option="Left3"/>
  <rodp:InvalidCombination Feature="MediaType" Option="Thick"/>
</rodp:InvalidCombinations>
<rodp:InvalidCombinations>
  <rodp:InvalidCombination Feature="HolePunch" Option="Left3"/>
  <rodp:InvalidCombination Feature="MediaType" Option="Labels"/>
</rodp:InvalidCombinations>
<rodp:InvalidCombinations>
  <rodp:InvalidCombination Feature="HolePunch" Option="Left3"/>
  <rodp:InvalidCombination Feature="MediaType" Option="Plain_Duplex_Backside"/>
</rodp:InvalidCombinations>
<rodp:InvalidCombinations>
  <rodp:InvalidCombination Feature="HolePunch" Option="Left3"/>
  <rodp:InvalidCombination Feature="MediaType" Option="Thick_Duplex_Backside"/>
</rodp:InvalidCombinations>
<rodp:InvalidCombinations>
  <rodp:InvalidCombination Feature="HolePunch" Option="Left4"/>
  <rodp:InvalidCombination Feature="MediaType" Option="TRANSPARENCY"/>
</rodp:InvalidCombinations>
<rodp:InvalidCombinations>
  <rodp:InvalidCombination Feature="HolePunch" Option="Left4"/>
  <rodp:InvalidCombination Feature="MediaType" Option="Thick"/>
</rodp:InvalidCombinations>
<rodp:InvalidCombinations>
  <rodp:InvalidCombination Feature="HolePunch" Option="Left4"/>
  <rodp:InvalidCombination Feature="MediaType" Option="Labels"/>
</rodp:InvalidCombinations>
<rodp:InvalidCombinations>
  <rodp:InvalidCombination Feature="HolePunch" Option="Left4"/>
  <rodp:InvalidCombination Feature="MediaType" Option="Plain_Duplex_Backside"/>
</rodp:InvalidCombinations>
<rodp:InvalidCombinations>
  <rodp:InvalidCombination Feature="HolePunch" Option="Left4"/>
  <rodp:InvalidCombination Feature="MediaType" Option="Thick_Duplex_Backside"/>
</rodp:InvalidCombinations>
<rodp:InvalidCombinations>
  <rodp:InvalidCombination Feature="MediaSizeName" Option="na_invoice_5.5x8.5in"/>
  <rodp:InvalidCombination Feature="HolePunch" Option="Left2"/>
</rodp:InvalidCombinations>
<rodp:InvalidCombinations>
  <rodp:InvalidCombination Feature="MediaSizeName" Option="na_invoice_5.5x8.5in"/>
```

```xml
        <rodp:InvalidCombination Feature="HolePunch" Option="Top2"/>
    </rodp:InvalidCombinations>
    <rodp:InvalidCombinations>
        <rodp:InvalidCombination Feature="MediaSizeName" Option="na_invoice_5.5x8.5in"/>
        <rodp:InvalidCombination Feature="HolePunch" Option="Right2"/>
    </rodp:InvalidCombinations>
    <rodp:InvalidCombinations>
        <rodp:InvalidCombination Feature="MediaSizeName" Option="na_invoice_5.5x8.5in"/>
        <rodp:InvalidCombination Feature="HolePunch" Option="Left3"/>
    </rodp:InvalidCombinations>
    <rodp:InvalidCombinations>
        <rodp:InvalidCombination Feature="MediaSizeName" Option="na_invoice_5.5x8.5in"/>
        <rodp:InvalidCombination Feature="HolePunch" Option="Top3"/>
    </rodp:InvalidCombinations>
    <rodp:InvalidCombinations>
        <rodp:InvalidCombination Feature="MediaSizeName" Option="na_invoice_5.5x8.5in"/>
        <rodp:InvalidCombination Feature="HolePunch" Option="Right3"/>
    </rodp:InvalidCombinations>
    <rodp:InvalidCombinations>
        <rodp:InvalidCombination Feature="MediaSizeName" Option="na_invoice_5.5x8.5in"/>
        <rodp:InvalidCombination Feature="HolePunch" Option="Left4"/>
    </rodp:InvalidCombinations>
    <rodp:InvalidCombinations>
        <rodp:InvalidCombination Feature="MediaSizeName" Option="na_invoice_5.5x8.5in"/>
        <rodp:InvalidCombination Feature="HolePunch" Option="Top4"/>
    </rodp:InvalidCombinations>
    <rodp:InvalidCombinations>
        <rodp:InvalidCombination Feature="MediaSizeName" Option="na_invoice_5.5x8.5in"/>
        <rodp:InvalidCombination Feature="HolePunch" Option="Right4"/>
    </rodp:InvalidCombinations>
    <rodp:InvalidCombinations>
        <rodp:InvalidCombination Feature="MediaSizeName" Option="iso_a6_105x148mm"/>
        <rodp:InvalidCombination Feature="HolePunch" Option="Left2"/>
    </rodp:InvalidCombinations>
    <rodp:InvalidCombinations>
        <rodp:InvalidCombination Feature="MediaSizeName" Option="iso_a6_105x148mm"/>
        <rodp:InvalidCombination Feature="HolePunch" Option="Top2"/>
    </rodp:InvalidCombinations>
    <rodp:InvalidCombinations>
```

```xml
        <rodp:InvalidCombination Feature="MediaSizeName" Option="iso_a6_105x148mm"/>
        <rodp:InvalidCombination Feature="HolePunch" Option="Right2"/>
    </rodp:InvalidCombinations>
    <rodp:InvalidCombinations>
        <rodp:InvalidCombination Feature="MediaSizeName" Option="iso_a6_105x148mm"/>
        <rodp:InvalidCombination Feature="HolePunch" Option="Left3"/>
    </rodp:InvalidCombinations>
    <rodp:InvalidCombinations>
        <rodp:InvalidCombination Feature="MediaSizeName" Option="iso_a6_105x148mm"/>
        <rodp:InvalidCombination Feature="HolePunch" Option="Top3"/>
    </rodp:InvalidCombinations>
    <rodp:InvalidCombinations>
        <rodp:InvalidCombination Feature="MediaSizeName" Option="iso_a6_105x148mm"/>
        <rodp:InvalidCombination Feature="HolePunch" Option="Right3"/>
    </rodp:InvalidCombinations>
    <rodp:InvalidCombinations>
        <rodp:InvalidCombination Feature="MediaSizeName" Option="iso_a6_105x148mm"/>
        <rodp:InvalidCombination Feature="HolePunch" Option="Left4"/>
    </rodp:InvalidCombinations>
    <rodp:InvalidCombinations>
        <rodp:InvalidCombination Feature="MediaSizeName" Option="iso_a6_105x148mm"/>
        <rodp:InvalidCombination Feature="HolePunch" Option="Top4"/>
    </rodp:InvalidCombinations>
    <rodp:InvalidCombinations>
        <rodp:InvalidCombination Feature="MediaSizeName" Option="iso_a6_105x148mm"/>
        <rodp:InvalidCombination Feature="HolePunch" Option="Right4"/>
    </rodp:InvalidCombinations>
    <rodp:InvalidCombinations>
        <rodp:InvalidCombination Feature="MediaSizeName" Option="na_number-10_4.125x9.5in"/>
        <rodp:InvalidCombination Feature="HolePunch" Option="Left2"/>
    </rodp:InvalidCombinations>
    <rodp:InvalidCombinations>
        <rodp:InvalidCombination Feature="MediaSizeName" Option="na_number-10_4.125x9.5in"/>
        <rodp:InvalidCombination Feature="HolePunch" Option="Top2"/>
    </rodp:InvalidCombinations>
    <rodp:InvalidCombinations>
        <rodp:InvalidCombination Feature="MediaSizeName" Option="na_number-10_4.125x9.5in"/>
        <rodp:InvalidCombination Feature="HolePunch" Option="Right2"/>
```

```xml
</rodp:InvalidCombinations>
<rodp:InvalidCombinations>
    <rodp:InvalidCombination Feature="MediaSizeName" Option="na_number-10_4.125x9.5in"/>
    <rodp:InvalidCombination Feature="HolePunch" Option="Left3"/>
</rodp:InvalidCombinations>
<rodp:InvalidCombinations>
    <rodp:InvalidCombination Feature="MediaSizeName" Option="na_number-10_4.125x9.5in"/>
    <rodp:InvalidCombination Feature="HolePunch" Option="Top3"/>
</rodp:InvalidCombinations>
<rodp:InvalidCombinations>
    <rodp:InvalidCombination Feature="MediaSizeName" Option="na_number-10_4.125x9.5in"/>
    <rodp:InvalidCombination Feature="HolePunch" Option="Right3"/>
</rodp:InvalidCombinations>
<rodp:InvalidCombinations>
    <rodp:InvalidCombination Feature="MediaSizeName" Option="na_number-10_4.125x9.5in"/>
    <rodp:InvalidCombination Feature="HolePunch" Option="Left4"/>
</rodp:InvalidCombinations>
<rodp:InvalidCombinations>
    <rodp:InvalidCombination Feature="MediaSizeName" Option="na_number-10_4.125x9.5in"/>
    <rodp:InvalidCombination Feature="HolePunch" Option="Top4"/>
</rodp:InvalidCombinations>
<rodp:InvalidCombinations>
    <rodp:InvalidCombination Feature="MediaSizeName" Option="na_number-10_4.125x9.5in"/>
    <rodp:InvalidCombination Feature="HolePunch" Option="Right4"/>
</rodp:InvalidCombinations>
<rodp:InvalidCombinations>
    <rodp:InvalidCombination Feature="MediaSizeName" Option="iso_dl_110x220mm"/>
    <rodp:InvalidCombination Feature="HolePunch" Option="Left2"/>
</rodp:InvalidCombinations>
<rodp:InvalidCombinations>
    <rodp:InvalidCombination Feature="MediaSizeName" Option="iso_dl_110x220mm"/>
    <rodp:InvalidCombination Feature="HolePunch" Option="Top2"/>
</rodp:InvalidCombinations>
<rodp:InvalidCombinations>
    <rodp:InvalidCombination Feature="MediaSizeName" Option="iso_dl_110x220mm"/>
    <rodp:InvalidCombination Feature="HolePunch" Option="Right2"/>
</rodp:InvalidCombinations>
<rodp:InvalidCombinations>
```

```xml
        <rodp:InvalidCombination Feature="MediaSizeName"
Option="iso_dl_110x220mm"/>
            <rodp:InvalidCombination Feature="HolePunch" Option="Left3"/>
        </rodp:InvalidCombinations>
        <rodp:InvalidCombinations>
            <rodp:InvalidCombination Feature="MediaSizeName"
Option="iso_dl_110x220mm"/>
            <rodp:InvalidCombination Feature="HolePunch" Option="Top3"/>
        </rodp:InvalidCombinations>
        <rodp:InvalidCombinations>
            <rodp:InvalidCombination Feature="MediaSizeName"
Option="iso_dl_110x220mm"/>
            <rodp:InvalidCombination Feature="HolePunch" Option="Right3"/>
        </rodp:InvalidCombinations>
        <rodp:InvalidCombinations>
            <rodp:InvalidCombination Feature="MediaSizeName"
Option="iso_dl_110x220mm"/>
            <rodp:InvalidCombination Feature="HolePunch" Option="Left4"/>
        </rodp:InvalidCombinations>
        <rodp:InvalidCombinations>
            <rodp:InvalidCombination Feature="MediaSizeName"
Option="iso_dl_110x220mm"/>
            <rodp:InvalidCombination Feature="HolePunch" Option="Top4"/>
        </rodp:InvalidCombinations>
        <rodp:InvalidCombinations>
            <rodp:InvalidCombination Feature="MediaSizeName"
Option="iso_dl_110x220mm"/>
            <rodp:InvalidCombination Feature="HolePunch" Option="Right4"/>
        </rodp:InvalidCombinations>
        <rodp:InvalidCombinations>
            <rodp:InvalidCombination Feature="MediaSizeName"
Option="na_monarch_3.875x7.5in"/>
            <rodp:InvalidCombination Feature="HolePunch" Option="Left2"/>
        </rodp:InvalidCombinations>
        <rodp:InvalidCombinations>
            <rodp:InvalidCombination Feature="MediaSizeName"
Option="na_monarch_3.875x7.5in"/>
            <rodp:InvalidCombination Feature="HolePunch" Option="Top2"/>
        </rodp:InvalidCombinations>
        <rodp:InvalidCombinations>
            <rodp:InvalidCombination Feature="MediaSizeName"
Option="na_monarch_3.875x7.5in"/>
            <rodp:InvalidCombination Feature="HolePunch" Option="Right2"/>
        </rodp:InvalidCombinations>
        <rodp:InvalidCombinations>
            <rodp:InvalidCombination Feature="MediaSizeName"
Option="na_monarch_3.875x7.5in"/>
            <rodp:InvalidCombination Feature="HolePunch" Option="Left3"/>
```

```xml
</rodp:InvalidCombinations>
<rodp:InvalidCombinations>
    <rodp:InvalidCombination Feature="MediaSizeName" Option="na_monarch_3.875x7.5in"/>
    <rodp:InvalidCombination Feature="HolePunch" Option="Top3"/>
</rodp:InvalidCombinations>
<rodp:InvalidCombinations>
    <rodp:InvalidCombination Feature="MediaSizeName" Option="na_monarch_3.875x7.5in"/>
    <rodp:InvalidCombination Feature="HolePunch" Option="Right3"/>
</rodp:InvalidCombinations>
<rodp:InvalidCombinations>
    <rodp:InvalidCombination Feature="MediaSizeName" Option="na_monarch_3.875x7.5in"/>
    <rodp:InvalidCombination Feature="HolePunch" Option="Left4"/>
</rodp:InvalidCombinations>
<rodp:InvalidCombinations>
    <rodp:InvalidCombination Feature="MediaSizeName" Option="na_monarch_3.875x7.5in"/>
    <rodp:InvalidCombination Feature="HolePunch" Option="Top4"/>
</rodp:InvalidCombinations>
<rodp:InvalidCombinations>
    <rodp:InvalidCombination Feature="MediaSizeName" Option="na_monarch_3.875x7.5in"/>
    <rodp:InvalidCombination Feature="HolePunch" Option="Right4"/>
</rodp:InvalidCombinations>
<rodp:InvalidCombinations>
    <rodp:InvalidCombination Feature="MediaSizeName" Option="iso_c5_162x229mm"/>
    <rodp:InvalidCombination Feature="HolePunch" Option="Left2"/>
</rodp:InvalidCombinations>
<rodp:InvalidCombinations>
    <rodp:InvalidCombination Feature="MediaSizeName" Option="iso_c5_162x229mm"/>
    <rodp:InvalidCombination Feature="HolePunch" Option="Top2"/>
</rodp:InvalidCombinations>
<rodp:InvalidCombinations>
    <rodp:InvalidCombination Feature="MediaSizeName" Option="iso_c5_162x229mm"/>
    <rodp:InvalidCombination Feature="HolePunch" Option="Right2"/>
</rodp:InvalidCombinations>
<rodp:InvalidCombinations>
    <rodp:InvalidCombination Feature="MediaSizeName" Option="iso_c5_162x229mm"/>
    <rodp:InvalidCombination Feature="HolePunch" Option="Left3"/>
</rodp:InvalidCombinations>
<rodp:InvalidCombinations>
```

```xml
        <rodp:InvalidCombination Feature="MediaSizeName" Option="iso_c5_162x229mm"/>
        <rodp:InvalidCombination Feature="HolePunch" Option="Top3"/>
    </rodp:InvalidCombinations>
    <rodp:InvalidCombinations>
        <rodp:InvalidCombination Feature="MediaSizeName" Option="iso_c5_162x229mm"/>
        <rodp:InvalidCombination Feature="HolePunch" Option="Right3"/>
    </rodp:InvalidCombinations>
    <rodp:InvalidCombinations>
        <rodp:InvalidCombination Feature="MediaSizeName" Option="iso_c5_162x229mm"/>
        <rodp:InvalidCombination Feature="HolePunch" Option="Left4"/>
    </rodp:InvalidCombinations>
    <rodp:InvalidCombinations>
        <rodp:InvalidCombination Feature="MediaSizeName" Option="iso_c5_162x229mm"/>
        <rodp:InvalidCombination Feature="HolePunch" Option="Top4"/>
    </rodp:InvalidCombinations>
    <rodp:InvalidCombinations>
        <rodp:InvalidCombination Feature="MediaSizeName" Option="iso_c5_162x229mm"/>
        <rodp:InvalidCombination Feature="HolePunch" Option="Right4"/>
    </rodp:InvalidCombinations>
    <rodp:InvalidCombinations>
        <rodp:InvalidCombination Feature="MediaSizeName" Option="iso_c6_114x162mm"/>
        <rodp:InvalidCombination Feature="HolePunch" Option="Left2"/>
    </rodp:InvalidCombinations>
    <rodp:InvalidCombinations>
        <rodp:InvalidCombination Feature="MediaSizeName" Option="iso_c6_114x162mm"/>
        <rodp:InvalidCombination Feature="HolePunch" Option="Top2"/>
    </rodp:InvalidCombinations>
    <rodp:InvalidCombinations>
        <rodp:InvalidCombination Feature="MediaSizeName" Option="iso_c6_114x162mm"/>
        <rodp:InvalidCombination Feature="HolePunch" Option="Right2"/>
    </rodp:InvalidCombinations>
    <rodp:InvalidCombinations>
        <rodp:InvalidCombination Feature="MediaSizeName" Option="iso_c6_114x162mm"/>
        <rodp:InvalidCombination Feature="HolePunch" Option="Left3"/>
    </rodp:InvalidCombinations>
    <rodp:InvalidCombinations>
        <rodp:InvalidCombination Feature="MediaSizeName" Option="iso_c6_114x162mm"/>
        <rodp:InvalidCombination Feature="HolePunch" Option="Top3"/>
```

```xml
</rodp:InvalidCombinations>
<rodp:InvalidCombinations>
    <rodp:InvalidCombination Feature="MediaSizeName" Option="iso_c6_114x162mm"/>
    <rodp:InvalidCombination Feature="HolePunch" Option="Right3"/>
</rodp:InvalidCombinations>
<rodp:InvalidCombinations>
    <rodp:InvalidCombination Feature="MediaSizeName" Option="iso_c6_114x162mm"/>
    <rodp:InvalidCombination Feature="HolePunch" Option="Left4"/>
</rodp:InvalidCombinations>
<rodp:InvalidCombinations>
    <rodp:InvalidCombination Feature="MediaSizeName" Option="iso_c6_114x162mm"/>
    <rodp:InvalidCombination Feature="HolePunch" Option="Top4"/>
</rodp:InvalidCombinations>
<rodp:InvalidCombinations>
    <rodp:InvalidCombination Feature="MediaSizeName" Option="iso_c6_114x162mm"/>
    <rodp:InvalidCombination Feature="HolePunch" Option="Right4"/>
</rodp:InvalidCombinations>
<rodp:InvalidCombinations>
    <rodp:InvalidCombination Feature="MediaSizeName" Option="na_arch-b_12x18in"/>
    <rodp:InvalidCombination Feature="HolePunch" Option="Left2"/>
</rodp:InvalidCombinations>
<rodp:InvalidCombinations>
    <rodp:InvalidCombination Feature="MediaSizeName" Option="na_arch-b_12x18in"/>
    <rodp:InvalidCombination Feature="HolePunch" Option="Top2"/>
</rodp:InvalidCombinations>
<rodp:InvalidCombinations>
    <rodp:InvalidCombination Feature="MediaSizeName" Option="na_arch-b_12x18in"/>
    <rodp:InvalidCombination Feature="HolePunch" Option="Right2"/>
</rodp:InvalidCombinations>
<rodp:InvalidCombinations>
    <rodp:InvalidCombination Feature="MediaSizeName" Option="na_arch-b_12x18in"/>
    <rodp:InvalidCombination Feature="HolePunch" Option="Left3"/>
</rodp:InvalidCombinations>
<rodp:InvalidCombinations>
    <rodp:InvalidCombination Feature="MediaSizeName" Option="na_arch-b_12x18in"/>
    <rodp:InvalidCombination Feature="HolePunch" Option="Top3"/>
</rodp:InvalidCombinations>
<rodp:InvalidCombinations>
```

```xml
    <rodp:InvalidCombination Feature="MediaSizeName" Option="na_arch-b_12x18in"/>
    <rodp:InvalidCombination Feature="HolePunch" Option="Right3"/>
</rodp:InvalidCombinations>
<rodp:InvalidCombinations>
    <rodp:InvalidCombination Feature="MediaSizeName" Option="na_arch-b_12x18in"/>
    <rodp:InvalidCombination Feature="HolePunch" Option="Left4"/>
</rodp:InvalidCombinations>
<rodp:InvalidCombinations>
    <rodp:InvalidCombination Feature="MediaSizeName" Option="na_arch-b_12x18in"/>
    <rodp:InvalidCombination Feature="HolePunch" Option="Top4"/>
</rodp:InvalidCombinations>
<rodp:InvalidCombinations>
    <rodp:InvalidCombination Feature="MediaSizeName" Option="na_arch-b_12x18in"/>
    <rodp:InvalidCombination Feature="HolePunch" Option="Right4"/>
</rodp:InvalidCombinations>
<rodp:InvalidCombinations>
  <rodp:InvalidCombination Feature="MediaSizeName" Option="custom_papersize"/>
  <rodp:InvalidCombination Feature="HolePunch" Option="Left2"/>
</rodp:InvalidCombinations>
<rodp:InvalidCombinations>
  <rodp:InvalidCombination Feature="MediaSizeName" Option="custom_papersize"/>
  <rodp:InvalidCombination Feature="HolePunch" Option="Top2"/>
</rodp:InvalidCombinations>
<rodp:InvalidCombinations>
  <rodp:InvalidCombination Feature="MediaSizeName" Option="custom_papersize"/>
  <rodp:InvalidCombination Feature="HolePunch" Option="Right2"/>
</rodp:InvalidCombinations>
<rodp:InvalidCombinations>
  <rodp:InvalidCombination Feature="MediaSizeName" Option="custom_papersize"/>
  <rodp:InvalidCombination Feature="HolePunch" Option="Left3"/>
</rodp:InvalidCombinations>
<rodp:InvalidCombinations>
  <rodp:InvalidCombination Feature="MediaSizeName" Option="custom_papersize"/>
  <rodp:InvalidCombination Feature="HolePunch" Option="Top3"/>
</rodp:InvalidCombinations>
<rodp:InvalidCombinations>
  <rodp:InvalidCombination Feature="MediaSizeName" Option="custom_papersize"/>
  <rodp:InvalidCombination Feature="HolePunch" Option="Right3"/>
</rodp:InvalidCombinations>
<rodp:InvalidCombinations>
  <rodp:InvalidCombination Feature="MediaSizeName" Option="custom_papersize"/>
  <rodp:InvalidCombination Feature="HolePunch" Option="Left4"/>
</rodp:InvalidCombinations>
<rodp:InvalidCombinations>
```

```xml
    <rodp:InvalidCombination Feature="MediaSizeName" Option="custom_papersize"/>
    <rodp:InvalidCombination Feature="HolePunch" Option="Top4"/>
</rodp:InvalidCombinations>
<rodp:InvalidCombinations>
    <rodp:InvalidCombination Feature="MediaSizeName" Option="custom_papersize"/>
    <rodp:InvalidCombination Feature="HolePunch" Option="Right4"/>
</rodp:InvalidCombinations>
<rodp:InvalidCombinations>
    <rodp:InvalidCombination Feature="MediaSizeName" Option="na_invoice_5.5x8.5in"/>
    <rodp:InvalidCombination Feature="Sides" Option="TwoSidedLongEdge"/>
</rodp:InvalidCombinations>
<rodp:InvalidCombinations>
    <rodp:InvalidCombination Feature="MediaSizeName" Option="iso_a6_105x148mm"/>
    <rodp:InvalidCombination Feature="Sides" Option="TwoSidedLongEdge"/>
</rodp:InvalidCombinations>
<rodp:InvalidCombinations>
    <rodp:InvalidCombination Feature="MediaSizeName" Option="na_number-10_4.125x9.5in"/>
    <rodp:InvalidCombination Feature="Sides" Option="TwoSidedLongEdge"/>
</rodp:InvalidCombinations>
<rodp:InvalidCombinations>
    <rodp:InvalidCombination Feature="MediaSizeName" Option="iso_dl_110x220mm"/>
    <rodp:InvalidCombination Feature="Sides" Option="TwoSidedLongEdge"/>
</rodp:InvalidCombinations>
<rodp:InvalidCombinations>
    <rodp:InvalidCombination Feature="MediaSizeName" Option="na_monarch_3.875x7.5in"/>
    <rodp:InvalidCombination Feature="Sides" Option="TwoSidedLongEdge"/>
</rodp:InvalidCombinations>
<rodp:InvalidCombinations>
    <rodp:InvalidCombination Feature="MediaSizeName" Option="iso_c5_162x229mm"/>
    <rodp:InvalidCombination Feature="Sides" Option="TwoSidedLongEdge"/>
</rodp:InvalidCombinations>
<rodp:InvalidCombinations>
    <rodp:InvalidCombination Feature="MediaSizeName" Option="iso_c6_114x162mm"/>
    <rodp:InvalidCombination Feature="Sides" Option="TwoSidedLongEdge"/>
</rodp:InvalidCombinations>
<rodp:InvalidCombinations>
    <rodp:InvalidCombination Feature="MediaSizeName" Option="na_arch-b_12x18in"/>
    <rodp:InvalidCombination Feature="Sides" Option="TwoSidedLongEdge"/>
</rodp:InvalidCombinations>
<rodp:InvalidCombinations>
```

```xml
<rodp:InvalidCombination Feature="MediaSizeName" Option="custom_papersize"/>
    <rodp:InvalidCombination Feature="Sides" Option="TwoSidedLongEdge"/>
</rodp:InvalidCombinations>
<rodp:InvalidCombinations>
    <rodp:InvalidCombination Feature="MediaSizeName" Option="na_invoice_5.5x8.5in"/>
    <rodp:InvalidCombination Feature="Sides" Option="TwoSidedShortEdge"/>
</rodp:InvalidCombinations>
<rodp:InvalidCombinations>
    <rodp:InvalidCombination Feature="MediaSizeName" Option="iso_a6_105x148mm"/>
    <rodp:InvalidCombination Feature="Sides" Option="TwoSidedShortEdge"/>
</rodp:InvalidCombinations>
<rodp:InvalidCombinations>
    <rodp:InvalidCombination Feature="MediaSizeName" Option="na_number-10_4.125x9.5in"/>
    <rodp:InvalidCombination Feature="Sides" Option="TwoSidedShortEdge"/>
</rodp:InvalidCombinations>
<rodp:InvalidCombinations>
    <rodp:InvalidCombination Feature="MediaSizeName" Option="iso_dl_110x220mm"/>
    <rodp:InvalidCombination Feature="Sides" Option="TwoSidedShortEdge"/>
</rodp:InvalidCombinations>
<rodp:InvalidCombinations>
    <rodp:InvalidCombination Feature="MediaSizeName" Option="na_monarch_3.875x7.5in"/>
    <rodp:InvalidCombination Feature="Sides" Option="TwoSidedShortEdge"/>
</rodp:InvalidCombinations>
<rodp:InvalidCombinations>
    <rodp:InvalidCombination Feature="MediaSizeName" Option="iso_c5_162x229mm"/>
    <rodp:InvalidCombination Feature="Sides" Option="TwoSidedShortEdge"/>
</rodp:InvalidCombinations>
<rodp:InvalidCombinations>
    <rodp:InvalidCombination Feature="MediaSizeName" Option="iso_c6_114x162mm"/>
    <rodp:InvalidCombination Feature="Sides" Option="TwoSidedShortEdge"/>
</rodp:InvalidCombinations>
<rodp:InvalidCombinations>
    <rodp:InvalidCombination Feature="MediaSizeName" Option="na_arch-b_12x18in"/>
    <rodp:InvalidCombination Feature="Sides" Option="TwoSidedShortEdge"/>
</rodp:InvalidCombinations>
<rodp:InvalidCombinations>
    <rodp:InvalidCombination Feature="MediaSizeName" Option="custom_papersize"/>
    <rodp:InvalidCombination Feature="Sides" Option="TwoSidedShortEdge"/>
</rodp:InvalidCombinations>
<rodp:InvalidCombinations>
```

```xml
      <rodp:InvalidCombination Feature="Sides" Option="TwoSidedLongEdge"/>
      <rodp:InvalidCombination Feature="MediaType" Option="TRANSPARENCY"/>
    </rodp:InvalidCombinations>
    <rodp:InvalidCombinations>
      <rodp:InvalidCombination Feature="Sides" Option="TwoSidedLongEdge"/>
      <rodp:InvalidCombination Feature="MediaType" Option="Thick"/>
    </rodp:InvalidCombinations>
    <rodp:InvalidCombinations>
      <rodp:InvalidCombination Feature="Sides" Option="TwoSidedLongEdge"/>
      <rodp:InvalidCombination Feature="MediaType" Option="Labels"/>
    </rodp:InvalidCombinations>
    <rodp:InvalidCombinations>
      <rodp:InvalidCombination Feature="Sides" Option="TwoSidedLongEdge"/>
      <rodp:InvalidCombination Feature="MediaType" Option="Plain_Duplex_Backside"/>
    </rodp:InvalidCombinations>
    <rodp:InvalidCombinations>
      <rodp:InvalidCombination Feature="Sides" Option="TwoSidedLongEdge"/>
      <rodp:InvalidCombination Feature="MediaType" Option="Thick_Duplex_Backside"/>
    </rodp:InvalidCombinations>
    <rodp:InvalidCombinations>
      <rodp:InvalidCombination Feature="Sides" Option="TwoSidedShortEdge"/>
      <rodp:InvalidCombination Feature="MediaType" Option="TRANSPARENCY"/>
    </rodp:InvalidCombinations>
    <rodp:InvalidCombinations>
      <rodp:InvalidCombination Feature="Sides" Option="TwoSidedShortEdge"/>
      <rodp:InvalidCombination Feature="MediaType" Option="Thick"/>
    </rodp:InvalidCombinations>
    <rodp:InvalidCombinations>
      <rodp:InvalidCombination Feature="Sides" Option="TwoSidedShortEdge"/>
      <rodp:InvalidCombination Feature="MediaType" Option="Labels"/>
    </rodp:InvalidCombinations>
    <rodp:InvalidCombinations>
      <rodp:InvalidCombination Feature="Sides" Option="TwoSidedShortEdge"/>
      <rodp:InvalidCombination Feature="MediaType" Option="Plain_Duplex_Backside"/>
    </rodp:InvalidCombinations>
    <rodp:InvalidCombinations>
      <rodp:InvalidCombination Feature="Sides" Option="TwoSidedShortEdge"/>
      <rodp:InvalidCombination Feature="MediaType" Option="Thick_Duplex_Backside"/>
    </rodp:InvalidCombinations>
   </rodp:GlobalConstraints>
  </rodp:DeviceConstraints>
 </rodp:RicohExtensionData>
</wprt:RicohExtensionData>
</RequestedPrinterElements>
```

APPENDIX B -- EXAMPLE CORE MAPPING DATA

```
<mapfile>
 <DeviceFeature Value="RAM">
  <!--GPD Keyword-->
  <PDLKeyword Value="Memory"/>
  <rcNameID Value="PRINTER_MEMORY_DISPLAY" />
  <Featureoption Value="65536KB">
   <PDLKeyword Value="65536KB" />
  </Featureoption >
 </DeviceFeature >
 <!--No Hard Disk is defined, since no name need to map-->
 <DeviceFeature Value="Finisher">
  <PDLKeyword Value="Finisher"/>
  <rcNameID Value="RC_STR_FINISHER" />
  <FeatureOption Value="NotInstalled">
   <PDLKeyword Value="NotInstalled" />
   <rcNameID Value="RC_STR_NOTINSTALLED" />
  </FeatureOption >
  <FeatureOption Value="Finisher2000">
   <PDLKeyword Value="Finisher2000" />
   <rcNameID Value="RC_STR_2TRAY_FINISHER" />
  </FeatureOption >
  <FeatureOption Value="BookletFinisher">
   <PDLKeyword Value="BookletFinisher" />
   <rcNameID Value="RC_STR_BOOKLET_FINISHER" />
  </FeatureOption>
  <FeatureOption Value="FinisherSR790">
   <PDLKeyword Value="FinisherSR790" />
   <rcNameID Value="RC_STR_FINISHER_SR790" />
  </FeatureOption>
  <FeatureOption Value="FinisherSR3030">
   <PDLKeyword Value="FinisherSR3030" />
   <rcNameID Value="RC_STR_FINISHER_SR3030" />
  </FeatureOption>
 </DeviceFeature >
 <DeviceFeature Value="LeftTray1and2">
  <PDLKeyword Value="LeftTray1and2"/>
  <rcNameID Value="RC_STR_LEFT_TRAY_1_AND_2" />
  <FeatureOption Value="NotInstalled">
   <PDLKeyword Value="NotInstalled" />
   <rcNameID Value="RC_STR_NOTINSTALLED" />
  </FeatureOption >
  <FeatureOption Value="Installed">
   <PDLKeyword Value="Installed" />
   <rcNameID Value="RC_STR_INSTALLED" />
  </FeatureOption >
 </DeviceFeature >
```

```xml
<DeviceFeature Value="InputTray3">
 <PDLKeyword Value="InputTray3"/>
 <rcNameID Value="RC_STR_TRAY3" />
 <FeatureOption Value="NotInstalled">
   <PDLKeyword Value="NotInstalled" />
   <rcNameID Value="RC_STR_NOTINSTALLED" />
 </FeatureOption >
 <FeatureOption Value="Installed">
   <PDLKeyword Value="Installed" />
   <rcNameID Value="RC_STR_INSTALLED" />
 </FeatureOption >
</DeviceFeature >
<DeviceFeature Value="InputTray4">
 <PDLKeyword Value="InputTray4"/>
 <rcNameID Value="RC_STR_TRAY4" />
 <FeatureOption Value="NotInstalled">
   <PDLKeyword Value="NotInstalled" />
   <rcNameID Value="RC_STR_NOTINSTALLED" />
 </FeatureOption >
 <FeatureOption Value="Installed">
   <PDLKeyword Value="Installed" />
   <rcNameID Value="RC_STR_INSTALLED" />
 </FeatureOption >
</DeviceFeature >
<DeviceFeature Value="LargeCapacityTray">
 <PDLKeyword Value="LargeCapacityTray"/>
 <rcNameID Value="RC_STR_LARGE_CAPACITY_TRAY" />
 <FeatureOption Value="NotInstalled">
   <PDLKeyword Value="NotInstalled" />
   <rcNameID Value="RC_STR_NOTINSTALLED" />
 </FeatureOption >
 <FeatureOption Value="Installed">
   <PDLKeyword Value="Installed" />
   <rcNameID Value="RC_STR_INSTALLED" />
 </FeatureOption>
</DeviceFeature>
<DeviceFeature Value="HolePunchUnit">
 <PDLKeyword Value="PunchUnit"/>
 <rcNameID Value="RC_STR_PUNCH_UNIT" />
 <FeatureOption Value="NotInstalled">
   <PDLKeyword Value="NotInstalled" />
   <rcNameID Value="RC_STR_NOTINSTALLED" />
 </FeatureOption >
 <FeatureOption Value="2and3holes">
   <PDLKeyword Value="2and3holes" />
   <rcNameID Value="RC_STR_PUNCH_UNIT_2_AND_3" />
 </FeatureOption >
 <FeatureOption Value="2and4holes">
```

```
<PDLKeyword Value="2and4holes" />
<rcNameID Value="RC_STR_PUNCH_UNIT_2_AND_4" />
</FeatureOption >
<FeatureOption Value="2holesJP">
 <PDLKeyword Value="2holesJP" />
 <rcNameID Value="RC_STR_PUNCH_UNIT_2_JP" />
</FeatureOption >
<FeatureOption Value="4holesEU">
 <PDLKeyword Value="4holesEU" />
 <rcNameID Value="RC_STR_PUNCH_UNIT_4_EU" />
</FeatureOption >
<FeatureOption Value="4holesNE">
 <PDLKeyword Value="4holesNE" />
 <rcNameID Value="RC_STR_PUNCH_UNIT_4_NE" />
</FeatureOption >
</DeviceFeature >
<DeviceFeature Value="MediaSizeName">
 <PDLKeyword Value="PaperSize"/>
 <rcNameID Value="PAPER_SIZE_DISPLAY" />
 <FeatureOption Value="na_arch-b_12x18in">
  <PDLKeyword Value="12x18" />
  <rcNameID Value="RC_STR_12X18" />
  <BlockMacro Value="=Cmd_Macro_PaperSize_12x18"/>
 </FeatureOption >
 <FeatureOption Value="na_ledger_11x17in">
  <PDLKeyword Value="11X17" />
  <rcNameID Value="RCID_DMPAPER_SYSTEM_NAME" />
  <BlockMacro Value="=Cmd_Macro_PaperSize_11X17"/>
 </FeatureOption >
 <FeatureOption Value="na_legal_8.5x14in">
  <PDLKeyword Value="LEGAL" />
  <rcNameID Value="RCID_DMPAPER_SYSTEM_NAME" />
  <BlockMacro Value="=Cmd_Macro_PaperSize_LEGAL"/>
 </FeatureOption >
 <FeatureOption Value="na_letter_8.5x11in">
  <PDLKeyword Value="LETTER" />
  <rcNameID Value="RCID_DMPAPER_SYSTEM_NAME" />
  <BlockMacro Value="=Cmd_Macro_PaperSize_LETTER"/>
 </FeatureOption >
 <FeatureOption Value="na_executive_7.25x10.5in">
  <PDLKeyword Value="EXECUTIVE" />
  <rcNameID Value="RCID_DMPAPER_SYSTEM_NAME" />
  <BlockMacro Value="=Cmd_Macro_PaperSize_EXECUTIVE"/>
 </FeatureOption >
 <FeatureOption Value="na_invoice_5.5x8.5in">
  <PDLKeyword Value="STATEMENT" />
  <rcNameID Value="RC_STR_5_5X8_5" />
  <BlockMacro Value="=Cmd_Macro_PaperSize_STATEMENT"/>
```

```
</FeatureOption >
<FeatureOption Value="iso_a3_297x420mm">
 <PDLKeyword Value="A3" />
 <rcNameID Value="RCID_DMPAPER_SYSTEM_NAME" />
 <BlockMacro Value="=Cmd_Macro_PaperSize_A3"/>
</FeatureOption >
<FeatureOption Value="iso_a4_210x297mm">
 <PDLKeyword Value="A4" />
 <rcNameID Value="RCID_DMPAPER_SYSTEM_NAME" />
 <BlockMacro Value="=Cmd_Macro_PaperSize_A4"/>
</FeatureOption >
<FeatureOption Value="iso_a5_148x210mm">
 <PDLKeyword Value="A5" />
 <rcNameID Value="RCID_DMPAPER_SYSTEM_NAME" />
 <BlockMacro Value="=Cmd_Macro_PaperSize_A5"/>
</FeatureOption >
<FeatureOption Value="iso_a6_105x148mm">
 <PDLKeyword Value="A6" />
 <rcNameID Value="RC_STR_A6" />
 <BlockMacro Value="=Cmd_Macro_PaperSize_A6"/>
</FeatureOption >
<FeatureOption Value="jis_b4_257x364mm">
 <PDLKeyword Value="B4" />
 <rcNameID Value="RCID_DMPAPER_SYSTEM_NAME" />
 <BlockMacro Value="=Cmd_Macro_PaperSize_B4"/>
</FeatureOption >
<FeatureOption Value="jis_b5_182x257mm">
 <PDLKeyword Value="B5" />
 <rcNameID Value="RCID_DMPAPER_SYSTEM_NAME" />
 <BlockMacro Value="=Cmd_Macro_PaperSize_B5"/>
</FeatureOption >
<FeatureOption Value="na_number-10_4.125x9.5in">
 <PDLKeyword Value="ENV_10" />
 <rcNameID Value="RCID_DMPAPER_SYSTEM_NAME" />
 <BlockMacro Value="=Cmd_Macro_PaperSize_ENV_10"/>
</FeatureOption >
<FeatureOption Value="iso_dl_110x220mm">
 <PDLKeyword Value="ENV_DL" />
 <rcNameID Value="RCID_DMPAPER_SYSTEM_NAME" />
 <BlockMacro Value="=Cmd_Macro_PaperSize_ENV_DL"/>
</FeatureOption >
<FeatureOption Value="na_monarch_3.875x7.5in">
 <PDLKeyword Value="ENV_MONARCH" />
 <rcNameID Value="RCID_DMPAPER_SYSTEM_NAME" />
 <BlockMacro Value="=Cmd_Macro_PaperSize_ENV_MONARCH"/>
</FeatureOption >
<FeatureOption Value="iso_c5_162x229mm">
 <PDLKeyword Value="ENV_C5" />
```

```xml
<rcNameID Value="RCID_DMPAPER_SYSTEM_NAME" />
<BlockMacro Value="=Cmd_Macro_PaperSize_ENV_C5"/>
</FeatureOption >
<FeatureOption Value="iso_c6_114x162mm">
 <PDLKeyword Value="ENV_C6" />
 <rcNameID Value="RCID_DMPAPER_SYSTEM_NAME" />
 <BlockMacro Value="=Cmd_Macro_PaperSize_ENV_C6"/>
</FeatureOption >
<FeatureOption Value="na_foolscap_8.5x13in">
 <PDLKeyword Value="FOLIO" />
 <rcNameID Value="RC_STR_8_5X13" />
 <BlockMacro Value="=Cmd_Macro_PaperSize_FOLIO"/>
</FeatureOption >
<FeatureOption Value="na_unknown_8.25x13in">
 <PDLKeyword Value="8_25x13" />
 <rcNameID Value="RC_STR_8_25X13" />
 <BlockMacro Value="=Cmd_Macro_PaperSize_8_25x13"/>
</FeatureOption >
<FeatureOption Value="na_govt-legal_8x13in">
 <PDLKeyword Value="8x13" />
 <rcNameID Value="RC_STR_8X13" />
 <BlockMacro Value="=Cmd_Macro_PaperSize_8x13"/>
</FeatureOption >
<FeatureOption Value="om_pa-kai_267x389mm">
 <PDLKeyword Value="8kai" />
 <rcNameID Value="RC_STR_8K" />
 <BlockMacro Value="=Cmd_Macro_PaperSize_8kai"/>
</FeatureOption >
<FeatureOption Value="prc_16k_146x215mm">
 <PDLKeyword Value="16kai" />
 <rcNameID Value="RC_STR_16K" />
 <BlockMacro Value="=Cmd_Macro_PaperSize_16kai"/>
</FeatureOption >
<FeatureOption Value="custom_papersize">
 <PDLKeyword Value="CUSTOMSIZE" />
 <rcNameID Value="RCID_DMPAPER_SYSTEM_NAME" />
 <BlockMacro Value="=Cmd_Macro_PaperSize_CUSTOMSIZE"/>
</FeatureOption >
</DeviceFeature >
<DeviceFeature Value="MediaType">
 <PDLKeyword Value="MediaType"/>
 <rcNameID Value="MEDIA_TYPE_DISPLAY" />
 <FeatureOption Value="Auto">
  <PDLKeyword Value="Auto" />
  <rcNameID Value="HT_AUTO_SELECT_DISPLAY" />
 </FeatureOption >
 <FeatureOption Value="STANDARD">
  <PDLKeyword Value="STANDARD" />
```

```xml
    <rcNameID Value="RC_STR_PLAIN" />
</FeatureOption>
<FeatureOption Value="Recycled">
    <PDLKeyword Value="Recycled" />
    <rcNameID Value="RC_STR_RECYCLED" />
</FeatureOption >
<FeatureOption Value="Special">
    <PDLKeyword Value="Special" />
    <rcNameID Value="RC_STR_SPECIAL" />
</FeatureOption >
<FeatureOption Value="Thick">
    <PDLKeyword Value="Thick" />
    <rcNameID Value="RC_STR_THICK" />
</FeatureOption >
<FeatureOption Value="TRANSPARENCY">
    <PDLKeyword Value="TRANSPARENCY" />
    <rcNameID Value="TRANSPARENCY_DISPLAY" />
</FeatureOption >
<FeatureOption Value="Color">
    <PDLKeyword Value="Color" />
    <rcNameID Value="RC_STR_COLOR" />
</FeatureOption >
<FeatureOption Value="Letterhead">
    <PDLKeyword Value="Letterhead" />
    <rcNameID Value="RC_STR_LETTERHEAD" />
</FeatureOption >
<FeatureOption Value="Preprinted">
    <PDLKeyword Value="Preprinted" />
    <rcNameID Value="RC_STR_PREPRINTED" />
</FeatureOption >
<FeatureOption Value="Labels">
    <PDLKeyword Value="Labels" />
    <rcNameID Value="RC_STR_LABELS" />
</FeatureOption >
<FeatureOption Value="Plain_Duplex_Backside">
    <PDLKeyword Value="Plain_Duplex_Backside" />
    <rcNameID Value="RC_STR_PLAIN_DUPLEX_BACKSIDE" />
</FeatureOption >
<FeatureOption Value="Thick_Duplex_Backside">
    <PDLKeyword Value="Thick_Duplex_Backside" />
    <rcNameID Value="RC_STR_THICK_DUPLEX_BACKSIDE" />
</FeatureOption>
<FeatureOption Value="Special1">
    <PDLKeyword Value="Special1" />
    <rcNameID Value="RC_STR_SPECIAL1" />
</FeatureOption >
<FeatureOption Value="Special2">
    <PDLKeyword Value="Special2" />
```

```
<rcNameID Value="RC_STR_SPECIAL2" />
</FeatureOption >
<FeatureOption Value="Special3">
 <PDLKeyword Value="Special3" />
 <rcNameID Value="RC_STR_SPECIAL3" />
</FeatureOption >
<FeatureOption Value="Thick1">
 <PDLKeyword Value="Thick1" />
 <rcNameID Value="RC_STR_THICK1" />
</FeatureOption >
<FeatureOption Value="Thick2">
 <PDLKeyword Value="Thick2" />
 <rcNameID Value="RC_STR_THICK2" />
</FeatureOption >
<FeatureOption Value="Thick3">
 <PDLKeyword Value="Thick3" />
 <rcNameID Value="RC_STR_THICK3" />
</FeatureOption >
<FeatureOption Value="Cardstock">
 <PDLKeyword Value="Cardstock" />
 <rcNameID Value="RC_STR_CARDSTOCK" />
</FeatureOption >
<FeatureOption Value="MiddleThick">
 <PDLKeyword Value="MiddleThick" />
 <rcNameID Value="RC_STR_MIDDLETHICK" />
</FeatureOption >
<FeatureOption Value="Thick_Duplex_Backside1">
 <PDLKeyword Value="Thick_Duplex_Backside1" />
 <rcNameID Value="RC_STR_THICK_DUPLEX_BACKSIDE1" />
</FeatureOption >
<FeatureOption Value="Thick_Duplex_Backside2">
 <PDLKeyword Value="Thick_Duplex_Backside2" />
 <rcNameID Value="RC_STR_THICK_DUPLEX_BACKSIDE2" />
</FeatureOption >
<FeatureOption Value="Thick_Duplex_Backside3">
 <PDLKeyword Value="Thick_Duplex_Backside3" />
 <rcNameID Value="RC_STR_THICK_DUPLEX_BACKSIDE3" />
</FeatureOption >
<FeatureOption Value="Thick1GAP3">
 <PDLKeyword Value="Thick1GAP3" />
 <rcNameID Value="RC_STR_THICK1GAP3" />
</FeatureOption >
<FeatureOption Value="Thick2GAP3">
 <PDLKeyword Value="Thick2GAP3" />
 <rcNameID Value="RC_STR_THICK2GAP3" />
</FeatureOption >
<FeatureOption Value="Plain_Duplex_Backside">
 <PDLKeyword Value="Plain_Duplex_Backside" />
```

```xml
  <rcNameID Value="RC_STR_PLAIN_DUPLEX_BACKSIDE" />
</FeatureOption >
<FeatureOption Value="ThinGAP3">
  <PDLKeyword Value="ThinGAP3" />
  <rcNameID Value="RC_STR_THINGAP3" />
</FeatureOption >
<FeatureOption Value="GLOSSY">
  <PDLKeyword Value="GLOSSY" />
  <rcNameID Value="GLOSSY_PAPER_DISPLAY" />
</FeatureOption >
<FeatureOption Value="Coated">
  <PDLKeyword Value="Coated" />
  <rcNameID Value="RC_STR_COATED" />
</FeatureOption >
<FeatureOption Value="PlainPaperGAP3">
  <PDLKeyword Value="PlainPaperGAP3" />
  <rcNameID Value="RC_STR_PLAINGAP3" />
</FeatureOption >
<FeatureOption Value="Bond">
  <PDLKeyword Value="Bond" />
  <rcNameID Value="RC_STR_BOND" />
</FeatureOption >
<FeatureOption Value="Thin">
  <PDLKeyword Value="Thin" />
  <rcNameID Value="RC_STR_THIN" />
</FeatureOption >
</DeviceFeature >
<DeviceFeature Value="InputBins">
  <PDLKeyword Value="InputBin"/>
  <rcNameID Value="PAPER_SOURCE_DISPLAY" />
  <FeatureOption Value="AUTO">
    <PDLKeyword Value="AUTO" />
    <rcNameID Value="RC_STR_AUTO_SELECT_BY_PRINTER" />
  </FeatureOption >
  <FeatureOption Value="Bypass">
    <PDLKeyword Value="BypassTray" />
    <rcNameID Value="RC_STR_BYPASS_TRAY" />
    <OptionID Value="RI_DMBINBYPASS_TRAY" />
  </FeatureOption >
  <FeatureOption Value="Tray1">
    <PDLKeyword Value="Tray1" />
    <rcNameID Value="RC_STR_TRAY1" />
    <OptionID Value="RI_DMBIN_TRAY1" />
  </FeatureOption >
  <FeatureOption Value="Tray2">
    <PDLKeyword Value="Tray2" />
    <rcNameID Value="RC_STR_TRAY2" />
    <OptionID Value="RI_DMBIN_TRAY2" />
```

```xml
</FeatureOption >
<FeatureOption Value="Tray3">
  <PDLKeyword Value="Tray3" />
  <rcNameID Value="RC_STR_TRAY3" />
  <OptionID Value="RI_DMBIN_TRAY3" />
</FeatureOption >
<FeatureOption Value="Tray4">
  <PDLKeyword Value="Tray4" />
  <rcNameID Value="RC_STR_TRAY4" />
  <OptionID Value="RI_DMBIN_TRAY4" />
</FeatureOption >
<FeatureOption Value="LargeCapacity">
  <PDLKeyword Value="LARGECAPACITY" />
  <rcNameID Value="RC_STR_LARGE_CAPACITY_TRAY" />
</FeatureOption>
</DeviceFeature >
<DeviceFeature Value="SlipSheet">
 <PDLKeyword Value="SlipSheet"/>
 <rcNameID Value="RC_STR_SLIPSHEET" />
 <FeatureOption Value="OFF">
  <PDLKeyword Value="OFF" />
  <rcNameID Value="OFF_DISPLAY" />
 </FeatureOption>
 <FeatureOption Value="ON">
  <PDLKeyword Value="ON" />
  <rcNameID Value="ON_DISPLAY" />
 </FeatureOption>
</DeviceFeature >
<DeviceFeature Value="SlipSheetInputBin">
 <PDLKeyword Value="SlipSheetInputBin"/>
 <rcNameID Value="RC_STR_SLIPSHEET_PAPER_SOURCE" />
 <FeatureOption Value="Bypass">
  <PDLKeyword Value="BypassTray" />
  <rcNameID Value="RC_STR_BYPASS_TRAY" />
 </FeatureOption>
 <FeatureOption Value="Tray1">
  <PDLKeyword Value="Tray1" />
  <rcNameID Value="RC_STR_TRAY1" />
 </FeatureOption>
 <FeatureOption Value="Tray2">
  <PDLKeyword Value="Tray2" />
  <rcNameID Value="RC_STR_TRAY2" />
 </FeatureOption>
 <FeatureOption Value="Tray3">
  <PDLKeyword Value="Tray3" />
  <rcNameID Value="RC_STR_TRAY3" />
 </FeatureOption>
 <FeatureOption Value="Tray4">
```

```xml
    <PDLKeyword Value="Tray4" />
    <rcNameID Value="RC_STR_TRAY4" />
  </FeatureOption>
  <FeatureOption Value="LargeCapacity">
    <PDLKeyword Value="LARGECAPACITY" />
    <rcNameID Value="RC_STR_LARGE_CAPACITY_TRAY" />
  </FeatureOption>
</DeviceFeature >
<DeviceFeature Value="OutputBins">
  <PDLKeyword Value="OutputBin"/>
  <rcNameID Value="OUTPUTBIN_DISPLAY" />
  <FeatureOption Value="PrinterDefault">
    <PDLKeyword Value="PrinterDefault" />
    <rcNameID Value="RC_STR_PRINTER_DEFAULT" />
  </FeatureOption>
  <FeatureOption Value="StandardTray">
    <PDLKeyword Value="StandardTray" />
    <rcNameID Value="RC_STR_STANDARD_TRAY" />
  </FeatureOption>
  <FeatureOption Value="ExternalTray">
    <PDLKeyword Value="ExternalTray" />
    <rcNameID Value="RC_STR_EXTERNAL_TRAY" />
  </FeatureOption>
  <FeatureOption Value="FinisherShiftTray1">
    <PDLKeyword Value="FinisherShiftTray1" />
    <rcNameID Value="RC_STR_FINISHER_SHIFT_TRAY1" />
  </FeatureOption>
  <FeatureOption Value="FinisherShiftTray2">
    <PDLKeyword Value="FinisherShiftTray2" />
    <rcNameID Value="RC_STR_FINISHER_SHIFT_TRAY2" />
  </FeatureOption>
  <FeatureOption Value="FinisherShiftTray">
    <PDLKeyword Value="FinisherShiftTray" />
    <rcNameID Value="RC_STR_FINISHER_SHIFT_TRAY" />
  </FeatureOption>
  <FeatureOption Value="FinisherBookletTray">
    <PDLKeyword Value="FinisherBookletTray" />
    <rcNameID Value="RC_STR_BOOKLET_FINISHER_TRAY" />
  </FeatureOption>
  <FeatureOption Value="LeftTray1">
    <PDLKeyword Value="LeftTray1" />
    <rcNameID Value="RC_STR_LEFT_TRAY1" />
  </FeatureOption>
  <FeatureOption Value="LeftTray2">
    <PDLKeyword Value="LeftTray2" />
    <rcNameID Value="RC_STR_LEFT_TRAY2" />
  </FeatureOption>
  <FeatureOption Value="FinisherUpperTray">
```

```xml
    <PDLKeyword Value="FinisherUpperTray" />
    <rcNameID Value="RC_STR_FINISHER_UPPER_TRAY" />
   </FeatureOption>
  </DeviceFeature >
  <DeviceFeature Value="Staple">
   <PDLKeyword Value="Stapling"/>
   <rcNameID Value="RC_STR_STAPLE" />
   <FeatureOption Value="OFF">
    <PDLKeyword Value="OFF" />
    <rcNameID Value="OFF_DISPLAY" />
   </FeatureOption>
   <FeatureOption Value="TopLeft">
    <PDLKeyword Value="TopLeft" />
    <rcNameID Value="RC_STR_TOP_LEFT" />
   </FeatureOption>
   <FeatureOption Value="TopRight">
    <PDLKeyword Value="TopRight" />
    <rcNameID Value="RC_STR_TOP_RIGHT" />
   </FeatureOption>
   <FeatureOption Value="Left2">
    <PDLKeyword Value="Left2" />
    <rcNameID Value="RC_STR_LEFT2" />
   </FeatureOption>
   <FeatureOption Value="Top2">
    <PDLKeyword Value="Top2" />
    <rcNameID Value="RC_STR_TOP2" />
   </FeatureOption>
   <FeatureOption Value="Right2">
    <PDLKeyword Value="Right2" />
    <rcNameID Value="RC_STR_RIGHT2" />
   </FeatureOption>
   <FeatureOption Value="TopLeftSlant">
    <PDLKeyword Value="TopLeftSlant" />
    <rcNameID Value="RC_STR_TOP_LEFT_SLANT" />
   </FeatureOption>
   <FeatureOption Value="TopRightSlant">
    <PDLKeyword Value="TopRightSlant" />
    <rcNameID Value="RC_STR_TOP_RIGHT_SLANT" />
   </FeatureOption>
   <FeatureOption Value="Booklet">
    <PDLKeyword Value="Booklet" />
    <rcNameID Value="RC_STR_BOOKLET" />
   </FeatureOption>
  </DeviceFeature >
  <DeviceFeature Value="HolePunch">
   <PDLKeyword Value="Punching"/>
   <rcNameID Value="RC_STR_PUNCH" />
   <FeatureOption Value="OFF">
```

```xml
  <PDLKeyword Value="OFF" />
  <rcNameID Value="OFF_DISPLAY" />
</FeatureOption >
<FeatureOption Value="Left2">
  <PDLKeyword Value="Left2" />
  <rcNameID Value="RC_STR_LEFT2" />
</FeatureOption >
<FeatureOption Value="Top2">
  <PDLKeyword Value="Top2" />
  <rcNameID Value="RC_STR_TOP2" />
</FeatureOption >
<FeatureOption Value="Right2">
  <PDLKeyword Value="Right2" />
  <rcNameID Value="RC_STR_RIGHT2" />
</FeatureOption >
<FeatureOption Value="Left3">
  <PDLKeyword Value="Left3" />
  <rcNameID Value="RC_STR_LEFT3" />
</FeatureOption >
<FeatureOption Value="Top3">
  <PDLKeyword Value="Top3" />
  <rcNameID Value="RC_STR_TOP3" />
</FeatureOption >
<FeatureOption Value="Right3">
  <PDLKeyword Value="Right3" />
  <rcNameID Value="RC_STR_RIGHT3" />
</FeatureOption >
<FeatureOption Value="Left4">
  <PDLKeyword Value="Left4" />
  <rcNameID Value="RC_STR_LEFT4" />
</FeatureOption >
<FeatureOption Value="Top4">
  <PDLKeyword Value="Top4" />
  <rcNameID Value="RC_STR_TOP4" />
</FeatureOption >
<FeatureOption Value="Right4">
  <PDLKeyword Value="Right4" />
  <rcNameID Value="RC_STR_RIGHT4" />
</FeatureOption >
</DeviceFeature >
<DeviceFeature Value="Orientation">
  <PDLKeyword Value="Orientation"/>
  <rcNameID Value="ORIENTATION_DISPLAY" />
  <FeatureOption Value="Portrait">
    <PDLKeyword Value="PORTRAIT" />
    <rcNameID Value="PORTRAIT_DISPLAY" />
  </FeatureOption >
  <FeatureOption Value="Landscape">
```

```xml
    <PDLKeyword Value="LANDSCAPE_CC90" />
    <rcNameID Value="LANDSCAPE_DISPLAY" />
  </FeatureOption >
</DeviceFeature >
<DeviceFeature Value="Sides">
  <PDLKeyword Value="Duplex"/>
  <rcNameID Value="TWO_SIDED_PRINTING_DISPLAY" />
  <FeatureOption Value="OneSided">
    <PDLKeyword Value="NONE" />
    <rcNameID Value="NONE_DISPLAY" />
  </FeatureOption >
  <FeatureOption Value="TwoSidedLongEdge">
    <PDLKeyword Value="VERTICAL" />
    <rcNameID Value="FLIP_ON_LONG_EDGE_DISPLAY" />
  </FeatureOption >
  <FeatureOption Value="TwoSidedShortEdge">
    <PDLKeyword Value="HORIZONTAL" />
    <rcNameID Value="FLIP_ON_SHORT_EDGE_DISPLAY" />
  </FeatureOption >
</DeviceFeature >
<DeviceFeature Value="Dither">
  <PDLKeyword Value="Dither"/>
  <rcNameID Value="RC_STR_DITHER_QUALITY" />
  <FeatureOption Value="High">
    <PDLKeyword Value="High" />
    <rcNameID Value="RC_STR_HIGH" />
  </FeatureOption >
  <FeatureOption Value="Low">
    <PDLKeyword Value="Low" />
    <rcNameID Value="RC_STR_LOW" />
  </FeatureOption >
</DeviceFeature >
<DeviceFeature Value="Resolution">
  <PDLKeyword Value="Resolution"/>
  <rcNameID Value="RESOLUTION_DISPLAY" />
  <FeatureOption Value="1200">
    <PDLKeyword Value="1200dpi"/>
    <rcNameID Value="RC_STR_1200DPI" />
  </FeatureOption >
  <FeatureOption Value="600">
    <PDLKeyword Value="600dpi"/>
    <rcNameID Value="RC_STR_600DPI" />
  </FeatureOption >
</DeviceFeature >
<DeviceFeature Value="TrueTypeFormat">
  <PDLKeyword Value="TrueTypeFormat"/>
  <rcNameID Value="RC_STR_TRUETYPE_FORMAT" />
  <FeatureOption Value="TTFDownloadAsBitmap">
```

```xml
  <PDLKeyword Value="TTFDownloadAsBitmap" />
  <rcNameID Value="RC_STR_TRUETYPE_BITMAP" />
 </FeatureOption >
 <FeatureOption Value="TTFDownloadDisabled">
  <PDLKeyword Value="TTFDownloadDisabled" />
  <rcNameID Value="RC_STR_TRUETYPE_DOWNLOADNONE" />
 </FeatureOption >
</DeviceFeature >
<DeviceFeature Value="ColorMode">
 <PDLKeyword Value="ColorMode"/>
 <rcNameID Value="COLOR_PRINTING_MODE_DISPLAY" />
 <FeatureOption Value="24bpp">
  <PDLKeyword Value="24bpp"/>
  <rcNameID Value="24BPP_DISPLAY" />
 </FeatureOption >
 <FeatureOption Value="Mono">
  <PDLKeyword Value="Mono"/>
  <rcNameID Value="MONO_DISPLAY" />
 </FeatureOption >
</DeviceFeature >
<DeviceFeature Value="Collate">
 <PDLKeyword Value="Collate"/>
 <FeatureOption Value="true">
  <PDLKeyword Value="ON" />
  <rcNameID Value="ON_DISPLAY" />
 </FeatureOption>
 <FeatureOption Value="false">
  <PDLKeyword Value="OFF" />
  <rcNameID Value="OFF_DISPLAY" />
 </FeatureOption>
</DeviceFeature>
<DeviceFeature Value="PrintQuality">
 <PDLKeyword Value="PrintQuality"/>
 <rcNameID Value="TEXT_QUALITY_DISPLAY" />
 <FeatureOption Value="SmoothingOff">
  <PDLKeyword Value="SmoothingOff" />
  <rcNameID Value="RC_STR_EDGE_SMOOTHING_OFF" />
 </FeatureOption>
 <FeatureOption Value="SmoothingOn">
  <PDLKeyword Value="SmoothingOn" />
  <rcNameID Value="RC_STR_EDGE_SMOOTHING_ON" />
 </FeatureOption>
</DeviceFeature>
<DeviceFeature Value="PrintDensity">
 <PDLKeyword Value="PrintDensity"/>
 <rcNameID Value="PRINTDENSITY_DISPLAY" />
 <FeatureOption Value="EconomodeOff">
  <PDLKeyword Value="EconomodeOff" />
```

```xml
    <rcNameID Value="RC_STR_TONER_SAVER_OFF" />
   </FeatureOption>
   <FeatureOption Value="EconomodeOn">
    <PDLKeyword Value="EconomodeOn" />
    <rcNameID Value="RC_STR_TONER_SAVER_ON" />
   </FeatureOption>
  </DeviceFeature>
  <DeviceFeature Value="LCTDetail">
   <PDLKeyword Value="LCTDetail"/>
   <rcNameID Value="RC_STR_LARGE_CAPACITY_TRAY" />
   <FeatureOption Value="NotInstalled">
    <PDLKeyword Value="NotInstalled" />
    <rcNameID Value="RC_STR_NOTINSTALLED" />
   </FeatureOption >
   <FeatureOption Value="Installed">
    <PDLKeyword Value="Installed" />
    <rcNameID Value="RC_STR_INSTALLED" />
   </FeatureOption>
  </DeviceFeature>
  <DeviceFeature Value="Tray3LCT">
   <PDLKeyword Value="Tray3LCT"/>
   <rcNameID Value="RC_STR_TRAY3_LCT" />
   <FeatureOption Value="NotInstalled">
    <PDLKeyword Value="NotInstalled" />
    <rcNameID Value="RC_STR_NOTINSTALLED" />
   </FeatureOption >
   <FeatureOption Value="Installed">
    <PDLKeyword Value="Installed" />
    <rcNameID Value="RC_STR_INSTALLED" />
   </FeatureOption>
  </DeviceFeature>
  <DeviceFeature Value="Memory_HardDisk">
   <PDLKeyword Value="Memory_HardDisk"/>
   <rcNameID Value="RC_STR_MEMORY_HARDDISK" />
   <FeatureOption Value="256MB_NotInstalled">
    <PDLKeyword Value="256MB_NotInstalled" />
    <rcNameID Value="RC_STR_256MB_NOTINSTALLED" />
   </FeatureOption >
   <FeatureOption Value="256MB_Installed">
    <PDLKeyword Value="256MB_Installed" />
    <rcNameID Value="RC_STR_256MB_INSTALLED" />
   </FeatureOption>
   <FeatureOption Value="384MBorMore_NotInstalled">
    <PDLKeyword Value="384MBorMore_NotInstalled" />
    <rcNameID Value="RC_STR_384MBORMORE_NOTINSTALLED" />
   </FeatureOption>
   <FeatureOption Value="384MBorMore_Installed">
    <PDLKeyword Value="384MBorMore_Installed" />
```

```xml
    <rcNameID Value="RC_STR_384MBORMORE_INSTALLED" />
   </FeatureOption>
  </DeviceFeature>
  <DeviceFeature Value="EdgeToEdgePrint">
   <PDLKeyword Value="EdgeToEdgePrint"/>
   <rcNameID Value="RC_STR_EDGE_TO_EDGE_PRINT" />
   <FeatureOption Value="OFF">
    <PDLKeyword Value="OFF" />
    <rcNameID Value="OFF_DISPLAY" />
   </FeatureOption >
   <FeatureOption Value="ON">
    <PDLKeyword Value="ON" />
    <rcNameID Value="ON_DISPLAY" />
   </FeatureOption>
  </DeviceFeature>
  <DeviceFeature Value="InputTray2">
   <PDLKeyword Value="InputTray2"/>
   <rcNameID Value="RC_STR_TRAY2" />
   <FeatureOption Value="NotInstalled">
    <PDLKeyword Value="NotInstalled" />
    <rcNameID Value="RC_STR_NOTINSTALLED" />
   </FeatureOption >
   <FeatureOption Value="Installed">
    <PDLKeyword Value="Installed" />
    <rcNameID Value="RC_STR_INSTALLED" />
   </FeatureOption>
  </DeviceFeature>
  <DeviceFeature Value="HardDisk">
   <PDLKeyword Value="HardDisk"/>
   <rcNameID Value="RC_STR_HARDDISK" />
   <FeatureOption Value="NotInstalled">
    <PDLKeyword Value="NotInstalled" />
    <rcNameID Value="RC_STR_NOTINSTALLED" />
   </FeatureOption >
   <FeatureOption Value="Installed">
    <PDLKeyword Value="Installed" />
    <rcNameID Value="RC_STR_INSTALLED" />
   </FeatureOption>
  </DeviceFeature>
</mapfile>
```

APPENDIX C -- EXAMPLE PRINTER DESCRIPTION DATA

```xml
<PrinterDescriptionData Device="RICOH Future Printer 2010">
  <DeviceFeatures>
    <DeviceFeature Value="InputTray3" PrinterProperty="true">
      <PDLKeyword Value="InputTray3"/>
      <rcNameID Value="RC_STR_TRAY3"/>
      <DisplayName xml:lang="en-US">Tray 3</DisplayName>
      <DefaultOption>NotInstalled</DefaultOption>
      <FeatureOption Value="NotInstalled">
        <PDLKeyword Value="NotInstalled"/>
        <rcNameID Value="RC_STR_NOTINSTALLED"/>
        <DisplayName xml:lang="en-US">Not Installed</DisplayName>
      </FeatureOption>
      <FeatureOption Value="Installed">
        <PDLKeyword Value="Installed"/>
        <rcNameID Value="RC_STR_INSTALLED"/>
        <DisplayName xml:lang="en-US">Installed</DisplayName>
      </FeatureOption>
    </DeviceFeature>
    <DeviceFeature Value="InputTray4" PrinterProperty="true">
      <PDLKeyword Value="InputTray4"/>
      <rcNameID Value="RC_STR_TRAY4"/>
      <DisplayName xml:lang="en-US">Tray 4</DisplayName>
      <DefaultOption>NotInstalled</DefaultOption>
      <FeatureOption Value="NotInstalled">
        <PDLKeyword Value="NotInstalled"/>
        <rcNameID Value="RC_STR_NOTINSTALLED"/>
        <DisplayName xml:lang="en-US">Not Installed</DisplayName>
      </FeatureOption>
      <FeatureOption Value="Installed">
        <PDLKeyword Value="Installed"/>
        <rcNameID Value="RC_STR_INSTALLED"/>
        <DisplayName xml:lang="en-US">Installed</DisplayName>
        <Constraints>
          <Constraint Feature="InputTray3" Option="NotInstalled"/>
        </Constraints>
      </FeatureOption>
    </DeviceFeature>
    <DeviceFeature Value="LargeCapacityTray" PrinterProperty="true">
      <PDLKeyword Value="LargeCapacityTray"/>
      <rcNameID Value="RC_STR_LARGE_CAPACITY_TRAY"/>
      <DisplayName xml:lang="en-US">Large Capacity Tray</DisplayName>
      <DefaultOption>NotInstalled</DefaultOption>
      <FeatureOption Value="NotInstalled">
        <PDLKeyword Value="NotInstalled"/>
        <rcNameID Value="RC_STR_NOTINSTALLED"/>
        <DisplayName xml:lang="en-US">Not Installed</DisplayName>
```

```xml
    </FeatureOption>
    <FeatureOption Value="Installed">
      <PDLKeyword Value="Installed"/>
      <rcNameID Value="RC_STR_INSTALLED"/>
      <DisplayName xml:lang="en-US">Installed</DisplayName>
    </FeatureOption>
  </DeviceFeature>
  <DeviceFeature Value="LeftTray1and2" PrinterProperty="true">
    <PDLKeyword Value="LeftTray1and2"/>
    <rcNameID Value="RC_STR_LEFT_TRAY_1_AND_2"/>
    <DisplayName xml:lang="en-US">Left Tray 1 and 2</DisplayName>
    <DefaultOption>NotInstalled</DefaultOption>
    <FeatureOption Value="NotInstalled">
      <PDLKeyword Value="NotInstalled"/>
      <rcNameID Value="RC_STR_NOTINSTALLED"/>
      <DisplayName xml:lang="en-US">Not Installed</DisplayName>
      <Constraints>
        <Constraint Feature="OutputBins" Option="LeftTray1"/>
        <Constraint Feature="OutputBins" Option="LeftTray2"/>
      </Constraints>
    </FeatureOption>
    <FeatureOption Value="Installed">
      <PDLKeyword Value="Installed"/>
      <rcNameID Value="RC_STR_INSTALLED"/>
      <DisplayName xml:lang="en-US">Installed</DisplayName>
      <Constraints>
        <Constraint Feature="HolePunchUnit" Option="2holesJP"/>
        <Constraint Feature="HolePunchUnit" Option="4holesEU"/>
        <Constraint Feature="HolePunchUnit" Option="4holesNE"/>
        <Constraint Feature="HolePunchUnit" Option="2and3holes"/>
        <Constraint Feature="HolePunchUnit" Option="2and4holes"/>
        <Constraint Feature="OutputBins" Option="FinisherShiftTray1"/>
        <Constraint Feature="OutputBins" Option="FinisherShiftTray2"/>
        <Constraint Feature="OutputBins" Option="FinisherShiftTray"/>
        <Constraint Feature="OutputBins" Option="FinisherBookletTray"/>
      </Constraints>
    </FeatureOption>
  </DeviceFeature>
  <DeviceFeature Value="Finisher" PrinterProperty="true">
    <PDLKeyword Value="Finisher"/>
    <rcNameID Value="RC_STR_FINISHER"/>
    <DisplayName xml:lang="en-US">Finisher</DisplayName>
    <DefaultOption>NotInstalled</DefaultOption>
    <FeatureOption Value="NotInstalled">
      <PDLKeyword Value="NotInstalled"/>
      <rcNameID Value="RC_STR_NOTINSTALLED"/>
      <DisplayName xml:lang="en-US">Not Installed</DisplayName>
      <Constraints>
```

```xml
    <Constraint Feature="OutputBins" Option="FinisherShiftTray1"/>
    <Constraint Feature="OutputBins" Option="FinisherShiftTray2"/>
    <Constraint Feature="OutputBins" Option="FinisherShiftTray"/>
    <Constraint Feature="OutputBins" Option="FinisherBookletTray"/>
    <Constraint Feature="HolePunchUnit" Option="2and3holes"/>
    <Constraint Feature="HolePunchUnit" Option="2and4holes"/>
    <Constraint Feature="HolePunchUnit" Option="2holesJP"/>
    <Constraint Feature="HolePunchUnit" Option="4holesEU"/>
    <Constraint Feature="HolePunchUnit" Option="4holesNE"/>
  </Constraints>
</FeatureOption>
<FeatureOption Value="Finisher2000">
  <PDLKeyword Value="Finisher2000"/>
  <rcNameID Value="RC_STR_2TRAY_FINISHER"/>
  <DisplayName xml:lang="en-US">2 Tray Finisher</DisplayName>
  <Constraints>
    <Constraint Feature="LeftTray1and2" Option="Installed"/>
    <Constraint Feature="HolePunchUnit" Option="2holesJP"/>
    <Constraint Feature="HolePunchUnit" Option="4holesEU"/>
    <Constraint Feature="OutputBins" Option="FinisherShiftTray"/>
    <Constraint Feature="OutputBins" Option="FinisherBookletTray"/>
    <Constraint Feature="OutputBins" Option="LeftTray1"/>
    <Constraint Feature="OutputBins" Option="LeftTray2"/>
  </Constraints>
</FeatureOption>
<FeatureOption Value="BookletFinisher">
  <PDLKeyword Value="BookletFinisher"/>
  <rcNameID Value="RC_STR_BOOKLET_FINISHER"/>
  <DisplayName xml:lang="en-US">Booklet Finisher</DisplayName>
  <Constraints>
    <Constraint Feature="LeftTray1and2" Option="Installed"/>
    <Constraint Feature="HolePunchUnit" Option="2and4holes"/>
    <Constraint Feature="OutputBins" Option="FinisherShiftTray1"/>
    <Constraint Feature="OutputBins" Option="FinisherShiftTray2"/>
    <Constraint Feature="OutputBins" Option="LeftTray1"/>
    <Constraint Feature="OutputBins" Option="LeftTray2"/>
  </Constraints>
</FeatureOption>
</DeviceFeature>
<DeviceFeature Value="HolePunchUnit" PrinterProperty="true">
  <PDLKeyword Value="PunchUnit"/>
  <rcNameID Value="RC_STR_PUNCH_UNIT"/>
  <DisplayName xml:lang="en-US">Punch Unit</DisplayName>
  <DefaultOption>NotInstalled</DefaultOption>
  <FeatureOption Value="NotInstalled">
    <PDLKeyword Value="NotInstalled"/>
    <rcNameID Value="RC_STR_NOTINSTALLED"/>
    <DisplayName xml:lang="en-US">Not Installed</DisplayName>
```

```xml
<Constraints>
  <Constraint Feature="HolePunch" Option="Left2"/>
  <Constraint Feature="HolePunch" Option="Top2"/>
  <Constraint Feature="HolePunch" Option="Right2"/>
  <Constraint Feature="HolePunch" Option="Left3"/>
  <Constraint Feature="HolePunch" Option="Top3"/>
  <Constraint Feature="HolePunch" Option="Right3"/>
  <Constraint Feature="HolePunch" Option="Left4"/>
  <Constraint Feature="HolePunch" Option="Top4"/>
  <Constraint Feature="HolePunch" Option="Right4"/>
</Constraints>
</FeatureOption>
<FeatureOption Value="2and3holes">
 <PDLKeyword Value="2and3holes"/>
 <rcNameID Value="RC_STR_PUNCH_UNIT_2_AND_3"/>
 <DisplayName xml:lang="en-US">2 and 3 holes</DisplayName>
 <Constraints>
  <Constraint Feature="HolePunch" Option="Left4"/>
  <Constraint Feature="HolePunch" Option="Top4"/>
  <Constraint Feature="HolePunch" Option="Right4"/>
 </Constraints>
</FeatureOption>
<FeatureOption Value="2and4holes">
 <PDLKeyword Value="2and4holes"/>
 <rcNameID Value="RC_STR_PUNCH_UNIT_2_AND_4"/>
 <DisplayName xml:lang="en-US">2 and 4 holes</DisplayName>
 <Constraints>
  <Constraint Feature="HolePunch" Option="Left3"/>
  <Constraint Feature="HolePunch" Option="Top3"/>
  <Constraint Feature="HolePunch" Option="Right3"/>
 </Constraints>
</FeatureOption>
<FeatureOption Value="2holesJP">
 <PDLKeyword Value="2holesJP"/>
 <rcNameID Value="RC_STR_PUNCH_UNIT_2_JP"/>
 <DisplayName xml:lang="en-US">2 holes type JP</DisplayName>
 <Constraints>
  <Constraint Feature="HolePunch" Option="Left4"/>
  <Constraint Feature="HolePunch" Option="Top4"/>
  <Constraint Feature="HolePunch" Option="Right4"/>
  <Constraint Feature="HolePunch" Option="Left3"/>
  <Constraint Feature="HolePunch" Option="Top3"/>
  <Constraint Feature="HolePunch" Option="Right3"/>
 </Constraints>
</FeatureOption>
<FeatureOption Value="4holesEU">
 <PDLKeyword Value="4holesEU"/>
 <rcNameID Value="RC_STR_PUNCH_UNIT_4_EU"/>
```

```xml
<DisplayName xml:lang="en-US">4 holes type EU</DisplayName>
<Constraints>
  <Constraint Feature="HolePunch" Option="Left2"/>
  <Constraint Feature="HolePunch" Option="Top2"/>
  <Constraint Feature="HolePunch" Option="Right2"/>
  <Constraint Feature="HolePunch" Option="Left3"/>
  <Constraint Feature="HolePunch" Option="Top3"/>
  <Constraint Feature="HolePunch" Option="Right3"/>
</Constraints>
</FeatureOption>
<FeatureOption Value="4holesNE">
  <PDLKeyword Value="4holesNE"/>
  <rcNameID Value="RC_STR_PUNCH_UNIT_4_NE"/>
  <DisplayName xml:lang="en-US">4 holes type NE</DisplayName>
  <Constraints>
    <Constraint Feature="HolePunch" Option="Left2"/>
    <Constraint Feature="HolePunch" Option="Top2"/>
    <Constraint Feature="HolePunch" Option="Right2"/>
    <Constraint Feature="HolePunch" Option="Left3"/>
    <Constraint Feature="HolePunch" Option="Top3"/>
    <Constraint Feature="HolePunch" Option="Right3"/>
  </Constraints>
</FeatureOption>
</DeviceFeature>
<DeviceFeature Value="MediaSizeName">
 <PDLKeyword Value="PaperSize"/>
 <rcNameID Value="PAPER_SIZE_DISPLAY"/>
 <DisplayName xml:lang="en-US">Paper Size</DisplayName>
 <FeatureOption Value="na_arch-b_12x18in">
   <PDLKeyword Value="12x18"/>
   <rcNameID Value="RC_STR_12X18"/>
   <BlockMacro Value="=Cmd_Macro_PaperSize_12x18"/>
   <DisplayName xml:lang="en-US">12x18</DisplayName>
   <PageDimensions ValueType="PAIR" Value="14400,21600"/>
   <PrintableArea ValueType="PAIR" Value="14000,21200"/>
   <PrintableOrigin ValueType="PAIR" Value="200,200"/>
 </FeatureOption>
 <FeatureOption Value="na_ledger_11x17in">
   <PDLKeyword Value="11X17"/>
   <rcNameID Value="RCID_DMPAPER_SYSTEM_NAME"/>
   <BlockMacro Value="=Cmd_Macro_PaperSize_11X17"/>
   <DisplayName xml:lang="en-US">11X17</DisplayName>
   <PrintableArea ValueType="PAIR" Value="12800,20000"/>
   <PrintableOrigin ValueType="PAIR" Value="200,200"/>
 </FeatureOption>
 <FeatureOption Value="na_legal_8.5x14in">
   <PDLKeyword Value="LEGAL"/>
   <rcNameID Value="RCID_DMPAPER_SYSTEM_NAME"/>
```

```xml
<BlockMacro Value="=Cmd_Macro_PaperSize_LEGAL"/>
<DisplayName xml:lang="en-US">LEGAL</DisplayName>
<PrintableArea ValueType="PAIR" Value="9800,16400"/>
<PrintableOrigin ValueType="PAIR" Value="200,200"/>
</FeatureOption>
<FeatureOption Value="na_letter_8.5x11in">
 <PDLKeyword Value="LETTER"/>
 <rcNameID Value="RCID_DMPAPER_SYSTEM_NAME"/>
 <BlockMacro Value="=Cmd_Macro_PaperSize_LETTER"/>
 <DisplayName xml:lang="en-US">LETTER</DisplayName>
 <PrintableArea ValueType="PAIR" Value="9800,12800"/>
 <PrintableOrigin ValueType="PAIR" Value="200,200"/>
</FeatureOption>
<FeatureOption Value="na_executive_7.25x10.5in">
 <PDLKeyword Value="EXECUTIVE"/>
 <rcNameID Value="RCID_DMPAPER_SYSTEM_NAME"/>
 <BlockMacro Value="=Cmd_Macro_PaperSize_EXECUTIVE"/>
 <DisplayName xml:lang="en-US">EXECUTIVE</DisplayName>
 <PrintableArea ValueType="PAIR" Value="8300,12200"/>
 <PrintableOrigin ValueType="PAIR" Value="200,200"/>
</FeatureOption>
<FeatureOption Value="na_invoice_5.5x8.5in">
 <PDLKeyword Value="STATEMENT"/>
 <rcNameID Value="RC_STR_5_5X8_5"/>
 <BlockMacro Value="=Cmd_Macro_PaperSize_STATEMENT"/>
 <DisplayName xml:lang="en-US">STATEMENT</DisplayName>
 <PrintableArea ValueType="PAIR" Value="6200,9800"/>
 <PrintableOrigin ValueType="PAIR" Value="200,200"/>
</FeatureOption>
<FeatureOption Value="iso_a3_297x420mm">
 <PDLKeyword Value="A3"/>
 <rcNameID Value="RCID_DMPAPER_SYSTEM_NAME"/>
 <BlockMacro Value="=Cmd_Macro_PaperSize_A3"/>
 <DisplayName xml:lang="en-US">A3</DisplayName>
 <PrintableArea ValueType="PAIR" Value="13628,19440"/>
 <PrintableOrigin ValueType="PAIR" Value="200,200"/>
</FeatureOption>
<FeatureOption Value="iso_a4_210x297mm">
 <PDLKeyword Value="A4"/>
 <rcNameID Value="RCID_DMPAPER_SYSTEM_NAME"/>
 <BlockMacro Value="=Cmd_Macro_PaperSize_A4"/>
 <DisplayName xml:lang="en-US">A4</DisplayName>
 <PrintableArea ValueType="PAIR" Value="9520,13628"/>
 <PrintableOrigin ValueType="PAIR" Value="200,200"/>
</FeatureOption>
<FeatureOption Value="iso_a5_148x210mm">
 <PDLKeyword Value="A5"/>
 <rcNameID Value="RCID_DMPAPER_SYSTEM_NAME"/>
```

```xml
  <BlockMacro Value="=Cmd_Macro_PaperSize_A5"/>
  <DisplayName xml:lang="en-US">A5</DisplayName>
  <PrintableArea ValueType="PAIR" Value="6592,9520"/>
  <PrintableOrigin ValueType="PAIR" Value="200,200"/>
</FeatureOption>
<FeatureOption Value="iso_a6_105x148mm">
  <PDLKeyword Value="A6"/>
  <rcNameID Value="RC_STR_A6"/>
  <BlockMacro Value="=Cmd_Macro_PaperSize_A6"/>
  <DisplayName xml:lang="en-US">A6</DisplayName>
  <PageDimensions ValueType="PAIR" Value=""/>
  <PrintableArea ValueType="PAIR" Value="4560,6592"/>
  <PrintableOrigin ValueType="PAIR" Value="200,200"/>
</FeatureOption>
<FeatureOption Value="jis_b4_257x364mm">
  <PDLKeyword Value="B4"/>
  <rcNameID Value="RCID_DMPAPER_SYSTEM_NAME"/>
  <BlockMacro Value="=Cmd_Macro_PaperSize_B4"/>
  <DisplayName xml:lang="en-US">B4</DisplayName>
  <PrintableArea ValueType="PAIR" Value="11740,16796"/>
  <PrintableOrigin ValueType="PAIR" Value="200,200"/>
</FeatureOption>
<FeatureOption Value="jis_b5_182x257mm">
  <PDLKeyword Value="B5"/>
  <rcNameID Value="RCID_DMPAPER_SYSTEM_NAME"/>
  <BlockMacro Value="=Cmd_Macro_PaperSize_B5"/>
  <DisplayName xml:lang="en-US">B5</DisplayName>
  <PrintableArea ValueType="PAIR" Value="8196,11740"/>
  <PrintableOrigin ValueType="PAIR" Value="200,200"/>
</FeatureOption>
<FeatureOption Value="na_number-10_4.125x9.5in">
  <PDLKeyword Value="ENV_10"/>
  <rcNameID Value="RCID_DMPAPER_SYSTEM_NAME"/>
  <BlockMacro Value="=Cmd_Macro_PaperSize_ENV_10"/>
  <DisplayName xml:lang="en-US">ENV_10</DisplayName>
  <PrintableArea ValueType="PAIR" Value="4548,11000"/>
  <PrintableOrigin ValueType="PAIR" Value="200,200"/>
</FeatureOption>
<FeatureOption Value="iso_dl_110x220mm">
  <PDLKeyword Value="ENV_DL"/>
  <rcNameID Value="RCID_DMPAPER_SYSTEM_NAME"/>
  <BlockMacro Value="=Cmd_Macro_PaperSize_ENV_DL"/>
  <DisplayName xml:lang="en-US">ENV_DL</DisplayName>
  <PrintableArea ValueType="PAIR" Value="4796,9992"/>
  <PrintableOrigin ValueType="PAIR" Value="200,200"/>
</FeatureOption>
<FeatureOption Value="na_monarch_3.875x7.5in">
  <PDLKeyword Value="ENV_MONARCH"/>
```

```xml
    <rcNameID Value="RCID_DMPAPER_SYSTEM_NAME"/>
    <BlockMacro Value="=Cmd_Macro_PaperSize_ENV_MONARCH"/>
    <DisplayName xml:lang="en-US">ENV_MONARCH</DisplayName>
    <PrintableArea ValueType="PAIR" Value="4248,8600"/>
    <PrintableOrigin ValueType="PAIR" Value="200,200"/>
</FeatureOption>
<FeatureOption Value="iso_c5_162x229mm">
    <PDLKeyword Value="ENV_C5"/>
    <rcNameID Value="RCID_DMPAPER_SYSTEM_NAME"/>
    <BlockMacro Value="=Cmd_Macro_PaperSize_ENV_C5"/>
    <DisplayName xml:lang="en-US">ENV_C5</DisplayName>
    <PrintableArea ValueType="PAIR" Value="7252,10416"/>
    <PrintableOrigin ValueType="PAIR" Value="200,200"/>
</FeatureOption>
<FeatureOption Value="iso_c6_114x162mm">
    <PDLKeyword Value="ENV_C6"/>
    <rcNameID Value="RCID_DMPAPER_SYSTEM_NAME"/>
    <BlockMacro Value="=Cmd_Macro_PaperSize_ENV_C6"/>
    <DisplayName xml:lang="en-US">ENV_C6</DisplayName>
    <PrintableArea ValueType="PAIR" Value="4984,7252"/>
    <PrintableOrigin ValueType="PAIR" Value="200,200"/>
</FeatureOption>
<FeatureOption Value="na_foolscap_8.5x13in">
    <PDLKeyword Value="FOLIO"/>
    <rcNameID Value="RC_STR_8_5X13"/>
    <BlockMacro Value="=Cmd_Macro_PaperSize_FOLIO"/>
    <DisplayName xml:lang="en-US">FOLIO</DisplayName>
    <PrintableArea ValueType="PAIR" Value="9800,15200"/>
    <PrintableOrigin ValueType="PAIR" Value="200,200"/>
</FeatureOption>
<FeatureOption Value="na_unknown_8.25x13in">
    <PDLKeyword Value="8_25x13"/>
    <rcNameID Value="RC_STR_8_25X13"/>
    <BlockMacro Value="=Cmd_Macro_PaperSize_8_25x13"/>
    <DisplayName xml:lang="en-US">8_25x13</DisplayName>
    <PageDimensions ValueType="PAIR" Value="9900,15600"/>
    <PrintableArea ValueType="PAIR" Value="9500,15200"/>
    <PrintableOrigin ValueType="PAIR" Value="200,200"/>
</FeatureOption>
<FeatureOption Value="na_govt-legal_8x13in">
    <PDLKeyword Value="8x13"/>
    <rcNameID Value="RC_STR_8X13"/>
    <BlockMacro Value="=Cmd_Macro_PaperSize_8x13"/>
    <DisplayName xml:lang="en-US">8x13</DisplayName>
    <PageDimensions ValueType="PAIR" Value="9600,15600"/>
    <PrintableArea ValueType="PAIR" Value="9200,15200"/>
    <PrintableOrigin ValueType="PAIR" Value="200,200"/>
</FeatureOption>
```

```xml
<FeatureOption Value="om_pa-kai_267x389mm">
  <PDLKeyword Value="8kai"/>
  <rcNameID Value="RC_STR_8K"/>
  <BlockMacro Value="=Cmd_Macro_PaperSize_8kai"/>
  <DisplayName xml:lang="en-US">8kai</DisplayName>
  <PageDimensions ValueType="PAIR" Value="12612,18424"/>
  <PrintableArea ValueType="PAIR" Value="12212,18024"/>
  <PrintableOrigin ValueType="PAIR" Value="200,200"/>
</FeatureOption>
<FeatureOption Value="prc_16k_146x215mm">
  <PDLKeyword Value="16kai"/>
  <rcNameID Value="RC_STR_16K"/>
  <BlockMacro Value="=Cmd_Macro_PaperSize_16kai"/>
  <DisplayName xml:lang="en-US">16kai</DisplayName>
  <PageDimensions ValueType="PAIR" Value="9212,12612"/>
  <PrintableArea ValueType="PAIR" Value="8812,12212"/>
  <PrintableOrigin ValueType="PAIR" Value="200,200"/>
</FeatureOption>
<FeatureOption Value="custom_papersize">
  <PDLKeyword Value="CUSTOMSIZE"/>
  <rcNameID Value="RCID_DMPAPER_SYSTEM_NAME"/>
  <BlockMacro Value="=Cmd_Macro_PaperSize_CUSTOMSIZE"/>
  <DisplayName xml:lang="en-US">CUSTOMSIZE</DisplayName>
  <MinSize ValueType="PAIR" Value="4251,6992"/>
  <MaxSize ValueType="PAIR" Value="14412,28346"/>
  <MaxPrintableWidth ValueType="INT" Value="14412"/>
  <MinLeftMargin ValueType="INT" Value="200"/>
  <TopMargin ValueType="INT" Value="200"/>
  <BottomMargin ValueType="INT" Value="200"/>
</FeatureOption>
</DeviceFeature>
<DeviceFeature Value="MediaType">
  <PDLKeyword Value="MediaType"/>
  <rcNameID Value="MEDIA_TYPE_DISPLAY"/>
  <DisplayName xml:lang="en-US">Media</DisplayName>
  <ConflictPriority ValueType="INT" Value="30"/>
  <FeatureOption Value="Auto">
    <PDLKeyword Value="Auto"/>
    <rcNameID Value="HT_AUTO_SELECT_DISPLAY"/>
    <DisplayName xml:lang="en-US">Auto Select</DisplayName>
  </FeatureOption>
  <FeatureOption Value="STANDARD">
    <PDLKeyword Value="STANDARD"/>
    <rcNameID Value="RC_STR_PLAIN"/>
    <DisplayName xml:lang="en-US">Plain Paper</DisplayName>
  </FeatureOption>
  <FeatureOption Value="Recycled">
    <PDLKeyword Value="Recycled"/>
```

```xml
  <rcNameID Value="RC_STR_RECYCLED"/>
  <DisplayName xml:lang="en-US">Recycled</DisplayName>
</FeatureOption>
<FeatureOption Value="Special">
  <PDLKeyword Value="Special"/>
  <rcNameID Value="RC_STR_SPECIAL"/>
  <DisplayName xml:lang="en-US">Special</DisplayName>
</FeatureOption>
<FeatureOption Value="Thick">
  <PDLKeyword Value="Thick"/>
  <rcNameID Value="RC_STR_THICK"/>
  <DisplayName xml:lang="en-US">Thick</DisplayName>
</FeatureOption>
<FeatureOption Value="TRANSPARENCY">
  <PDLKeyword Value="TRANSPARENCY"/>
  <rcNameID Value="TRANSPARENCY_DISPLAY"/>
  <DisplayName xml:lang="en-US">Transparency</DisplayName>
</FeatureOption>
<FeatureOption Value="Color">
  <PDLKeyword Value="Color"/>
  <rcNameID Value="RC_STR_COLOR"/>
  <DisplayName xml:lang="en-US">Color</DisplayName>
</FeatureOption>
<FeatureOption Value="Letterhead">
  <PDLKeyword Value="Letterhead"/>
  <rcNameID Value="RC_STR_LETTERHEAD"/>
  <DisplayName xml:lang="en-US">Letterhead</DisplayName>
</FeatureOption>
<FeatureOption Value="Preprinted">
  <PDLKeyword Value="Preprinted"/>
  <rcNameID Value="RC_STR_PREPRINTED"/>
  <DisplayName xml:lang="en-US">Preprinted</DisplayName>
</FeatureOption>
<FeatureOption Value="Labels">
  <PDLKeyword Value="Labels"/>
  <rcNameID Value="RC_STR_LABELS"/>
  <DisplayName xml:lang="en-US">Labels</DisplayName>
</FeatureOption>
<FeatureOption Value="Plain_Duplex_Backside">
  <PDLKeyword Value="Plain_Duplex_Backside"/>
  <rcNameID Value="RC_STR_PLAIN_DUPLEX_BACKSIDE"/>
  <DisplayName xml:lang="en-US">Plain (Duplex Backside)</DisplayName>
</FeatureOption>
<FeatureOption Value="Thick_Duplex_Backside">
  <PDLKeyword Value="Thick_Duplex_Backside"/>
  <rcNameID Value="RC_STR_THICK_DUPLEX_BACKSIDE"/>
  <DisplayName xml:lang="en-US">Thick (Duplex Backside)</DisplayName>
</FeatureOption>
```

```xml
</DeviceFeature>
<DeviceFeature Value="InputBins">
 <PDLKeyword Value="InputBin"/>
 <rcNameID Value="PAPER_SOURCE_DISPLAY"/>
 <DefaultOption>AUTO</DefaultOption>
 <DisplayName xml:lang="en-US">Paper Source</DisplayName>
 <ConflictPriority ValueType="INT" Value="20"/>
 <FeatureOption Value="AUTO">
  <PDLKeyword Value="AUTO"/>
  <rcNameID Value="RC_STR_AUTO_SELECT_BY_PRINTER"/>
  <DisplayName xml:lang="en-US">Auto Select by Printer</DisplayName>
 </FeatureOption>
 <FeatureOption Value="Bypass">
  <PDLKeyword Value="BypassTray"/>
  <rcNameID Value="RC_STR_BYPASS_TRAY"/>
  <OptionID Value="RI_DMBINBYPASS_TRAY"/>
  <DisplayName xml:lang="en-US">Bypass Tray</DisplayName>
 </FeatureOption>
 <FeatureOption Value="Tray1">
  <PDLKeyword Value="Tray1"/>
  <rcNameID Value="RC_STR_TRAY1"/>
  <OptionID Value="RI_DMBIN_TRAY1"/>
  <DisplayName xml:lang="en-US">Tray 1</DisplayName>
 </FeatureOption>
 <FeatureOption Value="Tray2">
  <PDLKeyword Value="Tray2"/>
  <rcNameID Value="RC_STR_TRAY2"/>
  <OptionID Value="RI_DMBIN_TRAY2"/>
  <DisplayName xml:lang="en-US">Tray 2</DisplayName>
 </FeatureOption>
 <FeatureOption Value="Tray3">
  <PDLKeyword Value="Tray3"/>
  <rcNameID Value="RC_STR_TRAY3"/>
  <OptionID Value="RI_DMBIN_TRAY3"/>
  <DisplayName xml:lang="en-US">Tray 3</DisplayName>
 </FeatureOption>
 <FeatureOption Value="Tray4">
  <PDLKeyword Value="Tray4"/>
  <rcNameID Value="RC_STR_TRAY4"/>
  <OptionID Value="RI_DMBIN_TRAY4"/>
  <DisplayName xml:lang="en-US">Tray 4</DisplayName>
 </FeatureOption>
 <FeatureOption Value="LargeCapacity">
  <PDLKeyword Value="LARGECAPACITY"/>
  <rcNameID Value="RC_STR_LARGE_CAPACITY_TRAY"/>
  <DisplayName xml:lang="en-US">Large Capacity Tray</DisplayName>
 </FeatureOption>
</DeviceFeature>
```

```xml
<DeviceFeature Value="SlipSheet">
 <PDLKeyword Value="SlipSheet"/>
 <rcNameID Value="RC_STR_SLIPSHEET"/>
 <DefaultOption>OFF</DefaultOption>
 <DisplayName xml:lang="en-US">Slip Sheet</DisplayName>
 <ConflictPriority ValueType="INT" Value="10"/>
 <FeatureOption Value="OFF">
  <PDLKeyword Value="OFF"/>
  <rcNameID Value="OFF_DISPLAY"/>
  <DisplayName xml:lang="en-US">Off</DisplayName>
 </FeatureOption>
 <FeatureOption Value="ON">
  <PDLKeyword Value="ON"/>
  <rcNameID Value="ON_DISPLAY"/>
  <DisplayName xml:lang="en-US">On</DisplayName>
 </FeatureOption>
</DeviceFeature>
<DeviceFeature Value="SlipSheetInputBin">
 <PDLKeyword Value="SlipSheetInputBin"/>
 <rcNameID Value="RC_STR_SLIPSHEET_PAPER_SOURCE"/>
 <DefaultOption>Bypass</DefaultOption>
 <DisplayName xml:lang="en-US">Slip Sheet Paper Source</DisplayName>
 <FeatureOption Value="Bypass">
  <PDLKeyword Value="BypassTray"/>
  <rcNameID Value="RC_STR_BYPASS_TRAY"/>
  <DisplayName xml:lang="en-US">Bypass Tray</DisplayName>
 </FeatureOption>
 <FeatureOption Value="Tray1">
  <PDLKeyword Value="Tray1"/>
  <rcNameID Value="RC_STR_TRAY1"/>
  <DisplayName xml:lang="en-US">Tray 1</DisplayName>
 </FeatureOption>
 <FeatureOption Value="Tray2">
  <PDLKeyword Value="Tray2"/>
  <rcNameID Value="RC_STR_TRAY2"/>
  <DisplayName xml:lang="en-US">Tray 2</DisplayName>
 </FeatureOption>
 <FeatureOption Value="Tray3">
  <PDLKeyword Value="Tray3"/>
  <rcNameID Value="RC_STR_TRAY3"/>
  <DisplayName xml:lang="en-US">Tray 3</DisplayName>
 </FeatureOption>
 <FeatureOption Value="Tray4">
  <PDLKeyword Value="Tray4"/>
  <rcNameID Value="RC_STR_TRAY4"/>
  <DisplayName xml:lang="en-US">Tray 4</DisplayName>
 </FeatureOption>
 <FeatureOption Value="LargeCapacity">
```

```xml
    <PDLKeyword Value="LARGECAPACITY"/>
    <rcNameID Value="RC_STR_LARGE_CAPACITY_TRAY"/>
    <DisplayName xml:lang="en-US">Large Capacity Tray</DisplayName>
  </FeatureOption>
</DeviceFeature>
<DeviceFeature Value="OutputBins">
  <PDLKeyword Value="OutputBin"/>
  <rcNameID Value="OUTPUTBIN_DISPLAY"/>
  <DefaultOption>PrinterDefault</DefaultOption>
  <DisplayName xml:lang="en-US">Output Bin</DisplayName>
  <FeatureOption Value="PrinterDefault">
    <PDLKeyword Value="PrinterDefault"/>
    <rcNameID Value="RC_STR_PRINTER_DEFAULT"/>
    <DisplayName xml:lang="en-US">Printer Default</DisplayName>
  </FeatureOption>
  <FeatureOption Value="StandardTray">
    <PDLKeyword Value="StandardTray"/>
    <rcNameID Value="RC_STR_STANDARD_TRAY"/>
    <DisplayName xml:lang="en-US">Standard Tray</DisplayName>
    <DisabledFeatures ValueType="LIST">
      <DisabledFeature Value="Staple"/>
    </DisabledFeatures>
    <DisabledFeatures ValueType="LIST">
      <DisabledFeature Value="HolePunch"/>
    </DisabledFeatures>
    <Constraints>
      <Constraint Feature="Staple" Option="TopLeft"/>
      <Constraint Feature="Staple" Option="TopLeftSlant"/>
      <Constraint Feature="Staple" Option="TopRight"/>
      <Constraint Feature="Staple" Option="TopRightSlant"/>
      <Constraint Feature="Staple" Option="Top2"/>
      <Constraint Feature="Staple" Option="Left2"/>
      <Constraint Feature="Staple" Option="Right2"/>
      <Constraint Feature="Staple" Option="Booklet"/>
      <Constraint Feature="HolePunch" Option="Left2"/>
      <Constraint Feature="HolePunch" Option="Top2"/>
      <Constraint Feature="HolePunch" Option="Right2"/>
      <Constraint Feature="HolePunch" Option="Left3"/>
      <Constraint Feature="HolePunch" Option="Top3"/>
      <Constraint Feature="HolePunch" Option="Right3"/>
      <Constraint Feature="HolePunch" Option="Left4"/>
      <Constraint Feature="HolePunch" Option="Top4"/>
      <Constraint Feature="HolePunch" Option="Right4"/>
    </Constraints>
  </FeatureOption>
  <FeatureOption Value="ExternalTray">
    <PDLKeyword Value="ExternalTray"/>
    <rcNameID Value="RC_STR_EXTERNAL_TRAY"/>
```

```xml
<DisplayName xml:lang="en-US">External Tray</DisplayName>
<DisabledFeatures ValueType="LIST">
  <DisabledFeature Value="Staple"/>
</DisabledFeatures>
<DisabledFeatures ValueType="LIST">
  <DisabledFeature Value="HolePunch"/>
</DisabledFeatures>
<Constraints>
  <Constraint Feature="Staple" Option="TopLeft"/>
  <Constraint Feature="Staple" Option="TopLeftSlant"/>
  <Constraint Feature="Staple" Option="TopRight"/>
  <Constraint Feature="Staple" Option="TopRightSlant"/>
  <Constraint Feature="Staple" Option="Top2"/>
  <Constraint Feature="Staple" Option="Left2"/>
  <Constraint Feature="Staple" Option="Right2"/>
  <Constraint Feature="Staple" Option="Booklet"/>
  <Constraint Feature="HolePunch" Option="Left2"/>
  <Constraint Feature="HolePunch" Option="Top2"/>
  <Constraint Feature="HolePunch" Option="Right2"/>
  <Constraint Feature="HolePunch" Option="Left3"/>
  <Constraint Feature="HolePunch" Option="Top3"/>
  <Constraint Feature="HolePunch" Option="Right3"/>
  <Constraint Feature="HolePunch" Option="Left4"/>
  <Constraint Feature="HolePunch" Option="Top4"/>
  <Constraint Feature="HolePunch" Option="Right4"/>
  <Constraint Feature="Sides" Option="TwoSidedLongEdge"/>
  <Constraint Feature="Sides" Option="TwoSidedShortEdge"/>
</Constraints>
</FeatureOption>
<FeatureOption Value="FinisherShiftTray1">
  <PDLKeyword Value="FinisherShiftTray1"/>
  <rcNameID Value="RC_STR_FINISHER_SHIFT_TRAY1"/>
  <DisplayName xml:lang="en-US">Finisher Shift Tray 1</DisplayName>
  <Constraints>
    <Constraint Feature="Staple" Option="Booklet"/>
  </Constraints>
</FeatureOption>
<FeatureOption Value="FinisherShiftTray2">
  <PDLKeyword Value="FinisherShiftTray2"/>
  <rcNameID Value="RC_STR_FINISHER_SHIFT_TRAY2"/>
  <DisplayName xml:lang="en-US">Finisher Shift Tray 2</DisplayName>
  <Constraints>
    <Constraint Feature="Staple" Option="Booklet"/>
  </Constraints>
</FeatureOption>
<FeatureOption Value="FinisherShiftTray">
  <PDLKeyword Value="FinisherShiftTray"/>
  <rcNameID Value="RC_STR_FINISHER_SHIFT_TRAY"/>
```

```xml
<DisplayName xml:lang="en-US">Finisher Shift Tray</DisplayName>
<Constraints>
  <Constraint Feature="Staple" Option="Booklet"/>
</Constraints>
</FeatureOption>
<FeatureOption Value="FinisherBookletTray">
  <PDLKeyword Value="FinisherBookletTray"/>
  <rcNameID Value="RC_STR_BOOKLET_FINISHER_TRAY"/>
  <DisplayName xml:lang="en-US">Booklet Finisher Tray</DisplayName>
  <DisabledFeatures ValueType="LIST">
    <DisabledFeature Value="HolePunch"/>
  </DisabledFeatures>
  <Constraints>
    <Constraint Feature="Staple" Option="TopLeft"/>
    <Constraint Feature="Staple" Option="TopLeftSlant"/>
    <Constraint Feature="Staple" Option="TopRight"/>
    <Constraint Feature="Staple" Option="TopRightSlant"/>
    <Constraint Feature="Staple" Option="Top2"/>
    <Constraint Feature="Staple" Option="Left2"/>
    <Constraint Feature="Staple" Option="Right2"/>
    <Constraint Feature="HolePunch" Option="Left2"/>
    <Constraint Feature="HolePunch" Option="Top2"/>
    <Constraint Feature="HolePunch" Option="Right2"/>
    <Constraint Feature="HolePunch" Option="Left3"/>
    <Constraint Feature="HolePunch" Option="Top3"/>
    <Constraint Feature="HolePunch" Option="Right3"/>
    <Constraint Feature="HolePunch" Option="Left4"/>
    <Constraint Feature="HolePunch" Option="Top4"/>
    <Constraint Feature="HolePunch" Option="Right4"/>
  </Constraints>
</FeatureOption>
<FeatureOption Value="LeftTray1">
  <PDLKeyword Value="LeftTray1"/>
  <rcNameID Value="RC_STR_LEFT_TRAY1"/>
  <DisplayName xml:lang="en-US">Left Tray 1</DisplayName>
  <DisabledFeatures ValueType="LIST">
    <DisabledFeature Value="Staple"/>
  </DisabledFeatures>
  <DisabledFeatures ValueType="LIST">
    <DisabledFeature Value="HolePunch"/>
  </DisabledFeatures>
  <Constraints>
    <Constraint Feature="Staple" Option="TopLeft"/>
    <Constraint Feature="Staple" Option="TopLeftSlant"/>
    <Constraint Feature="Staple" Option="TopRight"/>
    <Constraint Feature="Staple" Option="TopRightSlant"/>
    <Constraint Feature="Staple" Option="Top2"/>
    <Constraint Feature="Staple" Option="Left2"/>
```

```xml
    <Constraint Feature="Staple" Option="Right2"/>
    <Constraint Feature="Staple" Option="Booklet"/>
    <Constraint Feature="HolePunch" Option="Left2"/>
    <Constraint Feature="HolePunch" Option="Top2"/>
    <Constraint Feature="HolePunch" Option="Right2"/>
    <Constraint Feature="HolePunch" Option="Left3"/>
    <Constraint Feature="HolePunch" Option="Top3"/>
    <Constraint Feature="HolePunch" Option="Right3"/>
    <Constraint Feature="HolePunch" Option="Left4"/>
    <Constraint Feature="HolePunch" Option="Top4"/>
    <Constraint Feature="HolePunch" Option="Right4"/>
  </Constraints>
 </FeatureOption>
 <FeatureOption Value="LeftTray2">
  <PDLKeyword Value="LeftTray2"/>
  <rcNameID Value="RC_STR_LEFT_TRAY2"/>
  <DisplayName xml:lang="en-US">Left Tray 2</DisplayName>
  <DisabledFeatures ValueType="LIST">
   <DisabledFeature Value="Staple"/>
  </DisabledFeatures>
  <DisabledFeatures ValueType="LIST">
   <DisabledFeature Value="HolePunch"/>
  </DisabledFeatures>
  <Constraints>
   <Constraint Feature="Staple" Option="TopLeft"/>
   <Constraint Feature="Staple" Option="TopLeftSlant"/>
   <Constraint Feature="Staple" Option="TopRight"/>
   <Constraint Feature="Staple" Option="TopRightSlant"/>
   <Constraint Feature="Staple" Option="Top2"/>
   <Constraint Feature="Staple" Option="Left2"/>
   <Constraint Feature="Staple" Option="Right2"/>
   <Constraint Feature="Staple" Option="Booklet"/>
   <Constraint Feature="HolePunch" Option="Left2"/>
   <Constraint Feature="HolePunch" Option="Top2"/>
   <Constraint Feature="HolePunch" Option="Right2"/>
   <Constraint Feature="HolePunch" Option="Left3"/>
   <Constraint Feature="HolePunch" Option="Top3"/>
   <Constraint Feature="HolePunch" Option="Right3"/>
   <Constraint Feature="HolePunch" Option="Left4"/>
   <Constraint Feature="HolePunch" Option="Top4"/>
   <Constraint Feature="HolePunch" Option="Right4"/>
  </Constraints>
 </FeatureOption>
</DeviceFeature>
<DeviceFeature Value="Staple">
 <PDLKeyword Value="Stapling"/>
 <rcNameID Value="RC_STR_STAPLE"/>
 <DefaultOption>OFF</DefaultOption>
```

```xml
<DisplayName xml:lang="en-US">Staple</DisplayName>
<FeatureOption Value="OFF">
 <PDLKeyword Value="OFF"/>
 <rcNameID Value="OFF_DISPLAY"/>
 <DisplayName xml:lang="en-US">OFF</DisplayName>
</FeatureOption>
<FeatureOption Value="TopLeft">
 <PDLKeyword Value="TopLeft"/>
 <rcNameID Value="RC_STR_TOP_LEFT"/>
 <DisplayName xml:lang="en-US">Top Left</DisplayName>
</FeatureOption>
<FeatureOption Value="TopRight">
 <PDLKeyword Value="TopRight"/>
 <rcNameID Value="RC_STR_TOP_RIGHT"/>
 <DisplayName xml:lang="en-US">Top Right</DisplayName>
</FeatureOption>
<FeatureOption Value="Left2">
 <PDLKeyword Value="Left2"/>
 <rcNameID Value="RC_STR_LEFT2"/>
 <DisplayName xml:lang="en-US">Left 2</DisplayName>
</FeatureOption>
<FeatureOption Value="Top2">
 <PDLKeyword Value="Top2"/>
 <rcNameID Value="RC_STR_TOP2"/>
 <DisplayName xml:lang="en-US">Top 2</DisplayName>
</FeatureOption>
<FeatureOption Value="Right2">
 <PDLKeyword Value="Right2"/>
 <rcNameID Value="RC_STR_RIGHT2"/>
 <DisplayName xml:lang="en-US">Right 2</DisplayName>
</FeatureOption>
<FeatureOption Value="TopLeftSlant">
 <PDLKeyword Value="TopLeftSlant"/>
 <rcNameID Value="RC_STR_TOP_LEFT_SLANT"/>
 <DisplayName xml:lang="en-US">Top Left Slant</DisplayName>
</FeatureOption>
<FeatureOption Value="TopRightSlant">
 <PDLKeyword Value="TopRightSlant"/>
 <rcNameID Value="RC_STR_TOP_RIGHT_SLANT"/>
 <DisplayName xml:lang="en-US">Top Right Slant</DisplayName>
</FeatureOption>
<FeatureOption Value="Booklet">
 <PDLKeyword Value="Booklet"/>
 <rcNameID Value="RC_STR_BOOKLET"/>
 <DisplayName xml:lang="en-US">Booklet</DisplayName>
</FeatureOption>
</DeviceFeature>
<DeviceFeature Value="HolePunch">
```

```xml
<PDLKeyword Value="Punching"/>
<rcNameID Value="RC_STR_PUNCH"/>
<DefaultOption>OFF</DefaultOption>
<DisplayName xml:lang="en-US">Punch</DisplayName>
<FeatureOption Value="OFF">
 <PDLKeyword Value="OFF"/>
 <rcNameID Value="OFF_DISPLAY"/>
 <DisplayName xml:lang="en-US">OFF</DisplayName>
</FeatureOption>
<FeatureOption Value="Left2">
 <PDLKeyword Value="Left2"/>
 <rcNameID Value="RC_STR_LEFT2"/>
 <DisplayName xml:lang="en-US">Left 2</DisplayName>
</FeatureOption>
<FeatureOption Value="Top2">
 <PDLKeyword Value="Top2"/>
 <rcNameID Value="RC_STR_TOP2"/>
 <DisplayName xml:lang="en-US">Top 2</DisplayName>
</FeatureOption>
<FeatureOption Value="Right2">
 <PDLKeyword Value="Right2"/>
 <rcNameID Value="RC_STR_RIGHT2"/>
 <DisplayName xml:lang="en-US">Right 2</DisplayName>
</FeatureOption>
<FeatureOption Value="Left3">
 <PDLKeyword Value="Left3"/>
 <rcNameID Value="RC_STR_LEFT3"/>
 <DisplayName xml:lang="en-US">Left 3</DisplayName>
</FeatureOption>
<FeatureOption Value="Top3">
 <PDLKeyword Value="Top3"/>
 <rcNameID Value="RC_STR_TOP3"/>
 <DisplayName xml:lang="en-US">Top 3</DisplayName>
</FeatureOption>
<FeatureOption Value="Right3">
 <PDLKeyword Value="Right3"/>
 <rcNameID Value="RC_STR_RIGHT3"/>
 <DisplayName xml:lang="en-US">Right 3</DisplayName>
</FeatureOption>
<FeatureOption Value="Left4">
 <PDLKeyword Value="Left4"/>
 <rcNameID Value="RC_STR_LEFT4"/>
 <DisplayName xml:lang="en-US">Left 4</DisplayName>
</FeatureOption>
<FeatureOption Value="Top4">
 <PDLKeyword Value="Top4"/>
 <rcNameID Value="RC_STR_TOP4"/>
 <DisplayName xml:lang="en-US">Top 4</DisplayName>
```

```xml
    </FeatureOption>
    <FeatureOption Value="Right4">
      <PDLKeyword Value="Right4"/>
      <rcNameID Value="RC_STR_RIGHT4"/>
      <DisplayName xml:lang="en-US">Right 4</DisplayName>
    </FeatureOption>
  </DeviceFeature>
  <DeviceFeature Value="Orientation">
    <PDLKeyword Value="Orientation"/>
    <rcNameID Value="ORIENTATION_DISPLAY"/>
    <DisplayName xml:lang="en-US">Orientation</DisplayName>
    <FeatureOption Value="Landscape">
      <PDLKeyword Value="LANDSCAPE_CC90"/>
      <rcNameID Value="LANDSCAPE_DISPLAY"/>
      <DisplayName xml:lang="en-US">Landscape</DisplayName>
    </FeatureOption>
    <FeatureOption Value="Portrait">
      <PDLKeyword Value="PORTRAIT"/>
      <rcNameID Value="PORTRAIT_DISPLAY"/>
      <DisplayName xml:lang="en-US">Portrait</DisplayName>
    </FeatureOption>
  </DeviceFeature>
  <DeviceFeature Value="Sides">
    <PDLKeyword Value="Duplex"/>
    <rcNameID Value="TWO_SIDED_PRINTING_DISPLAY"/>
    <DisplayName xml:lang="en-US">Print on Both Sides</DisplayName>
    <FeatureOption Value="OneSided">
      <PDLKeyword Value="NONE"/>
      <rcNameID Value="NONE_DISPLAY"/>
      <DisplayName xml:lang="en-US">None</DisplayName>
    </FeatureOption>
    <FeatureOption Value="TwoSidedLongEdge">
      <PDLKeyword Value="VERTICAL"/>
      <rcNameID Value="FLIP_ON_LONG_EDGE_DISPLAY"/>
      <DisplayName xml:lang="en-US">Flip on long edge</DisplayName>
    </FeatureOption>
    <FeatureOption Value="TwoSidedShortEdge">
      <PDLKeyword Value="HORIZONTAL"/>
      <rcNameID Value="FLIP_ON_SHORT_EDGE_DISPLAY"/>
      <DisplayName xml:lang="en-US">Flip on short edge</DisplayName>
    </FeatureOption>
  </DeviceFeature>
  <DeviceFeature Value="Resolution">
    <PDLKeyword Value="Resolution"/>
    <rcNameID Value="RESOLUTION_DISPLAY"/>
    <DisplayName xml:lang="en-US">Resolution</DisplayName>
    <FeatureOption Value="600">
      <PDLKeyword Value="600dpi"/>
```

```xml
    <rcNameID Value="RC_STR_600DPI"/>
    <DisplayName xml:lang="en-US">600dpi</DisplayName>
   </FeatureOption>
   <FeatureOption Value="1200">
    <PDLKeyword Value="1200dpi"/>
    <rcNameID Value="RC_STR_1200DPI"/>
    <DisplayName xml:lang="en-US">1200dpi</DisplayName>
   </FeatureOption>
  </DeviceFeature>
  <DeviceFeature Value="TrueTypeFormat"/>
  <DeviceFeature Value="ColorMode">
   <PDLKeyword Value="ColorMode"/>
   <rcNameID Value="COLOR_PRINTING_MODE_DISPLAY"/>
   <DefaultOption>24bpp</DefaultOption>
   <DisplayName xml:lang="en-US">Color Mode</DisplayName>
   <FeatureOption Value="24bpp">
    <PDLKeyword Value="24bpp"/>
    <rcNameID Value="24BPP_DISPLAY"/>
    <DisplayName xml:lang="en-US">True Color (24BPP)</DisplayName>
   </FeatureOption>
   <FeatureOption Value="Mono">
    <PDLKeyword Value="Mono"/>
    <rcNameID Value="MONO_DISPLAY"/>
    <DisplayName xml:lang="en-US">Monochrome</DisplayName>
   </FeatureOption>
  </DeviceFeature>
  <DeviceFeature Value="RAM" PrinterProperty="true">
   <DisplayName xml:lang="en-US">Printer Memory</DisplayName>
   <DefaultOption>65536KB</DefaultOption>
   <ConcealFromUI ValueType="BOOL" Value="TRUE"/>
   <FeatureOption Value="65536KB">
    <PDLKeyword Value="65536KB"/>
    <DisplayName xml:lang="en-US">64MB</DisplayName>
   </FeatureOption>
  </DeviceFeature>
  <DeviceFeature Value="HardDisk" PrinterProperty="true">
   <DisplayName xml:lang="en-US">HardDisk</DisplayName>
   <DefaultOption>Installed</DefaultOption>
   <ConcealFromUI ValueType="BOOL" Value="TRUE"/>
   <FeatureOption Value="Installed">
    <PDLKeyword Value="Installed"/>
    <rcNameID Value="RC_STR_INSTALLED"/>
    <DisplayName xml:lang="en-US">Installed</DisplayName>
   </FeatureOption>
  </DeviceFeature>
  <DeviceFeature Value="UVCoating" PrinterProperty="true">
   <PDLKeyword Value="UVCoatingPDLName"/>
   <DisplayName xml:lang="en-US">UVCoatingDisplayName_ENG</DisplayName>
```

```xml
<DisplayName xml:lang="ja-JP">UVCoatingDisplayName_JP_特徴</DisplayName>
<DisplayName xml:lang="zh-CN">UVCoatingDisplayName_CN_渡膜</DisplayName>
<DefaultOption>UVCoatingOption1</DefaultOption>
<FeatureOption Value="UVCoatingOption1">
  <DisplayName xml:lang="en-US">UVCoatingOption1DisplayName_ENG</DisplayName>
  <DisplayName xml:lang="ja-JP">UVCoatingOption1DisplayName_JP_コーティング_オプション_1</DisplayName>
  <DisplayName xml:lang="zh-CN">UVCoatingOption1DisplayName_CN_渡膜_选项1</DisplayName>
</FeatureOption>
<FeatureOption Value="UVCoatingOption2">
  <DisplayName xml:lang="en-US">UVCoatingOption2DisplayName_ENG</DisplayName>
  <DisplayName xml:lang="ja-JP">UVCoatingOption2DisplayName_JP_コーティング_オプション_2</DisplayName>
  <DisplayName xml:lang="zh-CN">UVCoatingOption2DisplayName_CN_渡膜_选项2</DisplayName>
</FeatureOption>
<FeatureOption Value="UVCoatingOption3">
  <DisplayName xml:lang="en-US">UVCoatingOption3DisplayName_ENG</DisplayName>
  <DisplayName xml:lang="ja-JP">UVCoatingOption3DisplayName_JP_コーティング_オプション_3</DisplayName>
  <DisplayName xml:lang="zh-CN">UVCoatingOption3DisplayName_CN_渡膜_选项3</DisplayName>
</FeatureOption>
</DeviceFeature>
<DeviceFeature Value="Copies" MinValue="1" MaxValue="999999"/>
<DeviceFeature Value="PagesPerSheet">
  <FeatureOption Value="1"/>
  <FeatureOption Value="2"/>
  <FeatureOption Value="4"/>
  <FeatureOption Value="9"/>
  <FeatureOption Value="16"/>
</DeviceFeature>
<DeviceFeature Value="Direction">
  <FeatureOption Value="RightDown"/>
  <FeatureOption Value="DownRight"/>
  <FeatureOption Value="LeftDown"/>
  <FeatureOption Value="DownLeft"/>
</DeviceFeature>
<DeviceFeature Value="Collate">
  <PDLKeyword Value="Collate"/>
  <DisplayName xml:lang="en-US">Collate</DisplayName>
  <FeatureOption Value="false">
```

```xml
  <PDLKeyword Value="OFF"/>
  <rcNameID Value="OFF_DISPLAY"/>
  <DisplayName xml:lang="en-US">OFF</DisplayName>
 </FeatureOption>
 <FeatureOption Value="true">
  <PDLKeyword Value="ON"/>
  <rcNameID Value="ON_DISPLAY"/>
  <DisplayName xml:lang="en-US">ON</DisplayName>
 </FeatureOption>
</DeviceFeature>
<DeviceFeature Value="Dither">
 <PDLKeyword Value="Dither"/>
 <rcNameID Value="RC_STR_DITHER_QUALITY"/>
 <DefaultOption>High</DefaultOption>
 <DisplayName xml:lang="en-US">Dither</DisplayName>
 <FeatureOption Value="High">
  <PDLKeyword Value="High"/>
  <rcNameID Value="RC_STR_HIGH"/>
  <DisplayName xml:lang="en-US">High</DisplayName>
 </FeatureOption>
 <FeatureOption Value="Low">
  <PDLKeyword Value="Low"/>
  <rcNameID Value="RC_STR_LOW"/>
  <DisplayName xml:lang="en-US">Low</DisplayName>
 </FeatureOption>
</DeviceFeature>
<DeviceFeature Value="Support8CharPassword">
 <DisplayName xml:lang="en-US">Support8CharPassword</DisplayName>
 <ConcealFromUI ValueType="BOOL" Value="TRUE"/>
 <DefaultOption>ON</DefaultOption>
 <FeatureOption Value="ON">
  <DisplayName xml:lang="en-US">ON</DisplayName>
 </FeatureOption>
</DeviceFeature>
<DeviceFeature Value="SupportDocUiReplace">
 <DisplayName xml:lang="en-US">SupportDocUiReplace</DisplayName>
 <ConcealFromUI ValueType="BOOL" Value="TRUE"/>
 <DefaultOption>ON</DefaultOption>
 <FeatureOption Value="ON">
  <DisplayName xml:lang="en-US">ON</DisplayName>
 </FeatureOption>
</DeviceFeature>
<DeviceFeature Value="AutoConfig">
 <DisplayName xml:lang="en-US">AutoConfig</DisplayName>
 <ConcealFromUI ValueType="BOOL" Value="TRUE"/>
 <DefaultOption>ON</DefaultOption>
 <FeatureOption Value="ON">
  <DisplayName xml:lang="en-US">ON</DisplayName>
```

```xml
    </FeatureOption>
   </DeviceFeature>
   <DeviceFeature Value="SupportSamplePrint">
    <DisplayName xml:lang="en-US">SupportSamplePrint</DisplayName>
    <ConcealFromUI ValueType="BOOL" Value="TRUE"/>
    <DefaultOption>ON</DefaultOption>
    <FeatureOption Value="ON">
     <DisplayName xml:lang="en-US">ON</DisplayName>
    </FeatureOption>
   </DeviceFeature>
   <DeviceFeature Value="SupportSecurePrint">
    <DisplayName xml:lang="en-US">SupportSecurePrint</DisplayName>
    <ConcealFromUI ValueType="BOOL" Value="TRUE"/>
    <DefaultOption>ON</DefaultOption>
    <FeatureOption Value="ON">
     <DisplayName xml:lang="en-US">ON</DisplayName>
    </FeatureOption>
   </DeviceFeature>
   <DeviceFeature Value="SupportHoldPrint">
    <DisplayName xml:lang="en-US">SupportHoldPrint</DisplayName>
    <ConcealFromUI ValueType="BOOL" Value="TRUE"/>
    <DefaultOption>ON</DefaultOption>
    <FeatureOption Value="ON">
     <DisplayName xml:lang="en-US">ON</DisplayName>
    </FeatureOption>
   </DeviceFeature>
   <DeviceFeature Value="SupportStoredPrint">
    <DisplayName xml:lang="en-US">SupportStoredPrint</DisplayName>
    <ConcealFromUI ValueType="BOOL" Value="TRUE"/>
    <DefaultOption>ON</DefaultOption>
    <FeatureOption Value="ON">
     <DisplayName xml:lang="en-US">ON</DisplayName>
    </FeatureOption>
   </DeviceFeature>
   <DeviceFeature Value="SupportDocumentBox">
    <DisplayName xml:lang="en-US">SupportDocumentBox</DisplayName>
    <ConcealFromUI ValueType="BOOL" Value="TRUE"/>
    <DefaultOption>ON</DefaultOption>
    <FeatureOption Value="ON">
     <DisplayName xml:lang="en-US">ON</DisplayName>
    </FeatureOption>
   </DeviceFeature>
  </DeviceFeatures>
  <GlobalConstraints>
   <InvalidCombinations>
    <InvalidCombination Feature="InputBins" Option="Tray1"/>
    <InvalidCombination Feature="MediaType" Option="TRANSPARENCY"/>
   </InvalidCombinations>
```

```xml
<InvalidCombinations>
 <InvalidCombination Feature="InputBins" Option="Tray1"/>
 <InvalidCombination Feature="MediaType" Option="Thick"/>
</InvalidCombinations>
<InvalidCombinations>
 <InvalidCombination Feature="InputBins" Option="Tray1"/>
 <InvalidCombination Feature="MediaType" Option="Labels"/>
</InvalidCombinations>
<InvalidCombinations>
 <InvalidCombination Feature="InputBins" Option="Tray1"/>
 <InvalidCombination Feature="MediaType" Option="Plain_Duplex_Backside"/>
</InvalidCombinations>
<InvalidCombinations>
 <InvalidCombination Feature="InputBins" Option="Tray1"/>
 <InvalidCombination Feature="MediaType" Option="Thick_Duplex_Backside"/>
</InvalidCombinations>
<InvalidCombinations>
 <InvalidCombination Feature="InputBins" Option="Tray2"/>
 <InvalidCombination Feature="MediaType" Option="TRANSPARENCY"/>
</InvalidCombinations>
<InvalidCombinations>
 <InvalidCombination Feature="InputBins" Option="Tray2"/>
 <InvalidCombination Feature="MediaType" Option="Thick"/>
</InvalidCombinations>
<InvalidCombinations>
 <InvalidCombination Feature="InputBins" Option="Tray2"/>
 <InvalidCombination Feature="MediaType" Option="Labels"/>
</InvalidCombinations>
<InvalidCombinations>
 <InvalidCombination Feature="InputBins" Option="Tray2"/>
 <InvalidCombination Feature="MediaType" Option="Plain_Duplex_Backside"/>
</InvalidCombinations>
<InvalidCombinations>
 <InvalidCombination Feature="InputBins" Option="Tray2"/>
 <InvalidCombination Feature="MediaType" Option="Thick_Duplex_Backside"/>
</InvalidCombinations>
<InvalidCombinations>
 <InvalidCombination Feature="InputBins" Option="Tray3"/>
 <InvalidCombination Feature="MediaType" Option="TRANSPARENCY"/>
</InvalidCombinations>
<InvalidCombinations>
 <InvalidCombination Feature="InputBins" Option="Tray3"/>
 <InvalidCombination Feature="MediaType" Option="Thick"/>
</InvalidCombinations>
<InvalidCombinations>
 <InvalidCombination Feature="InputBins" Option="Tray3"/>
 <InvalidCombination Feature="MediaType" Option="Labels"/>
</InvalidCombinations>
```

```xml
<InvalidCombinations>
 <InvalidCombination Feature="InputBins" Option="Tray3"/>
 <InvalidCombination Feature="MediaType" Option="Plain_Duplex_Backside"/>
</InvalidCombinations>
<InvalidCombinations>
 <InvalidCombination Feature="InputBins" Option="Tray3"/>
 <InvalidCombination Feature="MediaType" Option="Thick_Duplex_Backside"/>
</InvalidCombinations>
<InvalidCombinations>
 <InvalidCombination Feature="InputBins" Option="Tray4"/>
 <InvalidCombination Feature="MediaType" Option="TRANSPARENCY"/>
</InvalidCombinations>
<InvalidCombinations>
 <InvalidCombination Feature="InputBins" Option="Tray4"/>
 <InvalidCombination Feature="MediaType" Option="Thick"/>
</InvalidCombinations>
<InvalidCombinations>
 <InvalidCombination Feature="InputBins" Option="Tray4"/>
 <InvalidCombination Feature="MediaType" Option="Labels"/>
</InvalidCombinations>
<InvalidCombinations>
 <InvalidCombination Feature="InputBins" Option="Tray4"/>
 <InvalidCombination Feature="MediaType" Option="Plain_Duplex_Backside"/>
</InvalidCombinations>
<InvalidCombinations>
 <InvalidCombination Feature="InputBins" Option="Tray4"/>
 <InvalidCombination Feature="MediaType" Option="Thick_Duplex_Backside"/>
</InvalidCombinations>
<InvalidCombinations>
 <InvalidCombination Feature="InputBins" Option="LARGECAPACITY"/>
 <InvalidCombination Feature="MediaType" Option="TRANSPARENCY"/>
</InvalidCombinations>
<InvalidCombinations>
 <InvalidCombination Feature="InputBins" Option="LARGECAPACITY"/>
 <InvalidCombination Feature="MediaType" Option="Thick"/>
</InvalidCombinations>
<InvalidCombinations>
 <InvalidCombination Feature="InputBins" Option="LARGECAPACITY"/>
 <InvalidCombination Feature="MediaType" Option="Labels"/>
</InvalidCombinations>
<InvalidCombinations>
 <InvalidCombination Feature="InputBins" Option="LARGECAPACITY"/>
 <InvalidCombination Feature="MediaType" Option="Plain_Duplex_Backside"/>
</InvalidCombinations>
<InvalidCombinations>
 <InvalidCombination Feature="InputBins" Option="LARGECAPACITY"/>
 <InvalidCombination Feature="MediaType" Option="Thick_Duplex_Backside"/>
</InvalidCombinations>
```

```xml
<InvalidCombinations>
 <InvalidCombination Feature="InputTray3" Option="NotInstalled"/>
 <InvalidCombination Feature="InputBins" Option="Tray3"/>
</InvalidCombinations>
<InvalidCombinations>
 <InvalidCombination Feature="InputTray4" Option="NotInstalled"/>
 <InvalidCombination Feature="InputBins" Option="Tray4"/>
</InvalidCombinations>
<InvalidCombinations>
 <InvalidCombination Feature="LargeCapacityTray" Option="NotInstalled"/>
 <InvalidCombination Feature="InputBins" Option="LARGECAPACITY"/>
</InvalidCombinations>
<InvalidCombinations>
 <InvalidCombination Feature="InputTray3" Option="NotInstalled"/>
 <InvalidCombination Feature="SlipSheetInputBin" Option="Tray3"/>
</InvalidCombinations>
<InvalidCombinations>
 <InvalidCombination Feature="InputTray4" Option="NotInstalled"/>
 <InvalidCombination Feature="SlipSheetInputBin" Option="Tray4"/>
</InvalidCombinations>
<InvalidCombinations>
 <InvalidCombination Feature="LargeCapacityTray" Option="NotInstalled"/>
 <InvalidCombination Feature="SlipSheetInputBin" Option="LARGECAPACITY"/>
</InvalidCombinations>
<InvalidCombinations>
 <InvalidCombination Feature="InputBins" Option="BypassTray"/>
 <InvalidCombination Feature="Sides" Option="TwoSidedLongEdge"/>
</InvalidCombinations>
<InvalidCombinations>
 <InvalidCombination Feature="InputBins" Option="BypassTray"/>
 <InvalidCombination Feature="Sides" Option="TwoSidedShortEdge"/>
</InvalidCombinations>
<InvalidCombinations>
 <InvalidCombination Feature="InputBins" Option="BypassTray"/>
 <InvalidCombination Feature="Staple" Option="TopLeft"/>
</InvalidCombinations>
<InvalidCombinations>
 <InvalidCombination Feature="InputBins" Option="BypassTray"/>
 <InvalidCombination Feature="Staple" Option="TopRight"/>
</InvalidCombinations>
<InvalidCombinations>
 <InvalidCombination Feature="InputBins" Option="BypassTray"/>
 <InvalidCombination Feature="Staple" Option="Top2"/>
</InvalidCombinations>
<InvalidCombinations>
 <InvalidCombination Feature="InputBins" Option="BypassTray"/>
 <InvalidCombination Feature="Staple" Option="Left2"/>
</InvalidCombinations>
```

```xml
<InvalidCombinations>
 <InvalidCombination Feature="InputBins" Option="BypassTray"/>
 <InvalidCombination Feature="Staple" Option="Right2"/>
</InvalidCombinations>
<InvalidCombinations>
 <InvalidCombination Feature="InputBins" Option="BypassTray"/>
 <InvalidCombination Feature="Staple" Option="TopLeftSlant"/>
</InvalidCombinations>
<InvalidCombinations>
 <InvalidCombination Feature="InputBins" Option="BypassTray"/>
 <InvalidCombination Feature="Staple" Option="TopRightSlant"/>
</InvalidCombinations>
<InvalidCombinations>
 <InvalidCombination Feature="InputBins" Option="BypassTray"/>
 <InvalidCombination Feature="Staple" Option="Booklet"/>
</InvalidCombinations>
<InvalidCombinations>
 <InvalidCombination Feature="InputBins" Option="BypassTray"/>
 <InvalidCombination Feature="HolePunch" Option="Left2"/>
</InvalidCombinations>
<InvalidCombinations>
 <InvalidCombination Feature="InputBins" Option="BypassTray"/>
 <InvalidCombination Feature="HolePunch" Option="Top2"/>
</InvalidCombinations>
<InvalidCombinations>
 <InvalidCombination Feature="InputBins" Option="BypassTray"/>
 <InvalidCombination Feature="HolePunch" Option="Right2"/>
</InvalidCombinations>
<InvalidCombinations>
 <InvalidCombination Feature="InputBins" Option="BypassTray"/>
 <InvalidCombination Feature="HolePunch" Option="Left3"/>
</InvalidCombinations>
<InvalidCombinations>
 <InvalidCombination Feature="InputBins" Option="BypassTray"/>
 <InvalidCombination Feature="HolePunch" Option="Top3"/>
</InvalidCombinations>
<InvalidCombinations>
 <InvalidCombination Feature="InputBins" Option="BypassTray"/>
 <InvalidCombination Feature="HolePunch" Option="Right3"/>
</InvalidCombinations>
<InvalidCombinations>
 <InvalidCombination Feature="InputBins" Option="BypassTray"/>
 <InvalidCombination Feature="HolePunch" Option="Left4"/>
</InvalidCombinations>
<InvalidCombinations>
 <InvalidCombination Feature="InputBins" Option="BypassTray"/>
 <InvalidCombination Feature="HolePunch" Option="Top4"/>
</InvalidCombinations>
```

```xml
<InvalidCombinations>
  <InvalidCombination Feature="InputBins" Option="BypassTray"/>
  <InvalidCombination Feature="HolePunch" Option="Right4"/>
</InvalidCombinations>
<InvalidCombinations>
  <InvalidCombination Feature="SlipSheet" Option="ON"/>
  <InvalidCombination Feature="InputBins" Option="AUTO"/>
</InvalidCombinations>
<InvalidCombinations>
  <InvalidCombination Feature="SlipSheet" Option="ON"/>
  <InvalidCombination Feature="InputBins" Option="Tray1"/>
</InvalidCombinations>
<InvalidCombinations>
  <InvalidCombination Feature="SlipSheet" Option="ON"/>
  <InvalidCombination Feature="InputBins" Option="Tray2"/>
</InvalidCombinations>
<InvalidCombinations>
  <InvalidCombination Feature="SlipSheet" Option="ON"/>
  <InvalidCombination Feature="InputBins" Option="Tray3"/>
</InvalidCombinations>
<InvalidCombinations>
  <InvalidCombination Feature="SlipSheet" Option="ON"/>
  <InvalidCombination Feature="InputBins" Option="Tray4"/>
</InvalidCombinations>
<InvalidCombinations>
  <InvalidCombination Feature="SlipSheet" Option="ON"/>
  <InvalidCombination Feature="InputBins" Option="LARGECAPACITY"/>
</InvalidCombinations>
<InvalidCombinations>
  <InvalidCombination Feature="SlipSheet" Option="ON"/>
  <InvalidCombination Feature="HolePunch" Option="Top2"/>
</InvalidCombinations>
<InvalidCombinations>
  <InvalidCombination Feature="SlipSheet" Option="ON"/>
  <InvalidCombination Feature="HolePunch" Option="Top3"/>
</InvalidCombinations>
<InvalidCombinations>
  <InvalidCombination Feature="SlipSheet" Option="ON"/>
  <InvalidCombination Feature="HolePunch" Option="Top4"/>
</InvalidCombinations>
<InvalidCombinations>
  <InvalidCombination Feature="SlipSheet" Option="ON"/>
  <InvalidCombination Feature="HolePunch" Option="Right2"/>
</InvalidCombinations>
<InvalidCombinations>
  <InvalidCombination Feature="SlipSheet" Option="ON"/>
  <InvalidCombination Feature="HolePunch" Option="Right3"/>
</InvalidCombinations>
```

```xml
<InvalidCombinations>
 <InvalidCombination Feature="SlipSheet" Option="ON"/>
 <InvalidCombination Feature="HolePunch" Option="Right4"/>
</InvalidCombinations>
<InvalidCombinations>
 <InvalidCombination Feature="SlipSheet" Option="ON"/>
 <InvalidCombination Feature="HolePunch" Option="Left2"/>
</InvalidCombinations>
<InvalidCombinations>
 <InvalidCombination Feature="SlipSheet" Option="ON"/>
 <InvalidCombination Feature="HolePunch" Option="Left3"/>
</InvalidCombinations>
<InvalidCombinations>
 <InvalidCombination Feature="SlipSheet" Option="ON"/>
 <InvalidCombination Feature="HolePunch" Option="Left4"/>
</InvalidCombinations>
<InvalidCombinations>
 <InvalidCombination Feature="SlipSheet" Option="ON"/>
 <InvalidCombination Feature="Staple" Option="TopLeft"/>
</InvalidCombinations>
<InvalidCombinations>
 <InvalidCombination Feature="SlipSheet" Option="ON"/>
 <InvalidCombination Feature="Staple" Option="TopLeftSlant"/>
</InvalidCombinations>
<InvalidCombinations>
 <InvalidCombination Feature="SlipSheet" Option="ON"/>
 <InvalidCombination Feature="Staple" Option="TopRight"/>
</InvalidCombinations>
<InvalidCombinations>
 <InvalidCombination Feature="SlipSheet" Option="ON"/>
 <InvalidCombination Feature="Staple" Option="TopRightSlant"/>
</InvalidCombinations>
<InvalidCombinations>
 <InvalidCombination Feature="SlipSheet" Option="ON"/>
 <InvalidCombination Feature="Staple" Option="Top2"/>
</InvalidCombinations>
<InvalidCombinations>
 <InvalidCombination Feature="SlipSheet" Option="ON"/>
 <InvalidCombination Feature="Staple" Option="Left2"/>
</InvalidCombinations>
<InvalidCombinations>
 <InvalidCombination Feature="SlipSheet" Option="ON"/>
 <InvalidCombination Feature="Staple" Option="Right2"/>
</InvalidCombinations>
<InvalidCombinations>
 <InvalidCombination Feature="SlipSheet" Option="ON"/>
 <InvalidCombination Feature="Staple" Option="Booklet"/>
</InvalidCombinations>
```

```xml
<InvalidCombinations>
 <InvalidCombination Feature="SlipSheet" Option="ON"/>
 <InvalidCombination Feature="MediaType" Option="STANDARD"/>
</InvalidCombinations>
<InvalidCombinations>
 <InvalidCombination Feature="SlipSheet" Option="ON"/>
 <InvalidCombination Feature="MediaType" Option="Thick"/>
</InvalidCombinations>
<InvalidCombinations>
 <InvalidCombination Feature="SlipSheet" Option="ON"/>
 <InvalidCombination Feature="MediaType" Option="Recycled"/>
</InvalidCombinations>
<InvalidCombinations>
 <InvalidCombination Feature="SlipSheet" Option="ON"/>
 <InvalidCombination Feature="MediaType" Option="Special"/>
</InvalidCombinations>
<InvalidCombinations>
 <InvalidCombination Feature="SlipSheet" Option="ON"/>
 <InvalidCombination Feature="MediaType" Option="Letterhead"/>
</InvalidCombinations>
<InvalidCombinations>
 <InvalidCombination Feature="SlipSheet" Option="ON"/>
 <InvalidCombination Feature="MediaType" Option="Preprinted"/>
</InvalidCombinations>
<InvalidCombinations>
 <InvalidCombination Feature="SlipSheet" Option="ON"/>
 <InvalidCombination Feature="MediaType" Option="Labels"/>
</InvalidCombinations>
<InvalidCombinations>
 <InvalidCombination Feature="SlipSheet" Option="ON"/>
 <InvalidCombination Feature="MediaType" Option="Color"/>
</InvalidCombinations>
<InvalidCombinations>
 <InvalidCombination Feature="SlipSheet" Option="ON"/>
 <InvalidCombination Feature="MediaType" Option="Plain_Duplex_Backside"/>
</InvalidCombinations>
<InvalidCombinations>
 <InvalidCombination Feature="SlipSheet" Option="ON"/>
 <InvalidCombination Feature="MediaType" Option="Thick_Duplex_Backside"/>
</InvalidCombinations>
<InvalidCombinations>
 <InvalidCombination Feature="SlipSheet" Option="ON"/>
 <InvalidCombination Feature="Sides" Option="TwoSidedLongEdge"/>
</InvalidCombinations>
<InvalidCombinations>
 <InvalidCombination Feature="SlipSheet" Option="ON"/>
 <InvalidCombination Feature="Sides" Option="TwoSidedShortEdge"/>
</InvalidCombinations>
```

```xml
<InvalidCombinations>
  <InvalidCombination Feature="Staple" Option="TopLeft"/>
  <InvalidCombination Feature="HolePunch" Option="Right2"/>
</InvalidCombinations>
<InvalidCombinations>
  <InvalidCombination Feature="Staple" Option="TopLeft"/>
  <InvalidCombination Feature="HolePunch" Option="Right3"/>
</InvalidCombinations>
<InvalidCombinations>
  <InvalidCombination Feature="Staple" Option="TopLeft"/>
  <InvalidCombination Feature="HolePunch" Option="Right4"/>
</InvalidCombinations>
<InvalidCombinations>
  <InvalidCombination Feature="Staple" Option="TopLeftSlant"/>
  <InvalidCombination Feature="HolePunch" Option="Right2"/>
</InvalidCombinations>
<InvalidCombinations>
  <InvalidCombination Feature="Staple" Option="TopLeftSlant"/>
  <InvalidCombination Feature="HolePunch" Option="Right3"/>
</InvalidCombinations>
<InvalidCombinations>
  <InvalidCombination Feature="Staple" Option="TopLeftSlant"/>
  <InvalidCombination Feature="HolePunch" Option="Right4"/>
</InvalidCombinations>
<InvalidCombinations>
  <InvalidCombination Feature="Staple" Option="TopRight"/>
  <InvalidCombination Feature="HolePunch" Option="Left2"/>
</InvalidCombinations>
<InvalidCombinations>
  <InvalidCombination Feature="Staple" Option="TopRight"/>
  <InvalidCombination Feature="HolePunch" Option="Left3"/>
</InvalidCombinations>
<InvalidCombinations>
  <InvalidCombination Feature="Staple" Option="TopRight"/>
  <InvalidCombination Feature="HolePunch" Option="Left4"/>
</InvalidCombinations>
<InvalidCombinations>
  <InvalidCombination Feature="Staple" Option="TopRightSlant"/>
  <InvalidCombination Feature="HolePunch" Option="Left2"/>
</InvalidCombinations>
<InvalidCombinations>
  <InvalidCombination Feature="Staple" Option="TopRightSlant"/>
  <InvalidCombination Feature="HolePunch" Option="Left3"/>
</InvalidCombinations>
<InvalidCombinations>
  <InvalidCombination Feature="Staple" Option="TopRightSlant"/>
  <InvalidCombination Feature="HolePunch" Option="Left4"/>
</InvalidCombinations>
```

```xml
<InvalidCombinations>
  <InvalidCombination Feature="Staple" Option="Top2"/>
  <InvalidCombination Feature="HolePunch" Option="Left2"/>
</InvalidCombinations>
<InvalidCombinations>
  <InvalidCombination Feature="Staple" Option="Top2"/>
  <InvalidCombination Feature="HolePunch" Option="Right2"/>
</InvalidCombinations>
<InvalidCombinations>
  <InvalidCombination Feature="Staple" Option="Top2"/>
  <InvalidCombination Feature="HolePunch" Option="Left3"/>
</InvalidCombinations>
<InvalidCombinations>
  <InvalidCombination Feature="Staple" Option="Top2"/>
  <InvalidCombination Feature="HolePunch" Option="Right3"/>
</InvalidCombinations>
<InvalidCombinations>
  <InvalidCombination Feature="Staple" Option="Top2"/>
  <InvalidCombination Feature="HolePunch" Option="Left4"/>
</InvalidCombinations>
<InvalidCombinations>
  <InvalidCombination Feature="Staple" Option="Top2"/>
  <InvalidCombination Feature="HolePunch" Option="Right4"/>
</InvalidCombinations>
<InvalidCombinations>
  <InvalidCombination Feature="Staple" Option="Left2"/>
  <InvalidCombination Feature="HolePunch" Option="Top2"/>
</InvalidCombinations>
<InvalidCombinations>
  <InvalidCombination Feature="Staple" Option="Left2"/>
  <InvalidCombination Feature="HolePunch" Option="Right2"/>
</InvalidCombinations>
<InvalidCombinations>
  <InvalidCombination Feature="Staple" Option="Left2"/>
  <InvalidCombination Feature="HolePunch" Option="Top3"/>
</InvalidCombinations>
<InvalidCombinations>
  <InvalidCombination Feature="Staple" Option="Left2"/>
  <InvalidCombination Feature="HolePunch" Option="Right3"/>
</InvalidCombinations>
<InvalidCombinations>
  <InvalidCombination Feature="Staple" Option="Left2"/>
  <InvalidCombination Feature="HolePunch" Option="Top4"/>
</InvalidCombinations>
<InvalidCombinations>
  <InvalidCombination Feature="Staple" Option="Left2"/>
  <InvalidCombination Feature="HolePunch" Option="Right4"/>
</InvalidCombinations>
```

```xml
<InvalidCombinations>
 <InvalidCombination Feature="Staple" Option="Right2"/>
 <InvalidCombination Feature="HolePunch" Option="Left2"/>
</InvalidCombinations>
<InvalidCombinations>
 <InvalidCombination Feature="Staple" Option="Right2"/>
 <InvalidCombination Feature="HolePunch" Option="Top2"/>
</InvalidCombinations>
<InvalidCombinations>
 <InvalidCombination Feature="Staple" Option="Right2"/>
 <InvalidCombination Feature="HolePunch" Option="Left3"/>
</InvalidCombinations>
<InvalidCombinations>
 <InvalidCombination Feature="Staple" Option="Right2"/>
 <InvalidCombination Feature="HolePunch" Option="Top3"/>
</InvalidCombinations>
<InvalidCombinations>
 <InvalidCombination Feature="Staple" Option="Right2"/>
 <InvalidCombination Feature="HolePunch" Option="Left4"/>
</InvalidCombinations>
<InvalidCombinations>
 <InvalidCombination Feature="Staple" Option="Right2"/>
 <InvalidCombination Feature="HolePunch" Option="Top4"/>
</InvalidCombinations>
<InvalidCombinations>
 <InvalidCombination Feature="Staple" Option="Booklet"/>
 <InvalidCombination Feature="HolePunch" Option="Left2"/>
</InvalidCombinations>
<InvalidCombinations>
 <InvalidCombination Feature="Staple" Option="Booklet"/>
 <InvalidCombination Feature="HolePunch" Option="Top2"/>
</InvalidCombinations>
<InvalidCombinations>
 <InvalidCombination Feature="Staple" Option="Booklet"/>
 <InvalidCombination Feature="HolePunch" Option="Right2"/>
</InvalidCombinations>
<InvalidCombinations>
 <InvalidCombination Feature="Staple" Option="Booklet"/>
 <InvalidCombination Feature="HolePunch" Option="Left3"/>
</InvalidCombinations>
<InvalidCombinations>
 <InvalidCombination Feature="Staple" Option="Booklet"/>
 <InvalidCombination Feature="HolePunch" Option="Top3"/>
</InvalidCombinations>
<InvalidCombinations>
 <InvalidCombination Feature="Staple" Option="Booklet"/>
 <InvalidCombination Feature="HolePunch" Option="Right3"/>
</InvalidCombinations>
```

```xml
<InvalidCombinations>
 <InvalidCombination Feature="Staple" Option="Booklet"/>
 <InvalidCombination Feature="HolePunch" Option="Left4"/>
</InvalidCombinations>
<InvalidCombinations>
 <InvalidCombination Feature="Staple" Option="Booklet"/>
 <InvalidCombination Feature="HolePunch" Option="Top4"/>
</InvalidCombinations>
<InvalidCombinations>
 <InvalidCombination Feature="Staple" Option="Booklet"/>
 <InvalidCombination Feature="HolePunch" Option="Right4"/>
</InvalidCombinations>
<InvalidCombinations>
 <InvalidCombination Feature="Staple" Option="TopLeft"/>
 <InvalidCombination Feature="MediaType" Option="TRANSPARENCY"/>
</InvalidCombinations>
<InvalidCombinations>
 <InvalidCombination Feature="Staple" Option="TopLeft"/>
 <InvalidCombination Feature="MediaType" Option="Thick"/>
</InvalidCombinations>
<InvalidCombinations>
 <InvalidCombination Feature="Staple" Option="TopLeft"/>
 <InvalidCombination Feature="MediaType" Option="Labels"/>
</InvalidCombinations>
<InvalidCombinations>
 <InvalidCombination Feature="Staple" Option="TopLeft"/>
 <InvalidCombination Feature="MediaType" Option="Plain_Duplex_Backside"/>
</InvalidCombinations>
<InvalidCombinations>
 <InvalidCombination Feature="Staple" Option="TopLeft"/>
 <InvalidCombination Feature="MediaType" Option="Thick_Duplex_Backside"/>
</InvalidCombinations>
<InvalidCombinations>
 <InvalidCombination Feature="Staple" Option="TopLeftSlant"/>
 <InvalidCombination Feature="MediaType" Option="TRANSPARENCY"/>
</InvalidCombinations>
<InvalidCombinations>
 <InvalidCombination Feature="Staple" Option="TopLeftSlant"/>
 <InvalidCombination Feature="MediaType" Option="Thick"/>
</InvalidCombinations>
<InvalidCombinations>
 <InvalidCombination Feature="Staple" Option="TopLeftSlant"/>
 <InvalidCombination Feature="MediaType" Option="Labels"/>
</InvalidCombinations>
<InvalidCombinations>
 <InvalidCombination Feature="Staple" Option="TopLeftSlant"/>
 <InvalidCombination Feature="MediaType" Option="Plain_Duplex_Backside"/>
</InvalidCombinations>
```

```
<InvalidCombinations>
 <InvalidCombination Feature="Staple" Option="TopLeftSlant"/>
 <InvalidCombination Feature="MediaType" Option="Thick_Duplex_Backside"/>
</InvalidCombinations>
<InvalidCombinations>
 <InvalidCombination Feature="Staple" Option="TopRight"/>
 <InvalidCombination Feature="MediaType" Option="TRANSPARENCY"/>
</InvalidCombinations>
<InvalidCombinations>
 <InvalidCombination Feature="Staple" Option="TopRight"/>
 <InvalidCombination Feature="MediaType" Option="Thick"/>
</InvalidCombinations>
<InvalidCombinations>
 <InvalidCombination Feature="Staple" Option="TopRight"/>
 <InvalidCombination Feature="MediaType" Option="Labels"/>
</InvalidCombinations>
<InvalidCombinations>
 <InvalidCombination Feature="Staple" Option="TopRight"/>
 <InvalidCombination Feature="MediaType" Option="Plain_Duplex_Backside"/>
</InvalidCombinations>
<InvalidCombinations>
 <InvalidCombination Feature="Staple" Option="TopRight"/>
 <InvalidCombination Feature="MediaType" Option="Thick_Duplex_Backside"/>
</InvalidCombinations>
<InvalidCombinations>
 <InvalidCombination Feature="Staple" Option="TopRightSlant"/>
 <InvalidCombination Feature="MediaType" Option="TRANSPARENCY"/>
</InvalidCombinations>
<InvalidCombinations>
 <InvalidCombination Feature="Staple" Option="TopRightSlant"/>
 <InvalidCombination Feature="MediaType" Option="Thick"/>
</InvalidCombinations>
<InvalidCombinations>
 <InvalidCombination Feature="Staple" Option="TopRightSlant"/>
 <InvalidCombination Feature="MediaType" Option="Labels"/>
</InvalidCombinations>
<InvalidCombinations>
 <InvalidCombination Feature="Staple" Option="TopRightSlant"/>
 <InvalidCombination Feature="MediaType" Option="Plain_Duplex_Backside"/>
</InvalidCombinations>
<InvalidCombinations>
 <InvalidCombination Feature="Staple" Option="TopRightSlant"/>
 <InvalidCombination Feature="MediaType" Option="Thick_Duplex_Backside"/>
</InvalidCombinations>
<InvalidCombinations>
 <InvalidCombination Feature="Staple" Option="Top2"/>
 <InvalidCombination Feature="MediaType" Option="TRANSPARENCY"/>
</InvalidCombinations>
```

```xml
<InvalidCombinations>
  <InvalidCombination Feature="Staple" Option="Top2"/>
  <InvalidCombination Feature="MediaType" Option="Thick"/>
</InvalidCombinations>
<InvalidCombinations>
  <InvalidCombination Feature="Staple" Option="Top2"/>
  <InvalidCombination Feature="MediaType" Option="Labels"/>
</InvalidCombinations>
<InvalidCombinations>
  <InvalidCombination Feature="Staple" Option="Top2"/>
  <InvalidCombination Feature="MediaType" Option="Plain_Duplex_Backside"/>
</InvalidCombinations>
<InvalidCombinations>
  <InvalidCombination Feature="Staple" Option="Top2"/>
  <InvalidCombination Feature="MediaType" Option="Thick_Duplex_Backside"/>
</InvalidCombinations>
<InvalidCombinations>
  <InvalidCombination Feature="Staple" Option="Left2"/>
  <InvalidCombination Feature="MediaType" Option="TRANSPARENCY"/>
</InvalidCombinations>
<InvalidCombinations>
  <InvalidCombination Feature="Staple" Option="Left2"/>
  <InvalidCombination Feature="MediaType" Option="Thick"/>
</InvalidCombinations>
<InvalidCombinations>
  <InvalidCombination Feature="Staple" Option="Left2"/>
  <InvalidCombination Feature="MediaType" Option="Labels"/>
</InvalidCombinations>
<InvalidCombinations>
  <InvalidCombination Feature="Staple" Option="Left2"/>
  <InvalidCombination Feature="MediaType" Option="Plain_Duplex_Backside"/>
</InvalidCombinations>
<InvalidCombinations>
  <InvalidCombination Feature="Staple" Option="Left2"/>
  <InvalidCombination Feature="MediaType" Option="Thick_Duplex_Backside"/>
</InvalidCombinations>
<InvalidCombinations>
  <InvalidCombination Feature="Staple" Option="Right2"/>
  <InvalidCombination Feature="MediaType" Option="TRANSPARENCY"/>
</InvalidCombinations>
<InvalidCombinations>
  <InvalidCombination Feature="Staple" Option="Right2"/>
  <InvalidCombination Feature="MediaType" Option="Thick"/>
</InvalidCombinations>
<InvalidCombinations>
  <InvalidCombination Feature="Staple" Option="Right2"/>
  <InvalidCombination Feature="MediaType" Option="Labels"/>
</InvalidCombinations>
```

```xml
<InvalidCombinations>
  <InvalidCombination Feature="Staple" Option="Right2"/>
  <InvalidCombination Feature="MediaType" Option="Plain_Duplex_Backside"/>
</InvalidCombinations>
<InvalidCombinations>
  <InvalidCombination Feature="Staple" Option="Right2"/>
  <InvalidCombination Feature="MediaType" Option="Thick_Duplex_Backside"/>
</InvalidCombinations>
<InvalidCombinations>
  <InvalidCombination Feature="Staple" Option="Booklet"/>
  <InvalidCombination Feature="MediaType" Option="TRANSPARENCY"/>
</InvalidCombinations>
<InvalidCombinations>
  <InvalidCombination Feature="Staple" Option="Booklet"/>
  <InvalidCombination Feature="MediaType" Option="Thick"/>
</InvalidCombinations>
<InvalidCombinations>
  <InvalidCombination Feature="Staple" Option="Booklet"/>
  <InvalidCombination Feature="MediaType" Option="Labels"/>
</InvalidCombinations>
<InvalidCombinations>
  <InvalidCombination Feature="Staple" Option="Booklet"/>
  <InvalidCombination Feature="MediaType" Option="Plain_Duplex_Backside"/>
</InvalidCombinations>
<InvalidCombinations>
  <InvalidCombination Feature="Staple" Option="Booklet"/>
  <InvalidCombination Feature="MediaType" Option="Thick_Duplex_Backside"/>
</InvalidCombinations>
<InvalidCombinations>
  <InvalidCombination Feature="MediaSizeName" Option="na_invoice_5.5x8.5in"/>
  <InvalidCombination Feature="Staple" Option="TopLeft"/>
</InvalidCombinations>
<InvalidCombinations>
  <InvalidCombination Feature="MediaSizeName" Option="na_invoice_5.5x8.5in"/>
  <InvalidCombination Feature="Staple" Option="TopLeftSlant"/>
</InvalidCombinations>
<InvalidCombinations>
  <InvalidCombination Feature="MediaSizeName" Option="na_invoice_5.5x8.5in"/>
  <InvalidCombination Feature="Staple" Option="TopRight"/>
</InvalidCombinations>
<InvalidCombinations>
  <InvalidCombination Feature="MediaSizeName" Option="na_invoice_5.5x8.5in"/>
  <InvalidCombination Feature="Staple" Option="TopRightSlant"/>
</InvalidCombinations>
<InvalidCombinations>
  <InvalidCombination Feature="MediaSizeName" Option="na_invoice_5.5x8.5in"/>
  <InvalidCombination Feature="Staple" Option="Top2"/>
</InvalidCombinations>
```

```xml
<InvalidCombinations>
  <InvalidCombination Feature="MediaSizeName" Option="na_invoice_5.5x8.5in"/>
  <InvalidCombination Feature="Staple" Option="Left2"/>
</InvalidCombinations>
<InvalidCombinations>
  <InvalidCombination Feature="MediaSizeName" Option="na_invoice_5.5x8.5in"/>
  <InvalidCombination Feature="Staple" Option="Right2"/>
</InvalidCombinations>
<InvalidCombinations>
  <InvalidCombination Feature="MediaSizeName" Option="na_invoice_5.5x8.5in"/>
  <InvalidCombination Feature="Staple" Option="Booklet"/>
</InvalidCombinations>
<InvalidCombinations>
  <InvalidCombination Feature="MediaSizeName" Option="iso_a5_148x210mm"/>
  <InvalidCombination Feature="Staple" Option="TopLeft"/>
</InvalidCombinations>
<InvalidCombinations>
  <InvalidCombination Feature="MediaSizeName" Option="iso_a5_148x210mm"/>
  <InvalidCombination Feature="Staple" Option="TopLeftSlant"/>
</InvalidCombinations>
<InvalidCombinations>
  <InvalidCombination Feature="MediaSizeName" Option="iso_a5_148x210mm"/>
  <InvalidCombination Feature="Staple" Option="TopRight"/>
</InvalidCombinations>
<InvalidCombinations>
  <InvalidCombination Feature="MediaSizeName" Option="iso_a5_148x210mm"/>
  <InvalidCombination Feature="Staple" Option="TopRightSlant"/>
</InvalidCombinations>
<InvalidCombinations>
  <InvalidCombination Feature="MediaSizeName" Option="iso_a5_148x210mm"/>
  <InvalidCombination Feature="Staple" Option="Top2"/>
</InvalidCombinations>
<InvalidCombinations>
  <InvalidCombination Feature="MediaSizeName" Option="iso_a5_148x210mm"/>
  <InvalidCombination Feature="Staple" Option="Left2"/>
</InvalidCombinations>
<InvalidCombinations>
  <InvalidCombination Feature="MediaSizeName" Option="iso_a5_148x210mm"/>
  <InvalidCombination Feature="Staple" Option="Right2"/>
</InvalidCombinations>
<InvalidCombinations>
  <InvalidCombination Feature="MediaSizeName" Option="iso_a5_148x210mm"/>
  <InvalidCombination Feature="Staple" Option="Booklet"/>
</InvalidCombinations>
<InvalidCombinations>
  <InvalidCombination Feature="MediaSizeName" Option="iso_a6_105x148mm"/>
  <InvalidCombination Feature="Staple" Option="TopLeft"/>
</InvalidCombinations>
```

```xml
<InvalidCombinations>
  <InvalidCombination Feature="MediaSizeName" Option="iso_a6_105x148mm"/>
  <InvalidCombination Feature="Staple" Option="TopLeftSlant"/>
</InvalidCombinations>
<InvalidCombinations>
  <InvalidCombination Feature="MediaSizeName" Option="iso_a6_105x148mm"/>
  <InvalidCombination Feature="Staple" Option="TopRight"/>
</InvalidCombinations>
<InvalidCombinations>
  <InvalidCombination Feature="MediaSizeName" Option="iso_a6_105x148mm"/>
  <InvalidCombination Feature="Staple" Option="TopRightSlant"/>
</InvalidCombinations>
<InvalidCombinations>
  <InvalidCombination Feature="MediaSizeName" Option="iso_a6_105x148mm"/>
  <InvalidCombination Feature="Staple" Option="Top2"/>
</InvalidCombinations>
<InvalidCombinations>
  <InvalidCombination Feature="MediaSizeName" Option="iso_a6_105x148mm"/>
  <InvalidCombination Feature="Staple" Option="Left2"/>
</InvalidCombinations>
<InvalidCombinations>
  <InvalidCombination Feature="MediaSizeName" Option="iso_a6_105x148mm"/>
  <InvalidCombination Feature="Staple" Option="Right2"/>
</InvalidCombinations>
<InvalidCombinations>
  <InvalidCombination Feature="MediaSizeName" Option="iso_a6_105x148mm"/>
  <InvalidCombination Feature="Staple" Option="Booklet"/>
</InvalidCombinations>
<InvalidCombinations>
  <InvalidCombination Feature="MediaSizeName" Option="na_number-10_4.125x9.5in"/>
  <InvalidCombination Feature="Staple" Option="TopLeft"/>
</InvalidCombinations>
<InvalidCombinations>
  <InvalidCombination Feature="MediaSizeName" Option="na_number-10_4.125x9.5in"/>
  <InvalidCombination Feature="Staple" Option="TopLeftSlant"/>
</InvalidCombinations>
<InvalidCombinations>
  <InvalidCombination Feature="MediaSizeName" Option="na_number-10_4.125x9.5in"/>
  <InvalidCombination Feature="Staple" Option="TopRight"/>
</InvalidCombinations>
<InvalidCombinations>
  <InvalidCombination Feature="MediaSizeName" Option="na_number-10_4.125x9.5in"/>
  <InvalidCombination Feature="Staple" Option="TopRightSlant"/>
</InvalidCombinations>
<InvalidCombinations>
  <InvalidCombination Feature="MediaSizeName" Option="na_number-10_4.125x9.5in"/>
  <InvalidCombination Feature="Staple" Option="Top2"/>
</InvalidCombinations>
```

```xml
<InvalidCombinations>
  <InvalidCombination Feature="MediaSizeName" Option="na_number-10_4.125x9.5in"/>
  <InvalidCombination Feature="Staple" Option="Left2"/>
</InvalidCombinations>
<InvalidCombinations>
  <InvalidCombination Feature="MediaSizeName" Option="na_number-10_4.125x9.5in"/>
  <InvalidCombination Feature="Staple" Option="Right2"/>
</InvalidCombinations>
<InvalidCombinations>
  <InvalidCombination Feature="MediaSizeName" Option="na_number-10_4.125x9.5in"/>
  <InvalidCombination Feature="Staple" Option="Booklet"/>
</InvalidCombinations>
<InvalidCombinations>
  <InvalidCombination Feature="MediaSizeName" Option="iso_dl_110x220mm"/>
  <InvalidCombination Feature="Staple" Option="TopLeft"/>
</InvalidCombinations>
<InvalidCombinations>
  <InvalidCombination Feature="MediaSizeName" Option="iso_dl_110x220mm"/>
  <InvalidCombination Feature="Staple" Option="TopLeftSlant"/>
</InvalidCombinations>
<InvalidCombinations>
  <InvalidCombination Feature="MediaSizeName" Option="iso_dl_110x220mm"/>
  <InvalidCombination Feature="Staple" Option="TopRight"/>
</InvalidCombinations>
<InvalidCombinations>
  <InvalidCombination Feature="MediaSizeName" Option="iso_dl_110x220mm"/>
  <InvalidCombination Feature="Staple" Option="TopRightSlant"/>
</InvalidCombinations>
<InvalidCombinations>
  <InvalidCombination Feature="MediaSizeName" Option="iso_dl_110x220mm"/>
  <InvalidCombination Feature="Staple" Option="Top2"/>
</InvalidCombinations>
<InvalidCombinations>
  <InvalidCombination Feature="MediaSizeName" Option="iso_dl_110x220mm"/>
  <InvalidCombination Feature="Staple" Option="Left2"/>
</InvalidCombinations>
<InvalidCombinations>
  <InvalidCombination Feature="MediaSizeName" Option="iso_dl_110x220mm"/>
  <InvalidCombination Feature="Staple" Option="Right2"/>
</InvalidCombinations>
<InvalidCombinations>
  <InvalidCombination Feature="MediaSizeName" Option="iso_dl_110x220mm"/>
  <InvalidCombination Feature="Staple" Option="Booklet"/>
</InvalidCombinations>
<InvalidCombinations>
  <InvalidCombination Feature="MediaSizeName" Option="na_monarch_3.875x7.5in"/>
  <InvalidCombination Feature="Staple" Option="TopLeft"/>
</InvalidCombinations>
```

```xml
<InvalidCombinations>
  <InvalidCombination Feature="MediaSizeName" Option="na_monarch_3.875x7.5in"/>
  <InvalidCombination Feature="Staple" Option="TopLeftSlant"/>
</InvalidCombinations>
<InvalidCombinations>
  <InvalidCombination Feature="MediaSizeName" Option="na_monarch_3.875x7.5in"/>
  <InvalidCombination Feature="Staple" Option="TopRight"/>
</InvalidCombinations>
<InvalidCombinations>
  <InvalidCombination Feature="MediaSizeName" Option="na_monarch_3.875x7.5in"/>
  <InvalidCombination Feature="Staple" Option="TopRightSlant"/>
</InvalidCombinations>
<InvalidCombinations>
  <InvalidCombination Feature="MediaSizeName" Option="na_monarch_3.875x7.5in"/>
  <InvalidCombination Feature="Staple" Option="Top2"/>
</InvalidCombinations>
<InvalidCombinations>
  <InvalidCombination Feature="MediaSizeName" Option="na_monarch_3.875x7.5in"/>
  <InvalidCombination Feature="Staple" Option="Left2"/>
</InvalidCombinations>
<InvalidCombinations>
  <InvalidCombination Feature="MediaSizeName" Option="na_monarch_3.875x7.5in"/>
  <InvalidCombination Feature="Staple" Option="Right2"/>
</InvalidCombinations>
<InvalidCombinations>
  <InvalidCombination Feature="MediaSizeName" Option="na_monarch_3.875x7.5in"/>
  <InvalidCombination Feature="Staple" Option="Booklet"/>
</InvalidCombinations>
<InvalidCombinations>
  <InvalidCombination Feature="MediaSizeName" Option="iso_c5_162x229mm"/>
  <InvalidCombination Feature="Staple" Option="TopLeft"/>
</InvalidCombinations>
<InvalidCombinations>
  <InvalidCombination Feature="MediaSizeName" Option="iso_c5_162x229mm"/>
  <InvalidCombination Feature="Staple" Option="TopLeftSlant"/>
</InvalidCombinations>
<InvalidCombinations>
  <InvalidCombination Feature="MediaSizeName" Option="iso_c5_162x229mm"/>
  <InvalidCombination Feature="Staple" Option="TopRight"/>
</InvalidCombinations>
<InvalidCombinations>
  <InvalidCombination Feature="MediaSizeName" Option="iso_c5_162x229mm"/>
  <InvalidCombination Feature="Staple" Option="TopRightSlant"/>
</InvalidCombinations>
<InvalidCombinations>
  <InvalidCombination Feature="MediaSizeName" Option="iso_c5_162x229mm"/>
  <InvalidCombination Feature="Staple" Option="Top2"/>
</InvalidCombinations>
```

```xml
<InvalidCombinations>
  <InvalidCombination Feature="MediaSizeName" Option="iso_c5_162x229mm"/>
  <InvalidCombination Feature="Staple" Option="Left2"/>
</InvalidCombinations>
<InvalidCombinations>
  <InvalidCombination Feature="MediaSizeName" Option="iso_c5_162x229mm"/>
  <InvalidCombination Feature="Staple" Option="Right2"/>
</InvalidCombinations>
<InvalidCombinations>
  <InvalidCombination Feature="MediaSizeName" Option="iso_c5_162x229mm"/>
  <InvalidCombination Feature="Staple" Option="Booklet"/>
</InvalidCombinations>
<InvalidCombinations>
  <InvalidCombination Feature="MediaSizeName" Option="iso_c6_114x162mm"/>
  <InvalidCombination Feature="Staple" Option="TopLeft"/>
</InvalidCombinations>
<InvalidCombinations>
  <InvalidCombination Feature="MediaSizeName" Option="iso_c6_114x162mm"/>
  <InvalidCombination Feature="Staple" Option="TopLeftSlant"/>
</InvalidCombinations>
<InvalidCombinations>
  <InvalidCombination Feature="MediaSizeName" Option="iso_c6_114x162mm"/>
  <InvalidCombination Feature="Staple" Option="TopRight"/>
</InvalidCombinations>
<InvalidCombinations>
  <InvalidCombination Feature="MediaSizeName" Option="iso_c6_114x162mm"/>
  <InvalidCombination Feature="Staple" Option="TopRightSlant"/>
</InvalidCombinations>
<InvalidCombinations>
  <InvalidCombination Feature="MediaSizeName" Option="iso_c6_114x162mm"/>
  <InvalidCombination Feature="Staple" Option="Top2"/>
</InvalidCombinations>
<InvalidCombinations>
  <InvalidCombination Feature="MediaSizeName" Option="iso_c6_114x162mm"/>
  <InvalidCombination Feature="Staple" Option="Left2"/>
</InvalidCombinations>
<InvalidCombinations>
  <InvalidCombination Feature="MediaSizeName" Option="iso_c6_114x162mm"/>
  <InvalidCombination Feature="Staple" Option="Right2"/>
</InvalidCombinations>
<InvalidCombinations>
  <InvalidCombination Feature="MediaSizeName" Option="iso_c6_114x162mm"/>
  <InvalidCombination Feature="Staple" Option="Booklet"/>
</InvalidCombinations>
<InvalidCombinations>
  <InvalidCombination Feature="MediaSizeName" Option="na_arch-b_12x18in"/>
  <InvalidCombination Feature="Staple" Option="TopLeft"/>
</InvalidCombinations>
```

```xml
<InvalidCombinations>
 <InvalidCombination Feature="MediaSizeName" Option="na_arch-b_12x18in"/>
 <InvalidCombination Feature="Staple" Option="TopLeftSlant"/>
</InvalidCombinations>
<InvalidCombinations>
 <InvalidCombination Feature="MediaSizeName" Option="na_arch-b_12x18in"/>
 <InvalidCombination Feature="Staple" Option="TopRight"/>
</InvalidCombinations>
<InvalidCombinations>
 <InvalidCombination Feature="MediaSizeName" Option="na_arch-b_12x18in"/>
 <InvalidCombination Feature="Staple" Option="TopRightSlant"/>
</InvalidCombinations>
<InvalidCombinations>
 <InvalidCombination Feature="MediaSizeName" Option="na_arch-b_12x18in"/>
 <InvalidCombination Feature="Staple" Option="Top2"/>
</InvalidCombinations>
<InvalidCombinations>
 <InvalidCombination Feature="MediaSizeName" Option="na_arch-b_12x18in"/>
 <InvalidCombination Feature="Staple" Option="Left2"/>
</InvalidCombinations>
<InvalidCombinations>
 <InvalidCombination Feature="MediaSizeName" Option="na_arch-b_12x18in"/>
 <InvalidCombination Feature="Staple" Option="Right2"/>
</InvalidCombinations>
<InvalidCombinations>
 <InvalidCombination Feature="MediaSizeName" Option="na_arch-b_12x18in"/>
 <InvalidCombination Feature="Staple" Option="Booklet"/>
</InvalidCombinations>
<InvalidCombinations>
 <InvalidCombination Feature="MediaSizeName" Option="custom_papersize"/>
 <InvalidCombination Feature="Staple" Option="TopLeft"/>
</InvalidCombinations>
<InvalidCombinations>
 <InvalidCombination Feature="MediaSizeName" Option="custom_papersize"/>
 <InvalidCombination Feature="Staple" Option="TopLeftSlant"/>
</InvalidCombinations>
<InvalidCombinations>
 <InvalidCombination Feature="MediaSizeName" Option="custom_papersize"/>
 <InvalidCombination Feature="Staple" Option="TopRight"/>
</InvalidCombinations>
<InvalidCombinations>
 <InvalidCombination Feature="MediaSizeName" Option="custom_papersize"/>
 <InvalidCombination Feature="Staple" Option="TopRightSlant"/>
</InvalidCombinations>
<InvalidCombinations>
 <InvalidCombination Feature="MediaSizeName" Option="custom_papersize"/>
 <InvalidCombination Feature="Staple" Option="Top2"/>
</InvalidCombinations>
```

```xml
<InvalidCombinations>
  <InvalidCombination Feature="MediaSizeName" Option="custom_papersize"/>
  <InvalidCombination Feature="Staple" Option="Left2"/>
</InvalidCombinations>
<InvalidCombinations>
  <InvalidCombination Feature="MediaSizeName" Option="custom_papersize"/>
  <InvalidCombination Feature="Staple" Option="Right2"/>
</InvalidCombinations>
<InvalidCombinations>
  <InvalidCombination Feature="MediaSizeName" Option="custom_papersize"/>
  <InvalidCombination Feature="Staple" Option="Booklet"/>
</InvalidCombinations>
<InvalidCombinations>
  <InvalidCombination Feature="HolePunch" Option="Top2"/>
  <InvalidCombination Feature="MediaType" Option="TRANSPARENCY"/>
</InvalidCombinations>
<InvalidCombinations>
  <InvalidCombination Feature="HolePunch" Option="Top2"/>
  <InvalidCombination Feature="MediaType" Option="Thick"/>
</InvalidCombinations>
<InvalidCombinations>
  <InvalidCombination Feature="HolePunch" Option="Top2"/>
  <InvalidCombination Feature="MediaType" Option="Labels"/>
</InvalidCombinations>
<InvalidCombinations>
  <InvalidCombination Feature="HolePunch" Option="Top2"/>
  <InvalidCombination Feature="MediaType" Option="Plain_Duplex_Backside"/>
</InvalidCombinations>
<InvalidCombinations>
  <InvalidCombination Feature="HolePunch" Option="Top2"/>
  <InvalidCombination Feature="MediaType" Option="Thick_Duplex_Backside"/>
</InvalidCombinations>
<InvalidCombinations>
  <InvalidCombination Feature="HolePunch" Option="Top3"/>
  <InvalidCombination Feature="MediaType" Option="TRANSPARENCY"/>
</InvalidCombinations>
<InvalidCombinations>
  <InvalidCombination Feature="HolePunch" Option="Top3"/>
  <InvalidCombination Feature="MediaType" Option="Thick"/>
</InvalidCombinations>
<InvalidCombinations>
  <InvalidCombination Feature="HolePunch" Option="Top3"/>
  <InvalidCombination Feature="MediaType" Option="Labels"/>
</InvalidCombinations>
<InvalidCombinations>
  <InvalidCombination Feature="HolePunch" Option="Top3"/>
  <InvalidCombination Feature="MediaType" Option="Plain_Duplex_Backside"/>
</InvalidCombinations>
```

```xml
<InvalidCombinations>
  <InvalidCombination Feature="HolePunch" Option="Top3"/>
  <InvalidCombination Feature="MediaType" Option="Thick_Duplex_Backside"/>
</InvalidCombinations>
<InvalidCombinations>
  <InvalidCombination Feature="HolePunch" Option="Top4"/>
  <InvalidCombination Feature="MediaType" Option="TRANSPARENCY"/>
</InvalidCombinations>
<InvalidCombinations>
  <InvalidCombination Feature="HolePunch" Option="Top4"/>
  <InvalidCombination Feature="MediaType" Option="Thick"/>
</InvalidCombinations>
<InvalidCombinations>
  <InvalidCombination Feature="HolePunch" Option="Top4"/>
  <InvalidCombination Feature="MediaType" Option="Labels"/>
</InvalidCombinations>
<InvalidCombinations>
  <InvalidCombination Feature="HolePunch" Option="Top4"/>
  <InvalidCombination Feature="MediaType" Option="Plain_Duplex_Backside"/>
</InvalidCombinations>
<InvalidCombinations>
  <InvalidCombination Feature="HolePunch" Option="Top4"/>
  <InvalidCombination Feature="MediaType" Option="Thick_Duplex_Backside"/>
</InvalidCombinations>
<InvalidCombinations>
  <InvalidCombination Feature="HolePunch" Option="Right2"/>
  <InvalidCombination Feature="MediaType" Option="TRANSPARENCY"/>
</InvalidCombinations>
<InvalidCombinations>
  <InvalidCombination Feature="HolePunch" Option="Right2"/>
  <InvalidCombination Feature="MediaType" Option="Thick"/>
</InvalidCombinations>
<InvalidCombinations>
  <InvalidCombination Feature="HolePunch" Option="Right2"/>
  <InvalidCombination Feature="MediaType" Option="Labels"/>
</InvalidCombinations>
<InvalidCombinations>
  <InvalidCombination Feature="HolePunch" Option="Right2"/>
  <InvalidCombination Feature="MediaType" Option="Plain_Duplex_Backside"/>
</InvalidCombinations>
<InvalidCombinations>
  <InvalidCombination Feature="HolePunch" Option="Right2"/>
  <InvalidCombination Feature="MediaType" Option="Thick_Duplex_Backside"/>
</InvalidCombinations>
<InvalidCombinations>
  <InvalidCombination Feature="HolePunch" Option="Right3"/>
  <InvalidCombination Feature="MediaType" Option="TRANSPARENCY"/>
</InvalidCombinations>
```

```xml
<InvalidCombinations>
  <InvalidCombination Feature="HolePunch" Option="Right3"/>
  <InvalidCombination Feature="MediaType" Option="Thick"/>
</InvalidCombinations>
<InvalidCombinations>
  <InvalidCombination Feature="HolePunch" Option="Right3"/>
  <InvalidCombination Feature="MediaType" Option="Labels"/>
</InvalidCombinations>
<InvalidCombinations>
  <InvalidCombination Feature="HolePunch" Option="Right3"/>
  <InvalidCombination Feature="MediaType" Option="Plain_Duplex_Backside"/>
</InvalidCombinations>
<InvalidCombinations>
  <InvalidCombination Feature="HolePunch" Option="Right3"/>
  <InvalidCombination Feature="MediaType" Option="Thick_Duplex_Backside"/>
</InvalidCombinations>
<InvalidCombinations>
  <InvalidCombination Feature="HolePunch" Option="Right4"/>
  <InvalidCombination Feature="MediaType" Option="TRANSPARENCY"/>
</InvalidCombinations>
<InvalidCombinations>
  <InvalidCombination Feature="HolePunch" Option="Right4"/>
  <InvalidCombination Feature="MediaType" Option="Thick"/>
</InvalidCombinations>
<InvalidCombinations>
  <InvalidCombination Feature="HolePunch" Option="Right4"/>
  <InvalidCombination Feature="MediaType" Option="Labels"/>
</InvalidCombinations>
<InvalidCombinations>
  <InvalidCombination Feature="HolePunch" Option="Right4"/>
  <InvalidCombination Feature="MediaType" Option="Plain_Duplex_Backside"/>
</InvalidCombinations>
<InvalidCombinations>
  <InvalidCombination Feature="HolePunch" Option="Right4"/>
  <InvalidCombination Feature="MediaType" Option="Thick_Duplex_Backside"/>
</InvalidCombinations>
<InvalidCombinations>
  <InvalidCombination Feature="HolePunch" Option="Left2"/>
  <InvalidCombination Feature="MediaType" Option="TRANSPARENCY"/>
</InvalidCombinations>
<InvalidCombinations>
  <InvalidCombination Feature="HolePunch" Option="Left2"/>
  <InvalidCombination Feature="MediaType" Option="Thick"/>
</InvalidCombinations>
<InvalidCombinations>
  <InvalidCombination Feature="HolePunch" Option="Left2"/>
  <InvalidCombination Feature="MediaType" Option="Labels"/>
</InvalidCombinations>
```

```xml
<InvalidCombinations>
  <InvalidCombination Feature="HolePunch" Option="Left2"/>
  <InvalidCombination Feature="MediaType" Option="Plain_Duplex_Backside"/>
</InvalidCombinations>
<InvalidCombinations>
  <InvalidCombination Feature="HolePunch" Option="Left2"/>
  <InvalidCombination Feature="MediaType" Option="Thick_Duplex_Backside"/>
</InvalidCombinations>
<InvalidCombinations>
  <InvalidCombination Feature="HolePunch" Option="Left3"/>
  <InvalidCombination Feature="MediaType" Option="TRANSPARENCY"/>
</InvalidCombinations>
<InvalidCombinations>
  <InvalidCombination Feature="HolePunch" Option="Left3"/>
  <InvalidCombination Feature="MediaType" Option="Thick"/>
</InvalidCombinations>
<InvalidCombinations>
  <InvalidCombination Feature="HolePunch" Option="Left3"/>
  <InvalidCombination Feature="MediaType" Option="Labels"/>
</InvalidCombinations>
<InvalidCombinations>
  <InvalidCombination Feature="HolePunch" Option="Left3"/>
  <InvalidCombination Feature="MediaType" Option="Plain_Duplex_Backside"/>
</InvalidCombinations>
<InvalidCombinations>
  <InvalidCombination Feature="HolePunch" Option="Left3"/>
  <InvalidCombination Feature="MediaType" Option="Thick_Duplex_Backside"/>
</InvalidCombinations>
<InvalidCombinations>
  <InvalidCombination Feature="HolePunch" Option="Left4"/>
  <InvalidCombination Feature="MediaType" Option="TRANSPARENCY"/>
</InvalidCombinations>
<InvalidCombinations>
  <InvalidCombination Feature="HolePunch" Option="Left4"/>
  <InvalidCombination Feature="MediaType" Option="Thick"/>
</InvalidCombinations>
<InvalidCombinations>
  <InvalidCombination Feature="HolePunch" Option="Left4"/>
  <InvalidCombination Feature="MediaType" Option="Labels"/>
</InvalidCombinations>
<InvalidCombinations>
  <InvalidCombination Feature="HolePunch" Option="Left4"/>
  <InvalidCombination Feature="MediaType" Option="Plain_Duplex_Backside"/>
</InvalidCombinations>
<InvalidCombinations>
  <InvalidCombination Feature="HolePunch" Option="Left4"/>
  <InvalidCombination Feature="MediaType" Option="Thick_Duplex_Backside"/>
</InvalidCombinations>
```

```xml
<InvalidCombinations>
  <InvalidCombination Feature="MediaSizeName" Option="na_invoice_5.5x8.5in"/>
  <InvalidCombination Feature="HolePunch" Option="Left2"/>
</InvalidCombinations>
<InvalidCombinations>
  <InvalidCombination Feature="MediaSizeName" Option="na_invoice_5.5x8.5in"/>
  <InvalidCombination Feature="HolePunch" Option="Top2"/>
</InvalidCombinations>
<InvalidCombinations>
  <InvalidCombination Feature="MediaSizeName" Option="na_invoice_5.5x8.5in"/>
  <InvalidCombination Feature="HolePunch" Option="Right2"/>
</InvalidCombinations>
<InvalidCombinations>
  <InvalidCombination Feature="MediaSizeName" Option="na_invoice_5.5x8.5in"/>
  <InvalidCombination Feature="HolePunch" Option="Left3"/>
</InvalidCombinations>
<InvalidCombinations>
  <InvalidCombination Feature="MediaSizeName" Option="na_invoice_5.5x8.5in"/>
  <InvalidCombination Feature="HolePunch" Option="Top3"/>
</InvalidCombinations>
<InvalidCombinations>
  <InvalidCombination Feature="MediaSizeName" Option="na_invoice_5.5x8.5in"/>
  <InvalidCombination Feature="HolePunch" Option="Right3"/>
</InvalidCombinations>
<InvalidCombinations>
  <InvalidCombination Feature="MediaSizeName" Option="na_invoice_5.5x8.5in"/>
  <InvalidCombination Feature="HolePunch" Option="Left4"/>
</InvalidCombinations>
<InvalidCombinations>
  <InvalidCombination Feature="MediaSizeName" Option="na_invoice_5.5x8.5in"/>
  <InvalidCombination Feature="HolePunch" Option="Top4"/>
</InvalidCombinations>
<InvalidCombinations>
  <InvalidCombination Feature="MediaSizeName" Option="na_invoice_5.5x8.5in"/>
  <InvalidCombination Feature="HolePunch" Option="Right4"/>
</InvalidCombinations>
<InvalidCombinations>
  <InvalidCombination Feature="MediaSizeName" Option="iso_a6_105x148mm"/>
  <InvalidCombination Feature="HolePunch" Option="Left2"/>
</InvalidCombinations>
<InvalidCombinations>
  <InvalidCombination Feature="MediaSizeName" Option="iso_a6_105x148mm"/>
  <InvalidCombination Feature="HolePunch" Option="Top2"/>
</InvalidCombinations>
<InvalidCombinations>
  <InvalidCombination Feature="MediaSizeName" Option="iso_a6_105x148mm"/>
  <InvalidCombination Feature="HolePunch" Option="Right2"/>
</InvalidCombinations>
```

```xml
<InvalidCombinations>
 <InvalidCombination Feature="MediaSizeName" Option="iso_a6_105x148mm"/>
 <InvalidCombination Feature="HolePunch" Option="Left3"/>
</InvalidCombinations>
<InvalidCombinations>
 <InvalidCombination Feature="MediaSizeName" Option="iso_a6_105x148mm"/>
 <InvalidCombination Feature="HolePunch" Option="Top3"/>
</InvalidCombinations>
<InvalidCombinations>
 <InvalidCombination Feature="MediaSizeName" Option="iso_a6_105x148mm"/>
 <InvalidCombination Feature="HolePunch" Option="Right3"/>
</InvalidCombinations>
<InvalidCombinations>
 <InvalidCombination Feature="MediaSizeName" Option="iso_a6_105x148mm"/>
 <InvalidCombination Feature="HolePunch" Option="Left4"/>
</InvalidCombinations>
<InvalidCombinations>
 <InvalidCombination Feature="MediaSizeName" Option="iso_a6_105x148mm"/>
 <InvalidCombination Feature="HolePunch" Option="Top4"/>
</InvalidCombinations>
<InvalidCombinations>
 <InvalidCombination Feature="MediaSizeName" Option="iso_a6_105x148mm"/>
 <InvalidCombination Feature="HolePunch" Option="Right4"/>
</InvalidCombinations>
<InvalidCombinations>
 <InvalidCombination Feature="MediaSizeName" Option="na_number-10_4.125x9.5in"/>
 <InvalidCombination Feature="HolePunch" Option="Left2"/>
</InvalidCombinations>
<InvalidCombinations>
 <InvalidCombination Feature="MediaSizeName" Option="na_number-10_4.125x9.5in"/>
 <InvalidCombination Feature="HolePunch" Option="Top2"/>
</InvalidCombinations>
<InvalidCombinations>
 <InvalidCombination Feature="MediaSizeName" Option="na_number-10_4.125x9.5in"/>
 <InvalidCombination Feature="HolePunch" Option="Right2"/>
</InvalidCombinations>
<InvalidCombinations>
 <InvalidCombination Feature="MediaSizeName" Option="na_number-10_4.125x9.5in"/>
 <InvalidCombination Feature="HolePunch" Option="Left3"/>
</InvalidCombinations>
<InvalidCombinations>
 <InvalidCombination Feature="MediaSizeName" Option="na_number-10_4.125x9.5in"/>
 <InvalidCombination Feature="HolePunch" Option="Top3"/>
</InvalidCombinations>
<InvalidCombinations>
 <InvalidCombination Feature="MediaSizeName" Option="na_number-10_4.125x9.5in"/>
 <InvalidCombination Feature="HolePunch" Option="Right3"/>
</InvalidCombinations>
```

```xml
<InvalidCombinations>
 <InvalidCombination Feature="MediaSizeName" Option="na_number-10_4.125x9.5in"/>
 <InvalidCombination Feature="HolePunch" Option="Left4"/>
</InvalidCombinations>
<InvalidCombinations>
 <InvalidCombination Feature="MediaSizeName" Option="na_number-10_4.125x9.5in"/>
 <InvalidCombination Feature="HolePunch" Option="Top4"/>
</InvalidCombinations>
<InvalidCombinations>
 <InvalidCombination Feature="MediaSizeName" Option="na_number-10_4.125x9.5in"/>
 <InvalidCombination Feature="HolePunch" Option="Right4"/>
</InvalidCombinations>
<InvalidCombinations>
 <InvalidCombination Feature="MediaSizeName" Option="iso_dl_110x220mm"/>
 <InvalidCombination Feature="HolePunch" Option="Left2"/>
</InvalidCombinations>
<InvalidCombinations>
 <InvalidCombination Feature="MediaSizeName" Option="iso_dl_110x220mm"/>
 <InvalidCombination Feature="HolePunch" Option="Top2"/>
</InvalidCombinations>
<InvalidCombinations>
 <InvalidCombination Feature="MediaSizeName" Option="iso_dl_110x220mm"/>
 <InvalidCombination Feature="HolePunch" Option="Right2"/>
</InvalidCombinations>
<InvalidCombinations>
 <InvalidCombination Feature="MediaSizeName" Option="iso_dl_110x220mm"/>
 <InvalidCombination Feature="HolePunch" Option="Left3"/>
</InvalidCombinations>
<InvalidCombinations>
 <InvalidCombination Feature="MediaSizeName" Option="iso_dl_110x220mm"/>
 <InvalidCombination Feature="HolePunch" Option="Top3"/>
</InvalidCombinations>
<InvalidCombinations>
 <InvalidCombination Feature="MediaSizeName" Option="iso_dl_110x220mm"/>
 <InvalidCombination Feature="HolePunch" Option="Right3"/>
</InvalidCombinations>
<InvalidCombinations>
 <InvalidCombination Feature="MediaSizeName" Option="iso_dl_110x220mm"/>
 <InvalidCombination Feature="HolePunch" Option="Left4"/>
</InvalidCombinations>
<InvalidCombinations>
 <InvalidCombination Feature="MediaSizeName" Option="iso_dl_110x220mm"/>
 <InvalidCombination Feature="HolePunch" Option="Top4"/>
</InvalidCombinations>
<InvalidCombinations>
 <InvalidCombination Feature="MediaSizeName" Option="iso_dl_110x220mm"/>
 <InvalidCombination Feature="HolePunch" Option="Right4"/>
</InvalidCombinations>
```

```
<InvalidCombinations>
 <InvalidCombination Feature="MediaSizeName" Option="na_monarch_3.875x7.5in"/>
 <InvalidCombination Feature="HolePunch" Option="Left2"/>
</InvalidCombinations>
<InvalidCombinations>
 <InvalidCombination Feature="MediaSizeName" Option="na_monarch_3.875x7.5in"/>
 <InvalidCombination Feature="HolePunch" Option="Top2"/>
</InvalidCombinations>
<InvalidCombinations>
 <InvalidCombination Feature="MediaSizeName" Option="na_monarch_3.875x7.5in"/>
 <InvalidCombination Feature="HolePunch" Option="Right2"/>
</InvalidCombinations>
<InvalidCombinations>
 <InvalidCombination Feature="MediaSizeName" Option="na_monarch_3.875x7.5in"/>
 <InvalidCombination Feature="HolePunch" Option="Left3"/>
</InvalidCombinations>
<InvalidCombinations>
 <InvalidCombination Feature="MediaSizeName" Option="na_monarch_3.875x7.5in"/>
 <InvalidCombination Feature="HolePunch" Option="Top3"/>
</InvalidCombinations>
<InvalidCombinations>
 <InvalidCombination Feature="MediaSizeName" Option="na_monarch_3.875x7.5in"/>
 <InvalidCombination Feature="HolePunch" Option="Right3"/>
</InvalidCombinations>
<InvalidCombinations>
 <InvalidCombination Feature="MediaSizeName" Option="na_monarch_3.875x7.5in"/>
 <InvalidCombination Feature="HolePunch" Option="Left4"/>
</InvalidCombinations>
<InvalidCombinations>
 <InvalidCombination Feature="MediaSizeName" Option="na_monarch_3.875x7.5in"/>
 <InvalidCombination Feature="HolePunch" Option="Top4"/>
</InvalidCombinations>
<InvalidCombinations>
 <InvalidCombination Feature="MediaSizeName" Option="na_monarch_3.875x7.5in"/>
 <InvalidCombination Feature="HolePunch" Option="Right4"/>
</InvalidCombinations>
<InvalidCombinations>
 <InvalidCombination Feature="MediaSizeName" Option="iso_c5_162x229mm"/>
 <InvalidCombination Feature="HolePunch" Option="Left2"/>
</InvalidCombinations>
<InvalidCombinations>
 <InvalidCombination Feature="MediaSizeName" Option="iso_c5_162x229mm"/>
 <InvalidCombination Feature="HolePunch" Option="Top2"/>
</InvalidCombinations>
<InvalidCombinations>
 <InvalidCombination Feature="MediaSizeName" Option="iso_c5_162x229mm"/>
 <InvalidCombination Feature="HolePunch" Option="Right2"/>
</InvalidCombinations>
```

```xml
<InvalidCombinations>
 <InvalidCombination Feature="MediaSizeName" Option="iso_c5_162x229mm"/>
 <InvalidCombination Feature="HolePunch" Option="Left3"/>
</InvalidCombinations>
<InvalidCombinations>
 <InvalidCombination Feature="MediaSizeName" Option="iso_c5_162x229mm"/>
 <InvalidCombination Feature="HolePunch" Option="Top3"/>
</InvalidCombinations>
<InvalidCombinations>
 <InvalidCombination Feature="MediaSizeName" Option="iso_c5_162x229mm"/>
 <InvalidCombination Feature="HolePunch" Option="Right3"/>
</InvalidCombinations>
<InvalidCombinations>
 <InvalidCombination Feature="MediaSizeName" Option="iso_c5_162x229mm"/>
 <InvalidCombination Feature="HolePunch" Option="Left4"/>
</InvalidCombinations>
<InvalidCombinations>
 <InvalidCombination Feature="MediaSizeName" Option="iso_c5_162x229mm"/>
 <InvalidCombination Feature="HolePunch" Option="Top4"/>
</InvalidCombinations>
<InvalidCombinations>
 <InvalidCombination Feature="MediaSizeName" Option="iso_c5_162x229mm"/>
 <InvalidCombination Feature="HolePunch" Option="Right4"/>
</InvalidCombinations>
<InvalidCombinations>
 <InvalidCombination Feature="MediaSizeName" Option="iso_c6_114x162mm"/>
 <InvalidCombination Feature="HolePunch" Option="Left2"/>
</InvalidCombinations>
<InvalidCombinations>
 <InvalidCombination Feature="MediaSizeName" Option="iso_c6_114x162mm"/>
 <InvalidCombination Feature="HolePunch" Option="Top2"/>
</InvalidCombinations>
<InvalidCombinations>
 <InvalidCombination Feature="MediaSizeName" Option="iso_c6_114x162mm"/>
 <InvalidCombination Feature="HolePunch" Option="Right2"/>
</InvalidCombinations>
<InvalidCombinations>
 <InvalidCombination Feature="MediaSizeName" Option="iso_c6_114x162mm"/>
 <InvalidCombination Feature="HolePunch" Option="Left3"/>
</InvalidCombinations>
<InvalidCombinations>
 <InvalidCombination Feature="MediaSizeName" Option="iso_c6_114x162mm"/>
 <InvalidCombination Feature="HolePunch" Option="Top3"/>
</InvalidCombinations>
<InvalidCombinations>
 <InvalidCombination Feature="MediaSizeName" Option="iso_c6_114x162mm"/>
 <InvalidCombination Feature="HolePunch" Option="Right3"/>
</InvalidCombinations>
```

```xml
<InvalidCombinations>
 <InvalidCombination Feature="MediaSizeName" Option="iso_c6_114x162mm"/>
 <InvalidCombination Feature="HolePunch" Option="Left4"/>
</InvalidCombinations>
<InvalidCombinations>
 <InvalidCombination Feature="MediaSizeName" Option="iso_c6_114x162mm"/>
 <InvalidCombination Feature="HolePunch" Option="Top4"/>
</InvalidCombinations>
<InvalidCombinations>
 <InvalidCombination Feature="MediaSizeName" Option="iso_c6_114x162mm"/>
 <InvalidCombination Feature="HolePunch" Option="Right4"/>
</InvalidCombinations>
<InvalidCombinations>
 <InvalidCombination Feature="MediaSizeName" Option="na_arch-b_12x18in"/>
 <InvalidCombination Feature="HolePunch" Option="Left2"/>
</InvalidCombinations>
<InvalidCombinations>
 <InvalidCombination Feature="MediaSizeName" Option="na_arch-b_12x18in"/>
 <InvalidCombination Feature="HolePunch" Option="Top2"/>
</InvalidCombinations>
<InvalidCombinations>
 <InvalidCombination Feature="MediaSizeName" Option="na_arch-b_12x18in"/>
 <InvalidCombination Feature="HolePunch" Option="Right2"/>
</InvalidCombinations>
<InvalidCombinations>
 <InvalidCombination Feature="MediaSizeName" Option="na_arch-b_12x18in"/>
 <InvalidCombination Feature="HolePunch" Option="Left3"/>
</InvalidCombinations>
<InvalidCombinations>
 <InvalidCombination Feature="MediaSizeName" Option="na_arch-b_12x18in"/>
 <InvalidCombination Feature="HolePunch" Option="Top3"/>
</InvalidCombinations>
<InvalidCombinations>
 <InvalidCombination Feature="MediaSizeName" Option="na_arch-b_12x18in"/>
 <InvalidCombination Feature="HolePunch" Option="Right3"/>
</InvalidCombinations>
<InvalidCombinations>
 <InvalidCombination Feature="MediaSizeName" Option="na_arch-b_12x18in"/>
 <InvalidCombination Feature="HolePunch" Option="Left4"/>
</InvalidCombinations>
<InvalidCombinations>
 <InvalidCombination Feature="MediaSizeName" Option="na_arch-b_12x18in"/>
 <InvalidCombination Feature="HolePunch" Option="Top4"/>
</InvalidCombinations>
<InvalidCombinations>
 <InvalidCombination Feature="MediaSizeName" Option="na_arch-b_12x18in"/>
 <InvalidCombination Feature="HolePunch" Option="Right4"/>
</InvalidCombinations>
```

```xml
<InvalidCombinations>
 <InvalidCombination Feature="MediaSizeName" Option="custom_papersize"/>
 <InvalidCombination Feature="HolePunch" Option="Left2"/>
</InvalidCombinations>
<InvalidCombinations>
 <InvalidCombination Feature="MediaSizeName" Option="custom_papersize"/>
 <InvalidCombination Feature="HolePunch" Option="Top2"/>
</InvalidCombinations>
<InvalidCombinations>
 <InvalidCombination Feature="MediaSizeName" Option="custom_papersize"/>
 <InvalidCombination Feature="HolePunch" Option="Right2"/>
</InvalidCombinations>
<InvalidCombinations>
 <InvalidCombination Feature="MediaSizeName" Option="custom_papersize"/>
 <InvalidCombination Feature="HolePunch" Option="Left3"/>
</InvalidCombinations>
<InvalidCombinations>
 <InvalidCombination Feature="MediaSizeName" Option="custom_papersize"/>
 <InvalidCombination Feature="HolePunch" Option="Top3"/>
</InvalidCombinations>
<InvalidCombinations>
 <InvalidCombination Feature="MediaSizeName" Option="custom_papersize"/>
 <InvalidCombination Feature="HolePunch" Option="Right3"/>
</InvalidCombinations>
<InvalidCombinations>
 <InvalidCombination Feature="MediaSizeName" Option="custom_papersize"/>
 <InvalidCombination Feature="HolePunch" Option="Left4"/>
</InvalidCombinations>
<InvalidCombinations>
 <InvalidCombination Feature="MediaSizeName" Option="custom_papersize"/>
 <InvalidCombination Feature="HolePunch" Option="Top4"/>
</InvalidCombinations>
<InvalidCombinations>
 <InvalidCombination Feature="MediaSizeName" Option="custom_papersize"/>
 <InvalidCombination Feature="HolePunch" Option="Right4"/>
</InvalidCombinations>
<InvalidCombinations>
 <InvalidCombination Feature="MediaSizeName" Option="na_invoice_5.5x8.5in"/>
 <InvalidCombination Feature="Sides" Option="TwoSidedLongEdge"/>
</InvalidCombinations>
<InvalidCombinations>
 <InvalidCombination Feature="MediaSizeName" Option="iso_a6_105x148mm"/>
 <InvalidCombination Feature="Sides" Option="TwoSidedLongEdge"/>
</InvalidCombinations>
<InvalidCombinations>
 <InvalidCombination Feature="MediaSizeName" Option="na_number-10_4.125x9.5in"/>
 <InvalidCombination Feature="Sides" Option="TwoSidedLongEdge"/>
</InvalidCombinations>
```

```xml
<InvalidCombinations>
 <InvalidCombination Feature="MediaSizeName" Option="iso_dl_110x220mm"/>
 <InvalidCombination Feature="Sides" Option="TwoSidedLongEdge"/>
</InvalidCombinations>
<InvalidCombinations>
 <InvalidCombination Feature="MediaSizeName" Option="na_monarch_3.875x7.5in"/>
 <InvalidCombination Feature="Sides" Option="TwoSidedLongEdge"/>
</InvalidCombinations>
<InvalidCombinations>
 <InvalidCombination Feature="MediaSizeName" Option="iso_c5_162x229mm"/>
 <InvalidCombination Feature="Sides" Option="TwoSidedLongEdge"/>
</InvalidCombinations>
<InvalidCombinations>
 <InvalidCombination Feature="MediaSizeName" Option="iso_c6_114x162mm"/>
 <InvalidCombination Feature="Sides" Option="TwoSidedLongEdge"/>
</InvalidCombinations>
<InvalidCombinations>
 <InvalidCombination Feature="MediaSizeName" Option="na_arch-b_12x18in"/>
 <InvalidCombination Feature="Sides" Option="TwoSidedLongEdge"/>
</InvalidCombinations>
<InvalidCombinations>
 <InvalidCombination Feature="MediaSizeName" Option="custom_papersize"/>
 <InvalidCombination Feature="Sides" Option="TwoSidedLongEdge"/>
</InvalidCombinations>
<InvalidCombinations>
 <InvalidCombination Feature="MediaSizeName" Option="na_invoice_5.5x8.5in"/>
 <InvalidCombination Feature="Sides" Option="TwoSidedShortEdge"/>
</InvalidCombinations>
<InvalidCombinations>
 <InvalidCombination Feature="MediaSizeName" Option="iso_a6_105x148mm"/>
 <InvalidCombination Feature="Sides" Option="TwoSidedShortEdge"/>
</InvalidCombinations>
<InvalidCombinations>
 <InvalidCombination Feature="MediaSizeName" Option="na_number-10_4.125x9.5in"/>
 <InvalidCombination Feature="Sides" Option="TwoSidedShortEdge"/>
</InvalidCombinations>
<InvalidCombinations>
 <InvalidCombination Feature="MediaSizeName" Option="iso_dl_110x220mm"/>
 <InvalidCombination Feature="Sides" Option="TwoSidedShortEdge"/>
</InvalidCombinations>
<InvalidCombinations>
 <InvalidCombination Feature="MediaSizeName" Option="na_monarch_3.875x7.5in"/>
 <InvalidCombination Feature="Sides" Option="TwoSidedShortEdge"/>
</InvalidCombinations>
<InvalidCombinations>
 <InvalidCombination Feature="MediaSizeName" Option="iso_c5_162x229mm"/>
 <InvalidCombination Feature="Sides" Option="TwoSidedShortEdge"/>
</InvalidCombinations>
```

```xml
<InvalidCombinations>
 <InvalidCombination Feature="MediaSizeName" Option="iso_c6_114x162mm"/>
 <InvalidCombination Feature="Sides" Option="TwoSidedShortEdge"/>
</InvalidCombinations>
<InvalidCombinations>
 <InvalidCombination Feature="MediaSizeName" Option="na_arch-b_12x18in"/>
 <InvalidCombination Feature="Sides" Option="TwoSidedShortEdge"/>
</InvalidCombinations>
<InvalidCombinations>
 <InvalidCombination Feature="MediaSizeName" Option="custom_papersize"/>
 <InvalidCombination Feature="Sides" Option="TwoSidedShortEdge"/>
</InvalidCombinations>
<InvalidCombinations>
 <InvalidCombination Feature="Sides" Option="TwoSidedLongEdge"/>
 <InvalidCombination Feature="MediaType" Option="TRANSPARENCY"/>
</InvalidCombinations>
<InvalidCombinations>
 <InvalidCombination Feature="Sides" Option="TwoSidedLongEdge"/>
 <InvalidCombination Feature="MediaType" Option="Thick"/>
</InvalidCombinations>
<InvalidCombinations>
 <InvalidCombination Feature="Sides" Option="TwoSidedLongEdge"/>
 <InvalidCombination Feature="MediaType" Option="Labels"/>
</InvalidCombinations>
<InvalidCombinations>
 <InvalidCombination Feature="Sides" Option="TwoSidedLongEdge"/>
 <InvalidCombination Feature="MediaType" Option="Plain_Duplex_Backside"/>
</InvalidCombinations>
<InvalidCombinations>
 <InvalidCombination Feature="Sides" Option="TwoSidedLongEdge"/>
 <InvalidCombination Feature="MediaType" Option="Thick_Duplex_Backside"/>
</InvalidCombinations>
<InvalidCombinations>
 <InvalidCombination Feature="Sides" Option="TwoSidedShortEdge"/>
 <InvalidCombination Feature="MediaType" Option="TRANSPARENCY"/>
</InvalidCombinations>
<InvalidCombinations>
 <InvalidCombination Feature="Sides" Option="TwoSidedShortEdge"/>
 <InvalidCombination Feature="MediaType" Option="Thick"/>
</InvalidCombinations>
<InvalidCombinations>
 <InvalidCombination Feature="Sides" Option="TwoSidedShortEdge"/>
 <InvalidCombination Feature="MediaType" Option="Labels"/>
</InvalidCombinations>
<InvalidCombinations>
 <InvalidCombination Feature="Sides" Option="TwoSidedShortEdge"/>
 <InvalidCombination Feature="MediaType" Option="Plain_Duplex_Backside"/>
</InvalidCombinations>
```

```
<InvalidCombinations>
  <InvalidCombination Feature="Sides" Option="TwoSidedShortEdge"/>
  <InvalidCombination Feature="MediaType" Option="Thick_Duplex_Backside"/>
</InvalidCombinations>
</GlobalConstraints>
</PrinterDescriptionData>
```

What is claimed is:

1. One or more storage media for printing to a Web Services-enabled printing device, the one or more non-transitory storage media storing instructions which, when processed by one or more processors, causes:
   a print driver executing on a client device and retrieving, from the Web Services-enabled printing device, printing device capabilities data that includes paper size data that indicates a particular paper size that the Web Service-enabled printing device is currently configured to support, wherein the particular paper size is not supported by the print driver;
   in response to retrieving the paper size data, the print driver:
      identifying a plurality of features in the printing device capabilities data;
      for each feature in the plurality of features in the printing device capabilities data, determining whether the said each feature is defined in core mapping data that is separate from the printing device capabilities data and includes keywords and name identifiers for a set of printing device features and options;
      updating, based at least upon the paper size data, printer description data, associated with the print driver, to indicate the particular paper size, wherein the printer description data specifies display data for one or more features and options from the plurality of features and options currently supported by the Web Service-enabled printing device;
   the print driver generating, based at least upon the display data contained in the printer description data, graphical user interface data which, when processed at the client device, causes at least the particular paper size to be displayed on a graphical user interface;
   the print driver receiving, from an application program, application data generated by the application program, wherein the application data indicates the particular paper size;
   the print driver generating, based at least upon the application data, print data and a print job ticket; and
   the print driver causing the print data and the print job ticket to be transmitted to the Web Services-enabled printing device.

2. The one or more non-transitory storage media as recited in claim 1, further storing additional instructions which, when processed by the one or more processors, causes:
   in response to retrieving the paper size data, the print driver creating a form that corresponds to the particular paper size, wherein the form indicates the particular paper size;
   wherein a second application program generates, based at least upon the form created by the print driver, second graphical user interface data which, when processed at the client device, causes at least the particular paper size to be displayed on a second graphical user interface;
   the print driver receiving, from the second application program, second application data generated by the second application program, wherein the second application data indicates the particular paper size;
   the print driver generating, based upon the second application data, second print data and a second print job ticket; and
   the print driver causing the second print data and the second print job ticket to be transmitted to the Web Services-enabled printing device.

3. The one or more non-transitory storage media as recited in claim 2, further storing additional instructions which, when processed by the one or more processors, causes:
   in response to receiving the second application data, the print driver replacing, in the second application data, first data that indicates that the particular paper size is a new paper size with second data that indicates that the particular paper size is a customized paper size.

4. The one or more non-transitory storage media as recited in claim 1, further storing additional instructions which, when processed by the one or more processors, causes:
   a port monitor, associated with the print driver, sending, to the Web Services-enabled printing device, an event subscription message, a portion of which conforms to a Web Services Eventing specification,
   wherein the event subscription message indicates that the port monitor subscribes for changes in one or more of the features or options supported by the Web Services-enabled printing device;
   the port monitor receiving, from the Web Services-enabled printing device, an event notification message, at least a portion of which conforms to the Web Services Eventing specification,
   wherein the event notification message indicates a change in one or more of the features or options supported by the Web Services-enabled printing device;
   wherein the print driver retrieving the paper size data comprises in response to the port monitor receiving the event notification message, the print driver, sending, to the port monitor, a request to query the Web Services-enabled printing device for the change.

5. The one or more non-transitory storage media as recited in claim 4, wherein the event notification message is generated in response to an input paper tray with a new configuration being inserted into the Web Services-enabled printing device.

6. An apparatus for printing to a Web Services-enabled printing device, the apparatus comprising a memory storing instructions which, when processed by one or more processors, causes:
   a print driver executing on a client device and retrieving, from the Web Services-enabled printing device, printing device capabilities data that includes paper size data that indicates a particular paper size that the Web Services-enabled printing device is currently configured to support, wherein the particular paper size is not supported by the print driver;
   in response to retrieving the paper size data, the print driver:
      identifying a plurality of features in the printing device capabilities data;
      for each feature in the plurality of features in the printing device capabilities data, determining whether the said each feature is defined in core mapping data that is separate from the printing device capabilities data and includes keywords and name identifiers for a set of printing device features and options;
      updating, based at least upon the paper size data, printer description data, associated with the print driver, to indicate the particular paper size, wherein the printer description data specifies display data for one or more features and options from the plurality of features and options currently supported by the Web Services-enabled printing device;
   the print driver generating, based at least upon the display data contained in the printer description data, graphical user interface data which, when processed at the client device, causes at least the particular paper size to be displayed on a graphical user interface;

the print driver receiving, from an application program, application data generated by the application program, wherein the application data indicates the particular paper size;

the print driver generating, based at least upon the application data, print data and a print job ticket; and the print driver causing the print data and the print job ticket to be transmitted to the Web Services-enabled printing device.

7. The apparatus as recited in claim 6, wherein the memory stores additional instructions which, when processed by the one or more processors, causes:

in response to retrieving the paper size data, the print driver creating a form that corresponds to the particular paper size, wherein the form indicates the particular paper size;

wherein a second application program generates, based at least upon the form created by the print driver, second graphical user interface data which, when processed at the client device, causes at least the particular paper size to be displayed on a second graphical user interface;

the print driver receiving, from the second application program, second application data generated by the second application program, wherein the second application data indicates the particular paper size;

the print driver generating, based upon the second application data, second print data and a second print job ticket; and the print driver causing the second print data and the second print job ticket to be transmitted to the Web Services-enabled printing device.

8. The apparatus as recited in claim 7, wherein the memory stores instructions which, when processed by the one or more processors, causes:

in response to receiving the second application data, the print driver replacing, in the second application data, first data that indicates that the particular paper size is a new paper size with second data that indicates that the particular paper size is a customized paper size.

9. The apparatus as recited in claim 6, wherein the memory stores additional instructions which, when processed by the one or more processors, causes:

a port monitor, associated with the print driver, sending, to the Web Services-enabled printing device, an event subscription message, a portion of which conforms to a Web Services Eventing specification, wherein the event subscription message indicates that the port monitor subscribes for changes in one or more of the features or options supported by the Web Services-enabled printing device;

the port monitor receiving, from the Web Services-enabled printing device, an event notification message, at least a portion of which conforms to the Web Services Eventing specification, wherein the event notification message indicates a change in one or more of the features or options supported by the Web Services-enabled printing device;

wherein the print driver retrieving the paper size data comprises in response to the port monitor receiving the event notification message, the print driver, sending, to the port monitor, a request to query the Web Services-enabled printing device for the change.

10. The apparatus as recited in claim 9, wherein the event notification message is generated in response to an input paper tray with a new configuration being inserted into the Web Services-enabled printing device.

11. An apparatus for printing to a Web Services-enabled printing device, the apparatus comprising a memory storing instructions which, when processed by one or more processors, causes:

a print driver executing on a client device and retrieving, from the Web Services-enabled printing device, printing device capabilities data that includes paper size data that indicates a particular paper size that the Web Services-enabled printing device is currently configured to support, wherein the particular paper size is not supported by the print driver; and in response to retrieving the paper size data, the print driver:

identifying a plurality of features in the printing device capabilities data;

for each feature in the plurality of features in the printing device capabilities data, determining whether the said each feature is defined in core mapping data that is separate from the printing device capabilities data and includes keywords and name identifiers for a set of printing device features and options;

in response to retrieving the paper size data, the print driver creating, based at least upon the paper size data, a form that corresponds to the particular paper size, wherein the form indicates the particular paper size;

wherein an application program generates, based at least upon the form created by the print driver, graphical user interface data which, when processed at the client device, causes at least the particular paper size to be displayed on a graphical user interface;

the print driver receiving, from the application program, application data generated by the application program, wherein the application data indicates the particular paper size;

the print driver generating, based at least upon the application data, print data and a print job ticket; and the print driver causing the print data and the print job ticket to be transmitted to the Web Services-enabled printing device.

12. The apparatus as recited in claim 11, wherein the memory stores instructions which, when processed by the one or more processors, causes:

in response to receiving the application data, the print driver replacing, in the application data, first data that indicates that the particular paper size is a new paper size with second data that indicates that the particular paper size is a customized paper size.

13. The apparatus as recited in claim 11, wherein the memory stores additional instructions which, when processed by the one or more processors, causes:

a port monitor, associated with the print driver, sending, to the Web Services-enabled printing device, an event subscription message, a portion of which conforms to a Web Services Eventing specification, wherein the event subscription message indicates that the port monitor subscribes for changes in one or more of the features or options supported by the Web Services-enabled printing device;

the port monitor receiving, from the Web Services-enabled printing device, an event notification message, at least a portion of which conforms to the Web Services Eventing specification, wherein the event notification message indicates a change in one or more of the features or options supported by the Web Services-enabled printing device;

wherein the print driver retrieving the paper size data comprises in response to the port monitor receiving the event notification message, the print driver, sending, to the port monitor, a request to query the Web Services-enabled printing device for the change.

14. The apparatus as recited in claim 13, wherein the event notification message is generated in response to an input paper tray with a new configuration being inserted into the Web Services-enabled printing device.

15. The one or more non-transitory storage media of claim 1, wherein the instructions, when executed by the one or more processors, further cause:
- for a particular feature in the plurality of features of the printing device capabilities data, in response to determining that the particular feature is defined in the core mapping data, the printer driver:
  - retrieving, from the core mapping data, a particular keyword and name identifier that corresponds to the particular feature, and
  - updating the printer description data by storing, in the printer description data, the particular keyword and name identifier from the core mapping data.

16. The one or more non-transitory storage media of claim 1, wherein the instructions, when executed by the one or more processors, further cause:
- for a particular feature in the plurality of features in the printing device capabilities data, in response to determining that the particular feature is not defined in the core mapping data, the printer driver:
  - generating, based on the particular feature indicated in the printing device capabilities data, a particular keyword,
  - retrieving, from the printing device capabilities data, one or more display names that are associated with the particular feature, and
  - updating the printer description data by storing, in the printer description data, the particular keyword and the one or more display names from the printing device capabilities data.

17. The apparatus of claim 6, wherein the instructions, when executed by the one or more processors, further cause:
- for a particular feature in the plurality of features in the printing device capabilities data, in response to determining that the particular feature is defined in the core mapping data, the printer driver:
  - retrieving, from the core mapping data, a particular keyword and name identifier that corresponds to the particular feature, and
  - updating the printer description data by storing, in the printer description data, the particular keyword and name identifier from the core mapping data.

18. The apparatus of claim 6, wherein the instructions, when executed by the one or more processors, further cause:
- for a particular feature in the plurality of features in the printing device capabilities data, in response to determining that the particular feature is not defined in the core mapping data, the printer driver:
  - generating, based on the particular feature indicated in the printing device capabilities data, a particular keyword,
  - retrieving, from the printing device capabilities data, one or more display names that are associated with the particular feature, and
  - updating the printer description data by storing, in the printer description data, the particular keyword and the one or more display names from the printing device capabilities data.

19. The apparatus of claim 11, wherein the instructions, when executed by the one or more processors, further cause:
- for a particular feature in the plurality of features, in response to determining that the particular feature is defined in the core mapping data, the printer driver:
  - retrieving, from the core mapping data, a particular keyword and name identifier that corresponds to the particular feature, and
  - updating the printer description data by storing, in the printer description data, the particular keyword and name identifier from the core mapping data.

* * * * *